United States Patent [19]

Klapdor et al.

[11] Patent Number: 5,301,216
[45] Date of Patent: Apr. 5, 1994

[54] METHOD OF OPERATING A NUCLEAR REACTOR WITH EMERGENCY COOLING SYSTEM ECONOMY

[75] Inventors: Hans V. Klapdor, Heidelberg; Josef Metzinger, Eberbach, both of Fed. Rep. of Germany

[73] Assignee: Max-Planck-Gesellschaft zur Foerderung der Wissenschaften e.V., Goettigen, Fed. Rep. of Germany

[21] Appl. No.: 21,729

[22] Filed: Feb. 23, 1993

Related U.S. Application Data

[63] Continuation of Ser. No. 866,074, Apr. 1, 1992, abandoned, which is a continuation of Ser. No. 657,898, Feb. 20, 1991, abandoned, which is a continuation of Ser. No. 376,967, Jul. 6, 1989, abandoned, which is a continuation of Ser. No. 220,364, Jul. 11, 1988, abandoned, which is a continuation of Ser. No. 780,491, Sep. 26, 1985, abandoned.

[30] Foreign Application Priority Data

Sep. 27, 1984 [DE] Fed. Rep. of Germany ....... 3435541
Jul. 5, 1985 [DE] Fed. Rep. of Germany ....... 3524175

[51] Int. Cl.$^5$ .............................................. G21C 15/18
[52] U.S. Cl. .............................................. 376/299
[58] Field of Search ................. 376/282, 283, 298, 299

[56] References Cited

U.S. PATENT DOCUMENTS 4,138,319 2/1979 Schabert et al. ................. 376/282

FOREIGN PATENT DOCUMENTS

| 2640786A1 | 3/1978 | Fed. Rep. of Germany . |
| 2942937A1 | 5/1981 | Fed. Rep. of Germany . |
| 3212322A1 | 10/1983 | Fed. Rep. of Germany . |
| 10697 | 1/1983 | Japan . |

OTHER PUBLICATIONS

"United States Decay Heat Standards", 1979, p. 8.
"Decay Heat Calculation", Duchemin et al, 1990, pp. 1-39.
"American National Standard for Decay Heat Power in Light Water Reactors", ANSI/ANS-5.1-1979, Aug. 1979.
"Decay Heat Power in Nuclear Fuels of Light Water Reactors", DIN 25463, Jul. 1982.
"Decay Heat", Progress in Nuclear Energy, Tobias, vol. 5, No. 1, pp. 1-93, 1980.
"New Results on the Decay Heat of Nuclear Reactors", Metzinger et al., Max-Planck-Institut Pür Kernphysik, Jul. 1985.
Cern Courier, International Journal of High Energy Physics, vol. 26, Nov. 1986, pp. 19-23.
Europhysics, vol. 18, No. 2, Feb. 1987, A. G. M. Jansen et al, pp. 21-27.
H. V. Klapdor, Nuclear Physics and Its Astro-Particle Connections, Weak and Electro Magnetic Interactions in Nuclei, 1986, Abstract.

Primary Examiner—Daniel D. Wasil
Attorney, Agent, or Firm—Frishauf, Holtz, Goodman & Woodward

[57] ABSTRACT

A new nuclear reactor or nuclear power plant, as a light water reactor (LWR), including a high-converting LWR, a heavy water reactor, a gas cooled reactor, a high temperature reactor, a fast breeder, with given maximum and effective output power (installed or nominal capacity) and given cooling capacity of the emergency cooling system is safely operated with increased maximum or effective power output which exceeds the values permitted by present nuclear standard and safety regulations. Further, a method for design and construction of a nuclear reactor with reduced cost of the emergency cooling system which is more economical than present methods are disclosed. The improvement is based on a new and more precise way of predicting the decay heat produced in the core of a nuclear reactor after shutdown and makes use of new, more reliable data which show that the decay heat of nuclear reactors is overestimated by present nuclear standards and nuclear safety regulations such as, e.g., ANSI/ANS-5.1-1979 (reaffirmed 13 Jul. 1985 for further 5 years as ANSI/ANS-5.1-1985) and DIN 25463.

5 Claims, 55 Drawing Sheets

238U FAST FISSION

PWR 38 MWd/kg
TOTAL DECAY HEAT FLOW

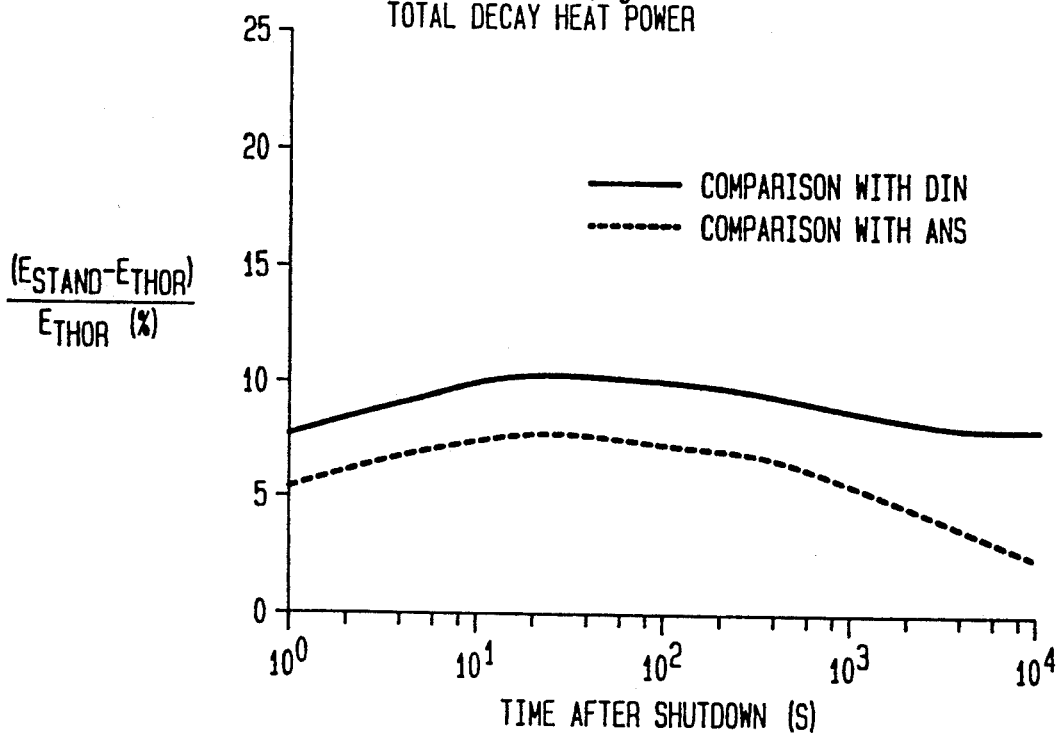
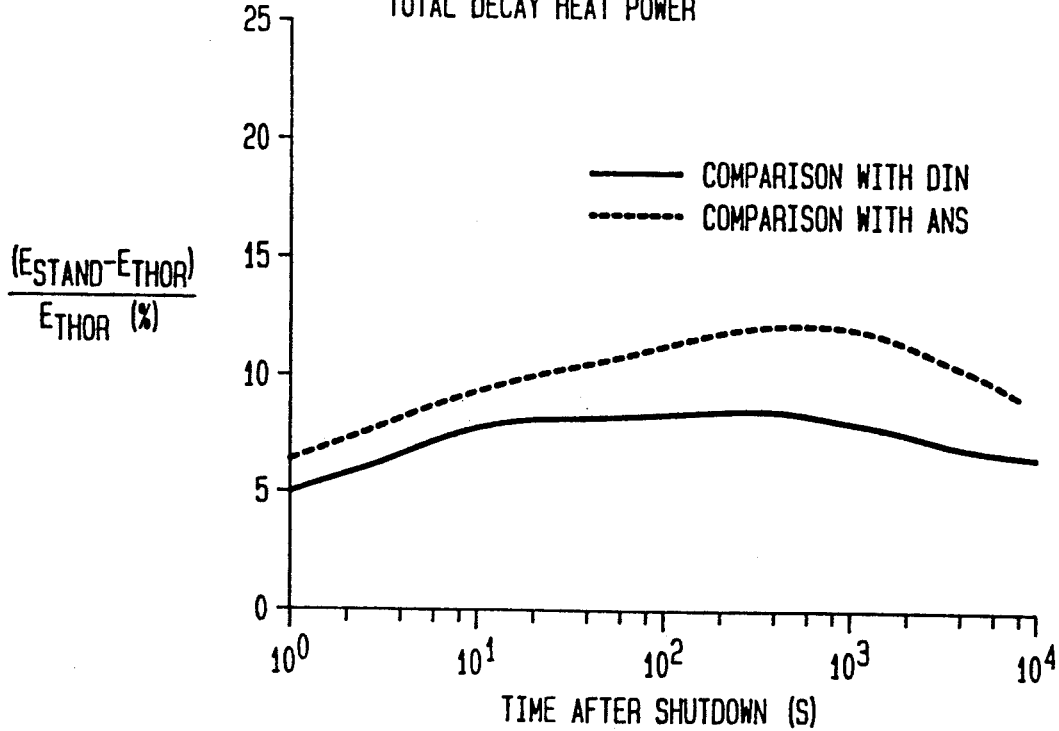

PWR 38 MWd/kg
EFFECT OF n-CAPTURE IN

PWR 38 MWd/kg
EFFECT OF n-CAPTURE IN

BWR 23 MWd/kg
TOTAL DECAY HEAT POWER

HIGH CONVERTING LWR 38.4 MWd/kg
TOTAL DECAY HEAT POWER

| Z | A | K | $\lambda_{tot}$ | $P_{\beta-(\alpha)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 24 | 66 | G | 7.3967E+00 | 0.683 | 0.000 | 0.000 | 0.000 | 0.000 | 0.000 | 0.000 | 0.317 | 0.000 | 5.463 |
| 25 | 66 | G | 5.0967E+00 | 0.993 | 0.000 | 0.000 | 0.000 | 0.000 | 0.000 | 0.000 | 0.007 | 0.000 | 9.039 |
| 26 | 66 | G | 4.6395E-01 | 1.000 | 0.000 | 0.000 | 0.000 | 0.000 | 0.000 | 0.000 | 0.000 | 0.000 | 3.379 |
| 27 | 66 | G | 1.9993E-01 | 1.000 | 0.000 | 0.000 | 0.000 | 0.000 | 0.000 | 0.000 | 0.000 | 0.000 | 6.620 |
| 28 | 66 | G | 3.5185E-06 | 1.000 | 0.000 | 0.000 | 0.000 | 0.000 | 0.000 | 0.000 | 0.000 | 0.000 | 0.066 |
| 29 | 66 | G | 2.2652E-03 | 1.000 | 0.000 | 0.000 | 0.000 | 0.000 | 0.000 | 0.000 | 0.000 | 0.000 | 1.157 |
| 30 | 66 | G | 0.0000E+00 | 0.000 | 0.000 | 0.000 | 0.000 | 0.000 | 0.000 | 0.000 | 0.000 | 0.000 | 0.000 |
| 31 | 66 | G | 2.0483E-05 | 0.000 | 0.000 | 1.000 | 0.000 | 0.000 | 0.000 | 0.000 | 0.000 | 0.000 | 0.000 |
| 32 | 66 | G | 8.3713E-05 | 0.000 | 0.000 | 1.000 | 0.000 | 0.000 | 0.000 | 0.000 | 0.000 | 0.000 | 0.000 |
| 24 | 67 | G | 1.1902E+01 | 0.078 | 0.000 | 0.000 | 0.000 | 0.000 | 0.000 | 0.000 | 0.916 | 0.006 | 3.857 |
| 25 | 67 | G | 6.1778E+00 | 0.993 | 0.000 | 0.000 | 0.000 | 0.000 | 0.000 | 0.000 | 0.007 | 0.000 | 6.288 |
| 26 | 67 | G | 9.5778E-01 | 0.998 | 0.000 | 0.000 | 0.000 | 0.000 | 0.000 | 0.000 | 0.002 | 0.000 | 6.754 |
| 27 | 67 | G | 3.5933E-01 | 1.000 | 0.000 | 0.000 | 0.000 | 0.000 | 0.000 | 0.000 | 0.000 | 0.000 | 5.538 |
| 28 | 67 | G | 3.8508E-02 | 1.000 | 0.000 | 0.000 | 0.000 | 0.000 | 0.000 | 0.000 | 0.000 | 0.000 | 1.857 |
| 29 | 67 | G | 3.1111E-06 | 1.000 | 0.000 | 0.000 | 0.000 | 0.000 | 0.000 | 0.000 | 0.000 | 0.000 | 0.271 |
| 30 | 67 | G | 0.0000E+00 | 0.000 | 0.000 | 0.000 | 0.000 | 0.000 | 0.000 | 0.000 | 0.000 | 0.000 | 0.000 |
| 31 | 67 | G | 2.4588E-06 | 0.000 | 0.000 | 1.000 | 0.000 | 0.000 | 0.000 | 0.000 | 0.000 | 0.000 | 0.000 |
| 32 | 67 | G | 6.1778E-04 | 0.002 | 0.000 | 1.000 | 0.000 | 0.000 | 0.000 | 0.000 | 0.000 | 0.000 | 3.640 |
| 24 | 68 | G | 1.2841E+01 | 0.986 | 0.000 | 0.000 | 0.000 | 0.000 | 0.000 | 0.000 | 0.997 | 0.001 | 9.907 |
| 25 | 68 | G | 1.1626E+01 | 0.996 | 0.000 | 0.000 | 0.000 | 0.000 | 0.000 | 0.000 | 0.010 | 0.004 | 4.521 |
| 26 | 68 | G | 1.6551E+00 | 1.000 | 0.000 | 0.000 | 0.000 | 0.000 | 0.000 | 0.000 | 0.004 | 0.000 | 7.884 |
| 27 | 68 | G | 8.5248E-01 | 1.000 | 0.000 | 0.000 | 0.000 | 0.000 | 0.000 | 0.000 | 0.000 | 0.000 | 1.080 |
| 28 | 68 | G | 9.0893E-03 | 1.000 | 0.000 | 0.000 | 0.000 | 0.000 | 0.000 | 0.000 | 0.000 | 0.000 | 1.185 |
| 29 | 68 | G | 3.0401E-03 | 0.140 | 0.000 | 0.860 | 0.000 | 0.000 | 0.000 | 0.000 | 0.000 | 0.000 | 2.517 |
| 30 | 68 | G | 2.3105E-02 | 1.000 | 0.000 | 0.000 | 0.000 | 0.000 | 0.000 | 0.000 | 0.000 | 0.000 | 0.000 |
| 31 | 68 | G | 0.0000E+00 | 0.000 | 0.000 | 0.000 | 0.000 | 0.000 | 1.000 | 0.000 | 0.000 | 0.000 | 0.000 |
| 32 | 68 | G | 1.6914E-04 | 0.000 | 0.000 | 1.000 | 0.000 | 0.000 | 0.000 | 0.000 | 0.000 | 0.000 | 0.000 |
| 24 | 68 | H | 2.7837E-08 | 0.000 | 0.000 | 0.000 | 0.000 | 0.000 | 1.000 | 0.000 | 0.000 | 0.000 | 0.000 |
| 25 | 69 | G | 9.4900E+00 | 0.262 | 0.000 | 0.000 | 0.000 | 0.000 | 0.000 | 0.000 | 0.738 | 0.000 | 5.082 |
| 26 | 69 | G | 3.0282E+00 | 0.989 | 0.000 | 0.000 | 0.000 | 0.000 | 0.000 | 0.000 | 0.011 | 0.000 | 7.494 |
| 27 | 69 | G | 1.0140E+00 | 1.000 | 0.000 | 0.000 | 0.000 | 0.000 | 0.000 | 0.000 | 0.000 | 0.000 | 6.593 |
| 28 | 69 | G | 3.5275E-02 | 1.000 | 0.000 | 0.000 | 0.000 | 0.000 | 0.000 | 0.000 | 0.000 | 0.000 | 4.000 |
| 29 | 69 | G | 3.8508E-03 | 1.000 | 0.000 | 0.000 | 0.000 | 0.000 | 0.000 | 0.000 | 0.000 | 0.000 | 1.249 |
| 30 | 69 | G | 1.3952E-05 | 0.000 | 0.000 | 1.000 | 0.000 | 0.000 | 0.000 | 0.000 | 0.000 | 0.000 | 0.439 |
| 31 | 69 | G | 2.0629E-04 | 0.000 | 0.000 | 1.000 | 0.000 | 0.000 | 0.000 | 0.000 | 0.000 | 0.000 | 0.322 |
| 32 | 69 | G | 0.0000E+00 | 0.000 | 0.000 | 0.000 | 0.000 | 0.000 | 0.000 | 0.000 | 0.000 | 0.000 | 0.000 |
| 33 | 69 | G | 4.9370E-06 | 0.000 | 0.000 | 1.000 | 0.000 | 0.000 | 0.000 | 0.000 | 0.000 | 0.000 | 0.000 |
| 24 | 70 | G | 7.6506E-04 | 0.000 | 0.000 | 0.000 | 0.000 | 0.000 | 0.000 | 0.000 | 0.000 | 0.000 | 0.000 |
|   |   |   | 2.0580E+01 | 0.000 | 0.000 | 0.000 | 0.000 | 0.000 | 0.000 | 0.000 | 0.994 | 0.006 | 4.057 |

| N | A | K | $\lambda_{tot}$ | $P_{\beta-(G)}$ | $P_{\beta-(I)}$ | $P_{\beta+(G)}$ | $P_{\beta+(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 25 | 70 | G | 1.8938E+01 | 0.066 | 0.000 | 0.000 | 0.000 | 0.000 | 0.000 | 0.000 | 0.914 | 0.020 | 4.937 |
| 26 | 70 | G | 3.3995E+00 | 0.983 | 0.000 | 0.000 | 0.000 | 0.000 | 0.000 | 0.000 | 0.017 | 0.000 | 5.319 |
| 27 | 70 | G | 2.4101E+00 | 1.000 | 0.000 | 0.000 | 0.000 | 0.000 | 0.000 | 0.000 | 0.000 | 0.000 | 8.761 |
| 28 | 70 | H | 8.9705E-02 | 1.000 | 0.000 | 0.000 | 0.000 | 0.000 | 0.000 | 0.000 | 0.000 | 0.000 | 1.760 |
| 29 | 70 | G | 1.6504E-02 | 0.870 | 0.000 | 0.000 | 0.000 | 0.000 | 0.130 | 0.000 | 0.000 | 0.000 | 3.919 |
| 29 | 70 | G | 1.3863E-01 | 1.000 | 0.000 | 0.000 | 0.000 | 0.000 | 0.000 | 0.000 | 0.000 | 0.000 | 3.275 |
| 30 | 70 | G | 0.0000E+00 | 0.000 | 0.000 | 0.000 | 0.000 | 0.000 | 0.000 | 0.000 | 0.000 | 0.000 | 0.000 |
| 31 | 70 | G | 5.4622E-04 | 0.996 | 0.000 | 0.004 | 0.000 | 0.000 | 0.000 | 0.000 | 0.000 | 0.000 | 0.653 |
| 32 | 70 | G | 0.0000E+00 | 0.000 | 0.000 | 0.000 | 0.000 | 0.000 | 0.000 | 0.000 | 0.000 | 0.000 | 0.000 |
| 25 | 71 | G | 1.3594E+01 | 0.000 | 0.000 | 0.000 | 0.000 | 0.000 | 0.000 | 0.000 | 0.989 | 0.011 | 4.603 |
| 26 | 71 | G | 6.6330E+00 | 0.965 | 0.000 | 0.000 | 0.000 | 0.000 | 0.000 | 0.000 | 0.035 | 0.000 | 8.129 |
| 27 | 71 | G | 2.0080E+00 | 0.999 | 0.000 | 0.000 | 0.000 | 0.000 | 0.000 | 0.000 | 0.001 | 0.000 | 7.274 |
| 28 | 71 | G | 2.2906E-01 | 1.000 | 0.000 | 0.000 | 0.000 | 0.000 | 0.000 | 0.000 | 0.000 | 0.000 | 4.674 |
| 29 | 71 | G | 3.5546E-02 | 0.834 | 0.166 | 0.000 | 0.000 | 0.000 | 0.000 | 0.000 | 0.000 | 0.000 | 2.469 |
| 30 | 71 | H | 4.9370E-05 | 1.000 | 0.000 | 0.000 | 0.000 | 0.000 | 0.000 | 0.000 | 0.000 | 0.000 | 2.110 |
| 31 | 71 | G | 4.8135E-03 | 1.000 | 0.000 | 0.000 | 0.000 | 0.000 | 0.000 | 0.000 | 0.000 | 0.000 | 1.365 |
| 32 | 71 | G | 1.3655E-05 | 1.000 | 0.000 | 0.000 | 0.000 | 0.000 | 0.000 | 0.000 | 0.000 | 0.000 | 0.000 |
| 33 | 71 | G | 0.0000E+00 | 0.000 | 0.000 | 1.000 | 0.000 | 0.000 | 0.000 | 0.000 | 0.000 | 0.000 | 0.009 |
| 26 | 72 | G | 7.1628E-07 | 0.000 | 0.000 | 1.000 | 0.000 | 0.000 | 0.000 | 0.000 | 0.000 | 0.000 | 0.000 |
| 27 | 72 | G | 3.0084E-06 | 0.962 | 0.000 | 0.000 | 0.000 | 0.000 | 0.000 | 0.000 | 0.038 | 0.000 | 6.102 |
| 28 | 72 | G | 6.2054E+00 | 0.998 | 0.000 | 0.000 | 0.000 | 0.000 | 0.000 | 0.000 | 0.002 | 0.000 | 9.614 |
| 29 | 72 | G | 4.6241E+00 | 1.000 | 0.000 | 0.000 | 0.000 | 0.000 | 0.000 | 0.000 | 0.000 | 0.000 | 2.591 |
| 30 | 72 | G | 3.3308E-01 | 1.000 | 0.000 | 0.000 | 0.000 | 0.000 | 0.000 | 0.000 | 0.000 | 0.000 | 4.772 |
| 31 | 72 | G | 1.0502E-01 | 1.000 | 0.000 | 0.000 | 0.000 | 0.000 | 0.000 | 0.000 | 0.000 | 0.000 | 0.254 |
| 32 | 72 | G | 4.1407E-06 | 1.000 | 0.000 | 0.000 | 0.000 | 0.000 | 0.000 | 0.000 | 0.000 | 0.000 | 3.203 |
| 33 | 72 | G | 1.3655E-05 | 0.015 | 0.985 | 0.000 | 0.000 | 0.000 | 0.000 | 0.000 | 0.000 | 0.000 | 0.000 |
| 34 | 72 | G | 0.0000E+00 | 0.000 | 0.000 | 0.000 | 0.000 | 0.000 | 1.000 | 0.000 | 0.000 | 0.000 | 0.000 |
| 26 | 73 | G | 7.4054E-06 | 0.000 | 0.000 | 1.000 | 0.000 | 0.000 | 0.000 | 0.000 | 0.000 | 0.000 | 0.000 |
| 27 | 73 | G | 9.4383E-07 | 0.932 | 0.000 | 0.000 | 0.000 | 0.000 | 0.000 | 0.000 | 0.061 | 0.007 | 8.713 |
| 28 | 73 | G | 1.2925E+01 | 0.332 | 0.000 | 0.000 | 0.000 | 0.000 | 0.000 | 0.000 | 0.668 | 0.000 | 4.762 |
| 29 | 73 | G | 3.4416E+00 | 1.000 | 0.000 | 0.000 | 0.000 | 0.000 | 0.000 | 0.000 | 0.000 | 0.000 | 5.541 |
| 30 | 73 | G | 7.8812E-01 | 1.000 | 0.000 | 0.000 | 0.000 | 0.000 | 0.000 | 0.000 | 0.000 | 0.000 | 3.717 |
| 31 | 73 | G | 1.7773E-01 | 1.000 | 0.000 | 0.000 | 0.000 | 0.000 | 0.000 | 0.000 | 0.000 | 0.000 | 1.962 |
| 32 | 73 | G | 2.9496E-02 | 1.000 | 0.000 | 0.000 | 0.000 | 0.000 | 0.000 | 0.000 | 0.000 | 0.000 | 0.780 |
| 33 | 73 | G | 3.9608E-05 | 1.000 | 0.000 | 0.000 | 0.000 | 0.000 | 0.000 | 0.000 | 0.000 | 0.000 | 0.067 |
| 33 | 73 | H | 1.3863E+00 | 0.000 | 0.000 | 1.000 | 0.000 | 0.000 | 0.000 | 0.000 | 0.000 | 0.000 | 0.000 |
| 34 | 73 | G | 0.0000E+00 | 0.000 | 0.000 | 1.000 | 0.000 | 0.000 | 0.000 | 0.000 | 0.000 | 0.000 | 0.000 |
| 34 | 73 | H | 9.9906E-08 | 0.000 | 0.000 | 1.000 | 0.000 | 0.000 | 0.000 | 0.000 | 0.000 | 0.000 | 0.000 |
| 34 | 73 | I | 2.9622E-04 | 0.000 | 0.000 | 1.000 | 0.000 | 0.000 | 0.000 | 0.000 | 0.000 | 0.000 | 0.000 |
| 34 | 73 | G | 2.7118E-05 | 0.000 | 0.000 | 1.000 | 0.000 | 0.000 | 0.000 | 0.000 | 0.000 | 0.000 | 0.000 |

| Z | A | K | $\lambda_{tot}$ | $P_{\beta-(G)}$ | $P_{\beta-(1)}$ | $P_{\beta+(G)}$ | $P_{\beta+(1)}$ | $P_{\alpha}$ | $P_{\gamma}$ | $P_{SF}$ | $P_{1n}$ | $P_{2n}$ | $E_{total}$ |
|---|---|---|---|---|---|---|---|---|---|---|---|---|---|
| 26 | 74 | G | 1.0041E+01 | 0.930 | 0.000 | 0.000 | 0.000 | 0.000 | 0.000 | 0.000 | 0.070 | 0.000 | 7.053 |
| 27 | 74 | G | 7.8722E+00 | 0.409 | 0.000 | 0.000 | 0.000 | 0.000 | 0.000 | 0.000 | 0.590 | 0.001 | 6.355 |
| 28 | 74 | G | 8.6752E-01 | 1.000 | 0.000 | 0.000 | 0.000 | 0.000 | 0.000 | 0.000 | 0.000 | 0.000 | 3.466 |
| 29 | 74 | G | 1.0022E+00 | 1.000 | 0.000 | 0.000 | 0.000 | 0.000 | 0.000 | 0.000 | 0.000 | 0.000 | 6.823 |
| 30 | 74 | H | 7.2963E-03 | 0.868 | 0.132 | 0.000 | 0.000 | 0.000 | 0.000 | 0.000 | 0.000 | 0.000 | 1.059 |
| 31 | 74 | G | 7.2963E-02 | 0.000 | 0.000 | 0.000 | 0.000 | 0.000 | 0.000 | 0.000 | 0.000 | 0.000 | 0.060 |
| 31 | 74 | G | 1.4262E-03 | 1.000 | 0.000 | 0.000 | 0.000 | 0.000 | 0.000 | 0.000 | 0.000 | 0.000 | 3.919 |
| 32 | 74 | G | 0.0000E+00 | 0.000 | 0.000 | 0.000 | 0.000 | 0.000 | 1.000 | 0.000 | 0.000 | 0.000 | 0.000 |
| 33 | 74 | G | 4.5156E-07 | 0.320 | 0.000 | 0.680 | 0.000 | 0.000 | 0.000 | 0.000 | 0.000 | 0.000 | 0.219 |
| 34 | 74 | G | 0.0000E+00 | 0.000 | 0.000 | 0.000 | 0.000 | 0.000 | 1.000 | 0.000 | 0.000 | 0.000 | 0.000 |
| 27 | 75 | G | 5.2952E+00 | 0.001 | 0.000 | 0.000 | 0.000 | 0.000 | 0.000 | 0.000 | 0.999 | 0.000 | 3.558 |
| 28 | 75 | G | 2.0648E+00 | 0.997 | 0.000 | 0.000 | 0.000 | 0.000 | 0.000 | 0.000 | 0.003 | 0.000 | 6.429 |
| 29 | 75 | G | 1.1090E+00 | 1.000 | 0.000 | 0.000 | 0.000 | 0.000 | 0.000 | 0.000 | 0.000 | 0.000 | 4.315 |
| 30 | 75 | G | 6.7956E-02 | 1.000 | 0.000 | 0.000 | 0.000 | 0.000 | 0.000 | 0.000 | 0.000 | 0.000 | 4.028 |
| 31 | 75 | G | 5.5012E-03 | 0.951 | 0.049 | 0.000 | 0.000 | 0.000 | 0.000 | 0.000 | 0.000 | 0.000 | 1.643 |
| 32 | 75 | G | 1.4748E-02 | 0.000 | 0.000 | 1.000 | 0.000 | 0.000 | 0.000 | 0.000 | 0.000 | 0.000 | 0.140 |
| 33 | 75 | H | 1.3919E-04 | 1.000 | 0.000 | 0.000 | 0.000 | 0.000 | 0.000 | 0.000 | 0.000 | 0.000 | 0.457 |
| 33 | 75 | G | 0.0000E+00 | 0.000 | 0.000 | 1.000 | 0.000 | 0.000 | 1.000 | 0.000 | 0.000 | 0.000 | 0.000 |
| 34 | 75 | G | 6.6649E-08 | 0.000 | 0.000 | 1.000 | 0.000 | 0.000 | 1.000 | 0.000 | 0.000 | 0.000 | 0.000 |
| 35 | 75 | G | 1.2034E-04 | 0.000 | 0.000 | 0.000 | 0.000 | 0.000 | 1.000 | 0.000 | 0.000 | 0.000 | 0.406 |
| 26 | 76 | G | 1.5458E+01 | 0.083 | 0.000 | 0.000 | 0.000 | 0.000 | 0.000 | 0.000 | 0.914 | 0.003 | 4.565 |
| 27 | 76 | G | 8.2078E+00 | 0.002 | 0.000 | 0.000 | 0.000 | 0.000 | 0.000 | 0.000 | 0.990 | 0.008 | 3.838 |
| 28 | 76 | G | 1.7687E+00 | 0.995 | 0.000 | 0.000 | 0.000 | 0.000 | 0.000 | 0.000 | 0.005 | 0.000 | 4.355 |
| 29 | 76 | G | 2.8384E+00 | 0.999 | 0.000 | 0.000 | 0.000 | 0.000 | 0.000 | 0.000 | 0.001 | 0.000 | 7.178 |
| 30 | 76 | G | 1.2161E-01 | 1.000 | 0.000 | 0.000 | 0.000 | 0.000 | 0.000 | 0.000 | 0.000 | 0.000 | 2.072 |
| 31 | 76 | G | 2.5577E-02 | 1.000 | 0.000 | 0.000 | 0.000 | 0.000 | 0.000 | 0.000 | 0.000 | 0.000 | 4.369 |
| 32 | 76 | G | 0.0000E+00 | 0.000 | 1.000 | 0.000 | 0.000 | 0.000 | 0.000 | 0.000 | 0.000 | 0.000 | 0.000 |
| 33 | 76 | G | 7.2932E-06 | 1.000 | 0.000 | 0.000 | 0.000 | 0.000 | 0.000 | 0.000 | 0.000 | 0.000 | 1.476 |
| 34 | 76 | G | 0.0000E+00 | 0.000 | 0.000 | 1.000 | 0.000 | 0.000 | 1.000 | 0.000 | 0.000 | 0.000 | 0.000 |
| 35 | 76 | G | 2.7550E+00 | 0.000 | 0.000 | 1.000 | 0.000 | 0.000 | 0.000 | 0.000 | 0.000 | 0.000 | 7.273 |
| 28 | 77 | G | 2.4711E+00 | 0.987 | 0.000 | 0.000 | 0.000 | 0.000 | 0.000 | 0.000 | 0.013 | 0.000 | 4.465 |
| 29 | 77 | G | 4.9510E-01 | 0.995 | 0.000 | 0.000 | 0.000 | 0.000 | 0.000 | 0.000 | 0.005 | 0.000 | 5.443 |
| 30 | 77 | G | 5.3319E-02 | 1.000 | 0.000 | 0.000 | 0.000 | 0.000 | 0.000 | 0.000 | 0.000 | 0.000 | 2.808 |
| 31 | 77 | G | 1.3078E-02 | 0.788 | 0.000 | 0.000 | 0.000 | 0.000 | 0.212 | 0.000 | 0.000 | 0.000 | 1.058 |
| 32 | 77 | H | 1.7039E-05 | 0.000 | 0.000 | 0.000 | 0.000 | 0.000 | 0.000 | 0.000 | 0.000 | 0.000 | 1.667 |
| 33 | 77 | G | 4.9617E-06 | 1.000 | 0.000 | 0.000 | 0.000 | 0.000 | 0.000 | 0.000 | 0.000 | 0.000 | 0.234 |
| 34 | 77 | H | 3.9608E-02 | 0.997 | 0.003 | 0.000 | 0.000 | 0.000 | 0.000 | 0.000 | 0.000 | 0.000 | 0.162 |
| 34 | 77 | G | 0.0000E+00 | 0.000 | 0.000 | 0.000 | 0.000 | 0.000 | 1.000 | 0.000 | 0.000 | 0.000 | 0.000 |
| 35 | 77 | H | 2.6866E-03 | 0.000 | 0.000 | 1.000 | 0.000 | 0.000 | 0.000 | 0.000 | 0.000 | 0.000 | 0.000 |

| Z | A | K | $\lambda_{tot}$ | $P_{\beta-(G)}$ | $P_{\beta-(I)}$ | $P_{\beta+(G)}$ | $P_{\beta+(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 35 | 77 | G | 3.3779E-06 | 0.000 | 0.000 | 1.000 | 0.000 | 0.000 | 0.000 | 0.000 | 0.000 | 0.000 | 0.000 |
| 36 | 77 | G | 1.5527E-04 | 0.000 | 0.000 | 1.000 | 0.000 | 0.000 | 0.000 | 0.000 | 0.000 | 0.000 | 0.000 |
| 28 | 78 | G | 3.1987E+00 | 0.983 | 0.000 | 0.000 | 0.000 | 0.000 | 0.000 | 0.000 | 0.017 | 0.000 | 5.244 |
| 29 | 78 | G | 3.9294E+00 | 0.994 | 0.000 | 0.000 | 0.000 | 0.000 | 0.000 | 0.000 | 0.006 | 0.000 | 6.878 |
| 30 | 78 | G | 4.7153E-01 | 1.000 | 0.000 | 0.000 | 0.000 | 0.000 | 0.000 | 0.000 | 0.000 | 0.000 | 3.310 |
| 31 | 78 | G | 1.2626E-01 | 1.000 | 0.000 | 0.000 | 0.000 | 0.000 | 0.000 | 0.000 | 0.000 | 0.000 | 5.141 |
| 32 | 78 | G | 1.3128E-04 | 1.000 | 0.000 | 0.000 | 0.000 | 0.000 | 0.000 | 0.000 | 0.000 | 0.000 | 0.505 |
| 33 | 78 | G | 1.2836E-04 | 1.000 | 0.000 | 0.000 | 0.000 | 0.000 | 0.000 | 0.000 | 0.000 | 0.000 | 2.553 |
| 34 | 78 | G | 0.0000E+00 | 0.000 | 0.000 | 0.000 | 0.000 | 0.000 | 0.000 | 0.000 | 0.000 | 0.000 | 0.000 |
| 35 | 78 | G | 1.7865E-03 | 0.000 | 0.000 | 1.000 | 0.000 | 0.000 | 0.000 | 0.000 | 0.000 | 0.000 | 0.000 |
| 36 | 78 | G | 0.0000E+00 | 0.000 | 0.000 | 0.000 | 0.000 | 0.000 | 0.000 | 0.000 | 0.000 | 0.000 | 0.000 |
| 29 | 79 | G | 4.5934E+00 | 0.986 | 0.000 | 0.000 | 0.000 | 0.000 | 0.000 | 0.000 | 0.014 | 0.000 | 5.442 |
| 30 | 79 | G | 1.8658E+00 | 1.000 | 0.000 | 0.000 | 0.000 | 0.000 | 0.000 | 0.000 | 0.000 | 0.000 | 4.948 |
| 31 | 79 | G | 2.3902E-01 | 0.949 | 0.050 | 0.000 | 0.000 | 0.000 | 0.000 | 0.000 | 0.001 | 0.000 | 4.140 |
| 32 | 79 | G | 1.6504E-02 | 0.960 | 0.000 | 0.000 | 0.000 | 0.000 | 0.040 | 0.000 | 0.000 | 0.000 | 2.479 |
| 33 | 79 | G | 3.6481E-02 | 1.000 | 0.000 | 0.000 | 0.000 | 0.000 | 0.000 | 0.000 | 0.000 | 0.000 | 1.951 |
| 34 | 79 | H | 1.4088E-03 | 0.989 | 0.011 | 0.000 | 0.000 | 0.000 | 0.000 | 0.000 | 0.000 | 0.000 | 0.998 |
| 34 | 79 | G | 2.9622E-03 | 1.000 | 0.000 | 0.000 | 0.000 | 0.000 | 0.000 | 0.000 | 0.000 | 0.000 | 0.096 |
| 35 | 79 | H | 3.4314E-13 | 0.000 | 0.000 | 0.000 | 0.000 | 0.000 | 1.000 | 0.000 | 0.000 | 0.000 | 0.041 |
| 35 | 79 | G | 1.4146E-01 | 0.000 | 0.000 | 1.000 | 0.000 | 0.000 | 0.000 | 0.000 | 0.000 | 0.000 | 0.207 |
| 36 | 79 | G | 0.0000E+00 | 0.000 | 0.000 | 0.000 | 0.000 | 0.000 | 0.000 | 0.000 | 0.000 | 0.000 | 0.000 |
| 36 | 79 | H | 1.3863E-02 | 0.000 | 0.000 | 1.000 | 0.000 | 0.000 | 0.000 | 0.000 | 0.000 | 0.000 | 0.130 |
| 37 | 79 | G | 5.5187E-06 | 0.000 | 0.000 | 1.000 | 0.000 | 0.000 | 0.000 | 0.000 | 0.000 | 0.000 | 0.282 |
| 28 | 80 | G | 5.0228E-04 | 0.000 | 0.000 | 0.000 | 0.000 | 0.000 | 0.000 | 0.000 | 0.000 | 0.000 | 0.000 |
| 29 | 80 | G | 4.9795E+00 | 0.000 | 0.000 | 0.000 | 0.000 | 0.000 | 1.000 | 0.000 | 0.000 | 0.000 | 3.344 |
| 30 | 80 | G | 6.8833E+00 | 0.266 | 0.000 | 0.000 | 0.000 | 0.000 | 0.000 | 0.000 | 0.733 | 0.001 | 5.306 |
| 31 | 80 | G | 1.4245E+00 | 1.000 | 0.000 | 0.000 | 0.000 | 0.000 | 0.000 | 0.000 | 0.000 | 0.000 | 2.738 |
| 32 | 80 | G | 4.0773E-01 | 0.991 | 0.000 | 0.000 | 0.000 | 0.000 | 0.000 | 0.000 | 0.009 | 0.000 | 6.011 |
| 33 | 80 | G | 2.3496E-02 | 1.000 | 0.000 | 0.000 | 0.000 | 0.000 | 0.000 | 0.000 | 0.000 | 0.000 | 1.316 |
| 34 | 80 | G | 4.5602E-02 | 1.000 | 0.000 | 0.000 | 0.000 | 0.000 | 0.000 | 0.000 | 0.000 | 0.000 | 2.834 |
| 35 | 80 | G | 0.0000E+00 | 0.000 | 0.000 | 0.000 | 0.000 | 0.000 | 0.000 | 0.000 | 0.000 | 0.000 | 0.000 |
| 35 | 80 | H | 4.3594E-05 | 0.917 | 0.000 | 0.083 | 0.000 | 0.000 | 0.000 | 0.000 | 0.000 | 0.000 | 0.086 |
| 36 | 80 | G | 6.5639E-04 | 0.000 | 0.000 | 0.000 | 0.000 | 0.000 | 0.000 | 0.000 | 0.000 | 0.000 | 0.802 |
| 36 | 80 | G | 0.0000E+00 | 0.000 | 0.000 | 0.000 | 0.000 | 0.000 | 0.000 | 0.000 | 0.000 | 0.000 | 0.000 |
| 29 | 81 | G | 7.3653E+00 | 0.997 | 0.000 | 0.000 | 0.000 | 0.000 | 0.000 | 0.000 | 0.003 | 0.000 | 3.623 |
| 30 | 81 | G | 3.1942E+00 | 1.000 | 0.000 | 0.000 | 0.000 | 0.000 | 0.000 | 0.000 | 0.000 | 0.000 | 6.567 |
| 31 | 81 | G | 5.7762E-01 | 1.000 | 0.000 | 0.000 | 0.000 | 0.000 | 0.000 | 0.000 | 0.000 | 0.000 | 5.489 |
| 32 | 81 | G | 8.8865E-02 | 1.000 | 0.000 | 0.000 | 0.000 | 0.000 | 0.000 | 0.000 | 0.000 | 0.000 | 2.894 |
| 33 | 81 | G | 2.0387E-02 | 0.967 | 0.033 | 0.000 | 0.000 | 0.000 | 0.000 | 0.000 | 0.000 | 0.000 | 1.808 |

| N | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 34 | 81 | I | 2.0161E-04 | 0.001 | 0.000 | 0.000 | 0.000 | 0.000 | 0.999 | 0.000 | 0.000 | 0.000 | 0.104 |
| 34 | 81 | G | 6.4180E-04 | 1.000 | 0.000 | 0.000 | 0.000 | 0.000 | 0.000 | 0.000 | 0.000 | 0.000 | 0.623 |
| 35 | 81 | I | 0.0000E+00 | 0.000 | 0.000 | 0.000 | 0.000 | 0.000 | 0.000 | 0.000 | 0.000 | 0.000 | 0.000 |
| 36 | 81 | G | 5.2116E-02 | 0.000 | 0.000 | 1.000 | 0.000 | 0.000 | 1.000 | 0.000 | 0.000 | 0.000 | 0.190 |
| 36 | 81 | I | 1.0466E-13 | 0.000 | 0.000 | 1.000 | 0.000 | 0.000 | 1.000 | 0.000 | 0.000 | 0.000 | 0.021 |
| 37 | 81 | G | 3.8127E-04 | 0.000 | 0.000 | 1.000 | 0.000 | 0.000 | 1.000 | 0.000 | 0.000 | 0.000 | 0.085 |
| 37 | 81 | I | 4.2034E-05 | 0.000 | 0.000 | 0.000 | 0.000 | 0.000 | 0.000 | 0.000 | 0.000 | 0.000 | 0.000 |
| 28 | 82 | G | 8.7276E+00 | 0.000 | 0.000 | 0.000 | 0.000 | 0.000 | 0.000 | 0.000 | 0.388 | 0.612 | 3.526 |
| 29 | 82 | G | 1.2384E+01 | 0.000 | 0.000 | 0.000 | 0.000 | 0.000 | 0.000 | 0.000 | 0.532 | 0.468 | 3.783 |
| 30 | 82 | G | 3.9095E+00 | 0.052 | 0.000 | 0.000 | 0.000 | 0.000 | 0.000 | 0.000 | 0.948 | 0.000 | 2.817 |
| 31 | 82 | G | 1.1552E+00 | 1.000 | 0.000 | 0.000 | 0.000 | 0.000 | 0.000 | 0.000 | 0.000 | 0.000 | 6.392 |
| 32 | 82 | G | 1.5068E-01 | 1.000 | 0.000 | 0.000 | 0.000 | 0.000 | 0.000 | 0.000 | 0.000 | 0.000 | 2.772 |
| 33 | 82 | G | 3.6290E-02 | 1.000 | 0.000 | 0.000 | 0.000 | 0.000 | 0.000 | 0.000 | 0.000 | 0.000 | 3.652 |
| 34 | 82 | G | 4.9510E-02 | 1.000 | 0.000 | 0.000 | 0.000 | 0.000 | 0.000 | 0.000 | 0.000 | 0.000 | 5.056 |
| 35 | 82 | I | 0.0000E+00 | 0.000 | 0.000 | 0.000 | 0.000 | 0.000 | 0.976 | 0.000 | 0.000 | 0.000 | 0.000 |
| 35 | 82 | G | 1.8938E-03 | 0.024 | 0.000 | 0.000 | 0.000 | 0.000 | 0.976 | 0.000 | 0.000 | 0.000 | 0.079 |
| 36 | 82 | G | 5.4579E-06 | 1.000 | 0.000 | 0.000 | 0.000 | 0.000 | 0.000 | 0.000 | 0.000 | 0.000 | 2.788 |
| 37 | 82 | I | 0.0000E+00 | 0.000 | 0.000 | 0.000 | 0.000 | 0.000 | 0.000 | 0.000 | 0.000 | 0.000 | 0.000 |
| 30 | 83 | G | 8.4232E+00 | 0.277 | 0.000 | 0.000 | 0.000 | 0.000 | 0.000 | 0.000 | 0.685 | 0.038 | 3.949 |
| 31 | 83 | G | 2.3105E+00 | 1.000 | 0.000 | 0.000 | 0.000 | 0.000 | 0.000 | 0.000 | 0.000 | 0.000 | 3.934 |
| 32 | 83 | G | 3.6481E-01 | 0.998 | 0.000 | 0.000 | 0.000 | 0.000 | 0.000 | 0.000 | 0.002 | 0.000 | 6.332 |
| 33 | 83 | G | 5.2116E-02 | 1.000 | 0.000 | 0.000 | 0.000 | 0.000 | 0.000 | 0.000 | 0.000 | 0.000 | 3.488 |
| 34 | 83 | G | 1.0046E-02 | 1.000 | 0.000 | 0.000 | 0.000 | 0.000 | 0.000 | 0.000 | 0.500 | 0.003 | 2.193 |
| 34 | 83 | I | 5.1574E-04 | 1.000 | 0.000 | 0.000 | 0.000 | 0.000 | 0.000 | 0.000 | 0.872 | 0.110 | 2.918 |
| 35 | 83 | G | 8.0225E-05 | 1.000 | 0.000 | 0.000 | 0.000 | 0.000 | 0.000 | 0.000 | 0.096 | 0.000 | 0.333 |
| 35 | 83 | I | 1.0521E-04 | 1.000 | 0.000 | 0.000 | 0.000 | 0.000 | 0.000 | 0.000 | 0.001 | 0.000 | 0.042 |
| 36 | 83 | G | 0.0000E+00 | 0.000 | 0.000 | 1.000 | 0.000 | 0.000 | 1.000 | 0.000 | 0.000 | 0.000 | 0.000 |
| 37 | 83 | G | 9.3065E-08 | 0.000 | 0.000 | 1.000 | 0.000 | 0.000 | 1.000 | 0.000 | 0.000 | 0.000 | 0.000 |
| 38 | 83 | I | 1.3863E-01 | 0.000 | 0.000 | 1.000 | 0.000 | 0.000 | 1.000 | 0.000 | 0.000 | 0.000 | 0.500 |
| 38 | 83 | G | 5.9447E-06 | 0.000 | 0.000 | 0.000 | 0.000 | 0.000 | 0.000 | 0.000 | 0.000 | 0.000 | 0.000 |
| 30 | 84 | G | 1.9195E+01 | 0.497 | 0.000 | 0.000 | 0.000 | 0.000 | 0.000 | 0.000 | 0.500 | 0.000 | 4.345 |
| 31 | 84 | G | 5.0264E+00 | 0.018 | 0.000 | 0.000 | 0.000 | 0.000 | 0.000 | 0.000 | 0.872 | 0.003 | 3.039 |
| 32 | 84 | G | 5.7762E-01 | 0.904 | 0.000 | 0.000 | 0.000 | 0.000 | 0.000 | 0.000 | 0.096 | 0.110 | 4.383 |
| 33 | 84 | G | 1.3078E-01 | 0.999 | 0.000 | 0.000 | 0.000 | 0.000 | 0.000 | 0.000 | 0.001 | 0.000 | 5.222 |
| 34 | 84 | G | 3.7266E-03 | 1.000 | 0.000 | 0.000 | 0.000 | 0.000 | 0.000 | 0.000 | 0.000 | 0.000 | 0.949 |
| 35 | 84 | I | 1.9254E-03 | 1.000 | 0.000 | 0.000 | 0.000 | 0.000 | 0.000 | 0.000 | 0.000 | 0.000 | 3.669 |
| 35 | 84 | G | 3.6328E-04 | 1.000 | 0.000 | 0.000 | 0.000 | 0.000 | 0.000 | 0.000 | 0.000 | 0.000 | 2.988 |
| 36 | 84 | G | 0.0000E+00 | 0.000 | 0.000 | 0.000 | 0.000 | 0.000 | 0.000 | 0.000 | 0.000 | 0.000 | 0.000 |
| 37 | 84 | I | 5.6353E-04 | 0.000 | 0.000 | 0.000 | 0.000 | 0.000 | 1.000 | 0.000 | 0.000 | 0.000 | 0.465 |

| N | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{sf}$ | $P_{1n}$ | $P_{2n}$ | $E_{Total}$ |
|---|---|---|---|---|---|---|---|---|---|---|---|---|---|
| 37 | 84 | G | 2.4493E-07 | 0.040 | 0.000 | 0.960 | 0.000 | 0.000 | 0.000 | 0.000 | 0.000 | 0.000 | 0.012 |
| 38 | 84 | G | 0.0000E+00 | 0.000 | 0.000 | 0.000 | 0.000 | 0.000 | 0.000 | 0.000 | 0.000 | 0.000 | 0.000 |
| 31 | 85 | G | 1.1918E+01 | 0.541 | 0.000 | 0.000 | 0.000 | 0.000 | 0.000 | 0.000 | 0.457 | 0.002 | 5.524 |
| 32 | 85 | G | 1.3213E-01 | 0.626 | 0.000 | 0.000 | 0.000 | 0.000 | 0.000 | 0.000 | 0.374 | 0.000 | 5.248 |
| 33 | 85 | G | 3.3812E-01 | 0.800 | 0.000 | 0.000 | 0.000 | 0.000 | 0.000 | 0.000 | 0.200 | 0.000 | 3.694 |
| 34 | 85 | G | 2.1005E-02 | 1.000 | 0.000 | 0.000 | 0.000 | 0.000 | 0.000 | 0.000 | 0.000 | 0.000 | 3.964 |
| 34 | 85 | H | 4.0299E-03 | 0.002 | 0.998 | 0.000 | 0.000 | 0.000 | 0.000 | 0.000 | 0.000 | 0.000 | 1.103 |
| 35 | 85 | G | 4.3053E-05 | 0.790 | 0.000 | 0.000 | 0.000 | 0.000 | 0.210 | 0.000 | 0.000 | 0.000 | 0.413 |
| 36 | 85 | G | 2.0691E-09 | 1.000 | 0.000 | 0.000 | 0.000 | 0.000 | 0.000 | 0.000 | 0.000 | 0.000 | 0.231 |
| 36 | 85 | H | 0.0000E+00 | 0.000 | 0.000 | 0.000 | 0.000 | 0.000 | 0.009 | 0.000 | 0.000 | 0.000 | 0.000 |
| 37 | 85 | G | 1.7064E-04 | 0.000 | 0.000 | 0.500 | 0.000 | 0.000 | 0.500 | 0.000 | 0.000 | 0.000 | 0.229 |
| 38 | 85 | G | 1.2362E-07 | 0.000 | 0.000 | 1.000 | 0.000 | 0.000 | 0.000 | 0.000 | 0.000 | 0.000 | 0.527 |
| 38 | 85 | H | 3.9294E-05 | 0.000 | 0.000 | 1.000 | 0.000 | 0.000 | 0.000 | 0.000 | 0.000 | 0.000 | 0.000 |
| 39 | 85 | G | 7.1311E-05 | 0.000 | 0.000 | 1.000 | 0.000 | 0.000 | 0.000 | 0.000 | 0.000 | 0.000 | 0.000 |
| 39 | 85 | H | 3.3260E+01 | 0.000 | 0.000 | 1.000 | 0.000 | 0.000 | 0.000 | 0.000 | 0.000 | 0.000 | 0.000 |
| 30 | 86 | G | 2.5096E+01 | 0.418 | 0.000 | 0.000 | 0.000 | 0.000 | 0.000 | 0.000 | 0.559 | 0.023 | 4.791 |
| 31 | 86 | G | 4.9795E+00 | 0.494 | 0.000 | 0.000 | 0.000 | 0.000 | 0.000 | 0.000 | 0.367 | 0.139 | 6.114 |
| 32 | 86 | G | 7.7016E-01 | 0.834 | 0.000 | 0.000 | 0.000 | 0.000 | 0.000 | 0.000 | 0.166 | 0.000 | 4.785 |
| 33 | 86 | G | 4.9159E-02 | 0.962 | 0.000 | 0.000 | 0.000 | 0.000 | 0.000 | 0.000 | 0.038 | 0.000 | 5.776 |
| 34 | 86 | G | 1.2836E-02 | 1.000 | 0.000 | 0.000 | 0.000 | 0.000 | 0.000 | 0.000 | 0.000 | 0.000 | 3.490 |
| 35 | 86 | G | 0.0000E+00 | 1.000 | 0.000 | 0.000 | 0.000 | 0.000 | 0.000 | 0.000 | 0.000 | 0.000 | 5.189 |
| 36 | 86 | G | 1.1326E-02 | 0.000 | 0.000 | 0.000 | 0.000 | 0.000 | 1.000 | 0.000 | 0.000 | 0.000 | 0.000 |
| 37 | 86 | G | 4.2787E-07 | 1.000 | 0.000 | 0.000 | 0.000 | 0.000 | 0.000 | 0.000 | 0.000 | 0.000 | 0.556 |
| 37 | 86 | H | 0.0000E+00 | 1.000 | 0.000 | 0.000 | 0.000 | 0.000 | 0.000 | 0.000 | 0.000 | 0.000 | 0.752 |
| 38 | 86 | G | 9.4952E+01 | 0.776 | 0.000 | 0.000 | 0.000 | 0.000 | 0.000 | 0.000 | 0.224 | 0.000 | 0.000 |
| 32 | 87 | G | 9.4952E-01 | 0.690 | 0.000 | 0.000 | 0.000 | 0.000 | 0.000 | 0.000 | 0.310 | 0.000 | 6.123 |
| 33 | 87 | G | 1.1951E-01 | 0.998 | 0.000 | 0.000 | 0.000 | 0.000 | 0.000 | 0.000 | 0.002 | 0.000 | 5.110 |
| 34 | 87 | G | 1.2444E-02 | 0.977 | 0.000 | 0.003 | 0.000 | 0.000 | 0.000 | 0.000 | 0.023 | 0.000 | 5.222 |
| 35 | 87 | G | 1.5141E-04 | 1.000 | 0.000 | 0.000 | 0.000 | 0.000 | 0.000 | 0.000 | 0.000 | 0.000 | 4.478 |
| 36 | 87 | G | 4.5904E-19 | 1.000 | 0.000 | 0.000 | 0.000 | 0.000 | 0.000 | 0.000 | 0.000 | 0.000 | 2.114 |
| 37 | 87 | G | 6.8628E-05 | 0.000 | 0.000 | 0.000 | 0.000 | 0.000 | 1.000 | 0.000 | 0.000 | 0.000 | 0.082 |
| 38 | 87 | G | 0.0000E+00 | 0.000 | 0.000 | 1.000 | 0.000 | 0.000 | 0.000 | 0.000 | 0.000 | 0.000 | 0.387 |
| 37 | 87 | H | 1.4811E-05 | 0.000 | 0.000 | 0.000 | 0.000 | 0.000 | 1.000 | 0.000 | 0.000 | 0.000 | 0.000 |
| 39 | 87 | G | 2.3976E-06 | 0.000 | 0.000 | 1.000 | 0.000 | 0.000 | 0.000 | 0.000 | 0.000 | 0.000 | 0.381 |
| 39 | 87 | H | 4.9510E-02 | 0.000 | 0.000 | 1.000 | 0.000 | 0.000 | 0.000 | 0.000 | 0.000 | 0.000 | 0.000 |
| 40 | 87 | G | 1.2034E-04 | 0.000 | 0.000 | 0.000 | 0.000 | 0.000 | 1.000 | 0.000 | 0.000 | 0.000 | 0.336 |
| 32 | 88 | G | 9.9863E-02 | 0.771 | 0.000 | 0.000 | 0.000 | 0.000 | 0.000 | 0.000 | 0.229 | 0.000 | 0.000 |
| 33 | 88 | G | 8.2321E+00 | 0.760 | 0.000 | 0.000 | 0.000 | 0.000 | 0.000 | 0.000 | 0.233 | 0.007 | 4.824 |
| 34 | 88 | G | 4.6210E-01 | 0.995 | 0.000 | 0.000 | 0.000 | 0.000 | 0.000 | 0.000 | 0.005 | 0.000 | 6.751 |
|   |   |   |   |   |   |   |   |   |   |   |   |   | 4.033 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 35 | 88 | G | 4.2524E-02 | 0.954 | 0.000 | 0.000 | 0.000 | 0.000 | 0.000 | 0.000 | 0.046 | 0.000 | 5.628 |
| 36 | 88 | G | 6.7956E-05 | 1.000 | 0.000 | 0.000 | 0.000 | 0.000 | 0.000 | 0.000 | 0.000 | 0.000 | 2.315 |
| 37 | 88 | G | 6.4901E-04 | 1.000 | 0.000 | 0.000 | 0.000 | 0.000 | 0.000 | 0.000 | 0.000 | 0.000 | 2.741 |
| 38 | 88 | G | 0.0000E+00 | 0.000 | 0.000 | 0.000 | 0.000 | 0.000 | 0.000 | 0.000 | 0.000 | 0.000 | 0.000 |
| 39 | 88 | G | 7.5260E-08 | 0.000 | 0.000 | 1.000 | 0.000 | 0.000 | 0.000 | 0.000 | 0.000 | 0.000 | 0.000 |
| 40 | 88 | G | 9.6190E-08 | 0.000 | 0.000 | 1.000 | 0.000 | 0.000 | 0.000 | 0.000 | 0.000 | 0.000 | 0.000 |
| 33 | 89 | G | 6.9245E+00 | 0.585 | 0.000 | 0.000 | 0.000 | 0.000 | 0.000 | 0.000 | 0.415 | 0.000 | 4.993 |
| 34 | 89 | G | 1.7329E+00 | 0.950 | 0.000 | 0.000 | 0.000 | 0.000 | 0.000 | 0.000 | 0.050 | 0.000 | 5.397 |
| 35 | 89 | G | 1.5403E-01 | 0.914 | 0.000 | 0.000 | 0.000 | 0.000 | 0.000 | 0.000 | 0.086 | 0.000 | 4.769 |
| 36 | 89 | G | 3.6290E-03 | 1.000 | 0.000 | 0.000 | 0.000 | 0.000 | 0.000 | 0.000 | 0.000 | 0.000 | 3.184 |
| 37 | 89 | G | 7.6003E-04 | 1.000 | 0.000 | 0.000 | 0.000 | 0.000 | 0.000 | 0.000 | 0.000 | 0.000 | 3.063 |
| 38 | 89 | G | 1.5898E-07 | 1.000 | 0.000 | 0.000 | 0.000 | 0.000 | 0.000 | 0.000 | 0.000 | 0.000 | 0.570 |
| 39 | 89 | H | 4.3322E-02 | 0.000 | 0.000 | 0.000 | 0.000 | 0.000 | 1.000 | 0.000 | 0.000 | 0.000 | 0.909 |
| 39 | 89 | G | 0.0000E+00 | 0.000 | 0.000 | 0.000 | 0.000 | 0.000 | 0.000 | 0.000 | 0.000 | 0.000 | 0.000 |
| 40 | 89 | H | 2.7770E-03 | 0.000 | 0.000 | 0.500 | 0.000 | 0.000 | 0.500 | 0.000 | 0.000 | 0.000 | 0.294 |
| 40 | 89 | G | 2.4562E-06 | 0.000 | 0.000 | 1.000 | 0.000 | 0.000 | 0.000 | 0.000 | 0.000 | 0.000 | 1.262 |
| 41 | 89 | H | 1.7504E-04 | 0.000 | 0.000 | 1.000 | 0.000 | 0.000 | 0.000 | 0.000 | 0.000 | 0.000 | 0.000 |
| 41 | 89 | G | 9.6270E-05 | 0.000 | 0.000 | 1.000 | 0.000 | 0.000 | 0.000 | 0.000 | 0.000 | 0.000 | 0.000 |
| 34 | 90 | G | 1.9924E+00 | 0.960 | 0.000 | 0.000 | 0.000 | 0.000 | 0.000 | 0.000 | 0.040 | 0.000 | 3.811 |
| 35 | 90 | G | 3.6481E-01 | 0.880 | 0.000 | 0.000 | 0.000 | 0.000 | 0.000 | 0.000 | 0.120 | 0.000 | 6.584 |
| 36 | 90 | G | 2.1460E-02 | 0.875 | 0.125 | 0.000 | 0.000 | 0.000 | 0.000 | 0.000 | 0.000 | 0.000 | 2.609 |
| 37 | 90 | G | 2.6866E-03 | 1.000 | 0.000 | 0.000 | 0.000 | 0.000 | 0.000 | 0.000 | 0.000 | 0.000 | 4.779 |
| 38 | 90 | G | 4.4433E-10 | 1.000 | 0.000 | 0.000 | 0.000 | 0.000 | 0.000 | 0.000 | 0.000 | 0.000 | 3.727 |
| 39 | 90 | H | 7.8233E-10 | 1.000 | 0.000 | 0.000 | 0.000 | 0.000 | 0.000 | 0.000 | 0.000 | 0.000 | 0.174 |
| 39 | 90 | G | 6.0274E-05 | 1.000 | 0.000 | 0.000 | 0.000 | 0.000 | 0.000 | 0.000 | 0.000 | 0.000 | 0.682 |
| 40 | 90 | H | 3.0006E-06 | 0.000 | 0.000 | 0.000 | 0.000 | 0.000 | 1.000 | 0.000 | 0.000 | 0.000 | 0.931 |
| 40 | 90 | G | 8.5679E-01 | 0.000 | 0.000 | 0.000 | 0.000 | 0.000 | 1.000 | 0.000 | 0.000 | 0.000 | 2.319 |
| 41 | 90 | H | 0.0000E+00 | 0.000 | 0.000 | 1.000 | 0.000 | 0.000 | 0.000 | 0.000 | 0.000 | 0.000 | 0.000 |
| 41 | 90 | G | 3.6869E-02 | 0.000 | 0.000 | 1.000 | 0.000 | 0.000 | 0.000 | 0.000 | 0.000 | 0.000 | 0.125 |
| 42 | 90 | G | 1.3188E-05 | 0.000 | 0.000 | 1.000 | 0.000 | 0.000 | 0.000 | 0.000 | 0.000 | 0.000 | 0.000 |
| 34 | 91 | G | 3.3779E-05 | 0.930 | 0.000 | 0.000 | 0.000 | 0.000 | 0.000 | 0.000 | 0.070 | 0.000 | 5.725 |
| 35 | 91 | G | 2.5672E+00 | 1.000 | 0.000 | 0.000 | 0.000 | 0.000 | 0.000 | 0.000 | 0.000 | 0.000 | 5.015 |
| 36 | 91 | G | 1.0830E+00 | 1.000 | 0.000 | 0.000 | 0.000 | 0.000 | 0.000 | 0.000 | 0.000 | 0.000 | 3.836 |
| 37 | 91 | G | 8.0598E-02 | 1.000 | 0.000 | 0.000 | 0.000 | 0.000 | 0.000 | 0.000 | 0.000 | 0.000 | 3.850 |
| 38 | 91 | G | 1.1951E-02 | 0.082 | 0.918 | 0.000 | 0.000 | 0.000 | 0.000 | 0.000 | 0.000 | 0.000 | 1.174 |
| 39 | 91 | H | 2.0268E-05 | 0.000 | 0.000 | 0.000 | 0.000 | 0.000 | 1.000 | 0.000 | 0.000 | 0.000 | 0.556 |
| 39 | 91 | G | 2.3244E-04 | 1.000 | 0.000 | 0.000 | 0.000 | 0.000 | 0.000 | 0.000 | 0.000 | 0.000 | 0.595 |
| 40 | 91 | G | 1.3726E-07 | 0.000 | 0.000 | 0.000 | 0.000 | 0.000 | 1.000 | 0.000 | 0.000 | 0.000 | 0.000 |

| N | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 41 | 91 | I | 1.2939E-06 | 0.000 | 0.000 | 0.000 | 0.000 | 0.000 | 1.000 | 0.000 | 0.000 | 0.000 | 0.105 |
| 41 | 91 | G | 3.2330E-11 | 0.000 | 0.000 | 1.000 | 0.000 | 0.000 | 1.000 | 0.000 | 0.000 | 0.000 | 0.017 |
| 41 | 91 | I | 1.0664E-02 | 0.000 | 0.000 | 0.500 | 0.000 | 0.000 | 0.500 | 0.000 | 0.000 | 0.000 | 0.326 |
| 42 | 91 | G | 7.4532E-04 | 0.000 | 0.000 | 1.000 | 0.000 | 0.000 | 0.000 | 0.000 | 0.000 | 0.000 | 0.000 |
| 42 | 91 | I | 1.7874E+01 | 0.974 | 0.000 | 0.000 | 0.000 | 0.000 | 0.000 | 0.000 | 0.026 | 0.000 | 4.083 |
| 34 | 92 | G | 1.9804E+00 | 0.740 | 0.000 | 0.000 | 0.000 | 0.000 | 0.000 | 0.000 | 0.260 | 0.000 | 6.312 |
| 35 | 92 | G | 3.7671E-01 | 1.000 | 0.000 | 0.000 | 0.000 | 0.000 | 0.000 | 0.000 | 0.000 | 0.000 | 3.541 |
| 36 | 92 | G | 1.5403E-01 | 1.000 | 0.000 | 0.000 | 0.000 | 0.000 | 0.000 | 0.000 | 0.000 | 0.000 | 3.979 |
| 37 | 92 | G | 7.1048E-05 | 1.000 | 0.000 | 0.000 | 0.000 | 0.000 | 0.000 | 0.000 | 0.000 | 0.000 | 1.518 |
| 38 | 92 | G | 5.4579E-05 | 1.000 | 0.000 | 0.000 | 0.000 | 0.000 | 0.000 | 0.000 | 0.000 | 0.000 | 1.697 |
| 39 | 92 | G | 0.0000E+00 | 1.000 | 0.000 | 0.000 | 0.000 | 0.000 | 0.000 | 0.000 | 0.000 | 0.000 | 0.000 |
| 40 | 92 | G | 0.0000E+00 | 0.000 | 0.000 | 0.000 | 0.000 | 0.000 | 0.000 | 0.000 | 0.000 | 0.000 | 0.000 |
| 41 | 92 | I | 7.9036E-06 | 0.000 | 0.000 | 1.000 | 0.000 | 0.000 | 1.000 | 0.000 | 0.000 | 0.000 | 1.510 |
| 41 | 92 | G | 6.1070E-09 | 0.000 | 0.000 | 1.000 | 0.000 | 0.000 | 0.000 | 0.000 | 0.000 | 0.000 | 0.000 |
| 42 | 92 | G | 0.0000E+00 | 0.000 | 0.000 | 0.000 | 0.000 | 0.000 | 0.000 | 0.000 | 0.000 | 0.000 | 0.000 |
| 35 | 93 | G | 1.2872E+01 | 0.968 | 0.000 | 0.000 | 0.000 | 0.000 | 0.000 | 0.000 | 0.032 | 0.000 | 3.775 |
| 36 | 93 | G | 5.3732E-01 | 0.968 | 0.000 | 0.000 | 0.000 | 0.000 | 0.000 | 0.000 | 0.032 | 0.000 | 4.495 |
| 37 | 93 | G | 1.1951E-01 | 0.984 | 0.000 | 0.000 | 0.000 | 0.000 | 0.000 | 0.000 | 0.016 | 0.000 | 4.197 |
| 38 | 93 | G | 1.5507E-03 | 1.000 | 0.000 | 0.000 | 0.000 | 0.000 | 0.000 | 0.000 | 0.000 | 0.000 | 2.898 |
| 39 | 93 | G | 8.4530E-01 | 0.050 | 0.950 | 0.000 | 0.000 | 0.000 | 0.000 | 0.000 | 0.000 | 0.000 | 0.759 |
| 39 | 93 | I | 1.9064E-05 | 0.000 | 0.000 | 0.000 | 0.000 | 0.000 | 1.000 | 0.000 | 0.000 | 0.000 | 1.262 |
| 40 | 93 | G | 1.4843E-14 | 1.000 | 0.000 | 0.000 | 0.000 | 0.000 | 0.000 | 0.000 | 0.000 | 0.000 | 0.016 |
| 41 | 93 | I | 1.6157E-09 | 0.000 | 0.000 | 0.000 | 0.000 | 0.000 | 1.000 | 0.000 | 0.000 | 0.000 | 0.030 |
| 41 | 93 | G | 0.0000E+00 | 0.000 | 0.000 | 0.000 | 0.000 | 0.000 | 0.000 | 0.000 | 0.000 | 0.000 | 0.000 |
| 42 | 93 | I | 2.7905E-05 | 0.000 | 0.000 | 1.000 | 0.000 | 0.000 | 1.000 | 0.000 | 0.000 | 0.000 | 2.425 |
| 42 | 93 | G | 6.2785E-12 | 0.000 | 0.000 | 0.500 | 0.000 | 0.000 | 0.500 | 0.000 | 0.000 | 0.000 | 0.016 |
| 43 | 93 | I | 2.6557E-04 | 0.000 | 0.000 | 1.000 | 0.000 | 0.000 | 1.000 | 0.000 | 0.000 | 0.000 | 0.196 |
| 43 | 93 | G | 7.1311E-05 | 0.000 | 0.000 | 1.000 | 0.000 | 0.000 | 0.000 | 0.000 | 0.000 | 0.000 | 0.000 |
| 34 | 94 | G | 2.8929E+01 | 0.936 | 0.000 | 0.000 | 0.000 | 0.000 | 0.000 | 0.000 | 0.064 | 0.000 | 4.687 |
| 35 | 94 | G | 2.3401E+01 | 0.972 | 0.000 | 0.000 | 0.000 | 0.000 | 0.000 | 0.000 | 0.028 | 0.000 | 7.064 |
| 36 | 94 | G | 3.4657E+00 | 0.956 | 0.000 | 0.000 | 0.000 | 0.000 | 0.000 | 0.000 | 0.044 | 0.000 | 2.396 |
| 37 | 94 | G | 2.5768E-01 | 0.889 | 0.000 | 0.000 | 0.000 | 0.000 | 0.000 | 0.000 | 0.111 | 0.000 | 7.335 |
| 38 | 94 | G | 9.3669E-03 | 1.000 | 0.000 | 0.000 | 0.000 | 0.000 | 0.000 | 0.000 | 0.000 | 0.000 | 2.265 |
| 39 | 94 | G | 6.1778E-04 | 1.000 | 0.000 | 0.000 | 0.000 | 0.000 | 0.000 | 0.000 | 0.000 | 0.000 | 2.594 |
| 40 | 94 | G | 0.0000E+00 | 0.000 | 0.000 | 0.000 | 0.000 | 0.000 | 0.000 | 0.000 | 0.000 | 0.000 | 0.000 |
| 41 | 94 | I | 1.8435E-03 | 0.005 | 0.000 | 0.000 | 0.000 | 0.000 | 0.995 | 0.000 | 0.000 | 0.000 | 0.047 |
| 41 | 94 | G | 1.0985E-12 | 1.000 | 0.000 | 0.000 | 0.000 | 0.000 | 0.000 | 0.000 | 0.000 | 0.000 | 1.720 |
| 42 | 94 | G | 0.0000E+00 | 0.000 | 0.000 | 0.000 | 0.000 | 0.000 | 0.000 | 0.000 | 0.000 | 0.000 | 0.000 |
| 36 | 95 | G | 8.8865E-01 | 1.000 | 0.000 | 0.000 | 0.000 | 0.000 | 0.000 | 0.000 | 0.000 | 0.000 | 3.732 |
| 37 | 95 | G | 1.8386E+00 | 0.929 | 0.000 | 0.000 | 0.000 | 0.000 | 0.000 | 0.000 | 0.071 | 0.000 | 5.612 |

| N | A | K | $\lambda_{tot}$ | $P_{\beta^-(G)}$ | $P_{\beta^-(I)}$ | $P_{\beta^+(G)}$ | $P_{\beta^+(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 38 | 95 | G | 2.8408E-02 | 1.000 | 0.000 | 0.000 | 0.000 | 0.000 | 0.000 | 0.000 | 0.000 | 0.000 | 3.287 |
| 39 | 95 | G | 1.1216E-03 | 1.000 | 0.000 | 0.000 | 0.000 | 0.000 | 0.000 | 0.000 | 0.000 | 0.000 | 2.650 |
| 40 | 95 | H | 1.2534E-07 | 0.989 | 0.011 | 0.000 | 0.000 | 0.000 | 0.000 | 0.000 | 0.000 | 0.000 | 0.851 |
| 41 | 95 | G | 2.2216E-06 | 0.056 | 0.000 | 0.000 | 0.000 | 0.000 | 0.944 | 0.000 | 0.000 | 0.000 | 0.250 |
| 41 | 95 | H | 2.2652E-07 | 1.000 | 0.000 | 0.000 | 0.000 | 0.000 | 0.000 | 0.000 | 0.000 | 0.000 | 0.809 |
| 42 | 95 | G | 0.0000E+00 | 0.000 | 0.000 | 0.000 | 0.000 | 0.000 | 0.000 | 0.000 | 0.000 | 0.000 | 0.000 |
| 42 | 95 | H | 1.3371E-07 | 0.000 | 0.000 | 1.000 | 0.000 | 0.000 | 0.000 | 0.000 | 0.000 | 0.000 | 0.000 |
| 43 | 95 | G | 9.6270E-06 | 0.000 | 0.000 | 1.000 | 0.000 | 0.000 | 0.000 | 0.000 | 0.000 | 0.000 | 0.000 |
| 43 | 95 | H | 1.1669E-04 | 0.000 | 0.000 | 1.000 | 0.000 | 0.000 | 0.000 | 0.000 | 0.000 | 0.000 | 0.000 |
| 44 | 95 | G | 4.4178E+01 | 0.841 | 0.000 | 0.000 | 0.000 | 0.000 | 0.000 | 0.000 | 0.159 | 0.000 | 5.104 |
| 34 | 96 | G | 3.7067E+01 | 0.926 | 0.000 | 0.000 | 0.000 | 0.000 | 0.000 | 0.000 | 0.073 | 0.001 | 7.757 |
| 35 | 96 | G | 5.3899E+00 | 1.000 | 0.000 | 0.000 | 0.000 | 0.000 | 0.000 | 0.000 | 0.000 | 0.000 | 1.843 |
| 36 | 96 | G | 3.6869E+00 | 0.873 | 0.000 | 0.000 | 0.000 | 0.000 | 0.000 | 0.000 | 0.127 | 0.000 | 6.957 |
| 37 | 96 | G | 6.9315E-01 | 1.000 | 0.000 | 0.000 | 0.000 | 0.000 | 0.000 | 0.000 | 0.000 | 0.000 | 2.918 |
| 38 | 96 | G | 6.9315E-02 | 1.000 | 0.000 | 0.000 | 0.000 | 0.000 | 0.000 | 0.000 | 0.000 | 0.000 | 5.359 |
| 39 | 96 | G | 1.1552E-01 | 1.000 | 0.000 | 0.000 | 0.000 | 0.000 | 0.000 | 0.000 | 0.000 | 0.000 | 3.486 |
| 40 | 96 | G | 0.0000E+00 | 0.000 | 0.000 | 0.000 | 0.000 | 0.000 | 0.000 | 0.000 | 0.000 | 0.000 | 0.000 |
| 41 | 96 | G | 8.2282E-06 | 0.000 | 0.000 | 1.000 | 0.000 | 0.000 | 0.000 | 0.000 | 0.000 | 0.000 | 2.692 |
| 42 | 96 | G | 0.0000E+00 | 0.000 | 0.000 | 0.000 | 0.000 | 0.000 | 0.000 | 0.000 | 0.000 | 0.000 | 0.000 |
| 36 | 97 | G | 9.4848E+00 | 1.000 | 0.000 | 0.000 | 0.000 | 0.000 | 0.000 | 0.000 | 0.000 | 0.000 | 3.064 |
| 37 | 97 | G | 4.0773E+00 | 0.790 | 0.000 | 0.000 | 0.000 | 0.000 | 0.000 | 0.000 | 0.210 | 0.000 | 5.881 |
| 38 | 97 | H | 1.5753E+00 | 0.999 | 0.000 | 0.000 | 0.000 | 0.000 | 0.000 | 0.000 | 0.001 | 0.000 | 4.250 |
| 39 | 97 | G | 6.3013E-01 | 0.983 | 0.000 | 0.000 | 0.000 | 0.000 | 0.017 | 0.000 | 0.000 | 0.000 | 4.279 |
| 39 | 97 | H | 2.2360E-01 | 0.984 | 0.000 | 0.000 | 0.000 | 0.000 | 0.000 | 0.000 | 0.016 | 0.000 | 3.985 |
| 40 | 97 | G | 1.1461E-05 | 0.949 | 0.051 | 0.000 | 0.000 | 0.000 | 0.000 | 0.000 | 0.000 | 0.000 | 1.540 |
| 41 | 97 | H | 1.3078E-02 | 0.000 | 0.000 | 1.000 | 0.000 | 0.000 | 0.000 | 0.000 | 0.000 | 0.000 | 0.743 |
| 42 | 97 | G | 1.5611E-04 | 0.000 | 0.000 | 0.000 | 0.000 | 0.000 | 1.000 | 0.000 | 0.000 | 0.000 | 1.135 |
| 43 | 97 | G | 0.0000E+00 | 0.000 | 0.000 | 0.000 | 0.000 | 0.000 | 0.000 | 0.000 | 0.000 | 0.000 | 0.000 |
| 43 | 97 | H | 8.8164E-08 | 0.000 | 0.000 | 0.000 | 0.000 | 0.000 | 1.000 | 0.000 | 0.000 | 0.000 | 0.097 |
| 44 | 97 | G | 8.4541E-15 | 0.000 | 0.000 | 0.000 | 0.000 | 0.000 | 1.000 | 0.000 | 0.000 | 0.000 | 0.017 |
| 36 | 98 | G | 2.7660E-06 | 0.000 | 0.000 | 1.000 | 0.000 | 0.000 | 0.000 | 0.000 | 0.000 | 0.000 | 0.253 |
| 37 | 98 | G | 9.3115E+00 | 1.000 | 0.000 | 0.000 | 0.000 | 0.000 | 0.000 | 0.000 | 0.000 | 0.000 | 1.989 |
| 38 | 98 | G | 6.0802E+00 | 0.740 | 0.000 | 0.000 | 0.000 | 0.000 | 0.000 | 0.000 | 0.260 | 0.000 | 7.259 |
| 39 | 98 | G | 1.0664E+00 | 0.995 | 0.000 | 0.000 | 0.000 | 0.000 | 0.000 | 0.000 | 0.005 | 0.000 | 2.760 |
| 39 | 98 | H | 3.4657E-01 | 1.000 | 0.000 | 0.000 | 0.000 | 0.000 | 0.000 | 0.000 | 0.000 | 0.000 | 5.682 |
| 40 | 98 | G | 1.0664E+00 | 0.995 | 0.000 | 0.000 | 0.000 | 0.000 | 0.000 | 0.000 | 0.005 | 0.000 | 4.592 |
| 41 | 98 | G | 2.2578E-02 | 1.000 | 0.000 | 0.000 | 0.000 | 0.000 | 0.000 | 0.000 | 0.000 | 0.000 | 0.910 |
| 41 | 98 | H | 2.2652E-04 | 1.000 | 0.000 | 0.000 | 0.000 | 0.000 | 0.000 | 0.000 | 0.000 | 0.000 | 3.486 |
| 41 | 98 | G | 2.3902E-01 | 1.000 | 0.000 | 0.000 | 0.000 | 0.000 | 0.000 | 0.000 | 0.000 | 0.000 | 2.094 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{total}$ |
|---|---|---|---|---|---|---|---|---|---|---|---|---|---|
| 42 | 98 | G | 0.0000E+00 | 0.000 | 0.000 | 0.000 | 0.000 | 0.000 | 0.000 | 0.000 | 0.000 | 0.000 | 0.000 |
| 43 | 98 | G | 5.2912E-15 | 1.000 | 0.000 | 0.000 | 0.000 | 0.000 | 0.000 | 0.000 | 0.000 | 0.000 | 1.518 |
| 44 | 98 | G | 0.0000E+00 | 0.000 | 0.000 | 0.000 | 0.000 | 0.000 | 0.000 | 0.000 | 0.000 | 0.000 | 0.000 |
| 38 | 99 | G | 2.3902E+00 | 1.000 | 0.000 | 0.000 | 0.000 | 0.000 | 0.000 | 0.000 | 0.000 | 0.000 | 4.735 |
| 39 | 99 | G | 4.5904E-01 | 0.962 | 0.000 | 0.000 | 0.000 | 0.000 | 0.000 | 0.000 | 0.038 | 0.000 | 3.812 |
| 40 | 99 | H | 3.3007E-01 | 0.584 | 0.416 | 0.000 | 0.000 | 0.000 | 0.000 | 0.000 | 0.000 | 0.000 | 2.388 |
| 40 | 99 | G | 4.4433E-01 | 1.000 | 0.000 | 0.000 | 0.000 | 0.000 | 0.000 | 0.000 | 0.000 | 0.000 | 2.074 |
| 41 | 99 | H | 4.6210E-02 | 1.000 | 0.000 | 0.000 | 0.000 | 0.000 | 0.000 | 0.000 | 0.000 | 0.000 | 1.696 |
| 41 | 99 | G | 2.9124E-06 | 0.870 | 0.130 | 0.000 | 0.000 | 0.000 | 0.000 | 0.000 | 0.000 | 0.000 | 0.654 |
| 42 | 99 | H | 3.2090E-05 | 1.000 | 0.000 | 0.000 | 0.000 | 0.000 | 0.000 | 0.000 | 0.000 | 0.000 | 0.143 |
| 43 | 99 | G | 1.0471E-13 | 1.000 | 0.000 | 0.000 | 0.000 | 0.000 | 0.000 | 0.000 | 0.000 | 0.000 | 0.085 |
| 43 | 99 | H | 0.0000E+00 | 0.000 | 0.000 | 0.000 | 0.000 | 0.000 | 0.000 | 0.000 | 0.000 | 0.000 | 0.000 |
| 44 | 99 | G | 4.0966E-05 | 0.000 | 0.000 | 0.000 | 0.000 | 0.000 | 1.000 | 0.000 | 0.000 | 0.000 | 0.000 |
| 45 | 99 | H | 5.0155E-07 | 0.000 | 0.000 | 1.000 | 0.000 | 0.000 | 0.000 | 0.000 | 0.000 | 0.000 | 0.000 |
| 45 | 99 | G | 5.3983E-04 | 0.000 | 0.000 | 1.000 | 0.000 | 0.000 | 0.000 | 0.000 | 0.000 | 0.000 | 3.169 |
| 46 | 99 | G | 1.4152E+01 | 0.000 | 0.000 | 1.000 | 0.000 | 0.000 | 0.000 | 0.000 | 0.000 | 0.000 | 6.199 |
| 36 | 100 | G | 1.3520E+01 | 0.669 | 0.000 | 0.000 | 0.000 | 0.000 | 0.000 | 0.000 | 0.329 | 0.002 | 3.255 |
| 37 | 100 | G | 3.2527E+00 | 0.999 | 0.000 | 0.000 | 0.000 | 0.000 | 0.000 | 0.000 | 0.001 | 0.000 | 7.339 |
| 38 | 100 | G | 7.3739E-01 | 1.000 | 0.000 | 0.000 | 0.000 | 0.000 | 0.000 | 0.000 | 0.000 | 0.000 | 1.850 |
| 39 | 100 | G | 9.7626E-02 | 1.000 | 0.000 | 0.000 | 0.000 | 0.000 | 0.000 | 0.000 | 0.000 | 0.000 | 3.465 |
| 40 | 100 | G | 4.6210E-01 | 1.000 | 0.000 | 0.000 | 0.000 | 0.000 | 0.000 | 0.000 | 0.000 | 0.000 | 0.000 |
| 41 | 100 | H | 0.0000E+00 | 0.000 | 0.000 | 0.000 | 0.000 | 0.000 | 0.000 | 0.000 | 0.000 | 0.000 | 1.405 |
| 42 | 100 | G | 4.3870E-02 | 1.000 | 0.000 | 0.000 | 0.000 | 0.000 | 0.000 | 0.000 | 0.000 | 0.000 | 0.000 |
| 43 | 100 | G | 0.0000E+00 | 0.000 | 0.000 | 0.000 | 0.000 | 0.000 | 0.000 | 0.000 | 0.000 | 0.000 | 4.113 |
| 44 | 100 | G | 5.8395E+00 | 0.998 | 0.000 | 0.000 | 0.000 | 0.000 | 0.000 | 0.000 | 0.002 | 0.000 | 5.898 |
| 38 | 101 | G | 9.9021E-01 | 1.000 | 0.000 | 0.000 | 0.000 | 0.000 | 0.000 | 0.000 | 0.000 | 0.000 | 3.539 |
| 39 | 101 | G | 2.8881E-01 | 1.000 | 0.000 | 0.000 | 0.000 | 0.000 | 0.000 | 0.000 | 0.000 | 0.000 | 2.554 |
| 40 | 101 | G | 9.7626E-02 | 1.000 | 0.000 | 0.000 | 0.000 | 0.000 | 0.000 | 0.000 | 0.000 | 0.000 | 1.995 |
| 41 | 101 | G | 7.9126E-04 | 1.000 | 0.000 | 0.000 | 0.000 | 0.000 | 0.000 | 0.000 | 0.000 | 0.000 | 0.816 |
| 42 | 101 | G | 8.1355E-04 | 1.000 | 0.000 | 0.000 | 0.000 | 0.000 | 0.000 | 0.000 | 0.000 | 0.000 | 0.078 |
| 43 | 101 | G | 0.0000E+00 | 0.000 | 0.000 | 0.000 | 0.000 | 0.000 | 0.000 | 0.000 | 0.000 | 0.000 | 0.000 |
| 44 | 101 | G | 1.8231E-06 | 0.000 | 0.000 | 0.500 | 0.000 | 0.000 | 0.500 | 0.000 | 0.000 | 0.000 | 0.000 |
| 45 | 101 | G | 6.6585E-09 | 0.000 | 0.000 | 1.000 | 0.000 | 0.000 | 0.000 | 0.000 | 0.000 | 0.000 | 0.078 |
| 45 | 101 | H | 2.2734E-05 | 0.000 | 0.000 | 1.000 | 0.000 | 0.000 | 0.000 | 0.000 | 0.000 | 0.000 | 0.000 |
| 46 | 101 | G | 5.3401E+00 | 0.992 | 0.000 | 0.000 | 0.000 | 0.000 | 0.000 | 0.000 | 0.008 | 0.000 | 4.105 |
| 38 | 102 | G | 1.3863E+00 | 1.000 | 0.000 | 0.000 | 0.000 | 0.000 | 0.000 | 0.000 | 0.000 | 0.000 | 6.807 |
| 39 | 102 | G | 3.3007E-01 | 1.000 | 0.000 | 0.000 | 0.000 | 0.000 | 0.000 | 0.000 | 0.000 | 0.000 | 2.629 |
| 40 | 102 | G | 5.3319E-01 | 1.000 | 0.000 | 0.000 | 0.000 | 0.000 | 0.000 | 0.000 | 0.000 | 0.000 | 4.396 |
| 41 | 102 | G | 1.0315E-03 | 1.000 | 0.000 | 0.000 | 0.000 | 0.000 | 0.000 | 0.000 | 0.000 | 0.000 | 0.370 |

Fig. 8:

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 43 | 102 | I | 2.6866E-03 | 0.985 | 0.000 | 0.000 | 0.000 | 0.000 | 0.015 | 0.000 | 0.000 | 0.000 | 3.282 |
| 43 | 102 | G | 1.3078E-01 | 1.000 | 0.000 | 0.000 | 0.000 | 0.000 | 0.000 | 0.000 | 0.000 | 0.000 | 2.037 |
| 44 | 102 | G | 0.0000E+00 | 0.000 | 0.000 | 0.000 | 0.000 | 0.000 | 0.000 | 0.000 | 0.000 | 0.000 | 0.000 |
| 45 | 102 | I | 7.5754E-09 | 0.208 | 0.000 | 0.742 | 0.000 | 0.000 | 0.050 | 0.000 | 0.000 | 0.000 | 0.098 |
| 45 | 102 | G | 8.4530E-15 | 0.000 | 0.000 | 1.000 | 0.000 | 0.000 | 0.000 | 0.000 | 0.000 | 0.000 | 2.152 |
| 46 | 102 | G | 0.0000E+00 | 0.000 | 0.000 | 0.000 | 0.000 | 0.000 | 0.000 | 0.000 | 0.000 | 0.000 | 0.000 |
| 39 | 103 | G | 2.0884E+00 | 0.969 | 0.000 | 0.000 | 0.000 | 0.000 | 0.031 | 0.000 | 0.000 | 0.000 | 4.997 |
| 40 | 103 | G | 5.3319E-01 | 1.000 | 0.000 | 0.000 | 0.000 | 0.000 | 0.000 | 0.000 | 0.000 | 0.000 | 5.325 |
| 41 | 103 | G | 4.6210E-01 | 1.000 | 0.000 | 0.000 | 0.000 | 0.000 | 0.000 | 0.000 | 0.000 | 0.000 | 2.545 |
| 42 | 103 | G | 1.0269E-02 | 1.000 | 0.000 | 0.000 | 0.000 | 0.000 | 0.000 | 0.000 | 0.000 | 0.000 | 2.674 |
| 43 | 103 | G | 1.2789E-02 | 1.000 | 0.000 | 0.000 | 0.000 | 0.000 | 0.000 | 0.000 | 0.000 | 0.000 | 1.226 |
| 44 | 103 | G | 2.0387E-07 | 0.038 | 0.962 | 0.000 | 0.000 | 0.000 | 0.000 | 0.000 | 0.000 | 0.000 | 0.556 |
| 45 | 103 | G | 2.0593E-04 | 0.000 | 0.000 | 1.000 | 0.000 | 0.000 | 0.000 | 0.000 | 0.000 | 0.000 | 0.040 |
| 45 | 103 | I | 0.0000E+00 | 0.000 | 0.000 | 0.000 | 0.000 | 0.000 | 0.000 | 0.000 | 0.000 | 0.000 | 0.000 |
| 46 | 103 | G | 4.7314E-07 | 0.000 | 0.000 | 1.000 | 0.000 | 0.000 | 0.000 | 0.000 | 0.000 | 0.000 | 0.065 |
| 47 | 103 | G | 1.2161E-01 | 0.000 | 0.000 | 1.000 | 0.000 | 0.000 | 0.000 | 0.000 | 0.000 | 0.000 | 0.134 |
| 47 | 103 | I | 1.7504E-04 | 0.000 | 0.000 | 0.000 | 0.000 | 0.000 | 1.000 | 0.000 | 0.000 | 0.000 | 0.000 |
| 38 | 104 | G | 1.3893E+01 | 0.961 | 0.000 | 0.000 | 0.000 | 0.000 | 0.039 | 0.000 | 0.000 | 0.000 | 4.797 |
| 39 | 104 | G | 3.9272E+00 | 0.988 | 0.000 | 0.000 | 0.000 | 0.000 | 0.012 | 0.000 | 0.000 | 0.000 | 7.588 |
| 40 | 104 | G | 5.7762E-01 | 1.000 | 0.000 | 0.000 | 0.000 | 0.000 | 0.000 | 0.000 | 0.000 | 0.000 | 2.212 |
| 41 | 104 | G | 8.6643E-01 | 1.000 | 0.000 | 0.000 | 0.000 | 0.000 | 0.000 | 0.000 | 0.000 | 0.000 | 5.414 |
| 42 | 104 | G | 1.1552E-02 | 1.000 | 0.000 | 0.000 | 0.000 | 0.000 | 0.000 | 0.000 | 0.000 | 0.000 | 1.440 |
| 43 | 104 | G | 6.3475E-04 | 1.000 | 0.000 | 0.000 | 0.000 | 0.000 | 0.000 | 0.000 | 0.000 | 0.000 | 3.500 |
| 44 | 104 | G | 0.0000E+00 | 0.000 | 0.000 | 0.000 | 0.000 | 0.000 | 0.000 | 0.000 | 0.000 | 0.000 | 0.000 |
| 45 | 104 | G | 2.6256E-03 | 0.002 | 0.000 | 0.004 | 0.000 | 0.000 | 0.998 | 0.000 | 0.000 | 0.000 | 0.133 |
| 45 | 104 | I | 1.6504E-02 | 0.996 | 0.000 | 0.000 | 0.000 | 0.000 | 0.000 | 0.000 | 0.000 | 0.000 | 1.000 |
| 46 | 104 | G | 0.0000E+00 | 0.000 | 0.000 | 0.000 | 0.000 | 0.000 | 0.000 | 0.000 | 0.000 | 0.000 | 0.000 |
| 40 | 105 | G | 2.4951E+00 | 1.000 | 0.000 | 0.000 | 0.000 | 0.000 | 0.000 | 0.000 | 0.000 | 0.000 | 4.470 |
| 41 | 105 | G | 2.4755E-01 | 1.000 | 0.000 | 0.000 | 0.000 | 0.000 | 0.000 | 0.000 | 0.000 | 0.000 | 4.030 |
| 42 | 105 | G | 1.8887E-02 | 1.000 | 0.000 | 0.000 | 0.000 | 0.000 | 0.000 | 0.000 | 0.000 | 0.000 | 3.669 |
| 43 | 105 | G | 1.5201E-03 | 1.000 | 0.000 | 0.000 | 0.000 | 0.000 | 0.000 | 0.000 | 0.000 | 0.000 | 1.890 |
| 44 | 105 | G | 4.3759E-05 | 0.745 | 0.255 | 0.000 | 0.000 | 0.000 | 0.000 | 0.000 | 0.000 | 0.000 | 1.153 |
| 45 | 105 | G | 1.5403E-02 | 1.000 | 0.000 | 0.000 | 0.000 | 0.000 | 0.000 | 0.000 | 0.000 | 0.000 | 0.130 |
| 45 | 105 | I | 5.4152E-06 | 0.000 | 0.000 | 0.000 | 0.000 | 0.000 | 1.000 | 0.000 | 0.000 | 0.000 | 0.231 |
| 46 | 105 | G | 0.0000E+00 | 0.000 | 0.000 | 0.000 | 0.000 | 0.000 | 0.000 | 0.000 | 0.000 | 0.000 | 0.000 |
| 47 | 105 | G | 1.6045E-03 | 1.000 | 0.000 | 0.000 | 0.000 | 0.000 | 0.000 | 0.000 | 0.000 | 0.000 | 0.025 |
| 47 | 105 | I | 1.9432E-07 | 0.000 | 0.000 | 1.000 | 0.000 | 0.000 | 0.000 | 0.000 | 0.000 | 0.000 | 0.000 |
| 48 | 105 | G | 2.0815E-04 | 0.000 | 0.000 | 1.000 | 0.000 | 0.000 | 0.000 | 0.000 | 0.000 | 0.000 | 0.000 |
| 40 | 106 | G | 4.0678E+00 | 1.000 | 0.000 | 0.000 | 0.000 | 0.000 | 0.000 | 0.000 | 0.000 | 0.000 | 2.756 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 41 | 106 | G | 6.9315E-01 | 1.000 | 0.000 | 0.000 | 0.000 | 0.000 | 0.000 | 0.000 | 0.000 | 0.000 | 5.824 |
| 42 | 106 | G | 8.4530E-02 | 1.000 | 0.000 | 0.000 | 0.000 | 0.000 | 0.000 | 0.000 | 0.000 | 0.000 | 1.610 |
| 43 | 106 | G | 1.9254E-02 | 1.000 | 0.000 | 0.000 | 0.000 | 0.000 | 0.000 | 0.000 | 0.000 | 0.000 | 4.187 |
| 44 | 106 | H | 2.1797E-08 | 1.000 | 0.000 | 0.000 | 0.000 | 0.000 | 0.000 | 0.000 | 0.000 | 0.000 | 0.010 |
| 45 | 106 | G | 8.7519E-05 | 1.000 | 0.000 | 0.000 | 0.000 | 0.000 | 0.000 | 0.000 | 0.000 | 0.000 | 3.094 |
| 45 | 106 | H | 2.3105E-02 | 1.000 | 0.000 | 0.000 | 0.000 | 0.000 | 0.000 | 0.000 | 0.000 | 0.000 | 1.626 |
| 46 | 106 | G | 0.0000E+00 | 0.000 | 0.000 | 0.000 | 0.000 | 0.000 | 0.000 | 0.000 | 0.000 | 0.000 | 0.000 |
| 46 | 106 | H | 9.6673E-07 | 0.000 | 0.000 | 1.000 | 0.000 | 0.000 | 0.000 | 0.000 | 0.000 | 0.000 | 0.000 |
| 47 | 106 | G | 4.8135E-04 | 0.000 | 0.000 | 1.000 | 0.000 | 0.000 | 0.000 | 0.000 | 0.000 | 0.000 | 1.219 |
| 47 | 106 | H | 0.0000E+00 | 0.000 | 0.000 | 0.000 | 0.000 | 0.000 | 0.000 | 0.000 | 0.000 | 0.000 | 0.000 |
| 48 | 106 | G | 0.0000E+00 | 0.000 | 0.000 | 0.000 | 0.000 | 0.000 | 0.000 | 0.000 | 0.000 | 0.000 | 0.000 |
| 41 | 107 | G | 1.7755E+00 | 0.986 | 0.000 | 0.000 | 0.000 | 0.000 | 0.000 | 0.000 | 0.014 | 0.000 | 3.267 |
| 42 | 107 | G | 2.3902E-01 | 1.000 | 0.000 | 0.000 | 0.000 | 0.000 | 0.000 | 0.000 | 0.000 | 0.000 | 4.724 |
| 43 | 107 | G | 3.3007E-02 | 1.000 | 0.000 | 0.000 | 0.000 | 0.000 | 0.000 | 0.000 | 0.000 | 0.000 | 2.384 |
| 44 | 107 | G | 3.0401E-03 | 1.000 | 0.000 | 0.000 | 0.000 | 0.000 | 0.000 | 0.000 | 0.000 | 0.000 | 1.444 |
| 45 | 107 | G | 5.3237E-04 | 1.000 | 0.000 | 0.000 | 0.000 | 0.000 | 0.000 | 0.000 | 0.000 | 0.000 | 0.747 |
| 46 | 107 | G | 3.2542E-02 | 1.000 | 0.000 | 0.000 | 0.000 | 0.000 | 0.000 | 0.000 | 0.000 | 0.000 | 0.215 |
| 47 | 107 | H | 3.3812E-15 | 0.000 | 0.000 | 0.000 | 0.000 | 0.000 | 1.000 | 0.000 | 0.000 | 0.000 | 0.008 |
| 47 | 107 | G | 1.5647E-02 | 0.000 | 0.000 | 0.000 | 0.000 | 0.000 | 1.000 | 0.000 | 0.000 | 0.000 | 0.093 |
| 48 | 107 | H | 0.0000E+00 | 0.000 | 0.000 | 0.000 | 0.000 | 0.000 | 0.000 | 0.000 | 0.000 | 0.000 | 0.000 |
| 48 | 107 | G | 2.9622E-05 | 0.000 | 0.000 | 1.000 | 0.000 | 0.000 | 0.000 | 0.000 | 0.000 | 0.000 | 0.121 |
| 49 | 107 | G | 1.3753E-02 | 0.000 | 0.000 | 1.000 | 0.000 | 0.000 | 0.000 | 0.000 | 0.000 | 0.000 | 0.678 |
| 40 | 108 | H | 3.5656E-04 | 0.000 | 0.000 | 0.000 | 0.000 | 0.000 | 0.000 | 0.000 | 0.000 | 0.000 | 0.000 |
| 41 | 108 | G | 6.8901E+00 | 0.994 | 0.000 | 0.000 | 0.000 | 0.000 | 0.000 | 0.000 | 0.006 | 0.000 | 3.522 |
| 42 | 108 | G | 3.2330E+00 | 0.994 | 0.000 | 0.000 | 0.000 | 0.000 | 0.000 | 0.000 | 0.006 | 0.000 | 6.460 |
| 43 | 108 | G | 5.3319E-01 | 1.000 | 0.000 | 0.000 | 0.000 | 0.000 | 0.000 | 0.000 | 0.000 | 0.000 | 1.735 |
| 44 | 108 | G | 1.3863E-01 | 1.000 | 0.000 | 0.000 | 0.000 | 0.000 | 0.000 | 0.000 | 0.000 | 0.000 | 3.985 |
| 45 | 108 | G | 2.5672E-03 | 1.000 | 0.000 | 0.000 | 0.000 | 0.000 | 0.000 | 0.000 | 0.000 | 0.000 | 0.492 |
| 45 | 108 | H | 1.9580E-03 | 0.972 | 0.000 | 0.000 | 0.000 | 0.000 | 0.087 | 0.000 | 0.000 | 0.000 | 2.146 |
| 46 | 108 | G | 0.0000E+00 | 0.000 | 0.000 | 0.000 | 0.000 | 0.000 | 0.000 | 0.000 | 0.000 | 0.000 | 0.000 |
| 47 | 108 | G | 1.7285E-09 | 0.000 | 0.000 | 0.913 | 0.000 | 0.000 | 0.000 | 0.000 | 0.000 | 0.000 | 3.460 |
| 47 | 108 | H | 4.7936E-03 | 0.945 | 0.000 | 0.028 | 0.000 | 0.000 | 0.000 | 0.000 | 0.055 | 0.000 | 1.634 |
| 48 | 108 | G | 0.0000E+00 | 0.000 | 0.000 | 0.000 | 0.000 | 0.000 | 0.000 | 0.000 | 0.000 | 0.000 | 0.628 |
| 41 | 109 | G | 2.7354E+00 | 1.000 | 0.000 | 0.000 | 0.000 | 0.000 | 0.000 | 0.000 | 0.000 | 0.000 | 1.550 |
| 42 | 109 | G | 6.4299E-01 | 1.000 | 0.000 | 0.000 | 0.000 | 0.000 | 0.000 | 0.000 | 0.000 | 0.000 | 4.834 |
| 43 | 109 | G | 4.9510E-01 | 1.000 | 0.000 | 0.000 | 0.000 | 0.000 | 0.000 | 0.000 | 0.000 | 0.000 | 2.924 |
| 44 | 109 | G | 2.0091E-02 | 1.000 | 0.000 | 0.000 | 0.000 | 0.000 | 0.000 | 0.000 | 0.000 | 0.000 | 3.001 |
| 45 | 109 | G | 8.6643E-03 | 1.000 | 0.000 | 0.000 | 0.000 | 0.000 | 0.000 | 0.000 | 0.000 | 0.000 | 1.232 |
| 46 | 109 | H | 2.4667E-03 | 0.000 | 0.000 | 0.000 | 0.000 | 0.000 | 1.000 | 0.000 | 0.000 | 0.000 | 0.189 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 46 | 109 | G | 1.4336E-05 | 0.000 | 1.000 | 0.000 | 0.000 | 0.000 | 0.000 | 0.000 | 0.000 | 0.000 | 0.362 |
| 47 | 109 | G | 1.7504E-02 | 0.000 | 0.000 | 0.000 | 0.000 | 0.000 | 1.000 | 0.000 | 0.000 | 0.000 | 0.088 |
| 47 | 109 | H | 0.0000E+00 | 0.000 | 0.000 | 0.000 | 0.000 | 0.000 | 0.000 | 0.000 | 0.000 | 0.000 | 0.000 |
| 48 | 109 | G | 4.8506E-11 | 0.000 | 0.000 | 0.000 | 0.000 | 0.000 | 1.000 | 0.000 | 0.000 | 0.000 | 0.020 |
| 49 | 109 | G | 8.6191E-03 | 0.000 | 0.000 | 1.000 | 0.000 | 0.000 | 0.000 | 0.000 | 0.000 | 0.000 | 0.650 |
| 49 | 109 | H | 4.5843E-05 | 0.961 | 0.000 | 0.000 | 0.000 | 0.000 | 0.000 | 0.000 | 0.039 | 0.000 | 0.000 |
| 40 | 110 | G | 1.1112E+01 | 0.953 | 0.000 | 0.000 | 0.000 | 0.000 | 0.000 | 0.000 | 0.047 | 0.000 | 4.326 |
| 41 | 110 | G | 5.3074E+00 | 1.000 | 0.000 | 0.000 | 0.000 | 0.000 | 0.000 | 0.000 | 0.000 | 0.000 | 7.011 |
| 42 | 110 | G | 8.5248E-01 | 1.000 | 0.000 | 0.000 | 0.000 | 0.000 | 0.000 | 0.000 | 0.000 | 0.000 | 2.630 |
| 43 | 110 | G | 8.3512E-01 | 1.000 | 0.000 | 0.000 | 0.000 | 0.000 | 0.000 | 0.000 | 0.000 | 0.000 | 5.649 |
| 44 | 110 | G | 5.5012E-02 | 1.000 | 0.000 | 0.000 | 0.000 | 0.000 | 0.000 | 0.000 | 0.000 | 0.000 | 1.084 |
| 45 | 110 | G | 2.1005E-01 | 1.000 | 0.000 | 0.000 | 0.000 | 0.000 | 0.000 | 0.000 | 0.000 | 0.000 | 2.573 |
| 45 | 110 | H | 2.5023E-02 | 0.000 | 0.000 | 0.000 | 0.000 | 0.000 | 1.000 | 0.000 | 0.000 | 0.000 | 3.738 |
| 46 | 110 | G | 0.0000E+00 | 0.000 | 0.000 | 0.000 | 0.000 | 0.000 | 0.000 | 0.000 | 0.000 | 0.000 | 0.000 |
| 47 | 110 | G | 3.2090E-08 | 0.986 | 0.000 | 0.000 | 0.000 | 0.000 | 0.014 | 0.000 | 0.000 | 0.000 | 2.812 |
| 47 | 110 | H | 2.8177E-02 | 0.997 | 0.000 | 0.003 | 0.000 | 0.000 | 0.000 | 0.000 | 0.000 | 0.000 | 1.218 |
| 48 | 110 | G | 0.0000E+00 | 0.000 | 0.000 | 0.000 | 0.000 | 0.000 | 0.000 | 0.000 | 0.000 | 0.000 | 0.000 |
| 42 | 111 | G | 1.4419E+00 | 0.999 | 0.000 | 0.000 | 0.000 | 0.000 | 0.000 | 0.000 | 0.001 | 0.000 | 5.607 |
| 43 | 111 | G | 4.7153E-01 | 1.000 | 0.000 | 0.000 | 0.000 | 0.000 | 0.000 | 0.000 | 0.000 | 0.000 | 3.421 |
| 44 | 111 | G | 3.1507E-01 | 1.000 | 0.000 | 0.000 | 0.000 | 0.000 | 0.000 | 0.000 | 0.000 | 0.000 | 3.180 |
| 45 | 111 | G | 6.3013E-02 | 1.000 | 0.184 | 0.000 | 0.000 | 0.000 | 0.739 | 0.000 | 0.000 | 0.000 | 2.009 |
| 46 | 111 | G | 3.5007E-05 | 0.077 | 0.990 | 0.000 | 0.000 | 0.000 | 0.993 | 0.000 | 0.000 | 0.000 | 0.537 |
| 46 | 111 | H | 4.9369E-04 | 0.010 | 0.005 | 0.000 | 0.000 | 0.000 | 0.000 | 0.000 | 0.002 | 0.000 | 0.879 |
| 47 | 111 | G | 1.0664E-02 | 0.002 | 0.013 | 0.000 | 0.000 | 0.000 | 0.000 | 0.000 | 0.001 | 0.000 | 0.062 |
| 47 | 111 | H | 1.0763E-06 | 0.987 | 0.000 | 0.000 | 0.000 | 0.000 | 0.000 | 0.000 | 0.000 | 0.000 | 0.376 |
| 48 | 111 | G | 2.3576E-04 | 0.000 | 0.000 | 0.000 | 0.000 | 0.000 | 1.000 | 0.000 | 0.000 | 0.000 | 0.396 |
| 48 | 111 | H | 0.0000E+00 | 0.000 | 0.000 | 0.000 | 0.000 | 0.000 | 0.000 | 0.000 | 0.000 | 0.000 | 0.000 |
| 49 | 111 | G | 1.5201E-03 | 0.000 | 0.000 | 0.000 | 0.000 | 0.000 | 1.000 | 0.000 | 0.000 | 0.000 | 0.537 |
| 50 | 111 | G | 2.8548E-06 | 0.000 | 0.000 | 0.000 | 0.000 | 0.000 | 0.000 | 0.000 | 0.000 | 0.000 | 0.000 |
| 43 | 112 | G | 3.2726E-04 | 0.998 | 0.000 | 0.000 | 0.000 | 0.000 | 0.000 | 0.000 | 0.002 | 0.000 | 3.542 |
| 44 | 112 | G | 1.7696E+00 | 0.999 | 0.000 | 0.000 | 0.000 | 0.000 | 0.000 | 0.000 | 0.001 | 0.000 | 6.503 |
| 45 | 112 | G | 7.7222E-01 | 1.000 | 0.000 | 0.000 | 0.000 | 0.000 | 0.000 | 0.000 | 0.000 | 0.000 | 1.361 |
| 46 | 112 | G | 1.9254E-01 | 1.000 | 0.000 | 0.000 | 0.000 | 0.000 | 0.000 | 0.000 | 0.000 | 0.000 | 3.727 |
| 47 | 112 | G | 9.9021E-01 | 1.000 | 0.000 | 0.000 | 0.000 | 0.000 | 0.000 | 0.000 | 0.000 | 0.000 | 0.097 |
| 48 | 112 | G | 9.1252E-06 | 0.000 | 0.000 | 0.000 | 0.000 | 0.000 | 1.000 | 0.000 | 0.000 | 0.000 | 2.077 |
| 48 | 112 | H | 6.1723E-05 | 0.000 | 0.000 | 0.000 | 0.000 | 0.000 | 0.000 | 0.000 | 0.000 | 0.000 | 0.000 |
| 49 | 112 | G | 0.0000E+00 | 0.000 | 0.000 | 0.000 | 0.000 | 0.000 | 1.000 | 0.000 | 0.000 | 0.000 | 0.155 |
| 49 | 112 | H | 5.5541E-04 | 0.000 | 0.000 | 0.000 | 0.000 | 0.000 | 0.000 | 0.000 | 0.000 | 0.000 | 0.094 |
| | | | 8.0225E-04 | 0.440 | 0.000 | 0.560 | 0.000 | 0.000 | 0.000 | 0.000 | 0.000 | 0.000 | |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 50 | 112 | G | 0.0000E+00 | 0.000 | 0.000 | 0.000 | 0.000 | 0.000 | 0.000 | 0.000 | 0.000 | 0.000 | 0.000 |
| 43 | 113 | G | 8.1739E-01 | 0.994 | 0.000 | 0.000 | 0.000 | 0.000 | 0.000 | 0.000 | 0.006 | 0.000 | 4.217 |
| 44 | 113 | G | 2.3105E-01 | 1.000 | 0.000 | 0.000 | 0.000 | 0.000 | 0.000 | 0.000 | 0.000 | 0.000 | 3.952 |
| 45 | 113 | G | 7.7016E-01 | 1.000 | 0.000 | 0.000 | 0.000 | 0.000 | 0.000 | 0.000 | 0.000 | 0.000 | 2.185 |
| 46 | 113 | H | 7.2203E-03 | 1.000 | 0.000 | 0.000 | 0.000 | 0.000 | 0.804 | 0.000 | 0.000 | 0.000 | 2.242 |
| 46 | 113 | G | 1.0502E-02 | 0.196 | 0.000 | 0.000 | 0.000 | 0.000 | 0.000 | 0.000 | 0.000 | 0.000 | 0.259 |
| 47 | 113 | G | 3.5859E-05 | 0.985 | 0.015 | 0.000 | 0.000 | 0.000 | 0.001 | 0.000 | 0.000 | 0.000 | 0.830 |
| 47 | 113 | H | 1.5068E-09 | 0.999 | 0.000 | 0.000 | 0.000 | 0.000 | 1.000 | 0.000 | 0.000 | 0.000 | 0.184 |
| 48 | 113 | G | 2.4407E-24 | 1.000 | 0.000 | 0.000 | 0.000 | 0.000 | 0.000 | 0.000 | 0.000 | 0.000 | 0.091 |
| 48 | 113 | H | 1.1613E-04 | 1.000 | 0.000 | 0.000 | 0.000 | 0.000 | 0.500 | 0.000 | 0.000 | 0.000 | 0.392 |
| 49 | 113 | G | 0.0000E+00 | 0.000 | 0.000 | 0.000 | 0.000 | 0.000 | 0.000 | 0.000 | 0.000 | 0.000 | 0.000 |
| 49 | 113 | H | 5.3983E-04 | 0.000 | 0.000 | 0.500 | 0.000 | 0.000 | 1.000 | 0.000 | 0.000 | 0.000 | 0.079 |
| 50 | 113 | G | 6.9698E-08 | 0.000 | 0.000 | 1.000 | 0.000 | 0.000 | 1.000 | 0.000 | 0.000 | 0.000 | 0.028 |
| 51 | 113 | H | 1.7320E-03 | 0.000 | 0.000 | 1.000 | 0.000 | 0.000 | 1.000 | 0.000 | 0.000 | 0.000 | 0.000 |
| 42 | 114 | G | 4.1882E+00 | 0.981 | 0.000 | 0.000 | 0.000 | 0.000 | 0.000 | 0.000 | 0.019 | 0.000 | 4.438 |
| 43 | 114 | G | 1.4003E+00 | 0.989 | 0.000 | 0.000 | 0.000 | 0.000 | 0.000 | 0.000 | 0.011 | 0.000 | 7.236 |
| 44 | 114 | G | 6.1340E-01 | 1.000 | 0.000 | 0.000 | 0.000 | 0.000 | 0.000 | 0.000 | 0.000 | 0.000 | 1.945 |
| 45 | 114 | G | 4.0773E-01 | 1.000 | 0.000 | 0.000 | 0.000 | 0.000 | 0.000 | 0.000 | 0.000 | 0.000 | 4.582 |
| 46 | 114 | G | 4.8135E-03 | 1.000 | 0.000 | 0.000 | 0.000 | 0.000 | 0.957 | 0.000 | 0.000 | 0.000 | 0.559 |
| 47 | 114 | G | 1.5403E-01 | 1.000 | 0.000 | 0.000 | 0.000 | 0.000 | 0.000 | 0.000 | 0.000 | 0.000 | 2.277 |
| 48 | 114 | G | 0.0000E+00 | 0.000 | 0.000 | 0.000 | 0.000 | 0.000 | 0.000 | 0.000 | 0.000 | 0.000 | 0.000 |
| 49 | 114 | H | 1.6195E-07 | 0.995 | 0.000 | 0.043 | 0.000 | 0.000 | 0.000 | 0.000 | 0.000 | 0.000 | 0.239 |
| 49 | 114 | G | 9.6404E-03 | 0.000 | 0.000 | 0.005 | 0.000 | 0.000 | 0.000 | 0.000 | 0.000 | 0.000 | 0.803 |
| 50 | 114 | G | 0.0000E+00 | 0.000 | 0.000 | 0.000 | 0.000 | 0.000 | 0.000 | 0.000 | 0.000 | 0.000 | 0.000 |
| 44 | 115 | G | 1.1486E+00 | 1.000 | 0.000 | 0.000 | 0.000 | 0.000 | 0.000 | 0.000 | 0.000 | 0.000 | 4.704 |
| 45 | 115 | G | 7.0643E-01 | 1.000 | 0.000 | 0.000 | 0.000 | 0.000 | 0.000 | 0.000 | 0.000 | 0.000 | 2.491 |
| 46 | 115 | G | 1.8241E-02 | 1.000 | 0.000 | 0.000 | 0.000 | 0.000 | 0.950 | 0.000 | 0.000 | 0.000 | 3.362 |
| 47 | 115 | G | 5.2511E-04 | 1.000 | 0.000 | 0.000 | 0.000 | 0.000 | 0.000 | 0.000 | 0.000 | 0.000 | 1.571 |
| 48 | 115 | H | 1.7911E-07 | 1.000 | 1.000 | 0.000 | 0.000 | 0.000 | 0.000 | 0.000 | 0.000 | 0.000 | 0.637 |
| 48 | 115 | G | 3.6101E-06 | 1.000 | 0.000 | 0.000 | 0.000 | 0.000 | 0.000 | 0.000 | 0.000 | 0.000 | 0.510 |
| 49 | 115 | H | 4.2893E-05 | 1.000 | 0.000 | 0.000 | 0.000 | 0.000 | 1.000 | 0.000 | 0.000 | 0.000 | 0.333 |
| 49 | 115 | G | 5.5012E-23 | 1.000 | 0.000 | 0.000 | 0.000 | 0.000 | 1.000 | 0.000 | 0.000 | 0.000 | 0.154 |
| 50 | 115 | G | 0.0000E+00 | 0.000 | 0.000 | 0.000 | 0.000 | 0.000 | 1.000 | 0.000 | 0.000 | 0.000 | 0.000 |
| 51 | 115 | G | 3.5989E-04 | 0.000 | 0.000 | 1.000 | 0.000 | 0.000 | 0.000 | 0.000 | 0.000 | 0.000 | 0.000 |
| 52 | 115 | G | 1.7243E-03 | 0.000 | 0.000 | 1.000 | 0.000 | 0.000 | 0.000 | 0.000 | 0.000 | 0.000 | 0.000 |
| 52 | 115 | G | 2.0268E-03 | 0.000 | 0.000 | 1.000 | 0.000 | 0.000 | 0.000 | 0.000 | 0.000 | 0.000 | 0.000 |
| 42 | 116 | G | 8.3865E+00 | 0.969 | 0.000 | 0.000 | 0.000 | 0.000 | 0.000 | 0.000 | 0.031 | 0.000 | 5.328 |
| 43 | 116 | G | 3.0848E+00 | 0.961 | 0.000 | 0.000 | 0.000 | 0.000 | 0.000 | 0.000 | 0.039 | 0.000 | 7.755 |
| 44 | 116 | G | 1.7491E+00 | 1.000 | 0.000 | 0.000 | 0.000 | 0.000 | 0.000 | 0.000 | 0.000 | 0.000 | 2.827 |

| Z | A | K | $\lambda_{tot}$ | $P_{\beta^-(G)}$ | $P_{\beta^-(I)}$ | $P_{\beta^+(G)}$ | $P_{\beta^+(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 45 | 116 | G | 1.1363E+00 | 1.000 | 0.000 | 0.000 | 0.000 | 0.000 | 0.000 | 0.000 | 0.000 | 0.000 | 5.154 |
| 46 | 116 | G | 5.5452E-02 | 1.000 | 0.000 | 0.000 | 0.000 | 0.000 | 0.000 | 0.000 | 0.000 | 0.000 | 1.164 |
| 47 | 116 | H | 6.6649E-02 | 0.984 | 0.000 | 0.000 | 0.000 | 0.000 | 0.016 | 0.000 | 0.000 | 0.000 | 3.628 |
| 47 | 116 | G | 4.2787E-03 | 1.000 | 0.000 | 0.000 | 0.000 | 0.000 | 0.000 | 0.000 | 0.000 | 0.000 | 3.786 |
| 48 | 116 | G | 0.0000E+00 | 0.000 | 0.000 | 0.000 | 0.000 | 0.000 | 0.000 | 0.000 | 0.000 | 0.000 | 0.000 |
| 48 | 116 | H | 2.1393E-04 | 1.000 | 0.000 | 0.000 | 0.000 | 0.000 | 0.000 | 0.000 | 0.000 | 0.000 | 2.810 |
| 49 | 116 | G | 4.9510E-02 | 1.000 | 0.000 | 0.000 | 0.000 | 0.000 | 0.000 | 0.000 | 0.000 | 0.000 | 1.394 |
| 50 | 116 | G | 0.0000E+00 | 0.000 | 0.000 | 0.000 | 0.000 | 0.000 | 0.000 | 0.000 | 0.000 | 0.000 | 0.000 |
| 44 | 117 | G | 2.8714E+00 | 0.998 | 0.000 | 0.000 | 0.000 | 0.000 | 0.000 | 0.000 | 0.002 | 0.000 | 5.487 |
| 45 | 117 | G | 1.7544E+00 | 0.998 | 0.000 | 0.000 | 0.000 | 0.000 | 0.000 | 0.000 | 0.002 | 0.000 | 2.303 |
| 46 | 117 | H | 1.4441E-01 | 1.000 | 0.000 | 0.000 | 0.000 | 0.000 | 0.000 | 0.000 | 0.000 | 0.000 | 3.752 |
| 47 | 117 | H | 1.3078E-01 | 0.868 | 0.132 | 0.000 | 0.000 | 0.000 | 0.000 | 0.000 | 0.000 | 0.000 | 2.155 |
| 47 | 117 | G | 9.4952E-03 | 0.878 | 0.122 | 0.000 | 0.000 | 0.000 | 0.000 | 0.000 | 0.000 | 0.000 | 2.401 |
| 48 | 117 | H | 5.8150E-05 | 0.990 | 0.010 | 0.000 | 0.000 | 0.000 | 0.000 | 0.000 | 0.000 | 0.000 | 2.231 |
| 48 | 117 | G | 7.9562E-05 | 0.084 | 0.916 | 0.000 | 0.000 | 0.000 | 0.000 | 0.000 | 0.000 | 0.000 | 1.508 |
| 49 | 117 | H | 9.9248E-05 | 0.529 | 0.000 | 0.000 | 0.000 | 0.000 | 0.471 | 0.000 | 0.000 | 0.000 | 0.525 |
| 49 | 117 | G | 2.6804E-04 | 0.998 | 0.002 | 0.000 | 0.000 | 0.000 | 0.000 | 0.000 | 0.000 | 0.000 | 0.955 |
| 50 | 117 | H | 5.8991E-07 | 0.000 | 0.000 | 0.000 | 0.000 | 0.000 | 1.000 | 0.000 | 0.000 | 0.000 | 0.315 |
| 50 | 117 | G | 0.0000E+00 | 0.000 | 0.000 | 0.000 | 0.000 | 0.000 | 0.000 | 0.000 | 0.000 | 0.000 | 0.000 |
| 51 | 117 | G | 6.8765E-05 | 0.000 | 0.000 | 0.000 | 0.000 | 0.000 | 0.000 | 0.000 | 0.000 | 0.000 | 0.000 |
| 52 | 117 | G | 1.7504E-04 | 0.000 | 0.000 | 0.000 | 0.000 | 0.000 | 0.000 | 0.000 | 0.000 | 0.000 | 0.000 |
| 44 | 118 | G | 4.0440E+00 | 0.997 | 0.000 | 0.000 | 0.000 | 0.000 | 0.000 | 0.000 | 0.003 | 0.000 | 3.701 |
| 45 | 118 | G | 2.7182E+00 | 0.998 | 0.000 | 0.000 | 0.000 | 0.000 | 0.000 | 0.000 | 0.002 | 0.000 | 5.916 |
| 46 | 118 | G | 2.2360E-01 | 1.000 | 0.000 | 0.000 | 0.000 | 0.000 | 0.000 | 0.000 | 0.000 | 0.000 | 1.612 |
| 47 | 118 | H | 2.4755E-01 | 0.580 | 0.000 | 0.000 | 0.000 | 0.000 | 0.420 | 0.000 | 0.000 | 0.000 | 2.600 |
| 47 | 118 | G | 1.8734E-01 | 1.000 | 0.000 | 0.000 | 0.000 | 0.000 | 0.000 | 0.000 | 0.000 | 0.000 | 3.663 |
| 48 | 118 | H | 2.2967E-04 | 1.000 | 0.000 | 0.000 | 0.000 | 0.000 | 0.000 | 0.000 | 0.000 | 0.000 | 0.244 |
| 48 | 118 | G | 2.6256E-03 | 1.000 | 0.000 | 0.000 | 0.000 | 0.000 | 0.000 | 0.000 | 0.000 | 0.000 | 3.289 |
| 49 | 118 | G | 1.3863E-01 | 1.000 | 0.000 | 1.000 | 0.000 | 0.000 | 0.000 | 0.000 | 0.000 | 0.000 | 1.866 |
| 50 | 118 | G | 0.0000E+00 | 0.000 | 0.000 | 0.000 | 0.000 | 0.000 | 0.000 | 0.000 | 0.000 | 0.000 | 0.000 |
| 51 | 118 | G | 3.8508E-05 | 0.000 | 0.000 | 1.000 | 0.000 | 0.000 | 0.000 | 0.000 | 0.000 | 0.000 | 0.000 |
| 51 | 118 | H | 7.2203E-04 | 0.000 | 0.000 | 1.000 | 0.000 | 0.000 | 0.000 | 0.000 | 0.000 | 0.000 | 0.000 |
| 52 | 118 | G | 1.3371E-06 | 0.000 | 0.000 | 1.000 | 0.000 | 0.000 | 0.000 | 0.000 | 0.000 | 0.000 | 0.000 |
| 44 | 119 | G | 6.1016E+00 | 0.988 | 0.000 | 0.000 | 0.000 | 0.000 | 0.000 | 0.000 | 0.012 | 0.000 | 6.226 |
| 45 | 119 | G | 6.6830E+00 | 0.984 | 0.000 | 0.000 | 0.000 | 0.000 | 0.000 | 0.000 | 0.016 | 0.000 | 4.094 |
| 46 | 119 | H | 4.4319E-01 | 1.000 | 0.000 | 0.000 | 0.000 | 0.000 | 0.000 | 0.000 | 0.000 | 0.000 | 3.834 |
| 47 | 119 | G | 3.3007E-01 | 0.780 | 0.220 | 0.000 | 0.000 | 0.000 | 0.000 | 0.000 | 0.000 | 0.000 | 2.904 |
| 48 | 119 | H | 5.2511E-03 | 0.845 | 0.155 | 0.000 | 0.000 | 0.000 | 0.000 | 0.000 | 0.000 | 0.000 | 2.837 |

| Z | A | K | $\lambda_{tot}$ | $P_{\beta^-(G)}$ | $P_{\beta^-(I)}$ | $P_{\beta^+(G)}$ | $P_{\beta^+(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 48 | 119 | G | 4.2787E-03 | 0.055 | 0.945 | 0.000 | 0.000 | 0.000 | 0.000 | 0.000 | 0.000 | 0.000 | 1.995 |
| 49 | 119 | I | 6.4180E-04 | 0.975 | 0.000 | 0.000 | 0.000 | 0.000 | 0.025 | 0.000 | 0.000 | 0.000 | 1.082 |
| 49 | 119 | G | 5.0228E-03 | 0.900 | 0.100 | 0.000 | 0.000 | 0.000 | 0.000 | 0.000 | 0.000 | 0.000 | 1.324 |
| 50 | 119 | H | 2.7397E-08 | 0.000 | 0.000 | 0.000 | 0.000 | 0.000 | 1.000 | 0.000 | 0.000 | 0.000 | 0.090 |
| 50 | 119 | G | 0.0000E+00 | 0.000 | 0.000 | 0.000 | 0.000 | 0.000 | 0.000 | 0.000 | 0.000 | 0.000 | 0.000 |
| 51 | 119 | I | 5.0011E-07 | 0.000 | 0.000 | 0.000 | 0.000 | 0.000 | 0.000 | 0.000 | 0.000 | 0.000 | 0.000 |
| 52 | 119 | G | 1.7068E-06 | 0.000 | 0.000 | 1.000 | 0.000 | 0.000 | 0.000 | 0.000 | 0.000 | 0.000 | 0.000 |
| 52 | 119 | I | 1.2034E-05 | 0.000 | 0.000 | 1.000 | 0.000 | 0.000 | 0.000 | 0.000 | 0.000 | 0.000 | 0.000 |
| 52 | 119 | G | 6.9405E+00 | 0.977 | 0.000 | 0.000 | 0.000 | 0.000 | 0.000 | 0.000 | 0.023 | 0.000 | 4.430 |
| 44 | 120 | G | 5.5143E+00 | 0.981 | 0.000 | 0.000 | 0.000 | 0.000 | 0.000 | 0.000 | 0.019 | 0.000 | 6.523 |
| 45 | 120 | G | 7.6053E-01 | 1.000 | 0.000 | 0.000 | 0.000 | 0.000 | 0.000 | 0.000 | 0.000 | 0.000 | 1.949 |
| 46 | 120 | G | 2.1661E+00 | 0.570 | 0.000 | 0.000 | 0.000 | 0.000 | 0.430 | 0.000 | 0.000 | 0.000 | 2.908 |
| 47 | 120 | G | 5.9243E-01 | 1.000 | 0.000 | 0.000 | 0.000 | 0.000 | 0.000 | 0.000 | 0.000 | 0.000 | 4.170 |
| 47 | 120 | I | 1.3645E-02 | 1.000 | 0.000 | 0.000 | 0.000 | 0.000 | 0.000 | 0.000 | 0.000 | 0.000 | 0.709 |
| 48 | 120 | G | 1.5003E-02 | 1.000 | 0.000 | 0.000 | 0.000 | 0.000 | 0.000 | 0.000 | 0.000 | 0.000 | 2.630 |
| 49 | 120 | G | 2.2360E-01 | 1.000 | 0.000 | 0.000 | 0.000 | 0.000 | 0.000 | 0.000 | 0.000 | 0.000 | 2.954 |
| 49 | 120 | I | 0.0000E+00 | 0.000 | 0.000 | 0.000 | 0.000 | 0.000 | 0.000 | 0.000 | 0.000 | 0.000 | 3.903 |
| 50 | 120 | G | 1.3919E-06 | 0.000 | 0.000 | 0.000 | 0.000 | 0.000 | 0.000 | 0.000 | 0.000 | 0.000 | 0.000 |
| 51 | 120 | G | 7.2657E-04 | 0.000 | 0.000 | 1.000 | 0.000 | 0.000 | 0.000 | 0.000 | 0.000 | 0.000 | 0.000 |
| 51 | 120 | I | 0.0000E+00 | 0.000 | 0.000 | 1.000 | 0.000 | 0.000 | 0.000 | 0.000 | 0.000 | 0.000 | 0.000 |
| 52 | 120 | G | 5.7332E+00 | 0.959 | 0.000 | 0.000 | 0.000 | 0.000 | 0.000 | 0.000 | 0.041 | 0.000 | 4.682 |
| 45 | 121 | G | 1.2225E+00 | 1.000 | 0.000 | 0.000 | 0.000 | 0.000 | 0.000 | 0.000 | 0.000 | 0.000 | 4.251 |
| 46 | 121 | G | 8.6643E-01 | 1.000 | 0.000 | 0.000 | 0.000 | 0.000 | 0.000 | 0.000 | 0.000 | 0.000 | 3.775 |
| 47 | 121 | G | 1.4441E-01 | 1.000 | 0.000 | 0.000 | 0.000 | 0.000 | 0.000 | 0.000 | 0.000 | 0.000 | 3.326 |
| 48 | 121 | G | 5.4152E-02 | 1.000 | 0.000 | 0.000 | 0.000 | 0.000 | 0.000 | 0.000 | 0.000 | 0.000 | 2.954 |
| 48 | 121 | I | 3.0401E-03 | 0.300 | 0.700 | 0.000 | 0.000 | 0.000 | 0.000 | 0.000 | 0.000 | 0.000 | 1.618 |
| 49 | 121 | G | 3.0006E-02 | 0.887 | 0.113 | 0.000 | 0.000 | 0.000 | 0.000 | 0.000 | 0.000 | 0.000 | 1.913 |
| 49 | 121 | I | 4.3870E-10 | 0.224 | 0.000 | 0.000 | 0.000 | 0.000 | 0.776 | 0.000 | 0.000 | 0.000 | 0.036 |
| 50 | 121 | G | 7.1311E-06 | 1.000 | 0.000 | 0.000 | 0.000 | 0.000 | 0.000 | 0.000 | 0.000 | 0.000 | 0.117 |
| 51 | 121 | G | 0.0000E+00 | 0.000 | 0.000 | 0.000 | 0.000 | 0.000 | 0.000 | 0.000 | 0.000 | 0.000 | 0.000 |
| 52 | 121 | G | 5.2077E-08 | 0.000 | 0.000 | 0.500 | 0.500 | 0.000 | 0.000 | 0.000 | 0.000 | 0.000 | 0.295 |
| 52 | 121 | I | 4.7737E-07 | 0.000 | 0.000 | 1.000 | 0.000 | 0.000 | 0.000 | 0.000 | 0.000 | 0.000 | 0.585 |
| 53 | 121 | G | 9.0821E-05 | 0.000 | 0.000 | 1.000 | 0.000 | 0.000 | 0.000 | 0.000 | 0.000 | 0.000 | 0.000 |
| 44 | 122 | G | 1.0868E+01 | 0.934 | 0.000 | 0.000 | 0.000 | 0.000 | 0.000 | 0.000 | 0.066 | 0.000 | 5.302 |
| 45 | 122 | G | 8.5956E+00 | 0.951 | 0.000 | 0.000 | 0.000 | 0.000 | 0.000 | 0.000 | 0.049 | 0.000 | 6.974 |
| 46 | 122 | G | 1.6184E+00 | 1.000 | 0.000 | 0.000 | 0.000 | 0.000 | 0.000 | 0.000 | 0.000 | 0.000 | 2.793 |
| 47 | 122 | G | 1.4441E+00 | 1.000 | 0.000 | 0.000 | 0.000 | 0.000 | 0.000 | 0.000 | 0.000 | 0.000 | 6.141 |
| 48 | 122 | G | 1.2603E-01 | 1.000 | 0.000 | 0.000 | 0.000 | 0.000 | 0.000 | 0.000 | 0.000 | 0.000 | 1.254 |
| 49 | 122 | I | 6.7296E-02 | 1.000 | 0.000 | 0.000 | 0.000 | 0.000 | 0.000 | 0.000 | 0.000 | 0.000 | 4.506 |

| N | A | K | $\lambda_{tot}$ | $P_{\beta-(G)}$ | $P_{\beta-(1)}$ | $P_{\beta+(G)}$ | $P_{\beta+(1)}$ | $P_\varepsilon$ | $P_\gamma$ | $P_{SF}$ | $P_{1n}$ | $P_{2n}$ | $E_{Total}$ |
|---|---|---|---|---|---|---|---|---|---|---|---|---|---|
| 49 | 122 | G | 4.6210E-01 | 1.000 | 0.000 | 0.000 | 0.000 | 0.000 | 0.000 | 0.000 | 0.000 | 0.000 | 3.196 |
| 50 | 122 | H | 0.0000E+00 | 0.000 | 0.000 | 0.000 | 0.000 | 0.000 | 0.000 | 0.000 | 0.000 | 0.000 | 0.000 |
| 51 | 122 | G | 2.7506E-03 | 0.000 | 0.000 | 0.000 | 0.000 | 0.000 | 1.000 | 0.000 | 0.000 | 0.000 | 0.163 |
| 51 | 122 | H | 2.9749E-06 | 0.967 | 0.000 | 0.033 | 0.000 | 0.000 | 0.000 | 0.000 | 0.000 | 0.000 | 1.006 |
| 52 | 122 | G | 0.0000E+00 | 0.000 | 0.000 | 0.000 | 0.000 | 0.000 | 0.000 | 0.000 | 0.000 | 0.000 | 0.000 |
| 45 | 123 | G | 8.4468E+00 | 0.929 | 0.000 | 0.000 | 0.000 | 0.000 | 0.000 | 0.000 | 0.071 | 0.000 | 5.234 |
| 46 | 123 | G | 2.4915E+00 | 0.999 | 0.000 | 0.000 | 0.000 | 0.000 | 0.000 | 0.000 | 0.001 | 0.000 | 5.024 |
| 47 | 123 | G | 1.7773E+00 | 1.000 | 0.000 | 0.000 | 0.000 | 0.000 | 0.000 | 0.000 | 0.000 | 0.000 | 4.137 |
| 48 | 123 | G | 2.1634E-01 | 1.000 | 0.000 | 0.000 | 0.000 | 0.000 | 0.000 | 0.000 | 0.000 | 0.000 | 4.370 |
| 49 | 123 | G | 1.4501E-02 | 1.000 | 0.000 | 0.000 | 0.000 | 0.000 | 0.000 | 0.000 | 0.000 | 0.000 | 2.102 |
| 49 | 123 | H | 1.1591E-01 | 0.037 | 0.963 | 0.000 | 0.000 | 0.000 | 0.000 | 0.000 | 0.000 | 0.000 | 2.487 |
| 50 | 123 | G | 2.8809E-04 | 1.000 | 0.000 | 0.000 | 0.000 | 0.000 | 0.000 | 0.000 | 0.000 | 0.000 | 0.621 |
| 50 | 123 | H | 6.1888E-04 | 1.000 | 0.000 | 0.000 | 0.000 | 0.000 | 0.000 | 0.000 | 0.000 | 0.000 | 0.523 |
| 51 | 123 | G | 0.0000E+00 | 0.000 | 0.000 | 0.000 | 0.000 | 0.000 | 0.000 | 0.000 | 0.000 | 0.000 | 0.000 |
| 52 | 123 | G | 6.7035E-08 | 0.000 | 0.000 | 0.000 | 0.000 | 1.000 | 0.000 | 0.000 | 0.000 | 0.000 | 0.248 |
| 52 | 123 | H | 1.7728E-21 | 0.000 | 0.000 | 0.000 | 0.000 | 1.000 | 0.000 | 0.000 | 0.000 | 0.000 | 0.017 |
| 53 | 123 | G | 1.4586E-05 | 0.000 | 0.000 | 0.000 | 0.000 | 1.000 | 0.000 | 0.000 | 0.000 | 0.000 | 0.000 |
| 44 | 124 | G | 1.7741E+01 | 0.794 | 0.000 | 0.000 | 0.000 | 0.000 | 0.000 | 0.000 | 0.206 | 0.000 | 5.670 |
| 45 | 124 | G | 1.2789E+01 | 0.900 | 0.000 | 0.000 | 0.000 | 0.000 | 0.000 | 0.000 | 0.095 | 0.005 | 7.597 |
| 46 | 124 | G | 2.9967E+00 | 0.996 | 0.000 | 0.000 | 0.000 | 0.000 | 0.000 | 0.000 | 0.004 | 0.000 | 3.629 |
| 47 | 124 | G | 1.7561E+00 | 0.996 | 0.000 | 0.000 | 0.000 | 0.000 | 0.000 | 0.000 | 0.004 | 0.000 | 6.769 |
| 48 | 124 | G | 7.7016E-01 | 1.000 | 0.000 | 0.000 | 0.000 | 0.000 | 0.000 | 0.000 | 0.000 | 0.000 | 1.926 |
| 49 | 124 | G | 2.8881E-01 | 1.000 | 0.000 | 0.000 | 0.000 | 0.000 | 0.000 | 0.000 | 0.000 | 0.000 | 5.123 |
| 49 | 124 | H | 2.1661E-01 | 1.000 | 0.000 | 0.000 | 0.000 | 0.000 | 0.000 | 0.000 | 0.000 | 0.000 | 4.651 |
| 50 | 124 | G | 0.0000E+00 | 0.000 | 0.000 | 0.000 | 0.000 | 0.000 | 0.000 | 0.000 | 0.000 | 0.000 | 0.000 |
| 51 | 124 | G | 7.2203E-03 | 0.200 | 0.800 | 0.000 | 0.000 | 0.000 | 0.000 | 0.000 | 0.000 | 0.000 | 0.442 |
| 51 | 124 | H | 1.3304E-07 | 0.000 | 0.000 | 0.000 | 0.000 | 0.000 | 1.000 | 0.000 | 0.000 | 0.000 | 2.234 |
| 52 | 124 | G | 0.0000E+00 | 0.000 | 0.000 | 0.000 | 0.000 | 0.000 | 0.000 | 0.000 | 0.000 | 0.000 | 0.000 |
| 46 | 125 | G | 4.4719E+00 | 0.982 | 0.000 | 0.000 | 0.000 | 0.000 | 0.000 | 0.000 | 0.018 | 0.000 | 5.718 |
| 47 | 125 | G | 2.0586E+00 | 0.992 | 0.000 | 0.000 | 0.000 | 0.000 | 0.000 | 0.000 | 0.008 | 0.000 | 4.777 |
| 48 | 125 | G | 5.6676E-01 | 1.000 | 0.000 | 0.000 | 0.000 | 0.000 | 0.000 | 0.000 | 0.000 | 0.000 | 5.021 |
| 49 | 125 | G | 5.6815E-02 | 1.000 | 0.000 | 0.000 | 0.000 | 0.000 | 0.000 | 0.000 | 0.000 | 0.000 | 2.610 |
| 49 | 125 | H | 3.0137E-01 | 0.112 | 0.888 | 0.000 | 0.000 | 0.000 | 0.000 | 0.000 | 0.000 | 0.000 | 3.098 |
| 50 | 125 | G | 1.2161E-03 | 1.000 | 0.000 | 0.000 | 0.000 | 0.000 | 0.000 | 0.000 | 0.000 | 0.000 | 1.156 |
| 50 | 125 | H | 8.3211E-07 | 1.000 | 0.000 | 0.000 | 0.000 | 0.000 | 0.000 | 0.000 | 0.000 | 0.000 | 1.128 |
| 51 | 125 | G | 7.9307E-09 | 1.000 | 0.000 | 0.000 | 0.000 | 0.000 | 0.000 | 0.000 | 0.000 | 0.000 | 0.565 |
| 52 | 125 | G | 1.3975E-07 | 0.000 | 0.000 | 0.000 | 0.000 | 0.000 | 1.000 | 0.000 | 0.000 | 0.000 | 0.145 |
| 52 | 125 | H | 0.0000E+00 | 0.000 | 0.000 | 0.000 | 0.000 | 0.000 | 0.000 | 0.000 | 0.000 | 0.000 | 0.000 |
| 53 | 125 | G | 1.3340E-07 | 0.000 | 0.000 | 0.000 | 0.000 | 1.000 | 0.000 | 0.000 | 0.000 | 0.000 | 0.059 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 54 | 125 | I | 1.2161E-02 | 0.000 | 0.000 | 0.000 | 0.000 | 0.000 | 1.000 | 0.000 | 0.000 | 0.000 | 0.253 |
| 54 | 125 | G | 1.1461E-05 | 0.000 | 0.000 | 1.000 | 0.000 | 0.000 | 0.000 | 0.000 | 0.000 | 0.000 | 0.301 |
| 46 | 126 | G | 5.2273E+00 | 0.968 | 0.000 | 0.000 | 0.000 | 0.000 | 0.000 | 0.000 | 0.032 | 0.000 | 4.512 |
| 47 | 126 | G | 2.9647E+00 | 0.987 | 0.000 | 0.000 | 0.000 | 0.000 | 0.000 | 0.000 | 0.013 | 0.000 | 7.354 |
| 48 | 126 | G | 1.3591E+00 | 1.000 | 0.000 | 0.000 | 0.000 | 0.000 | 0.000 | 0.000 | 0.000 | 0.000 | 3.061 |
| 49 | 126 | G | 4.9510E-01 | 1.000 | 0.000 | 0.000 | 0.000 | 0.000 | 0.000 | 0.000 | 0.000 | 0.000 | 5.934 |
| 50 | 126 | G | 2.0941E-09 | 0.000 | 0.000 | 0.000 | 0.000 | 0.000 | 0.136 | 0.000 | 0.000 | 0.000 | 0.181 |
| 51 | 126 | H | 7.2203E-03 | 0.864 | 0.000 | 0.000 | 0.000 | 0.000 | 0.000 | 0.000 | 0.000 | 0.000 | 2.202 |
| 51 | 126 | G | 6.4780E-07 | 1.000 | 0.000 | 0.000 | 0.000 | 0.000 | 0.000 | 0.000 | 0.000 | 0.000 | 3.051 |
| 52 | 126 | G | 0.0000E+00 | 0.000 | 0.000 | 0.000 | 0.000 | 0.000 | 0.000 | 0.000 | 0.000 | 0.000 | 0.000 |
| 53 | 126 | G | 1.9308E-06 | 0.437 | 0.000 | 0.563 | 0.000 | 0.000 | 0.000 | 0.000 | 0.000 | 0.000 | 0.599 |
| 54 | 126 | G | 0.0000E+00 | 0.000 | 0.000 | 0.000 | 0.000 | 0.000 | 0.000 | 0.000 | 0.000 | 0.000 | 0.000 |
| 47 | 127 | G | 3.5114E+00 | 0.872 | 0.000 | 0.000 | 0.000 | 0.000 | 0.000 | 0.000 | 0.128 | 0.000 | 5.121 |
| 48 | 127 | G | 1.2171E+00 | 1.000 | 0.000 | 0.000 | 0.000 | 0.000 | 0.000 | 0.000 | 0.000 | 0.000 | 6.055 |
| 49 | 127 | H | 1.8734E-01 | 0.146 | 0.847 | 0.000 | 0.000 | 0.000 | 0.000 | 0.000 | 0.007 | 0.000 | 3.253 |
| 49 | 127 | G | 6.1888E-01 | 1.000 | 0.000 | 0.000 | 0.000 | 0.000 | 0.000 | 0.000 | 0.000 | 0.000 | 3.740 |
| 50 | 127 | H | 2.8177E-03 | 1.000 | 0.000 | 0.000 | 0.000 | 0.000 | 0.000 | 0.000 | 0.000 | 0.000 | 1.607 |
| 50 | 127 | G | 9.1686E-05 | 0.850 | 0.150 | 0.000 | 0.000 | 0.000 | 0.000 | 0.000 | 0.000 | 0.000 | 2.373 |
| 51 | 127 | G | 2.0815E-06 | 0.024 | 0.000 | 0.000 | 0.000 | 0.000 | 0.976 | 0.000 | 0.000 | 0.000 | 0.975 |
| 52 | 127 | H | 7.3583E-08 | 1.000 | 0.000 | 0.000 | 0.000 | 0.000 | 0.000 | 0.000 | 0.000 | 0.000 | 0.093 |
| 52 | 127 | G | 2.0593E-05 | 1.000 | 0.000 | 0.000 | 0.000 | 0.000 | 0.000 | 0.000 | 0.000 | 0.000 | 0.230 |
| 53 | 127 | G | 0.0000E+00 | 0.000 | 0.000 | 0.000 | 0.000 | 0.000 | 0.000 | 0.000 | 0.000 | 0.000 | 0.000 |
| 54 | 127 | H | 9.9021E-03 | 0.000 | 0.000 | 1.000 | 0.000 | 0.000 | 0.000 | 0.000 | 0.000 | 0.000 | 0.309 |
| 54 | 127 | G | 2.2075E-07 | 0.000 | 0.000 | 1.000 | 0.000 | 0.000 | 0.000 | 0.000 | 0.000 | 0.000 | 0.000 |
| 55 | 127 | G | 3.0807E-05 | 0.000 | 0.000 | 1.000 | 0.000 | 0.000 | 0.000 | 0.000 | 0.000 | 0.000 | 5.094 |
| 46 | 128 | G | 8.4757E+00 | 0.805 | 0.000 | 0.000 | 0.000 | 0.000 | 0.000 | 0.000 | 0.195 | 0.000 | 7.652 |
| 47 | 128 | G | 4.8102E+00 | 0.949 | 0.000 | 0.000 | 0.000 | 0.000 | 0.000 | 0.000 | 0.051 | 0.000 | 4.304 |
| 48 | 128 | G | 1.4673E+00 | 0.998 | 0.000 | 0.000 | 0.000 | 0.000 | 0.000 | 0.000 | 0.002 | 0.000 | 6.133 |
| 49 | 128 | H | 7.7016E-01 | 0.130 | 0.870 | 0.000 | 0.000 | 0.000 | 0.000 | 0.000 | 0.000 | 0.000 | 5.848 |
| 49 | 128 | G | 7.7016E-01 | 0.988 | 0.000 | 0.000 | 0.000 | 0.000 | 0.000 | 0.000 | 0.012 | 0.000 | 0.846 |
| 50 | 128 | G | 1.9547E-04 | 0.000 | 1.000 | 0.000 | 0.000 | 0.000 | 0.000 | 0.000 | 0.000 | 0.000 | 2.864 |
| 51 | 128 | H | 1.1552E-03 | 0.966 | 0.000 | 0.000 | 0.000 | 0.000 | 0.034 | 0.000 | 0.000 | 0.000 | 3.556 |
| 52 | 128 | G | 2.1393E-05 | 1.000 | 0.000 | 0.000 | 0.000 | 0.000 | 0.000 | 0.000 | 0.000 | 0.000 | 0.000 |
| 53 | 128 | G | 0.0000E+00 | 0.000 | 0.000 | 0.000 | 0.000 | 0.000 | 0.000 | 0.000 | 0.000 | 0.000 | 0.000 |
| 54 | 128 | G | 4.6210E-04 | 0.931 | 0.000 | 0.000 | 0.000 | 0.000 | 0.069 | 0.000 | 0.000 | 0.000 | 0.837 |
| 48 | 129 | G | 0.0000E+00 | 0.000 | 0.000 | 0.000 | 0.000 | 0.000 | 0.000 | 0.000 | 0.000 | 0.000 | 0.000 |
| 49 | 129 | H | 2.2734E+00 | 0.989 | 0.000 | 0.000 | 0.000 | 0.000 | 0.000 | 0.000 | 0.011 | 0.000 | 7.139 |
| 49 | 129 | G | 5.5012E-01 | 1.000 | 0.000 | 0.000 | 0.000 | 0.000 | 0.000 | 0.000 | 0.000 | 0.000 | 3.751 |
| 49 | 129 | G | 1.1748E+00 | 0.859 | 0.106 | 0.000 | 0.000 | 0.000 | 0.000 | 0.000 | 0.035 | 0.000 | 4.480 |

| N | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 50 | 129 | I | 1.5403E-03 | 1.000 | 0.000 | 0.000 | 0.000 | 0.000 | 0.000 | 0.000 | 0.000 | 0.000 | 2.605 |
| 50 | 129 | G | 5.2511E-03 | 1.000 | 0.000 | 0.000 | 0.000 | 0.000 | 0.000 | 0.000 | 0.000 | 0.000 | 2.064 |
| 51 | 129 | G | 4.4575E-05 | 0.810 | 0.190 | 0.000 | 0.000 | 0.000 | 0.000 | 0.000 | 0.000 | 0.000 | 1.664 |
| 52 | 129 | I | 2.3902E-07 | 0.370 | 0.000 | 0.000 | 0.000 | 0.000 | 0.630 | 0.000 | 0.000 | 0.000 | 0.308 |
| 52 | 129 | G | 1.6598E-04 | 1.000 | 0.000 | 0.000 | 0.000 | 0.000 | 0.000 | 0.000 | 0.000 | 0.000 | 0.607 |
| 53 | 129 | G | 1.4003E-18 | 1.000 | 0.000 | 0.000 | 0.000 | 0.000 | 0.000 | 0.000 | 0.000 | 0.000 | 0.079 |
| 54 | 129 | I | 9.0253E-06 | 0.000 | 0.000 | 0.000 | 0.000 | 0.000 | 1.000 | 0.000 | 0.000 | 0.000 | 0.236 |
| 54 | 129 | G | 0.0000E+00 | 0.000 | 0.000 | 0.000 | 0.000 | 0.000 | 0.000 | 0.000 | 0.000 | 0.000 | 0.000 |
| 55 | 129 | G | 6.0065E-06 | 0.000 | 0.000 | 1.000 | 0.000 | 0.000 | 0.000 | 0.000 | 0.000 | 0.000 | 0.000 |
| 56 | 129 | G | 9.0395E-05 | 0.000 | 0.000 | 1.000 | 0.000 | 0.000 | 0.000 | 0.000 | 0.000 | 0.000 | 0.000 |
| 56 | 129 | I | 8.7519E-05 | 0.000 | 0.000 | 1.000 | 0.000 | 0.000 | 0.000 | 0.000 | 0.000 | 0.000 | 0.000 |
| 46 | 130 | G | 1.3034E+01 | 0.000 | 0.000 | 0.000 | 0.000 | 0.000 | 0.000 | 0.000 | 0.000 | 0.028 | 3.141 |
| 47 | 130 | G | 7.9782E+00 | 0.111 | 0.000 | 0.000 | 0.000 | 0.000 | 0.000 | 0.000 | 0.972 | 0.011 | 3.857 |
| 48 | 130 | G | 2.8396E+00 | 0.963 | 0.000 | 0.000 | 0.000 | 0.000 | 0.000 | 0.000 | 0.878 | 0.000 | 5.842 |
| 49 | 130 | I | 2.1005E+00 | 0.955 | 0.000 | 0.000 | 0.000 | 0.000 | 0.000 | 0.000 | 0.037 | 0.000 | 6.744 |
| 50 | 130 | G | 6.7956E-03 | 1.000 | 0.000 | 0.000 | 0.000 | 0.000 | 0.000 | 0.000 | 0.045 | 0.000 | 1.044 |
| 51 | 130 | G | 3.1223E-03 | 1.000 | 0.000 | 0.000 | 0.000 | 0.000 | 0.000 | 0.000 | 0.000 | 0.000 | 1.492 |
| 51 | 130 | I | 1.7773E-03 | 1.000 | 0.000 | 0.000 | 0.000 | 0.000 | 0.000 | 0.000 | 0.000 | 0.000 | 3.545 |
| 52 | 130 | G | 2.8881E-04 | 0.170 | 0.000 | 0.000 | 0.000 | 0.000 | 0.830 | 0.000 | 0.000 | 0.000 | 3.887 |
| 53 | 130 | G | 0.0000E+00 | 1.000 | 0.000 | 0.000 | 0.000 | 0.000 | 0.000 | 0.000 | 0.000 | 0.000 | 0.000 |
| 54 | 130 | G | 1.2836E-03 | 0.000 | 0.000 | 0.000 | 0.000 | 0.000 | 1.000 | 0.000 | 0.000 | 0.000 | 0.314 |
| 48 | 131 | I | 1.5576E-05 | 0.000 | 0.000 | 0.000 | 0.000 | 0.000 | 0.000 | 0.000 | 0.000 | 0.000 | 2.432 |
| 48 | 131 | G | 0.0000E+00 | 0.000 | 0.000 | 0.000 | 0.000 | 0.000 | 0.000 | 0.000 | 0.000 | 0.000 | 0.000 |
| 49 | 131 | G | 4.0370E+00 | 0.097 | 0.006 | 0.000 | 0.000 | 0.000 | 0.000 | 0.000 | 0.902 | 0.001 | 3.167 |
| 50 | 131 | G | 2.5672E+00 | 0.905 | 0.000 | 0.000 | 0.000 | 0.000 | 0.000 | 0.000 | 0.095 | 0.000 | 5.481 |
| 51 | 131 | G | 1.3863E-02 | 1.000 | 0.000 | 0.000 | 0.000 | 0.000 | 0.000 | 0.000 | 0.000 | 0.000 | 2.965 |
| 52 | 131 | G | 5.0228E-04 | 0.930 | 0.070 | 0.000 | 0.000 | 0.000 | 0.000 | 0.000 | 0.000 | 0.000 | 2.253 |
| 52 | 131 | I | 6.4180E-06 | 0.813 | 0.000 | 0.000 | 0.000 | 0.000 | 0.187 | 0.000 | 0.000 | 0.000 | 1.666 |
| 53 | 131 | G | 4.6210E-04 | 1.000 | 0.000 | 0.000 | 0.000 | 0.000 | 0.000 | 0.000 | 0.000 | 0.000 | 1.132 |
| 53 | 131 | I | 1.0002E-06 | 0.994 | 0.006 | 0.000 | 0.000 | 0.000 | 0.000 | 0.000 | 0.000 | 0.000 | 0.574 |
| 54 | 131 | G | 6.7296E-07 | 0.000 | 0.000 | 0.000 | 0.000 | 0.000 | 1.000 | 0.000 | 0.000 | 0.000 | 0.164 |
| 55 | 131 | G | 0.0000E+00 | 0.000 | 0.000 | 0.000 | 0.000 | 0.000 | 0.000 | 0.000 | 0.000 | 0.000 | 0.000 |
| 56 | 131 | G | 8.2793E-07 | 0.000 | 0.000 | 1.000 | 0.000 | 0.000 | 0.000 | 0.000 | 0.000 | 0.000 | 0.028 |
| 56 | 131 | I | 7.9672E-04 | 0.000 | 0.000 | 1.000 | 0.000 | 0.000 | 0.000 | 0.000 | 0.000 | 0.000 | 0.188 |
| 48 | 132 | G | 6.9761E-07 | 0.000 | 0.000 | 0.000 | 0.000 | 0.000 | 0.000 | 0.000 | 0.995 | 0.005 | 0.515 |
| 49 | 132 | G | 4.8642E+00 | 0.000 | 0.000 | 0.000 | 0.000 | 0.000 | 0.000 | 0.000 | 0.000 | 0.000 | 2.616 |
| 50 | 132 | G | 3.1507E+00 | 1.000 | 0.000 | 0.000 | 0.000 | 0.000 | 0.000 | 0.000 | 0.000 | 0.000 | 3.768 |
| 50 | 132 | G | 1.7329E-02 | 1.000 | 0.000 | 0.000 | 0.000 | 0.000 | 0.000 | 0.000 | 0.000 | 0.000 | 2.017 |
| 51 | 132 | I | 2.8177E-03 | 1.000 | 0.000 | 0.000 | 0.000 | 0.000 | 0.000 | 0.000 | 0.000 | 0.000 | 3.723 |

| N | A | K | $\lambda_{tot}$ | $P_{\beta^-(G)}$ | $P_{\beta^-(1)}$ | $P_{\beta^+(G)}$ | $P_{\beta^+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 51 | 132 | G | 4.1259E-03 | 1.000 | 0.000 | 0.000 | 0.000 | 0.000 | 0.000 | 0.000 | 0.000 | 0.000 | 3.745 |
| 52 | 132 | G | 2.5205E-06 | 1.000 | 0.000 | 0.000 | 0.000 | 0.000 | 0.000 | 0.000 | 0.000 | 0.000 | 0.337 |
| 53 | 132 | H | 1.3819E-04 | 0.118 | 0.000 | 0.000 | 0.000 | 0.000 | 0.882 | 0.000 | 0.000 | 0.000 | 0.445 |
| 53 | 132 | G | 8.3713E-05 | 1.000 | 0.000 | 0.000 | 0.000 | 0.000 | 0.000 | 0.000 | 0.000 | 0.000 | 2.751 |
| 54 | 132 | G | 0.0000E+00 | 0.000 | 0.000 | 0.000 | 0.000 | 0.000 | 0.000 | 0.000 | 0.000 | 0.000 | 0.000 |
| 55 | 132 | G | 1.2400E-06 | 0.020 | 0.000 | 0.980 | 0.000 | 0.000 | 0.000 | 0.000 | 0.000 | 0.000 | 0.728 |
| 56 | 132 | G | 0.0000E+00 | 0.000 | 0.000 | 0.000 | 0.000 | 0.000 | 0.000 | 0.000 | 0.000 | 0.000 | 0.000 |
| 49 | 133 | G | 3.0958E+00 | 1.000 | 0.000 | 0.000 | 0.000 | 0.000 | 0.000 | 0.000 | 0.000 | 0.000 | 2.664 |
| 50 | 133 | G | 4.8813E-01 | 1.000 | 0.000 | 0.000 | 0.000 | 0.000 | 0.000 | 0.000 | 0.991 | 0.009 | 6.809 |
| 51 | 133 | H | 5.0228E-01 | 1.000 | 0.000 | 0.000 | 0.000 | 0.000 | 0.000 | 0.000 | 0.000 | 0.000 | 2.075 |
| 51 | 133 | G | 2.0853E-04 | 0.773 | 0.061 | 0.000 | 0.000 | 0.000 | 0.166 | 0.000 | 0.000 | 0.000 | 1.813 |
| 52 | 133 | H | 9.2420E-04 | 1.000 | 0.000 | 0.000 | 0.000 | 0.000 | 0.000 | 0.000 | 0.000 | 0.000 | 1.701 |
| 52 | 133 | G | 7.7016E-02 | 1.000 | 0.000 | 0.000 | 0.000 | 0.000 | 0.000 | 0.000 | 0.000 | 0.000 | 0.634 |
| 53 | 133 | H | 9.2568E-06 | 0.970 | 0.030 | 0.000 | 0.000 | 0.000 | 0.000 | 0.000 | 0.000 | 0.000 | 1.015 |
| 53 | 133 | G | 3.6674E-06 | 1.000 | 0.000 | 0.000 | 0.000 | 0.000 | 0.000 | 0.000 | 0.000 | 0.000 | 0.233 |
| 54 | 133 | H | 1.5268E-06 | 1.000 | 0.000 | 0.000 | 0.000 | 0.000 | 0.000 | 0.000 | 0.000 | 0.000 | 0.182 |
| 54 | 133 | G | 0.0000E+00 | 0.000 | 0.000 | 0.000 | 0.000 | 0.000 | 0.000 | 0.000 | 0.000 | 0.000 | 0.000 |
| 55 | 133 | G | 4.9511E-06 | 0.000 | 0.000 | 1.000 | 0.000 | 0.000 | 0.000 | 0.000 | 0.000 | 0.000 | 0.288 |
| 56 | 133 | G | 2.0935E-09 | 0.000 | 0.000 | 1.000 | 0.000 | 0.000 | 0.000 | 0.000 | 0.000 | 0.000 | 0.442 |
| 56 | 133 | H | 1.9580E-04 | 0.000 | 0.000 | 0.000 | 0.000 | 0.000 | 1.000 | 0.000 | 0.000 | 0.000 | 0.000 |
| 57 | 133 | G | 1.3512E+01 | 0.000 | 0.000 | 1.000 | 0.000 | 0.000 | 0.000 | 0.000 | 0.000 | 0.000 | 3.125 |
| 48 | 134 | G | 4.8472E+00 | 0.000 | 0.000 | 0.000 | 0.000 | 0.000 | 0.000 | 0.000 | 0.951 | 0.049 | 2.832 |
| 49 | 134 | H | 2.7140E-01 | 0.068 | 0.000 | 0.000 | 0.000 | 0.000 | 0.000 | 0.000 | 0.728 | 0.272 | 1.558 |
| 50 | 134 | G | 8.1547E-01 | 0.999 | 0.000 | 0.000 | 0.000 | 0.000 | 0.000 | 0.000 | 0.001 | 0.000 | 3.854 |
| 51 | 134 | G | 6.6014E-02 | 1.000 | 0.000 | 0.000 | 0.000 | 0.000 | 0.000 | 0.000 | 0.000 | 0.000 | 4.933 |
| 52 | 134 | H | 2.7637E-04 | 0.000 | 0.023 | 0.000 | 0.000 | 0.000 | 0.977 | 0.000 | 0.000 | 0.000 | 1.124 |
| 52 | 134 | G | 3.3007E-03 | 1.000 | 0.000 | 0.000 | 0.000 | 0.000 | 0.000 | 0.000 | 0.000 | 0.000 | 0.332 |
| 53 | 134 | H | 2.2216E-04 | 0.728 | 0.272 | 0.000 | 0.000 | 0.000 | 0.000 | 0.000 | 0.000 | 0.000 | 3.151 |
| 54 | 134 | G | 2.3902E+00 | 0.008 | 0.000 | 1.000 | 0.000 | 0.000 | 0.000 | 0.000 | 0.000 | 0.000 | 1.966 |
| 55 | 134 | G | 0.0000E+00 | 0.000 | 0.000 | 0.000 | 0.000 | 0.000 | 0.000 | 0.000 | 0.000 | 0.000 | 0.000 |
| 55 | 134 | H | 6.6393E-05 | 0.920 | 0.000 | 0.000 | 0.000 | 0.000 | 0.000 | 0.000 | 0.080 | 0.000 | 0.139 |
| 56 | 134 | G | 1.0664E-08 | 0.000 | 0.000 | 1.000 | 0.000 | 0.000 | 0.000 | 0.000 | 0.000 | 0.000 | 1.718 |
| 56 | 134 | H | 0.0000E+00 | 0.000 | 0.000 | 0.000 | 0.000 | 0.000 | 0.000 | 0.000 | 0.000 | 0.000 | 0.000 |
| 50 | 135 | G | 4.8882E-01 | 0.854 | 0.000 | 0.000 | 0.000 | 0.000 | 0.000 | 0.000 | 0.985 | 0.007 | 1.507 |
| 51 | 135 | G | 4.0773E-01 | 0.000 | 0.146 | 0.000 | 0.000 | 0.000 | 0.000 | 0.000 | 0.080 | 0.000 | 1.175 |
| 52 | 135 | G | 3.8508E-02 | 0.000 | 0.000 | 0.000 | 0.000 | 0.000 | 1.000 | 0.000 | 0.000 | 0.000 | 4.428 |
| 53 | 135 | H | 2.9124E-05 | 1.000 | 0.000 | 0.000 | 0.000 | 0.000 | 0.000 | 0.000 | 0.000 | 0.000 | 1.954 |
| 54 | 135 | G | 7.5506E-04 | 0.000 | 0.000 | 0.000 | 0.000 | 0.000 | 1.000 | 0.000 | 0.000 | 0.000 | 0.527 |
| 54 | 135 | G | 2.1158E-05 | 1.000 | 0.000 | 0.000 | 0.000 | 0.000 | 0.000 | 0.000 | 0.000 | 0.000 | 0.567 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{sf}$ | $P_{1n}$ | $P_{2n}$ | $E_{Total}$ |
|---|---|---|---|---|---|---|---|---|---|---|---|---|---|
| 55 | 135 | I | 2.1797E-04 | 0.000 | 0.000 | 0.000 | 0.000 | 0.000 | 1.000 | 0.000 | 0.000 | 0.000 | 1.627 |
| 55 | 135 | G | 1.0985E-14 | 1.000 | 0.000 | 0.000 | 0.000 | 0.000 | 0.000 | 0.000 | 0.000 | 0.000 | 0.056 |
| 56 | 135 | I | 6.7296E-05 | 0.000 | 0.000 | 0.000 | 0.000 | 0.000 | 1.000 | 0.000 | 0.000 | 0.000 | 0.268 |
| 56 | 135 | G | 0.0000E+00 | 0.000 | 0.000 | 0.000 | 0.000 | 0.000 | 0.000 | 0.000 | 0.000 | 0.000 | 0.000 |
| 57 | 135 | G | 9.9248E-06 | 0.000 | 0.000 | 0.000 | 0.000 | 0.000 | 1.000 | 0.000 | 0.000 | 0.000 | 0.000 |
| 58 | 135 | I | 3.4657E-02 | 0.000 | 0.000 | 0.000 | 0.000 | 0.000 | 1.000 | 0.000 | 0.000 | 0.000 | 0.447 |
| 58 | 135 | G | 1.0841E-05 | 0.000 | 0.000 | 1.000 | 0.000 | 0.000 | 0.000 | 0.000 | 0.000 | 0.000 | 0.000 |
| 48 | 136 | G | 2.0623E+01 | 0.000 | 0.000 | 0.000 | 0.000 | 0.000 | 0.000 | 0.000 | 0.000 | 0.000 | 3.407 |
| 49 | 136 | G | 1.1158E+01 | 0.000 | 0.000 | 0.000 | 0.000 | 0.000 | 0.000 | 0.000 | 0.899 | 0.101 | 2.984 |
| 50 | 136 | G | 2.1440E+00 | 0.614 | 0.146 | 0.000 | 0.000 | 0.000 | 0.000 | 0.000 | 0.877 | 0.123 | 3.670 |
| 51 | 136 | I | 8.6643E-01 | 1.000 | 0.000 | 0.000 | 0.000 | 0.000 | 0.000 | 0.000 | 0.386 | 0.000 | 1.547 |
| 52 | 136 | G | 3.9608E-02 | 0.995 | 0.000 | 0.000 | 0.000 | 0.000 | 0.000 | 0.000 | 0.005 | 0.000 | 3.396 |
| 53 | 136 | G | 1.5403E-02 | 1.000 | 0.000 | 0.000 | 0.000 | 0.000 | 0.000 | 0.000 | 0.000 | 0.000 | 4.643 |
| 54 | 136 | I | 8.2518E-03 | 1.000 | 0.000 | 0.000 | 0.000 | 0.000 | 0.000 | 0.000 | 0.000 | 0.000 | 4.379 |
| 54 | 136 | G | 0.0000E+00 | 0.000 | 0.000 | 0.000 | 0.000 | 0.000 | 0.000 | 0.000 | 0.000 | 0.000 | 0.000 |
| 55 | 136 | I | 3.6481E-02 | 0.854 | 0.000 | 0.000 | 0.000 | 0.000 | 1.000 | 0.000 | 0.000 | 0.000 | 0.001 |
| 55 | 136 | G | 6.0802E-07 | 0.000 | 0.000 | 0.000 | 0.000 | 0.000 | 1.000 | 0.000 | 0.000 | 0.000 | 2.008 |
| 56 | 136 | I | 1.8734E+00 | 0.000 | 0.000 | 0.000 | 0.000 | 0.000 | 1.000 | 0.000 | 0.021 | 0.000 | 2.031 |
| 56 | 136 | G | 0.0000E+00 | 0.071 | 0.000 | 0.000 | 0.000 | 0.000 | 0.000 | 0.000 | 0.000 | 0.000 | 0.000 |
| 50 | 137 | G | 3.2835E+00 | 0.164 | 0.000 | 0.000 | 0.000 | 0.000 | 0.000 | 0.000 | 0.908 | 0.000 | 2.614 |
| 51. | 137 | I | 1.9079E+00 | 0.995 | 0.000 | 0.000 | 0.000 | 0.000 | 0.000 | 0.000 | 0.836 | 0.000 | 2.516 |
| 52 | 137 | G | 1.9804E-01 | 0.946 | 0.000 | 0.000 | 0.000 | 0.000 | 0.000 | 0.000 | 0.005 | 0.000 | 5.056 |
| 53 | 137 | G | 2.8642E-02 | 1.000 | 0.056 | 0.000 | 0.000 | 0.000 | 0.000 | 0.000 | 0.054 | 0.000 | 3.220 |
| 54 | 137 | G | 3.0137E-03 | 1.000 | 0.944 | 0.000 | 0.000 | 0.000 | 0.000 | 0.000 | 0.000 | 0.000 | 1.898 |
| 55 | 137 | G | 7.2886E-10 | 0.000 | 0.000 | 0.000 | 0.000 | 0.000 | 1.000 | 0.000 | 0.000 | 0.000 | 0.172 |
| 56 | 137 | I | 4.5304E-03 | 0.000 | 0.000 | 0.000 | 0.000 | 0.000 | 1.000 | 0.000 | 0.000 | 0.000 | 0.662 |
| 56 | 137 | G | 0.0000E+00 | 0.000 | 0.000 | 0.000 | 0.000 | 0.000 | 0.000 | 0.000 | 0.000 | 0.000 | 0.000 |
| 57 | 137 | G | 3.6636E-13 | 0.000 | 0.000 | 0.000 | 0.000 | 0.000 | 1.000 | 0.000 | 0.000 | 0.000 | 0.031 |
| 58 | 137 | I | 5.5989E-06 | 0.000 | 0.000 | 1.000 | 0.000 | 0.000 | 0.000 | 0.000 | 0.000 | 0.000 | 0.254 |
| 58 | 137 | G | 2.1393E-05 | 0.167 | 0.000 | 1.000 | 0.000 | 0.000 | 0.000 | 0.000 | 0.000 | 0.000 | 0.052 |
| 50 | 138 | G | 0.0000E+00 | 1.000 | 0.000 | 0.000 | 0.000 | 0.000 | 0.000 | 0.000 | 0.815 | 0.018 | 2.562 |
| 51 | 138 | I | 3.0202E+00 | 1.000 | 0.000 | 0.000 | 0.000 | 0.000 | 0.000 | 0.000 | 0.000 | 0.000 | 2.980 |
| 52 | 138 | I | 4.9510E-01 | 0.975 | 0.000 | 0.000 | 0.000 | 0.000 | 0.000 | 0.000 | 0.025 | 0.000 | 3.895 |
| 53 | 138 | I | 1.0830E-01 | 1.000 | 0.000 | 0.000 | 0.000 | 0.000 | 0.000 | 0.000 | 0.000 | 0.000 | 4.365 |
| 54 | 138 | I | 8.1932E-04 | 0.190 | 0.000 | 0.000 | 0.000 | 0.000 | 0.810 | 0.000 | 0.000 | 0.000 | 1.772 |
| 55 | 138 | G | 3.5877E-04 | 1.000 | 0.000 | 0.000 | 0.000 | 0.000 | 0.000 | 0.000 | 0.000 | 0.000 | 0.736 |
| 56 | 138 | G | 0.0000E+00 | 0.000 | 0.000 | 0.667 | 0.000 | 0.000 | 0.000 | 0.000 | 0.000 | 0.000 | 3.609 |
| 57 | 138 | G | 1.6271E-19 | 0.333 | 0.000 | 0.000 | 0.000 | 0.000 | 0.000 | 0.000 | 0.000 | 0.000 | 1.237 |

| Z | A | K | $\lambda_{tot}$ | $P_{\beta\text{-}(G)}$ | $P_{\beta\text{-}(1)}$ | $P_{\beta\text{+}(G)}$ | $P_{\beta\text{+}(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 58 | 138 | G | 0.0000E+00 | 0.000 | 0.000 | 0.000 | 0.000 | 0.000 | 0.000 | 0.000 | 0.000 | 0.000 | 0.000 |
| 51 | 139 | G | 3.5221E+00 | 0.002 | 0.000 | 0.000 | 0.000 | 0.000 | 0.000 | 0.000 | 0.997 | 0.001 | 2.298 |
| 52 | 139 | G | 9.7695E-01 | 0.991 | 0.000 | 0.000 | 0.000 | 0.000 | 0.000 | 0.000 | 0.009 | 0.000 | 5.509 |
| 53 | 139 | G | 3.0268E-01 | 0.900 | 0.000 | 0.000 | 0.000 | 0.000 | 0.000 | 0.000 | 0.100 | 0.000 | 4.119 |
| 54 | 139 | G | 1.7460E-02 | 1.000 | 0.000 | 0.000 | 0.000 | 0.000 | 0.000 | 0.000 | 0.000 | 0.000 | 2.670 |
| 55 | 139 | G | 1.2422E-03 | 1.000 | 0.000 | 0.000 | 0.000 | 0.000 | 0.000 | 0.000 | 0.000 | 0.000 | 1.981 |
| 56 | 139 | G | 1.3907E-04 | 1.000 | 0.000 | 0.000 | 0.000 | 0.000 | 0.000 | 0.000 | 0.000 | 0.000 | 0.946 |
| 57 | 139 | H | 0.0000E+00 | 0.000 | 0.000 | 0.000 | 0.000 | 0.000 | 0.000 | 0.000 | 0.000 | 0.000 | 0.000 |
| 58 | 139 | G | 1.2268E-02 | 0.000 | 0.000 | 1.000 | 0.000 | 0.000 | 0.000 | 0.000 | 0.000 | 0.000 | 0.752 |
| 58 | 139 | G | 5.8297E-08 | 0.000 | 0.000 | 1.000 | 0.000 | 0.000 | 0.000 | 0.000 | 0.000 | 0.000 | 0.192 |
| 59 | 139 | G | 4.2787E-05 | 0.000 | 0.000 | 1.000 | 0.000 | 0.000 | 0.000 | 0.000 | 0.000 | 0.000 | 0.168 |
| 52 | 140 | G | 1.2214E+00 | 0.825 | 0.000 | 0.000 | 0.000 | 0.000 | 0.000 | 0.000 | 0.175 | 0.000 | 3.917 |
| 53 | 140 | G | 8.0599E-01 | 0.680 | 0.000 | 0.000 | 0.000 | 0.000 | 0.000 | 0.000 | 0.320 | 0.000 | 4.965 |
| 54 | 140 | G | 5.0967E-02 | 1.000 | 0.000 | 0.000 | 0.000 | 0.000 | 0.000 | 0.000 | 0.000 | 0.000 | 2.348 |
| 55 | 140 | G | 1.0881E-02 | 1.000 | 0.000 | 0.000 | 0.000 | 0.000 | 0.000 | 0.000 | 0.000 | 0.000 | 3.880 |
| 56 | 140 | G | 6.3013E-07 | 1.000 | 0.000 | 0.000 | 0.000 | 0.000 | 0.000 | 0.000 | 0.000 | 0.000 | 0.492 |
| 57 | 140 | G | 4.7803E-06 | 1.000 | 0.000 | 0.000 | 0.000 | 0.000 | 0.000 | 0.000 | 0.000 | 0.000 | 2.852 |
| 58 | 140 | G | 0.0000E+00 | 0.000 | 0.000 | 0.000 | 0.000 | 0.000 | 0.000 | 0.000 | 0.000 | 0.000 | 0.000 |
| 59 | 140 | G | 3.3978E-03 | 0.000 | 0.000 | 1.000 | 0.000 | 0.000 | 0.000 | 0.000 | 0.000 | 0.000 | 0.700 |
| 60 | 140 | G | 2.3803E-06 | 0.000 | 0.000 | 1.000 | 0.000 | 0.000 | 0.000 | 0.000 | 0.000 | 0.000 | 0.000 |
| 53 | 141 | G | 1.6120E+00 | 0.880 | 0.000 | 0.000 | 0.000 | 0.000 | 0.000 | 0.000 | 0.120 | 0.000 | 3.880 |
| 54 | 141 | G | 4.0299E-01 | 0.999 | 0.000 | 0.000 | 0.000 | 0.000 | 0.000 | 0.000 | 0.001 | 0.000 | 3.186 |
| 55 | 141 | G | 2.7793E-02 | 1.000 | 0.000 | 0.000 | 0.000 | 0.000 | 0.000 | 0.000 | 0.000 | 0.000 | 2.799 |
| 56 | 141 | G | 6.3128E-04 | 1.000 | 0.000 | 0.000 | 0.000 | 0.000 | 0.000 | 0.000 | 0.000 | 0.000 | 1.759 |
| 57 | 141 | G | 4.8986E-05 | 1.000 | 0.000 | 0.000 | 0.000 | 0.000 | 0.000 | 0.000 | 0.000 | 0.000 | 1.003 |
| 58 | 141 | G | 2.4667E-07 | 1.000 | 0.000 | 0.000 | 0.000 | 0.000 | 0.000 | 0.000 | 0.000 | 0.000 | 0.247 |
| 59 | 141 | G | 0.0000E+00 | 0.000 | 0.000 | 0.000 | 0.000 | 0.000 | 1.000 | 0.000 | 0.000 | 0.000 | 0.000 |
| 60 | 141 | G | 1.1180E-02 | 0.000 | 0.000 | 1.000 | 0.000 | 0.000 | 0.000 | 0.000 | 0.000 | 0.000 | 0.000 |
| 60 | 141 | G | 7.7016E-05 | 0.000 | 0.000 | 1.000 | 0.000 | 0.000 | 0.000 | 0.000 | 0.000 | 0.000 | 0.092 |
| 61 | 141 | G | 5.5275E-04 | 0.669 | 0.000 | 0.000 | 0.000 | 0.000 | 0.000 | 0.000 | 0.331 | 0.000 | 0.000 |
| 52 | 142 | G | 2.2578E+00 | 1.000 | 0.000 | 0.000 | 0.000 | 0.000 | 0.000 | 0.000 | 0.000 | 0.000 | 3.898 |
| 53 | 142 | G | 3.4657E+00 | 0.995 | 0.000 | 0.000 | 0.000 | 0.000 | 0.000 | 0.000 | 0.005 | 0.000 | 3.935 |
| 54 | 142 | G | 5.5899E-01 | 0.998 | 0.000 | 0.000 | 0.000 | 0.000 | 0.000 | 0.000 | 0.002 | 0.000 | 3.065 |
| 55 | 142 | G | 4.0773E-01 | 1.000 | 0.000 | 0.000 | 0.000 | 0.000 | 0.000 | 0.000 | 0.000 | 0.000 | 5.443 |
| 56 | 142 | G | 1.0797E-03 | 1.000 | 0.000 | 0.000 | 0.000 | 0.000 | 0.000 | 0.000 | 0.000 | 0.000 | 1.428 |
| 57 | 142 | G | 1.2489E-04 | 1.000 | 0.000 | 0.000 | 0.000 | 0.000 | 0.000 | 0.000 | 0.000 | 0.000 | 3.225 |
| 58 | 142 | H | 0.0000E+00 | 0.000 | 0.000 | 0.000 | 0.000 | 0.000 | 1.000 | 0.000 | 0.000 | 0.000 | 0.000 |
| 59 | 142 | G | 7.9126E-04 | 0.000 | 0.000 | 0.000 | 0.000 | 0.000 | 0.000 | 0.000 | 0.000 | 0.000 | 0.004 |
| 59 | 142 | G | 1.0065E-05 | 1.000 | 0.000 | 0.000 | 0.000 | 0.000 | 0.000 | 0.000 | 0.000 | 0.000 | 0.879 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 60 | 142 | G | 0.0000E+00 | 0.000 | 0.000 | 0.000 | 0.000 | 0.000 | 0.000 | 0.000 | 0.000 | 0.000 | 0.000 |
| 54 | 143 | G | 2.3105E+00 | 0.989 | 0.000 | 0.000 | 0.000 | 0.000 | 0.000 | 0.000 | 0.011 | 0.000 | 4.794 |
| 55 | 143 | G | 3.8941E-01 | 0.989 | 0.000 | 0.000 | 0.000 | 0.000 | 0.000 | 0.000 | 0.011 | 0.000 | 2.858 |
| 56 | 143 | G | 4.7803E-02 | 1.000 | 0.000 | 0.000 | 0.000 | 0.000 | 0.000 | 0.000 | 0.000 | 0.000 | 1.947 |
| 57 | 143 | G | 8.1165E-04 | 1.000 | 0.000 | 0.000 | 0.000 | 0.000 | 0.000 | 0.000 | 0.000 | 0.000 | 1.427 |
| 58 | 143 | G | 5.8248E-06 | 1.000 | 0.000 | 0.000 | 0.000 | 0.000 | 0.000 | 0.000 | 0.000 | 0.000 | 0.714 |
| 59 | 143 | G | 5.9243E-07 | 1.000 | 0.000 | 0.000 | 0.000 | 0.000 | 0.000 | 0.000 | 0.000 | 0.000 | 0.316 |
| 60 | 143 | G | 0.0000E+00 | 0.000 | 0.000 | 0.000 | 0.000 | 0.000 | 0.000 | 0.000 | 0.000 | 0.000 | 0.000 |
| 61 | 143 | G | 3.0268E-08 | 0.000 | 0.000 | 1.000 | 0.000 | 0.000 | 0.000 | 0.000 | 0.000 | 0.000 | 0.000 |
| 62 | 143 | H | 1.0664E-02 | 0.000 | 0.000 | 1.000 | 0.000 | 0.000 | 0.000 | 0.000 | 0.000 | 0.000 | 0.754 |
| 62 | 143 | G | 1.3078E-03 | 0.000 | 0.000 | 1.000 | 0.000 | 0.000 | 0.000 | 0.000 | 0.000 | 0.000 | 0.000 |
| 54 | 144 | G | 6.0274E-01 | 1.000 | 0.000 | 0.000 | 0.000 | 0.000 | 0.000 | 0.000 | 0.000 | 0.000 | 3.335 |
| 55 | 144 | G | 6.9315E-01 | 0.989 | 0.000 | 0.000 | 0.000 | 0.000 | 0.000 | 0.000 | 0.011 | 0.000 | 5.534 |
| 56 | 144 | G | 5.8248E-02 | 1.000 | 0.000 | 0.000 | 0.000 | 0.000 | 0.000 | 0.000 | 0.000 | 0.000 | 1.558 |
| 57 | 144 | G | 1.6947E-02 | 1.000 | 0.000 | 0.000 | 0.000 | 0.000 | 0.000 | 0.000 | 0.000 | 0.000 | 3.414 |
| 58 | 144 | G | 2.8177E-08 | 0.985 | 0.015 | 0.000 | 0.000 | 0.000 | 0.000 | 0.000 | 0.000 | 0.000 | 0.110 |
| 59 | 144 | G | 1.6045E-03 | 1.000 | 0.000 | 0.000 | 0.000 | 0.000 | 0.000 | 0.000 | 0.000 | 0.000 | 0.059 |
| 60 | 144 | H | 6.6777E-04 | 0.000 | 0.000 | 0.000 | 0.000 | 0.000 | 1.000 | 0.000 | 0.000 | 0.000 | 1.246 |
| 60 | 144 | G | 0.0000E+00 | 0.000 | 0.000 | 0.000 | 0.000 | 0.000 | 0.000 | 0.000 | 0.000 | 0.000 | 0.000 |
| 61 | 144 | G | 2.2005E-08 | 0.000 | 0.000 | 1.000 | 0.000 | 0.000 | 0.000 | 0.000 | 0.000 | 0.000 | 0.000 |
| 62 | 144 | G | 0.0000E+00 | 0.000 | 0.000 | 0.000 | 0.000 | 0.000 | 0.000 | 0.000 | 0.000 | 0.000 | 0.000 |
| 54 | 145 | G | 7.7016E-01 | 1.000 | 0.000 | 0.000 | 0.000 | 0.000 | 0.000 | 0.000 | 0.000 | 0.000 | 4.949 |
| 55 | 145 | G | 1.1748E+00 | 0.956 | 0.000 | 0.000 | 0.000 | 0.000 | 0.000 | 0.000 | 0.044 | 0.000 | 4.197 |
| 56 | 145 | G | 1.6120E-01 | 1.000 | 0.000 | 0.000 | 0.000 | 0.000 | 0.000 | 0.000 | 0.000 | 0.000 | 2.342 |
| 57 | 145 | G | 2.7949E-02 | 1.000 | 0.000 | 0.000 | 0.000 | 0.000 | 0.000 | 0.000 | 0.000 | 0.000 | 2.119 |
| 58 | 145 | G | 3.8723E-03 | 1.000 | 0.000 | 0.000 | 0.000 | 0.000 | 0.000 | 0.000 | 0.000 | 0.000 | 1.450 |
| 59 | 145 | G | 3.2194E-05 | 1.000 | 0.000 | 0.000 | 0.000 | 0.000 | 0.000 | 0.000 | 0.000 | 0.000 | 0.695 |
| 60 | 145 | G | 0.0000E+00 | 0.000 | 0.000 | 0.000 | 0.000 | 0.000 | 0.000 | 0.000 | 0.000 | 0.000 | 0.000 |
| 61 | 145 | G | 1.2422E-09 | 0.000 | 0.000 | 1.000 | 0.000 | 0.000 | 0.000 | 0.000 | 0.000 | 0.000 | 0.044 |
| 62 | 145 | G | 2.3576E-08 | 0.996 | 0.000 | 0.000 | 0.000 | 0.000 | 0.000 | 0.000 | 0.004 | 0.000 | 0.097 |
| 54 | 146 | G | 1.6918E+00 | 1.000 | 0.000 | 0.000 | 0.000 | 0.000 | 0.000 | 0.000 | 0.000 | 0.000 | 3.433 |
| 55 | 146 | G | 2.2360E+00 | 0.961 | 0.000 | 0.000 | 0.000 | 0.000 | 0.000 | 0.000 | 0.039 | 0.000 | 5.320 |
| 56 | 146 | G | 3.1507E-01 | 1.000 | 0.000 | 0.000 | 0.000 | 0.000 | 0.000 | 0.000 | 0.000 | 0.000 | 2.497 |
| 57 | 146 | G | 6.9315E-02 | 1.000 | 0.000 | 0.000 | 0.000 | 0.000 | 0.000 | 0.000 | 0.000 | 0.000 | 3.745 |
| 58 | 146 | G | 1.1180E-01 | 1.000 | 0.000 | 0.000 | 0.000 | 0.000 | 0.000 | 0.000 | 0.000 | 0.000 | 3.577 |
| 59 | 146 | H | 8.5574E-04 | 1.000 | 0.000 | 0.000 | 0.000 | 0.000 | 0.000 | 0.000 | 0.000 | 0.000 | 0.568 |
| 59 | 146 | G | 4.8135E-04 | 1.000 | 0.000 | 0.000 | 0.000 | 0.000 | 0.000 | 0.000 | 0.000 | 0.000 | 2.292 |
| 60 | 146 | G | 0.0000E+00 | 0.000 | 0.000 | 0.000 | 0.000 | 0.000 | 0.000 | 0.000 | 0.000 | 0.000 | 0.000 |
| 61 | 146 | G | 3.9836E-09 | 0.331 | 0.000 | 0.669 | 0.000 | 0.000 | 0.000 | 0.000 | 0.000 | 0.000 | 0.851 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 62 | 146 | G | 2.1328E-16 | 0.000 | 0.000 | 0.000 | 0.000 | 1.000 | 0.000 | 0.000 | 0.000 | 0.000 | 2.540 |
| 56 | 147 | G | 9.6270E-01 | 1.000 | 0.000 | 0.000 | 0.000 | 0.000 | 0.000 | 0.000 | 0.000 | 0.000 | 3.820 |
| 57 | 147 | G | 3.1507E-01 | 1.000 | 0.000 | 0.000 | 0.000 | 0.000 | 0.000 | 0.000 | 0.000 | 0.000 | 3.607 |
| 58 | 147 | G | 1.2161E-02 | 1.000 | 0.000 | 0.000 | 0.000 | 0.000 | 0.000 | 0.000 | 0.000 | 0.000 | 2.297 |
| 59 | 147 | G | 8.4945E-04 | 1.000 | 0.000 | 0.000 | 0.000 | 0.000 | 0.000 | 0.000 | 0.000 | 0.000 | 1.511 |
| 60 | 147 | G | 7.3040E-07 | 1.000 | 0.000 | 0.000 | 0.000 | 0.000 | 0.000 | 0.000 | 0.000 | 0.000 | 0.411 |
| 61 | 147 | G | 8.3916E-09 | 1.000 | 0.000 | 0.000 | 0.000 | 0.000 | 0.000 | 0.000 | 0.000 | 0.000 | 0.062 |
| 62 | 147 | G | 2.0753E-19 | 0.000 | 0.000 | 0.000 | 0.000 | 1.000 | 0.000 | 0.000 | 0.000 | 0.000 | 2.310 |
| 63 | 147 | G | 3.2542E-07 | 0.000 | 0.000 | 1.000 | 0.000 | 0.000 | 0.000 | 0.000 | 0.000 | 0.000 | 0.000 |
| 64 | 147 | G | 5.0595E-06 | 0.000 | 0.000 | 1.000 | 0.000 | 0.000 | 0.000 | 0.000 | 0.000 | 0.000 | 0.000 |
| 54 | 148 | G | 4.3512E+00 | 0.990 | 0.000 | 0.000 | 0.000 | 0.000 | 0.000 | 0.000 | 0.010 | 0.000 | 3.447 |
| 55 | 148 | G | 4.0773E+00 | 1.000 | 0.000 | 0.000 | 0.000 | 0.000 | 0.000 | 0.000 | 0.000 | 0.000 | 5.778 |
| 56 | 148 | G | 1.0830E+00 | 1.000 | 0.000 | 0.000 | 0.000 | 0.000 | 0.000 | 0.000 | 0.000 | 0.000 | 3.350 |
| 57 | 148 | G | 5.3319E-01 | 1.000 | 0.000 | 0.000 | 0.000 | 0.000 | 0.000 | 0.000 | 0.000 | 0.000 | 3.543 |
| 58 | 148 | G | 1.4441E-02 | 1.000 | 0.000 | 0.000 | 0.000 | 0.000 | 0.000 | 0.000 | 0.000 | 0.000 | 1.274 |
| 59 | 148 | G | 5.0967E-03 | 1.000 | 0.000 | 0.000 | 0.000 | 0.000 | 0.000 | 0.000 | 0.000 | 0.000 | 2.606 |
| 60 | 148 | G | 0.0000E+00 | 0.000 | 0.000 | 0.000 | 0.000 | 0.000 | 0.000 | 0.000 | 0.000 | 0.000 | 0.000 |
| 61 | 148 | G | 1.9416E-07 | 0.954 | 0.000 | 0.000 | 0.000 | 0.046 | 0.000 | 0.000 | 0.000 | 0.000 | 2.162 |
| 61 | 148 | H | 1.4938E-06 | 1.000 | 0.000 | 0.000 | 0.000 | 0.000 | 0.000 | 0.000 | 0.000 | 0.000 | 1.315 |
| 62 | 148 | G | 3.1364E-24 | 0.000 | 0.000 | 0.000 | 0.000 | 1.000 | 0.000 | 0.000 | 0.000 | 0.000 | 2.014 |
| 56 | 149 | G | 8.3602E-01 | 0.999 | 0.000 | 0.000 | 0.000 | 0.000 | 0.000 | 0.000 | 0.001 | 0.000 | 5.598 |
| 57 | 149 | G | 5.7762E-01 | 1.000 | 0.000 | 0.000 | 0.000 | 0.000 | 0.000 | 0.000 | 0.000 | 0.000 | 4.142 |
| 58 | 149 | G | 1.3863E-01 | 1.000 | 0.000 | 0.000 | 0.000 | 0.000 | 0.000 | 0.000 | 0.000 | 0.000 | 2.304 |
| 59 | 149 | G | 5.1344E-03 | 1.000 | 0.000 | 0.000 | 0.000 | 0.000 | 0.000 | 0.000 | 0.000 | 0.000 | 1.482 |
| 60 | 149 | G | 1.1130E-04 | 1.000 | 0.000 | 0.000 | 0.000 | 0.000 | 0.000 | 0.000 | 0.000 | 0.000 | 0.868 |
| 61 | 149 | G | 3.6290E-06 | 1.000 | 0.000 | 0.000 | 0.000 | 0.000 | 0.000 | 0.000 | 0.000 | 0.000 | 0.378 |
| 62 | 149 | G | 0.0000E+00 | 0.000 | 0.000 | 0.000 | 0.000 | 0.000 | 0.000 | 0.000 | 0.000 | 0.000 | 0.000 |
| 63 | 149 | G | 8.6212E-08 | 0.000 | 0.000 | 1.000 | 0.000 | 0.000 | 0.000 | 0.000 | 0.000 | 0.000 | 0.075 |
| 64 | 149 | G | 8.4427E-07 | 0.000 | 0.000 | 1.000 | 0.000 | 0.000 | 0.000 | 0.000 | 0.000 | 0.000 | 0.000 |
| 54 | 150 | G | 7.0686E+00 | 0.954 | 0.000 | 0.000 | 0.000 | 0.000 | 0.000 | 0.000 | 0.046 | 0.000 | 4.353 |
| 55 | 150 | G | 8.1374E+00 | 0.415 | 0.000 | 0.000 | 0.000 | 0.000 | 0.000 | 0.000 | 0.583 | 0.002 | 4.858 |
| 56 | 150 | G | 1.5355E+00 | 0.998 | 0.000 | 0.000 | 0.000 | 0.000 | 0.000 | 0.000 | 0.002 | 0.000 | 3.920 |
| 57 | 150 | G | 9.2198E-01 | 0.999 | 0.000 | 0.000 | 0.000 | 0.000 | 0.000 | 0.000 | 0.001 | 0.000 | 5.490 |
| 58 | 150 | G | 1.4441E-01 | 1.000 | 0.000 | 0.000 | 0.000 | 0.000 | 0.000 | 0.000 | 0.000 | 0.000 | 1.525 |
| 59 | 150 | G | 1.1363E-01 | 1.000 | 0.000 | 0.000 | 0.000 | 0.000 | 0.000 | 0.000 | 0.000 | 0.000 | 3.475 |
| 60 | 150 | G | 0.0000E+00 | 0.000 | 0.000 | 0.000 | 0.000 | 0.000 | 0.000 | 0.000 | 0.000 | 0.000 | 0.000 |
| 61 | 150 | G | 7.1311E-05 | 1.000 | 0.000 | 0.000 | 0.000 | 0.000 | 0.000 | 0.000 | 0.000 | 0.000 | 2.301 |
| 62 | 150 | G | 0.0000E+00 | 0.000 | 0.000 | 0.000 | 0.000 | 0.000 | 0.000 | 0.000 | 0.000 | 0.000 | 0.000 |
| 57 | 151 | G | 1.0885E+00 | 0.996 | 0.000 | 0.000 | 0.000 | 0.000 | 0.000 | 0.000 | 0.004 | 0.000 | 4.912 |

| Z | A | K | $\lambda_{tot}$ | $P_{\beta-(G)}$ | $P_{\beta-(I)}$ | $P_{\beta+(G)}$ | $P_{\beta+(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 58 | 151 | G | 4.5904E-01 | 1.000 | 0.000 | 0.000 | 0.000 | 0.000 | 0.000 | 0.000 | 0.000 | 0.000 | 2.557 |
| 59 | 151 | G | 3.0944E-02 | 1.000 | 0.000 | 0.000 | 0.000 | 0.000 | 0.000 | 0.000 | 0.000 | 0.000 | 2.516 |
| 60 | 151 | G | 9.3165E-04 | 1.000 | 0.000 | 0.000 | 0.000 | 0.000 | 0.000 | 0.000 | 0.000 | 0.000 | 1.455 |
| 61 | 151 | G | 6.8628E-06 | 1.000 | 0.000 | 0.000 | 0.000 | 0.000 | 0.000 | 0.000 | 0.000 | 0.000 | 0.626 |
| 62 | 151 | G | 2.3657E-10 | 1.000 | 0.000 | 0.000 | 0.000 | 0.000 | 0.000 | 0.000 | 0.000 | 0.000 | 0.020 |
| 63 | 151 | G | 0.0000E+00 | 0.000 | 0.000 | 0.000 | 0.000 | 0.000 | 0.000 | 0.000 | 0.000 | 0.000 | 0.000 |
| 64 | 151 | G | 6.6649E-08 | 0.000 | 0.000 | 1.000 | 0.000 | 0.000 | 0.000 | 0.000 | 0.000 | 0.000 | 0.000 |
| 65 | 151 | H | 2.7726E-02 | 0.000 | 0.000 | 1.000 | 0.000 | 0.000 | 0.000 | 0.000 | 0.000 | 0.000 | 0.000 |
| 65 | 151 | G | 1.0940E-05 | 0.000 | 0.000 | 1.000 | 0.000 | 0.000 | 0.000 | 0.000 | 0.000 | 0.000 | 0.000 |
| 56 | 152 | G | 2.8154E+00 | 0.990 | 0.000 | 0.000 | 0.000 | 0.000 | 0.000 | 0.000 | 0.010 | 0.000 | 4.513 |
| 57 | 152 | G | 1.8193E+00 | 0.991 | 0.000 | 0.000 | 0.000 | 0.000 | 0.000 | 0.000 | 0.009 | 0.000 | 6.203 |
| 58 | 152 | G | 3.5221E-01 | 1.000 | 0.000 | 0.000 | 0.000 | 0.000 | 0.000 | 0.000 | 0.000 | 0.000 | 2.652 |
| 59 | 152 | G | 7.8526E-01 | 1.000 | 0.000 | 0.000 | 0.000 | 0.000 | 0.000 | 0.000 | 0.000 | 0.000 | 3.557 |
| 60 | 152 | G | 1.0134E-03 | 1.000 | 0.000 | 0.000 | 0.000 | 0.000 | 0.000 | 0.000 | 0.000 | 0.000 | 0.496 |
| 61 | 152 | G | 1.5403E-03 | 1.000 | 0.000 | 0.000 | 0.000 | 0.000 | 0.000 | 0.000 | 0.000 | 0.000 | 2.346 |
| 62 | 152 | G | 2.7506E-03 | 1.000 | 0.000 | 0.000 | 0.000 | 0.000 | 0.000 | 0.000 | 0.000 | 0.000 | 1.547 |
| 63 | 152 | G | 0.0000E+00 | 0.000 | 0.000 | 0.000 | 0.000 | 0.000 | 0.000 | 0.000 | 0.000 | 0.000 | 0.000 |
| 64 | 152 | G | 2.0703E-05 | 0.715 | 0.000 | 0.285 | 0.000 | 0.000 | 0.000 | 0.000 | 0.000 | 0.000 | 0.810 |
| 65 | 152 | G | 1.6503E-09 | 0.277 | 0.000 | 0.723 | 0.000 | 0.000 | 0.000 | 0.000 | 0.000 | 0.000 | 1.276 |
| 64 | 152 | H | 0.0000E+00 | 0.000 | 0.000 | 0.000 | 0.000 | 0.000 | 0.000 | 0.000 | 0.000 | 0.000 | 0.000 |
| 57 | 153 | G | 3.0670E+00 | 0.992 | 0.000 | 0.000 | 0.000 | 0.000 | 0.000 | 0.000 | 0.008 | 0.000 | 5.502 |
| 58 | 153 | G | 6.1449E-01 | 1.000 | 0.000 | 0.000 | 0.000 | 0.000 | 0.000 | 0.000 | 0.000 | 0.000 | 3.942 |
| 59 | 153 | G | 2.4623E-01 | 1.000 | 0.000 | 0.000 | 0.000 | 0.000 | 0.000 | 0.000 | 0.000 | 0.000 | 3.458 |
| 60 | 153 | G | 2.1661E-02 | 1.000 | 0.000 | 0.000 | 0.000 | 0.000 | 0.000 | 0.000 | 0.000 | 0.000 | 1.980 |
| 61 | 153 | G | 2.1797E-03 | 1.000 | 0.000 | 0.000 | 0.000 | 0.000 | 0.000 | 0.000 | 0.000 | 0.000 | 0.766 |
| 62 | 153 | G | 4.1259E-06 | 1.000 | 0.000 | 0.000 | 0.000 | 0.000 | 0.000 | 0.000 | 0.000 | 0.000 | 0.332 |
| 63 | 153 | G | 0.0000E+00 | 0.000 | 0.000 | 0.000 | 0.000 | 0.000 | 0.000 | 0.000 | 0.000 | 0.000 | 0.000 |
| 64 | 153 | G | 3.3165E-08 | 0.000 | 0.000 | 1.000 | 0.000 | 0.000 | 0.000 | 0.000 | 0.000 | 0.000 | 0.152 |
| 65 | 153 | G | 3.4314E-06 | 0.000 | 0.000 | 1.000 | 0.000 | 0.000 | 0.000 | 0.000 | 0.000 | 0.000 | 0.000 |
| 56 | 154 | G | 4.7089E+00 | 0.864 | 0.000 | 0.000 | 0.000 | 0.000 | 0.000 | 0.000 | 0.136 | 0.000 | 4.651 |
| 57 | 154 | G | 4.8102E+00 | 0.983 | 0.000 | 0.000 | 0.000 | 0.000 | 0.000 | 0.000 | 0.017 | 0.000 | 6.987 |
| 58 | 154 | G | 1.1620E+00 | 1.000 | 0.000 | 0.000 | 0.000 | 0.000 | 0.000 | 0.000 | 0.000 | 0.000 | 3.305 |
| 59 | 154 | G | 4.7574E-01 | 1.000 | 0.000 | 0.000 | 0.000 | 0.000 | 0.000 | 0.000 | 0.000 | 0.000 | 4.807 |
| 60 | 154 | G | 1.7329E-02 | 1.000 | 0.000 | 0.000 | 0.000 | 0.000 | 0.000 | 0.000 | 0.000 | 0.000 | 1.852 |
| 61 | 154 | G | 4.2787E-03 | 1.000 | 0.000 | 0.000 | 0.000 | 0.000 | 0.000 | 0.000 | 0.000 | 0.000 | 2.694 |
| 62 | 154 | G | 6.7956E-03 | 1.000 | 0.000 | 0.000 | 0.000 | 0.000 | 0.000 | 0.000 | 0.000 | 0.000 | 2.676 |
| 63 | 154 | H | 0.0000E+00 | 0.000 | 0.000 | 0.000 | 0.000 | 0.000 | 0.000 | 0.000 | 0.000 | 0.000 | 0.000 |
| 63 | 154 | G | 2.5114E-04 | 0.000 | 0.000 | 0.000 | 0.000 | 0.000 | 1.000 | 0.000 | 0.000 | 0.000 | 0.160 |
| 63 | 154 | G | 2.4933E-09 | 1.000 | 0.000 | 0.000 | 0.000 | 0.000 | 0.000 | 0.000 | 0.000 | 0.000 | 1.514 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{total}$ |
|---|---|---|---|---|---|---|---|---|---|---|---|---|---|
| 64 | 154 | G | 0.0000E+00 | 0.000 | 0.000 | 0.000 | 0.000 | 0.000 | 0.000 | 0.000 | 0.000 | 0.000 | 0.000 |
| 58 | 155 | G | 1.8688E+00 | 0.999 | 0.000 | 0.000 | 0.000 | 0.000 | 0.000 | 0.000 | 0.001 | 0.000 | 4.788 |
| 59 | 155 | G | 8.6893E-01 | 1.000 | 0.000 | 0.000 | 0.000 | 0.000 | 0.000 | 0.000 | 0.000 | 0.000 | 4.111 |
| 60 | 155 | G | 4.5186E-02 | 1.000 | 0.000 | 0.000 | 0.000 | 0.000 | 0.000 | 0.000 | 0.000 | 0.000 | 3.437 |
| 61 | 155 | G | 2.4711E-01 | 1.000 | 0.000 | 0.000 | 0.000 | 0.000 | 0.000 | 0.000 | 0.000 | 0.000 | 1.567 |
| 62 | 155 | G | 5.1727E-04 | 1.000 | 0.000 | 0.000 | 0.000 | 0.000 | 0.000 | 0.000 | 0.000 | 0.000 | 0.656 |
| 63 | 155 | G | 4.4432E-09 | 1.000 | 0.000 | 0.000 | 0.000 | 0.000 | 0.000 | 0.000 | 0.000 | 0.000 | 0.129 |
| 64 | 155 | G | 0.0000E+00 | 0.000 | 0.000 | 0.000 | 0.000 | 0.000 | 0.000 | 0.000 | 0.000 | 0.000 | 0.000 |
| 65 | 155 | G | 1.5068E-06 | 0.000 | 0.000 | 1.000 | 0.000 | 0.000 | 0.000 | 0.000 | 0.000 | 0.000 | 0.000 |
| 66 | 155 | G | 1.9254E-05 | 0.000 | 0.000 | 1.000 | 0.000 | 0.000 | 0.000 | 0.000 | 0.000 | 0.000 | 0.000 |
| 58 | 156 | G | 2.2719E+00 | 0.997 | 0.000 | 0.000 | 0.000 | 0.000 | 0.000 | 0.000 | 0.003 | 0.000 | 3.854 |
| 59 | 156 | G | 1.5121E+00 | 0.998 | 0.000 | 0.000 | 0.000 | 0.000 | 0.000 | 0.000 | 0.002 | 0.000 | 5.631 |
| 60 | 156 | G | 8.2873E-02 | 1.000 | 0.000 | 0.000 | 0.000 | 0.000 | 0.000 | 0.000 | 0.000 | 0.000 | 2.564 |
| 61 | 156 | G | 5.0447E-01 | 1.000 | 0.000 | 0.000 | 0.000 | 0.000 | 0.000 | 0.000 | 0.000 | 0.000 | 3.198 |
| 62 | 156 | G | 2.0507E-05 | 1.000 | 0.000 | 0.000 | 0.000 | 0.000 | 0.000 | 0.000 | 0.000 | 0.000 | 0.326 |
| 63 | 156 | G | 5.2912E-07 | 1.000 | 0.000 | 0.000 | 0.000 | 0.000 | 0.000 | 0.000 | 0.000 | 0.000 | 1.729 |
| 64 | 156 | G | 0.0000E+00 | 0.000 | 0.000 | 0.000 | 0.000 | 0.000 | 0.000 | 0.000 | 0.000 | 0.000 | 0.000 |
| 65 | 156 | G | 3.5656E-05 | 1.000 | 0.000 | 0.000 | 0.000 | 0.000 | 0.000 | 0.000 | 0.000 | 0.000 | 0.000 |
| 66 | 156 | I | 1.4843E-06 | 0.989 | 0.000 | 0.000 | 0.000 | 0.000 | 0.000 | 0.000 | 0.011 | 0.000 | 5.521 |
| 58 | 157 | G | 0.0000E+00 | 0.000 | 0.000 | 1.000 | 0.000 | 0.000 | 0.000 | 0.000 | 0.000 | 0.000 | 0.000 |
| 59 | 157 | G | 3.4365E+00 | 0.996 | 0.000 | 0.000 | 0.000 | 0.000 | 0.000 | 0.000 | 0.004 | 0.000 | 4.679 |
| 60 | 157 | G | 1.8289E+00 | 1.000 | 0.000 | 0.000 | 0.000 | 0.000 | 0.000 | 0.000 | 0.000 | 0.000 | 4.078 |
| 61 | 157 | G | 1.6902E-01 | 1.000 | 0.000 | 0.000 | 0.000 | 0.000 | 0.000 | 0.000 | 0.000 | 0.000 | 2.936 |
| 62 | 157 | G | 1.4811E-01 | 1.000 | 0.000 | 0.000 | 0.000 | 0.000 | 0.000 | 0.000 | 0.000 | 0.000 | 1.221 |
| 63 | 157 | G | 1.4233E-03 | 1.000 | 0.000 | 0.000 | 0.000 | 0.000 | 0.000 | 0.000 | 0.000 | 0.000 | 0.663 |
| 64 | 157 | G | 1.2718E-05 | 1.000 | 0.000 | 0.000 | 0.000 | 0.000 | 0.000 | 0.000 | 0.000 | 0.000 | 0.000 |
| 65 | 157 | G | 0.0000E+00 | 0.000 | 0.000 | 0.000 | 0.000 | 0.000 | 0.000 | 0.000 | 0.000 | 0.000 | 0.008 |
| 66 | 157 | G | 1.4654E-10 | 0.000 | 0.000 | 0.986 | 0.000 | 0.000 | 0.000 | 0.000 | 0.014 | 0.000 | 0.362 |
| 58 | 158 | G | 2.3771E-05 | 0.992 | 0.000 | 0.000 | 0.000 | 0.000 | 0.000 | 0.000 | 0.008 | 0.000 | 4.368 |
| 59 | 158 | G | 3.8767E+00 | 1.000 | 0.000 | 0.000 | 0.000 | 0.000 | 0.000 | 0.000 | 0.000 | 0.000 | 6.356 |
| 60 | 158 | G | 2.9508E+00 | 1.000 | 0.000 | 0.000 | 0.000 | 0.000 | 0.000 | 0.000 | 0.000 | 0.000 | 3.094 |
| 61 | 158 | G | 2.4862E-01 | 1.000 | 0.000 | 0.000 | 0.000 | 0.000 | 0.000 | 0.000 | 0.000 | 0.000 | 4.195 |
| 62 | 158 | G | 2.9980E-01 | 1.000 | 0.000 | 0.000 | 0.000 | 0.000 | 0.000 | 0.000 | 0.000 | 0.000 | 1.063 |
| 63 | 158 | G | 2.0941E-03 | 1.000 | 0.000 | 0.000 | 0.000 | 0.000 | 0.000 | 0.000 | 0.000 | 0.000 | 2.031 |
| 64 | 158 | G | 2.5114E-04 | 0.000 | 0.000 | 0.000 | 0.000 | 0.000 | 1.000 | 0.000 | 0.000 | 0.000 | 0.000 |
| 65 | 158 | G | 0.0000E+00 | 0.000 | 0.000 | 0.820 | 0.000 | 0.000 | 0.000 | 0.000 | 0.000 | 0.000 | 0.008 |
| 65 | 158 | I | 6.6014E-02 | 0.180 | 0.000 | 0.000 | 0.000 | 0.000 | 0.000 | 0.000 | 0.000 | 0.000 | 0.110 |
| 66 | 158 | G | 1.4654E-10 | 0.000 | 0.000 | 0.000 | 0.000 | 0.000 | 0.000 | 0.000 | 0.000 | 0.000 | 0.000 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 59 | 159 | G | 3.2634E+00 | 0.986 | 0.000 | 0.000 | 0.000 | 0.000 | 0.000 | 0.000 | 0.014 | 0.000 | 5.224 |
| 60 | 159 | G | 4.8068E-01 | 1.000 | 0.000 | 0.000 | 0.000 | 0.000 | 0.000 | 0.000 | 0.000 | 0.000 | 4.747 |
| 61 | 159 | G | 4.2999E-01 | 1.000 | 0.000 | 0.000 | 0.000 | 0.000 | 0.000 | 0.000 | 0.000 | 0.000 | 3.509 |
| 62 | 159 | G | 6.8358E-02 | 1.000 | 0.000 | 0.000 | 0.000 | 0.000 | 0.000 | 0.000 | 0.000 | 0.000 | 2.371 |
| 63 | 159 | G | 6.3591E-04 | 1.000 | 0.000 | 0.000 | 0.000 | 0.000 | 0.000 | 0.000 | 0.000 | 0.000 | 1.967 |
| 64 | 159 | G | 1.0376E-05 | 1.000 | 0.000 | 0.000 | 0.000 | 0.000 | 0.000 | 0.000 | 0.000 | 0.000 | 0.363 |
| 65 | 159 | G | 0.0000E+00 | 0.000 | 0.000 | 0.000 | 0.000 | 0.000 | 0.000 | 0.000 | 0.000 | 0.000 | 0.000 |
| 66 | 159 | G | 5.5452E-08 | 0.000 | 0.000 | 1.000 | 0.000 | 0.000 | 0.000 | 0.000 | 0.000 | 0.000 | 0.058 |
| 67 | 159 | G | 8.3512E-02 | 0.000 | 0.000 | 1.000 | 0.000 | 0.000 | 0.000 | 0.000 | 0.000 | 0.000 | 0.000 |
| 67 | 159 | H | 3.5007E-04 | 0.000 | 0.000 | 1.000 | 0.000 | 0.000 | 0.000 | 0.000 | 0.000 | 0.000 | 0.000 |
| 58 | 160 | G | 6.4062E+00 | 0.872 | 0.000 | 0.000 | 0.000 | 0.000 | 0.000 | 0.000 | 0.128 | 0.000 | 4.522 |
| 59 | 160 | G | 5.5231E+00 | 0.950 | 0.000 | 0.000 | 0.000 | 0.000 | 0.000 | 0.000 | 0.050 | 0.000 | 6.900 |
| 60 | 160 | G | 5.8941E-01 | 1.000 | 0.000 | 0.000 | 0.000 | 0.000 | 0.000 | 0.000 | 0.000 | 0.000 | 3.636 |
| 61 | 160 | G | 8.3301E-01 | 1.000 | 0.000 | 0.000 | 0.000 | 0.000 | 0.000 | 0.000 | 0.000 | 0.000 | 4.956 |
| 62 | 160 | G | 1.1432E-01 | 1.000 | 0.000 | 0.000 | 0.000 | 0.000 | 0.000 | 0.000 | 0.000 | 0.000 | 1.518 |
| 63 | 160 | G | 1.6504E-02 | 1.000 | 0.000 | 0.000 | 0.000 | 0.000 | 0.000 | 0.000 | 0.000 | 0.000 | 2.461 |
| 64 | 160 | G | 0.0000E+00 | 0.000 | 0.000 | 0.000 | 0.000 | 0.000 | 0.000 | 0.000 | 0.000 | 0.000 | 0.000 |
| 65 | 160 | G | 1.0950E-07 | 1.000 | 0.000 | 0.000 | 0.000 | 0.000 | 0.000 | 0.000 | 0.000 | 0.000 | 1.390 |
| 66 | 160 | G | 0.0000E+00 | 0.000 | 0.000 | 0.000 | 0.000 | 0.000 | 0.000 | 0.000 | 0.000 | 0.000 | 0.000 |
| 60 | 161 | G | 1.0553E+00 | 0.999 | 0.000 | 0.000 | 0.000 | 0.000 | 0.000 | 0.000 | 0.001 | 0.000 | 5.405 |
| 61 | 161 | G | 9.9676E-01 | 1.000 | 0.000 | 0.000 | 0.000 | 0.000 | 0.000 | 0.000 | 0.000 | 0.000 | 4.084 |
| 62 | 161 | G | 2.4969E-01 | 1.000 | 0.000 | 0.000 | 0.000 | 0.000 | 0.000 | 0.000 | 0.000 | 0.000 | 3.013 |
| 63 | 161 | G | 2.7916E-02 | 1.000 | 0.000 | 0.000 | 0.000 | 0.000 | 0.000 | 0.000 | 0.000 | 0.000 | 2.637 |
| 64 | 161 | G | 3.2090E-03 | 1.000 | 0.000 | 0.000 | 0.000 | 0.000 | 0.000 | 0.000 | 0.000 | 0.000 | 0.983 |
| 65 | 161 | G | 1.1626E-06 | 1.000 | 0.000 | 0.000 | 0.000 | 0.000 | 0.000 | 0.000 | 0.000 | 0.000 | 0.238 |
| 66 | 161 | G | 0.0000E+00 | 0.000 | 0.000 | 0.000 | 0.000 | 0.000 | 0.000 | 0.000 | 0.000 | 0.000 | 0.000 |
| 60 | 161 | H | 1.0345E-01 | 0.000 | 0.000 | 0.000 | 0.000 | 0.000 | 0.000 | 0.000 | 0.000 | 0.000 | 0.000 |
| 67 | 161 | G | 7.7016E-05 | 0.000 | 0.000 | 1.000 | 0.000 | 0.000 | 0.000 | 0.000 | 0.000 | 0.000 | 0.000 |
| 68 | 161 | G | 5.9447E-05 | 0.000 | 0.000 | 0.998 | 0.000 | 0.000 | 0.000 | 0.000 | 0.002 | 0.000 | 4.228 |
| 60 | 162 | G | 1.4751E+00 | 0.996 | 0.000 | 0.000 | 0.000 | 0.000 | 0.000 | 0.000 | 0.004 | 0.000 | 5.692 |
| 61 | 162 | G | 1.7971E+00 | 1.000 | 0.000 | 0.000 | 0.000 | 0.000 | 0.000 | 0.000 | 0.000 | 0.000 | 2.028 |
| 62 | 162 | G | 3.2680E-01 | 1.000 | 0.000 | 0.000 | 0.000 | 0.000 | 0.000 | 0.000 | 0.000 | 0.000 | 4.266 |
| 63 | 162 | G | 7.4118E-02 | 1.000 | 0.000 | 0.000 | 0.000 | 0.000 | 0.000 | 0.000 | 0.000 | 0.000 | 0.764 |
| 64 | 162 | G | 1.4088E-03 | 1.000 | 0.000 | 0.000 | 0.000 | 0.000 | 0.000 | 0.000 | 0.000 | 0.000 | 1.643 |
| 65 | 162 | G | 1.4874E-03 | 1.000 | 0.000 | 0.000 | 0.000 | 0.000 | 0.000 | 0.000 | 0.000 | 0.000 | 0.000 |
| 66 | 162 | G | 0.0000E+00 | 0.000 | 0.000 | 0.390 | 0.000 | 0.000 | 0.610 | 0.000 | 0.000 | 0.000 | 0.067 |
| 67 | 162 | G | 1.6989E-04 | 0.000 | 0.000 | 1.000 | 0.000 | 0.000 | 0.000 | 0.000 | 0.000 | 0.000 | 0.000 |
| 67 | 162 | H | 7.7016E-04 | 0.000 | 0.000 | 1.000 | 0.000 | 0.000 | 0.000 | 0.000 | 0.000 | 0.000 | 0.000 |
| 68 | 162 | G | 0.0000E+00 | 0.000 | 0.000 | 0.000 | 0.000 | 0.000 | 0.000 | 0.000 | 0.000 | 0.000 | 0.000 |

| Z | A | K | $\lambda_{tot}$ | $P_{\beta-(G)}$ | $P_{\beta-(1)}$ | $P_{\beta-(G)}$ | $P_{\beta-(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 60 | 163 | G | 2.4527E+00 | 0.950 | 0.000 | 0.000 | 0.000 | 0.000 | 0.000 | 0.000 | 0.050 | 0.000 | 5.874 |
| 61 | 163 | G | 2.3935E+00 | 0.994 | 0.000 | 0.000 | 0.000 | 0.000 | 0.000 | 0.000 | 0.006 | 0.000 | 4.711 |
| 62 | 163 | G | 6.4062E-01 | 1.000 | 0.000 | 0.000 | 0.000 | 0.000 | 0.000 | 0.000 | 0.000 | 0.000 | 3.674 |
| 63 | 163 | G | 1.1949E-01 | 1.000 | 0.000 | 0.000 | 0.000 | 0.000 | 0.000 | 0.000 | 0.000 | 0.000 | 3.171 |
| 64 | 163 | G | 1.0452E-02 | 1.000 | 0.000 | 0.000 | 0.000 | 0.000 | 0.000 | 0.000 | 0.000 | 0.000 | 2.408 |
| 65 | 163 | G | 5.9243E-04 | 1.000 | 0.000 | 0.000 | 0.000 | 0.000 | 0.000 | 0.000 | 0.000 | 0.000 | 1.108 |
| 66 | 163 | G | 0.0000E+00 | 0.000 | 0.000 | 1.000 | 0.000 | 0.000 | 0.000 | 0.000 | 0.000 | 0.000 | 0.000 |
| 67 | 163 | G | 6.3013E-01 | 0.000 | 0.000 | 1.000 | 0.000 | 0.000 | 0.000 | 0.000 | 0.000 | 0.000 | 0.009 |
| 67 | 163 | H | 6.6649E-10 | 0.000 | 0.000 | 1.000 | 0.000 | 0.000 | 0.000 | 0.000 | 0.000 | 0.000 | 0.010 |
| 68 | 163 | G | 1.5403E-04 | 0.000 | 0.000 | 1.000 | 0.000 | 0.000 | 0.000 | 0.000 | 0.000 | 0.000 | 4.520 |
| 60 | 164 | G | 2.6680E+00 | 0.934 | 0.000 | 0.000 | 0.000 | 0.000 | 0.000 | 0.000 | 0.066 | 0.000 | 6.481 |
| 61 | 164 | G | 4.0159E+00 | 0.989 | 0.000 | 0.000 | 0.000 | 0.000 | 0.000 | 0.000 | 0.011 | 0.000 | 2.594 |
| 62 | 164 | G | 9.3732E-01 | 1.000 | 0.000 | 0.000 | 0.000 | 0.000 | 0.000 | 0.000 | 0.000 | 0.000 | 4.905 |
| 63 | 164 | G | 2.6048E-01 | 1.000 | 0.000 | 0.000 | 0.000 | 0.000 | 0.000 | 0.000 | 0.000 | 0.000 | 1.220 |
| 64 | 164 | G | 2.1790E-02 | 1.000 | 0.000 | 0.000 | 0.000 | 0.000 | 0.000 | 0.000 | 0.000 | 0.000 | 2.699 |
| 65 | 164 | G | 3.8508E-03 | 1.000 | 0.000 | 0.000 | 0.000 | 0.000 | 0.000 | 0.000 | 0.000 | 0.000 | 0.000 |
| 66 | 164 | G | 0.0000E+00 | 0.000 | 0.000 | 1.000 | 0.000 | 0.000 | 0.000 | 0.000 | 0.000 | 0.000 | 0.140 |
| 67 | 164 | G | 3.1223E-04 | 0.420 | 0.000 | 0.580 | 0.000 | 0.000 | 0.000 | 0.000 | 0.000 | 0.000 | 0.151 |
| 67 | 164 | H | 3.9836E-04 | 0.000 | 0.000 | 1.000 | 0.000 | 0.000 | 0.000 | 0.000 | 0.000 | 0.000 | 0.000 |
| 68 | 164 | G | 0.0000E+00 | 0.000 | 0.000 | 1.000 | 0.000 | 0.000 | 0.000 | 0.000 | 0.000 | 0.000 | 5.137 |
| 61 | 165 | G | 4.2655E+00 | 0.954 | 0.000 | 0.000 | 0.000 | 0.000 | 0.000 | 0.000 | 0.046 | 0.000 | 4.406 |
| 62 | 165 | G | 1.6567E+00 | 1.000 | 0.000 | 0.000 | 0.000 | 0.000 | 0.000 | 0.000 | 0.000 | 0.000 | 3.774 |
| 63 | 165 | G | 4.0870E-01 | 1.000 | 0.000 | 0.000 | 0.000 | 0.000 | 0.000 | 0.000 | 0.000 | 0.000 | 2.945 |
| 64 | 165 | G | 5.7427E-02 | 1.000 | 0.000 | 0.000 | 0.000 | 0.000 | 0.000 | 0.000 | 0.000 | 0.000 | 1.725 |
| 65 | 165 | G | 4.7541E-03 | 1.000 | 0.000 | 0.000 | 0.000 | 0.000 | 0.000 | 0.000 | 0.000 | 0.000 | 0.123 |
| 66 | 165 | G | 8.8865E-05 | 0.022 | 0.000 | 1.000 | 0.000 | 0.000 | 0.000 | 0.000 | 0.000 | 0.000 | 0.475 |
| 67 | 165 | H | 8.1932E-05 | 0.000 | 0.000 | 1.000 | 0.000 | 0.000 | 0.000 | 0.000 | 0.000 | 0.000 | 0.000 |
| 68 | 165 | G | 0.0000E+00 | 0.000 | 0.000 | 1.000 | 0.000 | 0.000 | 0.000 | 0.000 | 0.000 | 0.000 | 0.046 |
| 69 | 165 | G | 1.8693E-05 | 0.000 | 0.000 | 1.000 | 0.000 | 0.000 | 0.000 | 0.000 | 0.000 | 0.000 | 0.000 |
| 62 | 166 | G | 6.4062E-06 | 1.000 | 0.000 | 0.000 | 0.000 | 0.000 | 0.000 | 0.000 | 0.000 | 0.000 | 3.141 |
| 63 | 166 | G | 1.8769E+00 | 1.000 | 0.000 | 0.000 | 0.000 | 0.000 | 0.000 | 0.000 | 0.000 | 0.000 | 5.589 |
| 64 | 166 | G | 7.8127E-01 | 1.000 | 0.000 | 0.000 | 0.000 | 0.000 | 0.000 | 0.000 | 0.000 | 0.000 | 1.749 |
| 65 | 166 | G | 1.0807E-01 | 1.000 | 0.000 | 0.000 | 0.000 | 0.000 | 0.000 | 0.000 | 0.000 | 0.000 | 3.485 |
| 66 | 166 | G | 1.2281E-02 | 1.000 | 0.000 | 0.000 | 0.000 | 0.000 | 0.000 | 0.000 | 0.000 | 0.000 | 0.200 |
| 67 | 166 | G | 2.3625E-06 | 1.000 | 0.000 | 0.000 | 0.000 | 0.000 | 0.000 | 0.000 | 0.000 | 0.000 | 1.817 |
| 67 | 166 | H | 1.8337E-11 | 1.000 | 0.000 | 0.000 | 0.000 | 0.000 | 0.978 | 0.000 | 0.000 | 0.000 | 0.722 |
| 68 | 166 | G | 7.1844E-06 | 1.000 | 0.000 | 0.000 | 0.000 | 0.000 | 0.000 | 0.000 | 0.000 | 0.000 | 0.000 |
| 69 | 166 | G | 0.0000E+00 | 0.000 | 0.000 | 1.000 | 0.000 | 0.000 | 0.000 | 0.000 | 0.000 | 0.000 | 0.000 |

| Z | A | K | $\lambda_{tot}$ | $P_{\beta-(G)}$ | $P_{\beta-(1)}$ | $P_{\beta+(2)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 70 | 166 | G | 3.3961E-06 | 0.000 | 0.000 | 1.000 | 0.000 | 0.000 | 0.000 | 0.000 | 0.000 | 0.000 | 0.000 |
| 62 | 167 | G | 2.5530E+00 | 0.996 | 0.000 | 0.000 | 0.000 | 0.000 | 0.000 | 0.000 | 0.004 | 0.000 | 5.021 |
| 63 | 167 | G | 9.4628E-01 | 0.999 | 0.000 | 0.000 | 0.000 | 0.000 | 0.000 | 0.000 | 0.001 | 0.000 | 4.314 |
| 64 | 167 | G | 2.3276E-01 | 1.000 | 0.000 | 0.000 | 0.000 | 0.000 | 0.000 | 0.000 | 0.000 | 0.000 | 3.549 |
| 65 | 167 | G | 2.2600E-02 | 1.000 | 0.000 | 0.000 | 0.000 | 0.000 | 0.000 | 0.000 | 0.000 | 0.000 | 2.347 |
| 66 | 167 | G | 1.8633E-03 | 1.000 | 0.000 | 0.000 | 0.000 | 0.000 | 0.000 | 0.000 | 0.000 | 0.000 | 1.255 |
| 67 | 167 | G | 6.1888E-05 | 1.000 | 0.000 | 0.000 | 0.000 | 0.000 | 0.000 | 0.000 | 0.000 | 0.000 | 0.597 |
| 68 | 167 | H | 3.0137E-01 | 0.000 | 0.000 | 0.000 | 0.000 | 0.000 | 1.000 | 0.000 | 0.000 | 0.000 | 0.208 |
| 68 | 167 | G | 0.0000E+00 | 0.000 | 0.000 | 0.000 | 0.000 | 0.000 | 0.000 | 0.000 | 0.000 | 0.000 | 0.000 |
| 69 | 167 | G | 8.6730E-07 | 0.000 | 0.000 | 0.000 | 0.000 | 0.000 | 0.000 | 0.000 | 0.000 | 0.000 | 0.000 |
| 70 | 167 | G | 6.5268E-04 | 0.000 | 0.000 | 1.000 | 0.000 | 0.000 | 0.000 | 0.000 | 0.000 | 0.000 | 0.000 |
| 62 | 168 | G | 3.3599E+00 | 0.993 | 0.000 | 0.000 | 0.000 | 0.000 | 0.000 | 0.000 | 0.007 | 0.000 | 3.641 |
| 63 | 168 | G | 1.3846E+00 | 0.997 | 0.000 | 0.000 | 0.000 | 0.000 | 0.000 | 0.000 | 0.003 | 0.000 | 6.186 |
| 64 | 168 | G | 3.1407E-01 | 1.000 | 0.000 | 0.000 | 0.000 | 0.000 | 0.000 | 0.000 | 0.000 | 0.000 | 2.245 |
| 65 | 168 | G | 4.9055E-02 | 1.000 | 0.000 | 0.000 | 0.000 | 0.000 | 0.000 | 0.000 | 0.000 | 0.000 | 4.122 |
| 66 | 168 | G | 5.2711E-03 | 1.000 | 0.000 | 0.000 | 0.000 | 0.000 | 0.000 | 0.000 | 0.000 | 0.000 | 1.083 |
| 67 | 168 | G | 3.8508E-03 | 1.000 | 0.000 | 0.000 | 0.000 | 0.000 | 0.000 | 0.000 | 0.000 | 0.000 | 1.594 |
| 68 | 168 | G | 0.0000E+00 | 0.000 | 0.000 | 0.000 | 0.000 | 0.000 | 0.000 | 0.000 | 0.000 | 0.000 | 0.000 |
| 69 | 168 | G | 8.6212E-08 | 0.020 | 0.000 | 0.980 | 0.000 | 0.000 | 0.000 | 0.000 | 0.000 | 0.000 | 0.000 |
| 70 | 168 | G | 0.0000E+00 | 0.000 | 0.000 | 0.000 | 0.000 | 0.000 | 0.000 | 0.000 | 0.000 | 0.000 | 0.000 |
| 63 | 169 | G | 1.8871E+00 | 0.991 | 0.000 | 0.000 | 0.000 | 0.000 | 0.000 | 0.000 | 0.009 | 0.000 | 4.831 |
| 64 | 169 | G | 4.8337E-01 | 1.000 | 0.000 | 0.000 | 0.000 | 0.000 | 0.000 | 0.000 | 0.000 | 0.000 | 4.096 |
| 65 | 169 | G | 5.4838E-02 | 1.000 | 0.000 | 0.000 | 0.000 | 0.000 | 0.000 | 0.000 | 0.000 | 0.000 | 2.933 |
| 66 | 169 | G | 1.8164E-02 | 1.000 | 0.000 | 0.000 | 0.000 | 0.000 | 0.000 | 0.000 | 0.000 | 0.000 | 2.495 |
| 67 | 169 | G | 2.5114E-03 | 1.000 | 0.000 | 0.000 | 0.000 | 0.000 | 0.000 | 0.000 | 0.000 | 0.000 | 1.211 |
| 68 | 169 | G | 8.5363E-07 | 1.000 | 0.000 | 0.000 | 0.000 | 0.000 | 0.000 | 0.000 | 0.000 | 0.000 | 0.103 |
| 70 | 169 | G | 0.0000E+00 | 0.000 | 0.000 | 0.000 | 0.000 | 0.000 | 0.000 | 0.000 | 0.000 | 0.000 | 0.000 |
| 70 | 169 | G | 1.5068E-02 | 0.000 | 0.000 | 1.000 | 0.000 | 0.000 | 0.000 | 0.000 | 0.000 | 0.000 | 0.024 |
| 71 | 169 | H | 2.5114E-07 | 0.000 | 0.000 | 0.000 | 0.000 | 0.000 | 1.000 | 0.000 | 0.000 | 0.000 | 0.423 |
| 71 | 169 | H | 4.2787E-03 | 0.000 | 0.000 | 1.000 | 0.000 | 0.000 | 0.000 | 0.000 | 0.000 | 0.000 | 0.029 |
| 62 | 170 | G | 5.6353E-06 | 0.000 | 0.000 | 0.000 | 0.000 | 0.000 | 1.000 | 0.000 | 0.000 | 0.000 | 0.000 |
| 63 | 170 | G | 5.5630E+00 | 0.980 | 0.000 | 0.000 | 0.000 | 0.000 | 0.000 | 0.000 | 0.020 | 0.000 | 4.257 |
| 64 | 170 | G | 2.6009E+00 | 0.962 | 0.000 | 0.000 | 0.000 | 0.000 | 0.000 | 0.000 | 0.038 | 0.000 | 6.637 |
| 65 | 170 | G | 7.1873E-01 | 1.000 | 0.000 | 0.000 | 0.000 | 0.000 | 0.000 | 0.000 | 0.000 | 0.000 | 2.767 |
| 66 | 170 | G | 8.4283E-02 | 1.000 | 0.000 | 0.000 | 0.000 | 0.000 | 0.000 | 0.000 | 0.000 | 0.000 | 4.746 |
| 67 | 170 | G | 3.4011E-02 | 1.000 | 0.000 | 0.000 | 0.000 | 0.000 | 0.000 | 0.000 | 0.000 | 0.000 | 1.483 |
| 68 | 170 | G | 4.1756E-03 | 1.000 | 0.000 | 0.000 | 0.000 | 0.000 | 0.000 | 0.000 | 0.000 | 0.000 | 2.473 |
| 69 | 170 | G | 0.0000E+00 | 0.000 | 0.000 | 0.000 | 0.000 | 0.000 | 0.000 | 0.000 | 0.000 | 0.000 | 0.000 |
| 70 | 170 | G | 6.2446E-08 | 1.000 | 0.000 | 0.000 | 0.000 | 0.000 | 0.000 | 0.000 | 0.000 | 0.000 | 0.333 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 70 | 170 | G | 0.0000E+00 | 0.000 | 0.000 | 0.000 | 0.000 | 0.000 | 0.000 | 0.000 | 0.000 | 0.000 | 0.000 |
| 64 | 171 | G | 1.0345E+00 | 0.999 | 0.000 | 0.000 | 0.000 | 0.000 | 0.000 | 0.000 | 0.001 | 0.000 | 4.666 |
| 65 | 171 | G | 1.1129E-01 | 0.995 | 0.000 | 0.000 | 0.000 | 0.000 | 0.000 | 0.000 | 0.005 | 0.000 | 3.514 |
| 66 | 171 | G | 6.8089E-02 | 1.000 | 0.000 | 0.000 | 0.000 | 0.000 | 0.000 | 0.000 | 0.000 | 0.000 | 3.021 |
| 67 | 171 | G | 9.5712E-03 | 1.000 | 0.000 | 0.000 | 0.000 | 0.000 | 0.000 | 0.000 | 0.000 | 0.000 | 2.156 |
| 68 | 171 | G | 2.5672E-05 | 1.000 | 0.000 | 0.000 | 0.000 | 0.000 | 0.000 | 0.000 | 0.000 | 0.000 | 0.793 |
| 69 | 171 | G | 1.1457E-08 | 1.000 | 0.000 | 0.000 | 0.000 | 0.000 | 0.000 | 0.000 | 0.000 | 0.000 | 0.026 |
| 70 | 171 | G | 0.0000E+00 | 0.000 | 0.000 | 0.000 | 0.000 | 0.000 | 0.000 | 0.000 | 0.000 | 0.000 | 0.000 |
| 71 | 171 | H | 9.1204E-03 | 0.000 | 0.000 | 1.000 | 0.000 | 0.000 | 0.000 | 0.000 | 0.000 | 0.000 | 0.071 |
| 71 | 171 | G | 9.7626E-07 | 0.000 | 0.000 | 1.000 | 0.000 | 0.000 | 0.000 | 0.000 | 0.000 | 0.000 | 0.000 |
| 72 | 171 | G | 1.5782E-05 | 0.000 | 0.000 | 0.000 | 0.000 | 0.000 | 0.000 | 0.000 | 0.000 | 0.000 | 0.000 |
| 64 | 172 | G | 1.4146E+00 | 0.998 | 0.000 | 0.000 | 0.000 | 0.000 | 0.000 | 0.000 | 0.002 | 0.000 | 3.265 |
| 65 | 172 | G | 1.6184E-01 | 0.987 | 0.000 | 0.000 | 0.000 | 0.000 | 0.000 | 0.000 | 0.013 | 0.000 | 5.321 |
| 66 | 172 | G | 1.2286E-01 | 1.000 | 0.000 | 0.000 | 0.000 | 0.000 | 0.000 | 0.000 | 0.000 | 0.000 | 1.946 |
| 67 | 172 | G | 1.9459E-02 | 1.000 | 0.000 | 0.000 | 0.000 | 0.000 | 0.000 | 0.000 | 0.000 | 0.000 | 3.704 |
| 68 | 172 | G | 3.9294E-06 | 1.000 | 0.000 | 0.000 | 0.000 | 0.000 | 0.000 | 0.000 | 0.000 | 0.000 | 0.658 |
| 69 | 172 | G | 3.0268E-06 | 1.000 | 0.000 | 0.000 | 0.000 | 0.000 | 0.000 | 0.000 | 0.000 | 0.000 | 1.018 |
| 70 | 172 | G | 0.0000E+00 | 0.000 | 0.000 | 0.000 | 0.000 | 0.000 | 0.000 | 0.000 | 0.000 | 0.000 | 0.000 |
| 71 | 172 | H | 3.1223E-03 | 0.000 | 0.000 | 1.000 | 0.000 | 0.000 | 0.000 | 0.000 | 0.000 | 0.000 | 0.000 |
| 71 | 172 | G | 1.1974E-06 | 0.000 | 0.000 | 1.000 | 0.000 | 0.000 | 0.000 | 0.000 | 0.000 | 0.000 | 0.000 |
| 72 | 172 | G | 1.1748E-08 | 0.000 | 0.000 | 0.000 | 0.000 | 0.000 | 0.000 | 0.000 | 0.000 | 0.000 | 0.000 |
| 70 | 173 | G | 0.0000E+00 | 0.000 | 0.000 | 0.000 | 0.000 | 0.000 | 0.000 | 0.000 | 0.000 | 0.000 | 0.000 |
| 70 | 174 | G | 0.0000E+00 | 0.000 | 0.000 | 0.000 | 0.000 | 0.000 | 0.000 | 0.000 | 0.000 | 0.000 | 0.000 |
| 71 | 175 | G | 1.9095E-06 | 1.000 | 0.000 | 0.000 | 0.000 | 0.000 | 0.000 | 0.000 | 0.000 | 0.000 | 0.169 |
| 71 | 175 | G | 0.0000E+00 | 0.000 | 0.000 | 0.000 | 0.000 | 0.000 | 0.000 | 0.000 | 0.000 | 0.000 | 0.000 |
| 71 | 176 | G | 5.2313E-05 | 1.000 | 0.000 | 0.000 | 0.000 | 0.000 | 0.000 | 0.000 | 0.000 | 0.000 | 1.310 |
| 71 | 176 | H | 6.1070E-19 | 0.780 | 0.000 | 0.220 | 0.000 | 0.000 | 0.000 | 0.000 | 0.000 | 0.000 | 1.020 |
| 72 | 176 | G | 0.0000E+00 | 0.000 | 0.000 | 0.000 | 0.000 | 0.000 | 0.000 | 0.000 | 0.000 | 0.000 | 0.000 |
| 70 | 177 | G | 5.0119E-08 | 1.000 | 0.000 | 0.000 | 0.000 | 0.000 | 0.000 | 0.000 | 0.000 | 0.000 | 1.358 |
| 71 | 177 | H | 1.1957E-06 | 1.000 | 0.000 | 0.000 | 0.000 | 0.000 | 0.000 | 0.000 | 0.000 | 0.000 | 0.182 |
| 71 | 177 | G | 0.0000E+00 | 0.000 | 0.000 | 0.000 | 0.000 | 0.000 | 0.000 | 0.000 | 0.000 | 0.000 | 0.000 |
| 72 | 178 | G | 1.7329E-01 | 1.000 | 0.000 | 0.000 | 0.000 | 0.000 | 0.000 | 0.000 | 0.000 | 0.000 | 1.147 |
| 72 | 178 | G | 0.0000E+00 | 0.000 | 0.000 | 0.000 | 0.000 | 0.000 | 0.000 | 0.000 | 0.000 | 0.000 | 0.000 |
| 72 | 179 | G | 3.7067E-02 | 1.000 | 0.000 | 0.000 | 0.000 | 0.000 | 0.000 | 0.000 | 0.000 | 0.000 | 0.375 |
| 72 | 179 | G | 0.0000E+00 | 0.000 | 0.000 | 0.000 | 0.000 | 0.000 | 0.000 | 0.000 | 0.000 | 0.000 | 0.000 |
| 72 | 180 | G | 3.5007E-05 | 1.000 | 0.000 | 0.000 | 0.000 | 0.000 | 0.000 | 0.000 | 0.000 | 0.000 | 1.142 |
| 72 | 180 | G | 0.0000E+00 | 0.000 | 0.000 | 0.000 | 0.000 | 0.000 | 0.000 | 0.000 | 0.000 | 0.000 | 0.000 |
| 72 | 181 | G | 1.8938E-07 | 1.000 | 0.000 | 0.000 | 0.000 | 0.000 | 0.000 | 0.000 | 0.000 | 0.000 | 0.754 |
| 73 | 181 | G | 0.0000E+00 | 0.000 | 0.000 | 0.000 | 0.000 | 0.000 | 0.000 | 0.000 | 0.000 | 0.000 | 0.000 |

| Z | A | K | λ_tot | P_β-(G) | P_β-(1) | P_β+(G) | P_β+(1) | P_α | P_γ | P_SF | P_1n | P_2n | E_Total |
|---|---|---|-------|---------|---------|---------|---------|-----|-----|------|------|------|---------|
| 72 | 182 | I | 1.8785E-04 | 0.540 | 0.000 | 0.000 | 0.000 | 0.000 | 0.460 | 0.000 | 0.000 | 0.000 | 0.540 |
| 72 | 182 | G | 2.4424E-15 | 1.000 | 0.000 | 0.000 | 0.000 | 0.000 | 0.000 | 0.000 | 0.000 | 0.000 | 0.500 |
| 73 | 182 | I | 7.2203E-04 | 0.000 | 0.000 | 0.000 | 0.000 | 0.000 | 1.000 | 0.000 | 0.000 | 0.000 | 0.520 |
| 73 | 182 | G | 7.0107E-08 | 1.000 | 0.000 | 0.000 | 0.000 | 0.000 | 0.000 | 0.000 | 0.000 | 0.000 | 1.502 |
| 73 | 182 | I | 0.0000E+00 | 0.000 | 0.000 | 0.000 | 0.000 | 0.000 | 1.000 | 0.000 | 0.000 | 0.000 | 0.000 |
| 74 | 182 | G | 1.6120E-06 | 1.000 | 0.000 | 0.000 | 0.000 | 0.000 | 0.000 | 0.000 | 0.000 | 0.000 | 1.070 |
| 74 | 183 | I | 1.3078E-01 | 0.000 | 0.000 | 0.000 | 0.000 | 0.000 | 1.000 | 0.000 | 0.000 | 0.000 | 0.309 |
| 74 | 183 | G | 0.0000E+00 | 0.000 | 0.000 | 0.000 | 0.000 | 0.000 | 0.000 | 0.000 | 0.000 | 0.000 | 0.000 |
| 74 | 184 | G | 0.0000E+00 | 0.000 | 0.000 | 0.000 | 0.000 | 0.000 | 0.000 | 0.000 | 0.000 | 0.000 | 0.000 |
| 74 | 185 | I | 6.7956E-03 | 1.000 | 0.000 | 0.000 | 0.000 | 0.000 | 0.000 | 0.000 | 0.000 | 0.000 | 0.197 |
| 74 | 185 | G | 1.0682E-07 | 1.000 | 0.000 | 0.000 | 0.000 | 0.000 | 0.000 | 0.000 | 0.000 | 0.000 | 0.433 |
| 74 | 186 | G | 0.0000E+00 | 0.000 | 0.000 | 0.000 | 0.000 | 0.000 | 0.000 | 0.000 | 0.000 | 0.000 | 0.000 |
| 75 | 186 | I | 2.1243E-06 | 0.922 | 0.000 | 0.078 | 0.000 | 0.000 | 0.000 | 0.000 | 0.000 | 0.000 | 0.361 |
| 75 | 186 | G | 0.0000E+00 | 0.000 | 0.000 | 0.000 | 0.000 | 0.000 | 0.000 | 0.000 | 0.000 | 0.000 | 0.000 |
| 74 | 187 | I | 8.0900E-06 | 1.000 | 0.000 | 0.000 | 0.000 | 0.000 | 0.000 | 0.000 | 0.000 | 0.000 | 0.765 |
| 75 | 187 | G | 4.3954E-19 | 1.000 | 0.000 | 0.000 | 0.000 | 0.000 | 0.000 | 0.000 | 0.000 | 0.000 | 2.590 |
| 75 | 187 | I | 0.0000E+00 | 0.000 | 0.000 | 0.000 | 0.000 | 0.000 | 0.000 | 0.000 | 0.000 | 0.000 | 0.000 |
| 75 | 188 | I | 1.1626E-07 | 0.000 | 1.000 | 0.000 | 0.000 | 0.000 | 0.000 | 0.000 | 0.000 | 0.000 | 0.101 |
| 75 | 188 | G | 6.2110E-04 | 1.000 | 0.000 | 0.000 | 0.000 | 0.000 | 0.000 | 0.000 | 0.000 | 0.000 | 0.172 |
| 76 | 188 | I | 1.1339E-05 | 0.000 | 0.000 | 0.000 | 0.000 | 0.000 | 1.000 | 0.000 | 0.000 | 0.000 | 0.837 |
| 76 | 188 | G | 0.0000E+00 | 0.000 | 0.000 | 0.000 | 0.000 | 0.000 | 0.000 | 0.000 | 0.000 | 0.000 | 0.000 |
| 75 | 189 | I | 7.9235E-06 | 0.920 | 0.080 | 0.000 | 0.000 | 0.000 | 0.000 | 0.000 | 0.000 | 0.000 | 1.010 |
| 76 | 189 | G | 3.2090E-05 | 1.000 | 0.000 | 0.000 | 0.000 | 0.000 | 0.000 | 0.000 | 0.000 | 0.000 | 0.000 |
| 76 | 189 | I | 0.0000E+00 | 0.000 | 0.000 | 0.000 | 0.000 | 0.000 | 0.000 | 0.000 | 0.000 | 0.000 | 0.000 |
| 76 | 190 | G | 1.1669E-03 | 0.000 | 0.000 | 0.000 | 0.000 | 0.000 | 1.000 | 0.000 | 0.000 | 0.000 | 1.706 |
| 76 | 190 | I | 0.0000E+00 | 0.000 | 0.000 | 0.000 | 0.000 | 0.000 | 0.000 | 0.000 | 0.000 | 0.000 | 0.000 |
| 76 | 191 | I | 1.4698E-05 | 0.954 | 0.000 | 0.046 | 0.000 | 0.000 | 0.000 | 0.000 | 0.000 | 0.000 | 0.744 |
| 77 | 191 | G | 5.2077E-07 | 0.000 | 0.000 | 0.000 | 0.000 | 0.000 | 1.000 | 0.000 | 0.000 | 0.000 | 0.245 |
| 77 | 191 | I | 1.4031E-01 | 0.000 | 0.000 | 0.000 | 0.000 | 0.000 | 1.000 | 0.000 | 0.000 | 0.000 | 0.171 |
| 77 | 191 | G | 0.0000E+00 | 0.000 | 0.000 | 0.000 | 0.000 | 0.000 | 0.000 | 0.000 | 0.000 | 0.000 | 0.000 |
| 77 | 192 | I | 8.2518E-03 | 0.000 | 0.000 | 0.000 | 0.000 | 0.000 | 1.000 | 0.000 | 0.000 | 0.000 | 0.058 |
| 77 | 192 | G | 1.0841E-07 | 1.000 | 0.000 | 0.000 | 0.000 | 0.000 | 0.000 | 0.000 | 0.000 | 0.000 | 1.033 |
| 77 | 193 | I | 7.5688E-07 | 0.000 | 0.000 | 0.000 | 0.000 | 0.000 | 1.000 | 0.000 | 0.000 | 0.000 | 0.000 |
| 78 | 193 | G | 0.0000E+00 | 0.000 | 0.000 | 0.000 | 0.000 | 0.000 | 0.000 | 0.000 | 0.000 | 0.000 | 0.080 |
| 77 | 193 | I | 1.8528E-06 | 0.000 | 0.000 | 1.000 | 0.000 | 0.000 | 0.000 | 0.000 | 0.000 | 0.000 | 0.150 |
| 78 | 193 | G | 4.3953E-10 | 0.000 | 0.000 | 0.000 | 0.000 | 0.000 | 1.000 | 0.000 | 0.000 | 0.000 | 0.005 |
| 77 | 194 | I | 4.6898E-08 | 1.000 | 0.000 | 0.000 | 0.000 | 0.000 | 0.000 | 0.000 | 0.000 | 0.000 | 0.100 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{total}$ |
|---|---|---|---|---|---|---|---|---|---|---|---|---|---|
| 77 | 194 | G | 1.0054E-05 | 1.000 | 0.000 | 0.000 | 0.000 | 0.000 | 0.000 | 0.000 | 0.000 | 0.000 | 0.900 |
| 78 | 194 | G | 0.0000E+00 | 0.000 | 0.000 | 0.000 | 0.000 | 0.000 | 0.000 | 0.000 | 0.000 | 0.000 | 0.000 |
| 78 | 195 | H | 1.9958E-06 | 0.000 | 0.000 | 0.000 | 0.000 | 0.000 | 1.000 | 0.000 | 0.000 | 0.000 | 0.259 |
| 78 | 195 | G | 0.0000E+00 | 0.000 | 0.000 | 0.000 | 0.000 | 0.000 | 0.000 | 0.000 | 0.000 | 0.000 | 0.000 |
| 78 | 196 | G | 0.0000E+00 | 0.000 | 0.000 | 0.000 | 0.000 | 0.000 | 0.000 | 0.000 | 0.000 | 0.000 | 0.000 |
| 78 | 197 | H | 1.2238E-04 | 0.030 | 0.000 | 0.000 | 0.000 | 0.000 | 0.970 | 0.000 | 0.000 | 0.000 | 0.422 |
| 78 | 197 | G | 1.0521E-05 | 1.000 | 0.000 | 0.000 | 0.000 | 0.000 | 0.000 | 0.000 | 0.000 | 0.000 | 0.750 |
| 79 | 197 | H | 8.8865E-02 | 0.000 | 0.000 | 0.000 | 0.000 | 0.000 | 1.000 | 0.000 | 0.000 | 0.000 | 0.409 |
| 79 | 197 | G | 0.0000E+00 | 0.000 | 0.000 | 0.000 | 0.000 | 0.000 | 0.000 | 0.000 | 0.000 | 0.000 | 0.000 |
| 79 | 198 | G | 3.4884E-06 | 1.000 | 0.000 | 0.000 | 0.000 | 0.000 | 0.000 | 0.000 | 0.000 | 0.000 | 0.812 |
| 79 | 198 | H | 2.9787E-06 | 0.000 | 0.000 | 0.000 | 0.000 | 0.000 | 1.000 | 0.000 | 0.000 | 0.000 | 1.374 |
| 80 | 198 | G | 0.0000E+00 | 0.000 | 0.000 | 0.000 | 0.000 | 0.000 | 0.000 | 0.000 | 0.000 | 0.000 | 0.000 |
| 79 | 199 | G | 2.5558E-06 | 1.000 | 0.000 | 0.000 | 0.000 | 0.000 | 0.000 | 0.000 | 0.000 | 0.000 | 0.231 |
| 80 | 199 | H | 2.7118E-06 | 0.000 | 0.000 | 0.000 | 0.000 | 0.000 | 1.000 | 0.000 | 0.000 | 0.000 | 0.532 |
| 80 | 199 | G | 0.0000E+00 | 0.000 | 0.000 | 0.000 | 0.000 | 0.000 | 0.000 | 0.000 | 0.000 | 0.000 | 0.000 |
| 79 | 200 | G | 1.0296E-05 | 0.840 | 0.000 | 0.000 | 0.000 | 0.000 | 0.160 | 0.000 | 0.000 | 0.000 | 0.160 |
| 80 | 200 | G | 2.3869E-04 | 1.000 | 0.000 | 0.000 | 0.000 | 0.000 | 0.000 | 0.000 | 0.000 | 0.000 | 2.200 |
| 80 | 201 | G | 0.0000E+00 | 0.000 | 0.000 | 0.000 | 0.000 | 0.000 | 0.000 | 0.000 | 0.000 | 0.000 | 0.000 |
| 80 | 202 | G | 0.0000E+00 | 0.000 | 0.000 | 0.000 | 0.000 | 0.000 | 0.000 | 0.000 | 0.000 | 0.000 | 0.000 |
| 80 | 203 | G | 1.7221E-07 | 1.000 | 0.000 | 0.000 | 0.000 | 0.000 | 0.000 | 0.000 | 0.000 | 0.000 | 0.336 |
| 81 | 203 | G | 0.0000E+00 | 0.000 | 0.000 | 0.000 | 0.000 | 0.000 | 0.000 | 0.000 | 0.000 | 0.000 | 0.000 |
| 80 | 204 | G | 0.0000E+00 | 0.000 | 0.000 | 0.000 | 0.000 | 0.000 | 0.000 | 0.000 | 0.000 | 0.000 | 0.000 |
| 81 | 204 | G | 5.8150E-09 | 0.974 | 0.000 | 0.026 | 0.000 | 0.000 | 0.000 | 0.000 | 0.000 | 0.000 | 0.239 |
| 82 | 204 | G | 1.7191E-04 | 0.000 | 0.000 | 0.000 | 0.000 | 0.000 | 1.000 | 0.000 | 0.000 | 0.000 | 2.186 |
| 82 | 204 | H | 1.5700E-24 | 0.000 | 0.000 | 0.000 | 0.000 | 1.000 | 0.000 | 0.000 | 0.000 | 0.000 | 2.600 |
| 81 | 205 | G | 2.2216E-03 | 1.000 | 0.000 | 0.000 | 0.000 | 0.000 | 0.000 | 0.000 | 0.000 | 0.000 | 1.600 |
| 82 | 205 | G | 0.0000E+00 | 0.000 | 0.000 | 0.000 | 0.000 | 0.000 | 0.000 | 0.000 | 0.000 | 0.000 | 0.000 |
| 82 | 205 | H | 1.4654E-14 | 1.000 | 0.000 | 0.000 | 0.000 | 0.000 | 0.000 | 0.000 | 0.000 | 0.000 | 0.005 |
| 81 | 206 | G | 1.4175E-03 | 1.000 | 0.000 | 0.000 | 0.000 | 0.000 | 0.000 | 0.000 | 0.000 | 0.000 | 2.643 |
| 82 | 206 | G | 3.1223E-03 | 1.000 | 0.000 | 0.000 | 0.000 | 0.000 | 0.000 | 0.000 | 0.000 | 0.000 | 1.524 |
| 82 | 206 | H | 2.7506E-04 | 0.000 | 0.000 | 0.000 | 0.000 | 0.000 | 1.000 | 0.000 | 0.000 | 0.000 | 0.000 |
| 81 | 207 | G | 0.0000E+00 | 0.000 | 0.000 | 0.000 | 0.000 | 0.000 | 0.000 | 0.000 | 0.000 | 0.000 | 0.000 |
| 82 | 207 | G | 5.2116E-01 | 1.000 | 0.000 | 0.000 | 0.000 | 0.000 | 0.000 | 0.000 | 0.000 | 0.000 | 0.495 |
| 81 | 207 | H | 2.4219E-03 | 0.000 | 0.000 | 0.000 | 0.000 | 0.000 | 1.000 | 0.000 | 0.000 | 0.000 | 0.000 |
| 82 | 208 | G | 0.0000E+00 | 0.000 | 0.000 | 0.000 | 0.000 | 0.000 | 0.000 | 0.000 | 0.000 | 0.000 | 0.000 |
| 81 | 208 | G | 3.7840E-03 | 1.000 | 0.000 | 0.000 | 0.000 | 0.000 | 0.000 | 0.000 | 0.000 | 0.000 | 3.970 |
| 82 | 208 | G | 0.0000E+00 | 0.000 | 0.000 | 0.000 | 0.000 | 0.000 | 0.000 | 0.000 | 0.000 | 0.000 | 0.000 |
| 81 | 209 | G | 5.2511E-03 | 1.000 | 0.000 | 0.000 | 0.000 | 0.000 | 0.000 | 0.000 | 0.000 | 0.000 | 2.803 |

| N | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 82 | 209 | G | 5.9193E-05 | 1.000 | 0.000 | 0.000 | 0.000 | 0.000 | 0.000 | 0.000 | 0.000 | 0.000 | 0.194 |
| 83 | 209 | G | 0.0000E+00 | 0.000 | 0.000 | 0.000 | 0.000 | 0.000 | 0.000 | 0.000 | 0.000 | 0.000 | 0.000 |
| 81 | 210 | G | 8.8865E-03 | 1.000 | 0.000 | 0.000 | 0.000 | 0.000 | 0.000 | 0.000 | 0.000 | 0.000 | 0.000 |
| 82 | 210 | G | 9.8556E-10 | 1.000 | 0.000 | 0.000 | 0.000 | 0.000 | 0.000 | 0.000 | 0.000 | 0.000 | 0.039 |
| 83 | 210 | H | 7.3264E-15 | 0.000 | 0.000 | 0.000 | 0.000 | 1.000 | 0.000 | 0.000 | 0.000 | 0.000 | 5.296 |
| 83 | 210 | G | 1.6004E-06 | 1.000 | 0.000 | 0.000 | 0.000 | 0.000 | 0.000 | 0.000 | 0.000 | 0.000 | 0.389 |
| 84 | 210 | G | 5.7955E-07 | 0.000 | 0.000 | 0.000 | 0.000 | 1.000 | 0.000 | 0.000 | 0.000 | 0.000 | 5.408 |
| 82 | 211 | G | 3.2001E-04 | 1.000 | 0.000 | 0.000 | 0.000 | 0.000 | 0.000 | 0.000 | 0.000 | 0.000 | 0.506 |
| 83 | 211 | G | 5.3319E-02 | 0.003 | 0.000 | 0.000 | 0.000 | 0.997 | 0.000 | 0.000 | 0.000 | 0.000 | 6.729 |
| 84 | 211 | H | 2.7506E-03 | 0.000 | 0.000 | 0.000 | 0.000 | 1.000 | 0.000 | 0.000 | 0.000 | 0.000 | 7.600 |
| 84 | 211 | G | 1.3433E+00 | 0.000 | 0.000 | 0.000 | 0.000 | 1.000 | 0.000 | 0.000 | 0.000 | 0.000 | 7.592 |
| 82 | 212 | G | 1.8098E-05 | 1.000 | 0.000 | 0.000 | 0.000 | 0.000 | 0.000 | 0.000 | 0.000 | 0.000 | 0.321 |
| 83 | 212 | G | 4.6210E-04 | 0.640 | 0.000 | 0.000 | 0.000 | 0.360 | 0.000 | 0.000 | 0.000 | 0.000 | 0.000 |
| 84 | 212 | G | 1.9064E-04 | 0.070 | 0.000 | 0.000 | 0.000 | 0.930 | 0.000 | 0.000 | 0.000 | 0.000 | 2.869 |
| 84 | 212 | H | 4.8813E+07 | 0.640 | 0.000 | 0.000 | 0.000 | 0.360 | 0.000 | 0.000 | 0.000 | 0.000 | 0.000 |
| 82 | 213 | G | 2.3105E+06 | 0.000 | 0.000 | 0.000 | 0.000 | 1.000 | 0.000 | 0.000 | 0.000 | 0.000 | 8.940 |
| 83 | 213 | G | 1.1326E-03 | 1.000 | 0.000 | 0.000 | 0.000 | 0.000 | 0.000 | 0.000 | 0.000 | 0.000 | 0.000 |
| 84 | 213 | G | 2.5344E-04 | 0.978 | 0.000 | 0.000 | 0.000 | 0.022 | 0.000 | 0.000 | 0.000 | 0.000 | 0.709 |
| 82 | 214 | G | 1.6504E+05 | 0.000 | 0.000 | 0.000 | 0.000 | 1.000 | 0.000 | 0.000 | 0.000 | 0.000 | 8.537 |
| 83 | 214 | G | 4.3106E-04 | 1.000 | 0.000 | 0.000 | 0.000 | 0.000 | 0.000 | 0.000 | 0.000 | 0.000 | 0.538 |
| 84 | 214 | G | 5.8052E-04 | 0.000 | 0.000 | 0.000 | 0.000 | 1.000 | 0.000 | 0.000 | 0.000 | 0.000 | 2.162 |
| 82 | 215 | G | 4.2265E+03 | 1.000 | 0.000 | 0.000 | 0.000 | 0.000 | 0.000 | 0.000 | 0.000 | 0.000 | 7.833 |
| 83 | 215 | G | 1.5611E-03 | 1.000 | 0.000 | 0.000 | 0.000 | 0.000 | 0.000 | 0.000 | 0.000 | 0.000 | 0.000 |
| 84 | 215 | G | 3.8941E+02 | 0.000 | 0.000 | 0.000 | 0.000 | 1.000 | 0.000 | 0.000 | 0.000 | 0.000 | 7.531 |
| 83 | 216 | G | 4.6210E+00 | 1.000 | 0.000 | 0.000 | 0.000 | 0.000 | 0.000 | 0.000 | 0.000 | 0.000 | 6.906 |
| 84 | 216 | G | 6.9315E-02 | 0.000 | 0.000 | 0.000 | 0.000 | 1.000 | 0.000 | 0.000 | 0.000 | 0.000 | 0.000 |
| 85 | 217 | G | 2.1460E+01 | 0.001 | 0.000 | 0.000 | 0.000 | 0.999 | 0.000 | 0.000 | 0.000 | 0.000 | 7.199 |
| 84 | 217 | G | 3.7877E-03 | 0.030 | 0.000 | 0.000 | 0.000 | 0.970 | 0.000 | 0.000 | 0.000 | 0.000 | 6.113 |
| 85 | 218 | G | 3.4657E-01 | 0.000 | 0.000 | 0.000 | 0.000 | 1.000 | 0.000 | 0.000 | 0.000 | 0.000 | 0.000 |
| 86 | 218 | G | 1.9804E+01 | 0.000 | 0.000 | 0.000 | 0.000 | 1.000 | 0.000 | 0.000 | 0.000 | 0.000 | 7.260 |
| 85 | 219 | G | 1.2836E-02 | 0.800 | 0.000 | 0.000 | 0.000 | 0.200 | 0.000 | 0.000 | 0.000 | 0.000 | 0.000 |
| 86 | 219 | G | 1.7504E-01 | 0.000 | 0.000 | 0.000 | 0.000 | 1.000 | 0.000 | 0.000 | 0.000 | 0.000 | 7.000 |
| 86 | 220 | G | 1.2467E-02 | 0.000 | 0.000 | 0.000 | 0.000 | 1.000 | 0.000 | 0.000 | 0.000 | 0.000 | 6.405 |
| 87 | 221 | G | 4.6210E-04 | 0.000 | 0.000 | 0.000 | 0.000 | 1.000 | 0.000 | 0.000 | 0.000 | 0.000 | 0.000 |
| 86 | 222 | G | 2.3576E-06 | 0.000 | 0.000 | 0.000 | 0.000 | 1.000 | 0.000 | 0.000 | 0.000 | 0.000 | 6.511 |
| 87 | 222 | G | 2.0973E-04 | 1.000 | 0.000 | 0.000 | 0.000 | 0.000 | 0.000 | 0.000 | 0.000 | 0.000 | 5.590 |
| 88 | 222 | G | 8.0225E-02 | 0.000 | 0.000 | 0.000 | 0.000 | 1.000 | 0.000 | 0.000 | 0.000 | 0.000 | 0.000 |
| 87 | 223 | G | 1.8241E-02 | 1.000 | 0.000 | 0.000 | 0.000 | 0.000 | 0.000 | 0.000 | 0.000 | 0.000 | 6.680 |
| 86 | 223 | G | 2.6866E-04 | 1.000 | 0.000 | 0.000 | 0.000 | 0.000 | 0.000 | 0.000 | 0.000 | 0.000 | 0.000 |

| Z | A | K | $\lambda_{tot}$ | $P_{\beta\text{-}(G)}$ | $P_{\beta\text{-}(I)}$ | $P_{\beta\text{+}(G)}$ | $P_{\beta\text{+}(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 87 | 223 | G | 5.2993E-04 | 1.000 | 0.000 | 0.000 | 0.000 | 0.000 | 0.000 | 0.000 | 0.000 | 0.000 | 0.438 |
| 88 | 223 | G | 7.0185E-07 | 0.000 | 0.000 | 0.000 | 0.000 | 1.000 | 0.000 | 0.000 | 0.000 | 0.000 | 6.007 |
| 86 | 224 | G | 1.0817E-04 | 1.000 | 0.000 | 0.000 | 0.000 | 0.000 | 0.000 | 0.000 | 0.000 | 0.000 | 0.000 |
| 87 | 224 | G | 3.5007E-03 | 1.000 | 0.000 | 0.000 | 0.000 | 0.000 | 0.000 | 0.000 | 0.000 | 0.000 | 0.000 |
| 88 | 224 | G | 2.1921E-06 | 0.000 | 0.000 | 0.000 | 0.000 | 1.000 | 0.000 | 0.000 | 0.000 | 0.000 | 5.790 |
| 86 | 225 | G | 2.5672E-03 | 1.000 | 0.000 | 0.000 | 0.000 | 0.000 | 0.000 | 0.000 | 0.000 | 0.000 | 0.000 |
| 87 | 225 | G | 2.9622E-03 | 1.000 | 0.000 | 0.000 | 0.000 | 0.000 | 0.000 | 0.000 | 0.000 | 0.000 | 0.000 |
| 88 | 225 | G | 5.4194E-07 | 1.000 | 0.000 | 0.000 | 0.000 | 0.000 | 0.000 | 0.000 | 0.000 | 0.000 | 0.118 |
| 89 | 225 | G | 8.0225E-07 | 0.000 | 0.000 | 0.000 | 0.000 | 1.000 | 0.000 | 0.000 | 0.000 | 0.000 | 5.893 |
| 86 | 226 | G | 1.9254E-03 | 1.000 | 0.000 | 0.000 | 0.000 | 0.000 | 0.000 | 0.000 | 0.000 | 0.000 | 0.000 |
| 87 | 226 | G | 1.4441E-02 | 1.000 | 0.000 | 0.000 | 0.000 | 0.000 | 0.000 | 0.000 | 0.000 | 0.000 | 0.000 |
| 88 | 226 | G | 1.3737E-10 | 0.830 | 0.000 | 0.170 | 0.000 | 0.000 | 0.000 | 0.000 | 0.000 | 0.000 | 4.871 |
| 89 | 226 | G | 6.6393E-06 | 0.000 | 0.000 | 0.000 | 0.000 | 1.000 | 0.000 | 0.000 | 0.000 | 0.000 | 0.000 |
| 86 | 227 | G | 3.7266E-04 | 1.000 | 0.000 | 0.000 | 0.000 | 0.000 | 0.000 | 0.000 | 0.000 | 0.000 | 6.450 |
| 87 | 227 | G | 4.6834E-03 | 1.000 | 0.000 | 0.000 | 0.000 | 0.000 | 0.000 | 0.000 | 0.000 | 0.000 | 0.000 |
| 88 | 227 | G | 2.7375E-04 | 1.000 | 0.000 | 0.000 | 0.000 | 0.000 | 0.000 | 0.000 | 0.000 | 0.000 | 0.000 |
| 89 | 227 | G | 1.0097E-09 | 0.986 | 0.000 | 0.000 | 0.000 | 0.014 | 0.000 | 0.000 | 0.000 | 0.000 | 0.082 |
| 90 | 227 | G | 4.2866E-07 | 0.000 | 0.000 | 0.000 | 0.000 | 1.000 | 0.000 | 0.000 | 0.000 | 0.000 | 6.157 |
| 87 | 228 | G | 1.7773E-02 | 1.000 | 0.000 | 0.000 | 0.000 | 0.000 | 0.000 | 0.000 | 0.000 | 0.000 | 0.000 |
| 88 | 228 | G | 3.8232E-09 | 1.000 | 0.000 | 0.000 | 0.000 | 0.000 | 0.000 | 0.000 | 0.000 | 0.000 | 0.013 |
| 89 | 228 | G | 3.1407E-05 | 1.000 | 0.000 | 0.000 | 0.000 | 0.000 | 0.000 | 0.000 | 0.000 | 0.000 | 1.458 |
| 90 | 228 | G | 1.1489E-08 | 0.000 | 0.000 | 0.000 | 0.000 | 1.000 | 0.000 | 0.000 | 0.000 | 0.000 | 5.517 |
| 87 | 229 | G | 1.4441E-02 | 1.000 | 0.000 | 0.000 | 0.000 | 0.000 | 0.000 | 0.000 | 0.000 | 0.000 | 0.000 |
| 88 | 229 | G | 2.8881E-03 | 1.000 | 0.000 | 0.000 | 0.000 | 0.000 | 0.000 | 0.000 | 0.000 | 0.000 | 0.000 |
| 89 | 229 | G | 1.8425E-04 | 1.000 | 0.000 | 0.000 | 0.000 | 0.000 | 0.000 | 0.000 | 0.000 | 0.000 | 0.000 |
| 90 | 229 | G | 2.9942E-12 | 1.000 | 0.000 | 0.000 | 0.000 | 0.000 | 0.000 | 0.000 | 0.000 | 0.000 | 5.161 |
| 87 | 230 | G | 3.6481E-02 | 1.000 | 0.000 | 0.000 | 0.000 | 0.000 | 0.000 | 0.000 | 0.000 | 0.000 | 0.000 |
| 88 | 230 | G | 1.2422E-04 | 1.000 | 0.000 | 0.000 | 0.000 | 0.000 | 0.000 | 0.000 | 0.000 | 0.000 | 0.000 |
| 89 | 230 | G | 5.6815E-03 | 1.000 | 0.000 | 0.000 | 0.000 | 0.000 | 0.000 | 0.000 | 0.000 | 0.000 | 4.774 |
| 90 | 230 | G | 2.9148E-13 | 1.000 | 0.000 | 0.000 | 0.000 | 0.000 | 0.000 | 0.000 | 0.000 | 0.000 | 0.000 |
| 88 | 231 | G | 1.5403E-03 | 1.000 | 0.000 | 0.000 | 0.000 | 0.000 | 0.000 | 0.000 | 0.000 | 0.000 | 0.187 |
| 89 | 231 | G | 7.5449E-06 | 1.000 | 0.000 | 0.000 | 0.000 | 0.000 | 0.000 | 0.000 | 0.000 | 0.000 | 5.083 |
| 90 | 231 | G | 6.7100E-13 | 0.000 | 0.000 | 0.000 | 0.000 | 1.000 | 0.000 | 0.000 | 0.000 | 0.000 | 0.000 |
| 91 | 231 | G | 1.9804E-02 | 1.000 | 0.000 | 0.000 | 0.000 | 0.000 | 0.000 | 0.000 | 0.000 | 0.000 | 4.084 |
| 89 | 232 | G | 1.5643E-18 | 0.000 | 0.000 | 0.000 | 0.000 | 1.000 | 0.000 | 0.000 | 0.000 | 0.000 | 1.107 |
| 90 | 232 | G | 6.1232E-06 | 0.998 | 0.000 | 0.002 | 0.000 | 0.000 | 0.000 | 0.000 | 0.000 | 0.000 | 5.416 |
| 92 | 232 | G | 3.0522E-10 | 0.000 | 0.000 | 0.000 | 0.000 | 1.000 | 0.000 | 0.000 | 0.000 | 0.000 | 0.438 |
| 90 | 233 | G | 5.1805E-04 | 1.000 | 0.000 | 0.000 | 0.000 | 0.000 | 0.000 | 0.000 | 0.000 | 0.000 | 0.403 |
| 91 | 233 | G | 2.9711E-07 | 1.000 | 0.000 | 0.000 | 0.000 | 0.000 | 0.000 | 0.000 | 0.000 | 0.000 | |

| Z | A | K | $\lambda_{tot}$ | $P_{\beta-(G)}$ | $P_{\beta-(I)}$ | $P_{\beta+(G)}$ | $P_{\beta+(I)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 92 | 233 | G | 1.3805E-13 | 0.000 | 0.000 | 0.000 | 0.000 | 1.000 | 0.000 | 0.000 | 0.000 | 0.000 | 4.904 |
| 90 | 234 | G | 3.3292E-07 | 0.000 | 1.000 | 0.000 | 0.000 | 0.000 | 0.000 | 0.000 | 0.000 | 0.000 | 0.069 |
| 91 | 234 | H | 9.8739E-03 | 0.999 | 0.000 | 0.000 | 0.000 | 0.000 | 0.001 | 0.000 | 0.000 | 0.000 | 0.845 |
| 91 | 234 | G | 2.8737E-05 | 1.000 | 0.000 | 0.000 | 0.000 | 0.000 | 0.000 | 0.000 | 0.000 | 0.000 | 1.738 |
| 92 | 234 | G | 8.9716E-14 | 0.000 | 0.000 | 0.000 | 0.000 | 1.000 | 0.000 | 0.000 | 0.000 | 0.000 | 4.859 |
| 90 | 235 | G | 1.6743E-03 | 1.000 | 0.000 | 0.000 | 0.000 | 0.000 | 0.000 | 0.000 | 0.000 | 0.000 | 0.654 |
| 91 | 235 | G | 4.7935E-04 | 1.000 | 0.000 | 0.000 | 0.000 | 0.000 | 0.000 | 0.000 | 0.000 | 0.000 | 0.490 |
| 92 | 235 | G | 3.1223E-17 | 0.000 | 0.000 | 0.000 | 0.000 | 1.000 | 0.000 | 0.000 | 0.000 | 0.000 | 4.418 |
| 90 | 236 | G | 3.1139E-04 | 1.000 | 0.000 | 0.000 | 0.000 | 0.000 | 0.000 | 0.000 | 0.000 | 0.000 | 0.000 |
| 92 | 236 | G | 9.3871E-16 | 0.000 | 0.000 | 0.000 | 0.000 | 1.000 | 0.000 | 0.000 | 0.000 | 0.000 | 4.570 |
| 92 | 237 | G | 1.1885E-06 | 1.000 | 0.000 | 0.000 | 0.000 | 0.000 | 0.000 | 0.000 | 0.000 | 0.000 | 0.343 |
| 93 | 237 | G | 1.0270E-14 | 0.000 | 0.000 | 0.000 | 0.000 | 1.000 | 0.000 | 0.000 | 0.000 | 0.000 | 5.156 |
| 92 | 238 | G | 4.9194E-18 | 0.000 | 0.000 | 0.000 | 0.000 | 1.000 | 0.000 | 0.000 | 0.000 | 0.000 | 4.279 |
| 93 | 238 | G | 3.7898E-06 | 1.000 | 0.000 | 0.000 | 0.000 | 0.000 | 0.000 | 0.000 | 0.000 | 0.000 | 0.815 |
| 94 | 238 | G | 2.5050E-10 | 0.000 | 0.000 | 0.000 | 0.000 | 1.000 | 0.000 | 0.000 | 0.000 | 0.000 | 5.591 |
| 92 | 239 | G | 4.9159E-04 | 1.000 | 0.000 | 0.000 | 0.000 | 0.000 | 0.000 | 0.000 | 0.000 | 0.000 | 0.463 |
| 93 | 239 | G | 3.4061E-06 | 1.000 | 0.000 | 0.000 | 0.000 | 0.000 | 0.000 | 0.000 | 0.000 | 0.000 | 0.424 |
| 94 | 239 | G | 9.1132E-13 | 0.000 | 0.000 | 0.000 | 0.000 | 1.000 | 0.000 | 0.000 | 0.000 | 0.000 | 5.199 |
| 92 | 240 | G | 1.3680E-05 | 1.000 | 0.000 | 0.000 | 0.000 | 0.000 | 0.000 | 0.000 | 0.000 | 0.000 | 0.248 |
| 93 | 240 | H | 1.5611E-03 | 0.999 | 0.000 | 0.000 | 0.000 | 0.000 | 0.001 | 0.000 | 0.000 | 0.000 | 1.041 |
| 93 | 240 | G | 1.7773E-04 | 1.000 | 0.000 | 0.000 | 0.000 | 0.000 | 0.000 | 0.000 | 0.000 | 0.000 | 1.548 |
| 94 | 240 | G | 3.3615E-12 | 0.000 | 0.000 | 0.000 | 0.000 | 1.000 | 0.000 | 0.000 | 0.000 | 0.000 | 5.253 |
| 92 | 241 | G | 7.2203E-04 | 1.000 | 0.000 | 0.000 | 0.000 | 0.000 | 0.000 | 0.000 | 0.000 | 0.000 | 0.000 |
| 93 | 241 | G | 1.5264E-09 | 1.000 | 0.000 | 0.000 | 0.000 | 0.000 | 0.000 | 0.000 | 0.000 | 0.000 | 0.005 |
| 94 | 241 | G | 5.0854E-11 | 0.000 | 0.000 | 0.000 | 0.000 | 1.000 | 0.000 | 0.000 | 0.000 | 0.000 | 5.604 |
| 95 | 241 | G | 5.8395E-14 | 0.000 | 0.000 | 0.000 | 0.000 | 1.000 | 0.000 | 0.000 | 0.000 | 0.000 | 4.982 |
| 92 | 242 | G | 1.4462E-10 | 0.827 | 0.000 | 0.173 | 0.000 | 0.000 | 0.000 | 0.000 | 0.000 | 0.000 | 0.067 |
| 93 | 242 | G | 1.2019E-05 | 1.000 | 0.000 | 0.000 | 0.000 | 0.000 | 0.000 | 0.000 | 0.000 | 0.000 | 0.192 |
| 94 | 242 | G | 4.9264E-08 | 0.000 | 0.000 | 0.002 | 0.000 | 0.005 | 0.995 | 0.000 | 0.000 | 0.000 | 6.216 |
| 95 | 242 | H | 3.8853E-05 | 1.000 | 0.000 | 0.000 | 0.000 | 0.000 | 0.000 | 0.000 | 0.000 | 0.000 | 0.199 |
| 96 | 242 | G | 2.9787E-12 | 0.000 | 0.000 | 0.000 | 0.000 | 1.000 | 0.000 | 0.000 | 0.000 | 0.000 | 5.423 |
| 93 | 243 | G | 7.7119E-10 | 1.000 | 0.000 | 0.000 | 0.000 | 0.000 | 0.000 | 0.000 | 0.000 | 0.000 | 6.189 |
| 94 | 243 | G | 2.7204E-16 | 0.000 | 0.000 | 0.999 | 0.000 | 0.000 | 0.000 | 0.000 | 0.000 | 0.000 | 0.000 |
| 95 | 243 | G | 4.4432E-04 | 1.000 | 0.000 | 0.000 | 0.000 | 0.000 | 0.000 | 0.000 | 0.000 | 0.000 | 4.892 |
| 96 | 244 | G | 1.9064E-05 | 1.000 | 0.000 | 0.000 | 0.000 | 0.000 | 0.000 | 0.000 | 0.000 | 0.000 | 0.513 |
| 95 | 244 | H | 1.2143E-09 | 1.000 | 0.000 | 0.000 | 0.000 | 0.000 | 0.000 | 0.000 | 0.000 | 0.000 | 1.151 |
| 94 | 244 | G | 1.8337E-05 | 1.000 | 0.000 | 0.000 | 0.000 | 0.000 | 0.000 | 0.000 | 0.000 | 0.000 | 5.901 |
| 95 | 245 | G | 9.3922E-05 | 1.000 | 0.000 | 0.000 | 0.000 | 0.000 | 0.000 | 0.000 | 0.000 | 0.000 | 0.726 |
| 96 | 245 | G | 2.5854E-12 | 0.000 | 0.000 | 0.000 | 0.000 | 1.000 | 0.000 | 0.000 | 0.000 | 0.000 | 0.320 |
| 96 | 245 | G | | 0.000 | 0.000 | 0.000 | 0.000 | 1.000 | 0.000 | 0.000 | 0.000 | 0.000 | 5.598 |

| Z | A | K | $\lambda_{tot}$ | $P_{\beta-(G)}$ | $P_{\beta-(1)}$ | $P_{\beta+(G)}$ | $P_{\beta+(1)}$ | $P_\alpha$ | $P_\gamma$ | $P_{SF}$ | $P_{1n}$ | $P_{2n}$ | $E_{Total}$ |
|---|---|---|---|---|---|---|---|---|---|---|---|---|---|
| 94 | 246 | G | 7.3944E-07 | 1.000 | 0.000 | 0.000 | 0.000 | 0.000 | 0.000 | 0.000 | 0.000 | 0.000 | 0.228 |
| 95 | 246 | H | 4.6210E-04 | 1.000 | 0.000 | 0.000 | 0.000 | 0.000 | 0.000 | 0.000 | 0.000 | 0.000 | 1.438 |
| 95 | 246 | G | 2.9622E-04 | 1.000 | 0.000 | 0.000 | 0.000 | 0.000 | 0.000 | 0.000 | 0.000 | 0.000 | 1.544 |
| 96 | 246 | G | 4.6458E-12 | 0.000 | 0.000 | 0.000 | 0.000 | 1.000 | 0.000 | 0.000 | 0.000 | 0.000 | 5.523 |
| 95 | 247 | G | 5.2511E-04 | 1.000 | 0.000 | 0.000 | 0.000 | 0.000 | 0.000 | 0.000 | 0.000 | 0.000 | 0.694 |
| 96 | 247 | G | 1.4088E-15 | 0.000 | 0.000 | 0.000 | 0.000 | 1.000 | 0.000 | 0.000 | 0.000 | 0.000 | 5.390 |
| 96 | 248 | G | 6.4659E-14 | 0.000 | 0.000 | 0.000 | 0.000 | 0.917 | 0.000 | 0.083 | 0.000 | 0.000 | 21.000 |
| 96 | 249 | G | 1.8009E-04 | 1.000 | 0.000 | 0.000 | 0.000 | 0.000 | 0.000 | 0.000 | 0.000 | 0.000 | 0.302 |
| 97 | 249 | G | 2.5069E-08 | 1.000 | 0.000 | 0.000 | 0.000 | 0.000 | 0.000 | 0.000 | 0.000 | 0.000 | 0.033 |
| 98 | 249 | G | 4.0606E-11 | 0.070 | 0.000 | 0.000 | 0.000 | 0.260 | 0.000 | 0.670 | 0.000 | 0.000 | 7.806 |
| 96 | 250 | G | 2.9698E-12 | 1.000 | 0.000 | 0.000 | 0.000 | 0.000 | 0.000 | 0.000 | 0.000 | 0.000 | 123.300 |
| 97 | 250 | G | 5.9857E-05 | 1.000 | 0.000 | 0.000 | 0.000 | 0.000 | 0.000 | 0.000 | 0.000 | 0.000 | 1.197 |
| 98 | 250 | G | 1.6804E-09 | 0.000 | 0.000 | 0.000 | 0.000 | 0.999 | 0.000 | 0.001 | 0.000 | 0.000 | 6.267 |
| 97 | 251 | G | 2.0629E-04 | 1.000 | 0.000 | 0.000 | 0.000 | 0.000 | 0.000 | 0.000 | 0.000 | 0.000 | 0.473 |
| 98 | 251 | G | 2.4475E-11 | 0.000 | 0.000 | 0.000 | 0.000 | 1.000 | 0.000 | 0.000 | 0.000 | 0.000 | 6.027 |
| 98 | 252 | G | 8.3321E-09 | 0.000 | 0.000 | 0.000 | 0.000 | 0.969 | 0.000 | 0.031 | 0.000 | 0.000 | 12.040 |
| 98 | 253 | H | 4.5039E-07 | 0.997 | 0.000 | 0.000 | 0.000 | 0.003 | 0.000 | 0.000 | 0.000 | 0.000 | 0.098 |
| 98 | 253 | G | 9.3922E-04 | 0.000 | 0.000 | 0.000 | 0.000 | 0.003 | 0.000 | 1.000 | 0.000 | 0.000 | 199.400 |
| 98 | 254 | G | 1.3261E-07 | 0.000 | 0.000 | 0.000 | 0.000 | 0.003 | 0.000 | 0.997 | 0.000 | 0.000 | 199.400 |
| 99 | 254 | H | 4.8986E-06 | 0.980 | 0.000 | 0.008 | 0.000 | 1.000 | 0.000 | 0.000 | 0.000 | 0.000 | 8.173 |
| 99 | 254 | G | 2.9099E-08 | 0.000 | 0.000 | 0.000 | 0.000 | 1.000 | 0.000 | 0.000 | 0.000 | 0.000 | 6.623 |
| 99 | 254 | G | 5.9447E-05 | 0.920 | 0.000 | 0.000 | 0.000 | 0.080 | 0.000 | 0.000 | 0.000 | 0.000 | 0.000 |
| 100 | 255 | G | 2.0156E-07 | 0.000 | 0.000 | 0.000 | 0.000 | 0.999 | 0.000 | 0.001 | 0.000 | 0.000 | 7.370 |
| 99 | 256 | G | 9.5791E-06 | 1.000 | 0.000 | 0.000 | 0.000 | 0.000 | 0.000 | 0.000 | 0.000 | 0.000 | 0.000 |
| 100 | 256 | G | 2.5334E-05 | 0.000 | 0.000 | 0.000 | 0.000 | 0.081 | 0.000 | 0.919 | 0.000 | 0.000 | 1.523 |
| 99 | 256 | H | 5.2511E-04 | 0.000 | 0.000 | 0.000 | 0.000 | 0.998 | 0.000 | 0.002 | 0.000 | 0.000 | 0.611 |
| 100 | 257 | G | 7.3302E-05 | 1.000 | 0.000 | 0.000 | 0.000 | 0.000 | 0.000 | 0.000 | 0.000 | 0.000 | 0.000 |
| 100 | 257 | G | 7.9828E-08 | 0.000 | 0.000 | 0.000 | 0.000 | 0.000 | 0.000 | 0.000 | 0.000 | 0.000 | 0.000 |
| 100 | 258 | G | 1.8241E+03 | 0.000 | 0.000 | 0.000 | 0.000 | 0.000 | 0.000 | 1.000 | 0.000 | 0.000 | 0.000 |

[FIG. 3(1)] ACTINIDE BUILD-UP AND DECAY CHAINS (HARTE, 1976).

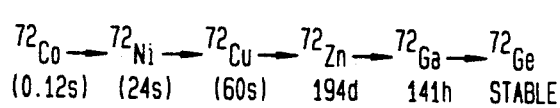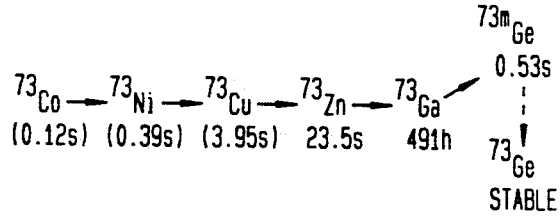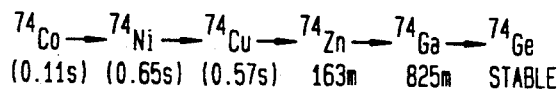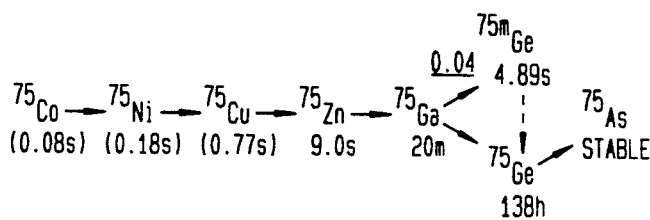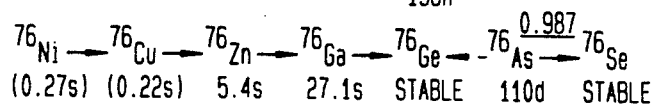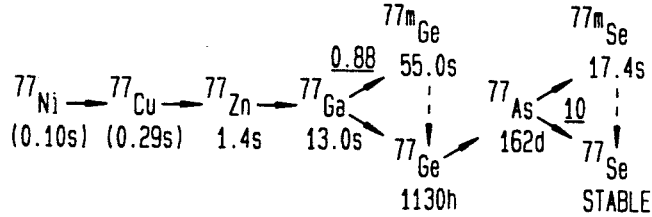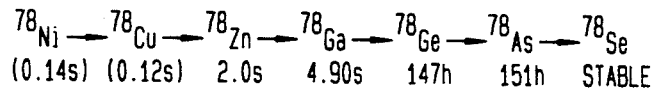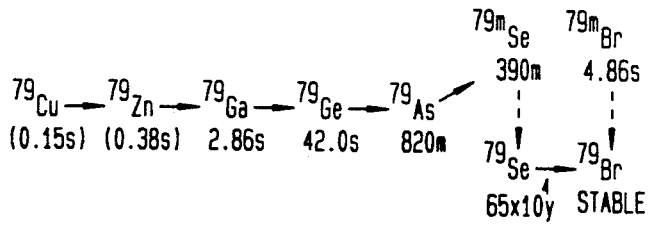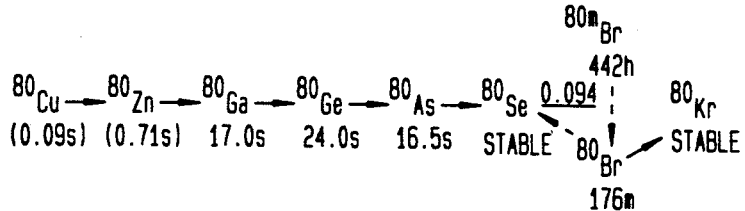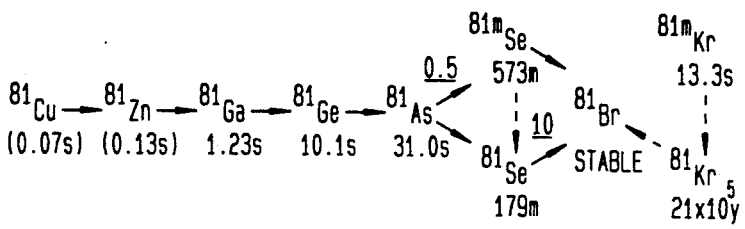
FIG. 12
[FIG. 4(1)] FISSION PRODUCT CHAINS.
——— NEGATION DECAY
- - - - - POSITION/ELECTRON CAPTURE DECAY
— - — ISOMETRIC TRANSITION
············· DELAYED NEUTRON EMISSION (FIG. 4(2))

METHOD OF OPERATING A NUCLEAR REACTOR WITH EMERGENCY COOLING SYSTEM ECONOMY

This application is a continuation of application Ser. No. 07/866,074, filed Apr. 1, 1992 (abandoned) which is a continuation of application Ser. No. 07/657,898, filed Feb. 20, 1991 (abandoned), which is a continuation of application Ser. No. 07/376,967 filed Jul. 6, 1989 (abandoned), which is a continuation of application Ser. No. 07/220,364 filed Jul. 11, 1988 (abandoned), which is a continuation of application Ser. No. 07/780,491 filed Sep. 26, 1985 (abandoned).

The present invention relates generally to the production of heat energy by nuclear fission, and more specifically to nuclear reactors, nuclear power plants, procedures for designing and constructing the emergency cooling system of a nuclear reactor.

BACKGROUND OF THE INVENTION

The relation between the maximum effective output power (installed or nominal capacity) of a nuclear reactor and the cooling capacity of its emergency cooling system is essentially determined by the so-called decay heat, i.e. the heat produced by radioactive decay of the fission products after shut-down of the fissioning process. The removal of the decay heat is most critical, particularly for light water reactors (LWR), in the first minutes after shutdown. Immediately after shutdown the decay heat corresponds to about 7% of the operating power of the reactor before shut-down. In case of a pressurized water reactor (PWR), without cooling, the decay heat would cause melting of the metal jackets enclosing the fuel pellets within 50 seconds after shut-down from nominal power. Typically, the heat produced by a LWR in the first 200 seconds after shutdown determines the necessary maximum cooling capacity of the emergency cooling system of the reactor.

The decay heat is essentially comprised by three portions originating from 1. the decay of the fission products,
2. the decay of the elements, like $^{239}U$, $^{239}Np$ and further actinides, which are formed by neutron capture by the nuclear fuel,
3. the decay of isotopes produced by neutron capture by the fission products.

The presently valid nuclear standards, as the ANS standard ANSI/ANS-5.1-1979/1985 and the DIN standard DIN 25463 (July 1982), which estimate the decay heat and basing on this prescribe the minimum permitted cooling capacity of the emergency cooling system in relation to the maximum operating power (installed capacity or nominal output power) of the reactor in normal operation or, in other words, prescribe the maximum permitted operating power of a power plant in normal operation with a given cooling capacity of the emergency cooling system, are based on relatively uncertain assumptions. The experimental information available at present is incomplete, as discussed in the report on the "Invited Paper presented at International Conference on Nuclear Power Plant Aging, Availability Factor and Reliability Analysis", San Diego, Calif., 8-12 Jul. 1985, Max-Planck-Institut für Kernphysik, Heidelberg, F. R. Germany, MPI H-1985-V14, and is not adapted for a precise prediction of the decay heat, in particular for the first minutes after shut-down. It also was not possible to reliably theoretically predict the decay heat, as also discussed in the above report, in particular for the first minutes after shutdown, because rough approximations had to be made and particularly only incorrect descriptions existed of the beta decay of the involved nuclides.

The consequence of the latter is—this is found as result of new data based on a more precise theoretical method of calculating the nuclear $\beta$ decay of the various fission products, which form the basis of the invention to be described—a considerable overdimensioning of reactor emergency cooling systems up to now.

SUMMARY OF THE INVENTION

An object of the present invention is to provide a method for operating nuclear reactors and power plants which is more economical than the methods of the prior art.

A further object of the invention is to provide nuclear reactors, which differ advantageously from the known nuclear reactors by higher efficiency and maximum power output at given cost of installation, or by lower costs of installation at given maximum output power.

The present invention is based on new and reliable data of the amount of the decay heat—including all of the three portions thereof mentioned above. We have found, that the total decay heat is smaller than that, which has been assumed on the basis of the measurements and calculations available before the invention. This allows to operate a nuclear reactor, which has a cooling system of a predetermined cooling power capacity, with higher effective and maximum output power (nominal power), particular also in normal continuous operation. This is of particular interest for existing LWR's, heavy water reactors and gas cooled reactors used in large scale for the production of electric power, and can be achieved by a simple modification of the control and safety systems of the reactor.

Further, the emergency cooling systems of a nuclear reactor of given maximum output power (installed capacity or nominal output power) can be designed smaller than according to the teaching of the prior art.

The latter is specifically of considerable importance for LWR's, further for heavy water reactors and gas cooled reactors. The same is true for high-converting LWR's, high temperature reactors and fast breeders, for which only very scarce experimental decay heat data exist up to now.

In the following preferred embodiments of the invention will be explained in more detail with reference to the drawings.

BRIEF DESCRIPTION OF THE DRAWINGS

FIGS. 2b and 2c are diagrams corresponding to FIG. 2a, but for a burn-up of 19 MWd/kg and 53,4 MWd/kg, respectively.

FIG. 5 are diagrams corresponding to FIG. 2a, but for a boiling water reactor (BWR) and a burn-up of 23 MWd/kg of the nuclear fuel mentioned with reference to FIG. 2a;

FIG. 8 comprising parts 1 to 18 is a TABLE comprising a list of data for computing the decay heat by means of equations (3) and (4) explained in this specification, wherein is:

Z the nuclear charge of the isotope;
A the mass number of the isotope;
K denotes decay of the isotope from the ground state (G) or from an isomeric state (I);
$\lambda^{tot}$ the total decay rate of isotope ( Z, A, K) per sec;
$P_{\beta^-(G)}$ the probability of decay by $\beta^-$ emission finally feeding the ground state of the daughter nucleus;
$P_{\beta^-(I)}$ the probability of decay by $\beta^-$ emission finally feeding an isomeric state of the daughter nucleus;
$P_{\beta^+(G)}$ the probability of decay by $\beta^+$ emission finally feeding the ground state of the daughter nucleus;
$P_{\beta^+(I)}$ the probability of decay by $\beta^+$ emission finally feeding an isomeric state of the daughter nucleus;
$P_\alpha$ the probability of $\alpha$-decay
$P_\gamma$ the probability of $\gamma$-decay of an isomeric state;
$P_{SF}$ the probability of decay by spontaneous fission;
$P_{1n}$ the probability of decay by $\beta^-$ delayed one-neutron emission;
$P_{2n}$ the probability of $\beta^-$ delayed two-neutron emission;
$E_{Total}$ the total recoverable decay energy (decay heat dissipated in the reactor core) produced by the decay of the isotope (Z, A, K) in MeV.

Figure 3:
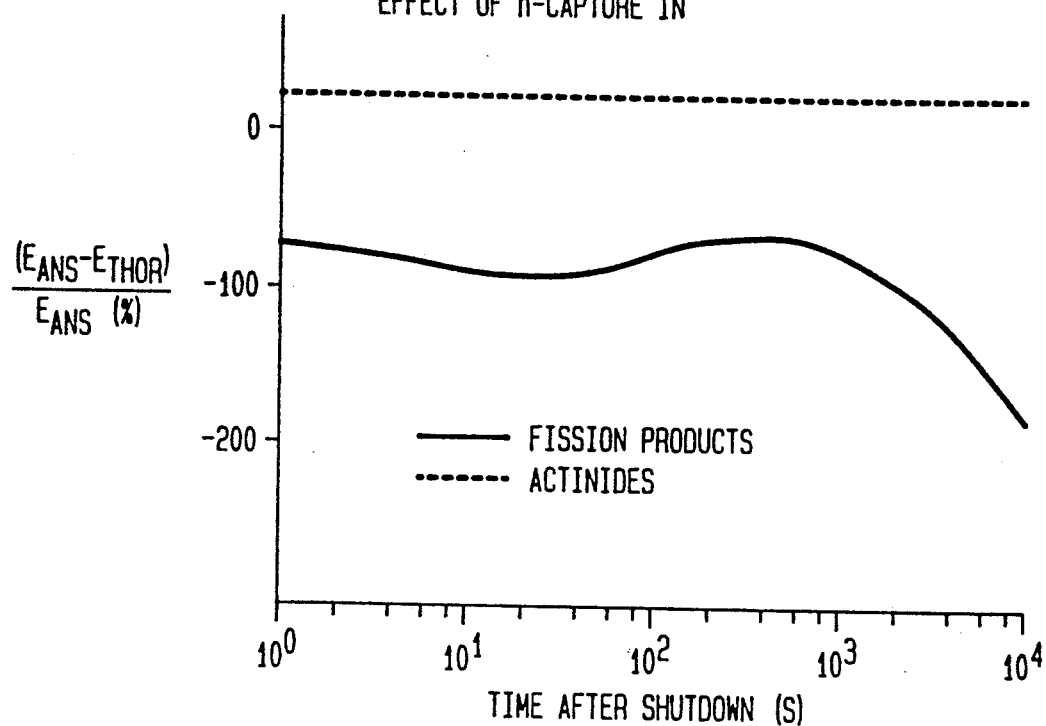
FIG. 3 are diagrams for the case of the PWR of FIG. 2a, showing the situation relative to the ANS prediction for those parts of the decay heat originating from neutron capture by the fission products (solid line) and by the actinides (dashed line).
Figure 9:
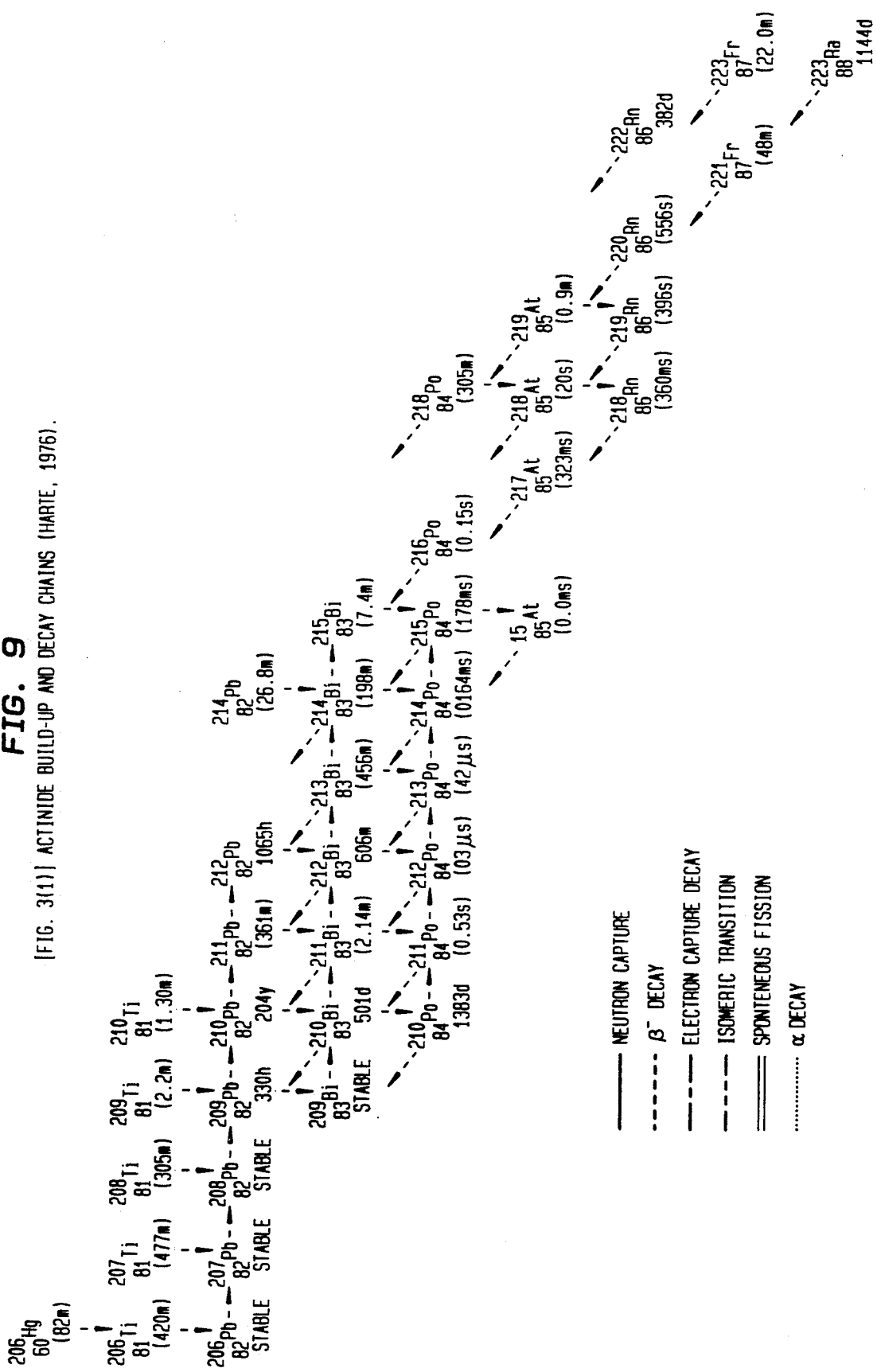

FIG. 9 is a reproduction of FIG. 3 (1) of an article by A. Tobias hereinafter cited and incorporated in part.

Figure 10:
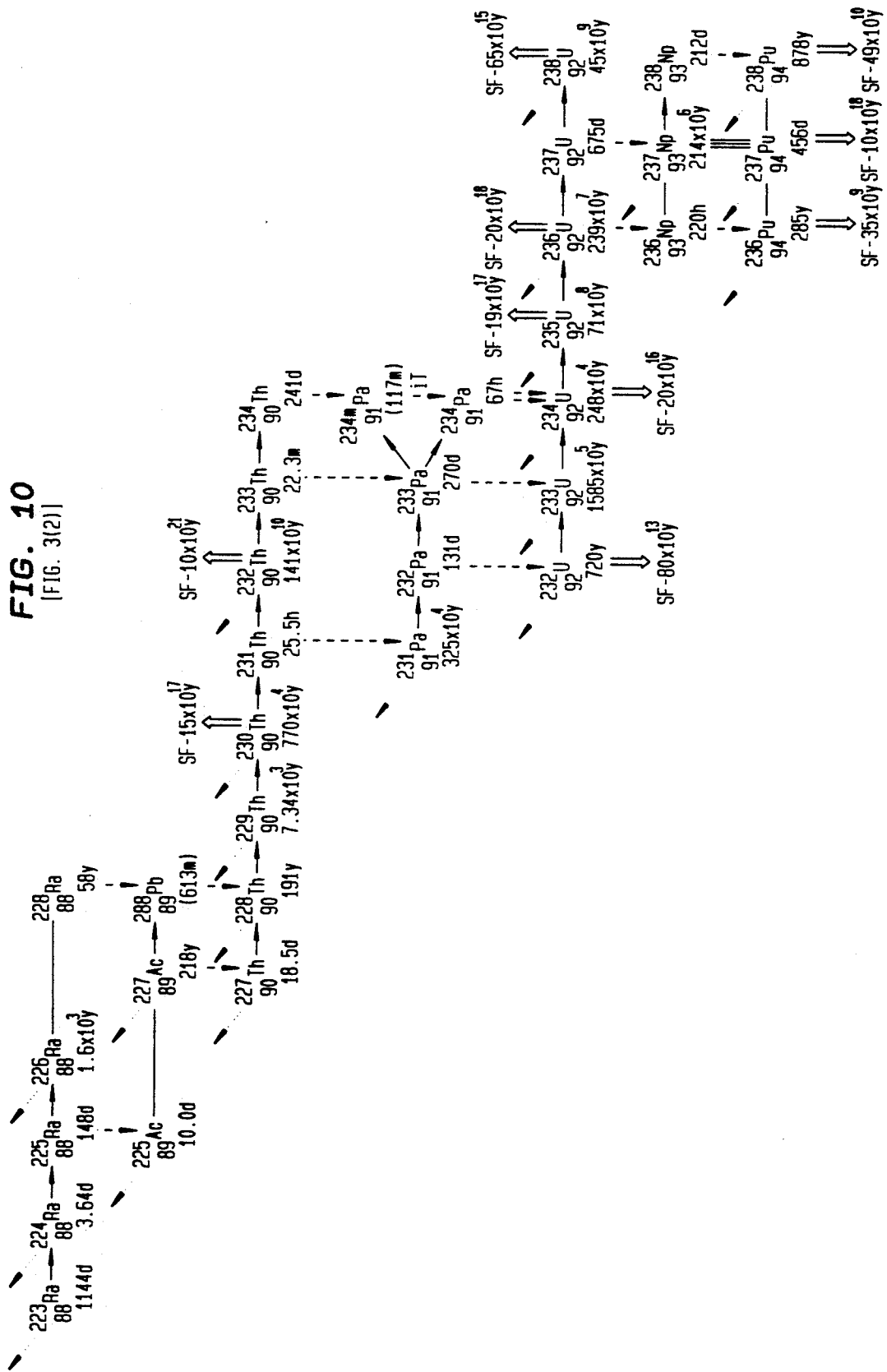

FIG. 10 is a reproduction of FIG. 3(2) of the said Tobias publication.

Figure 11:
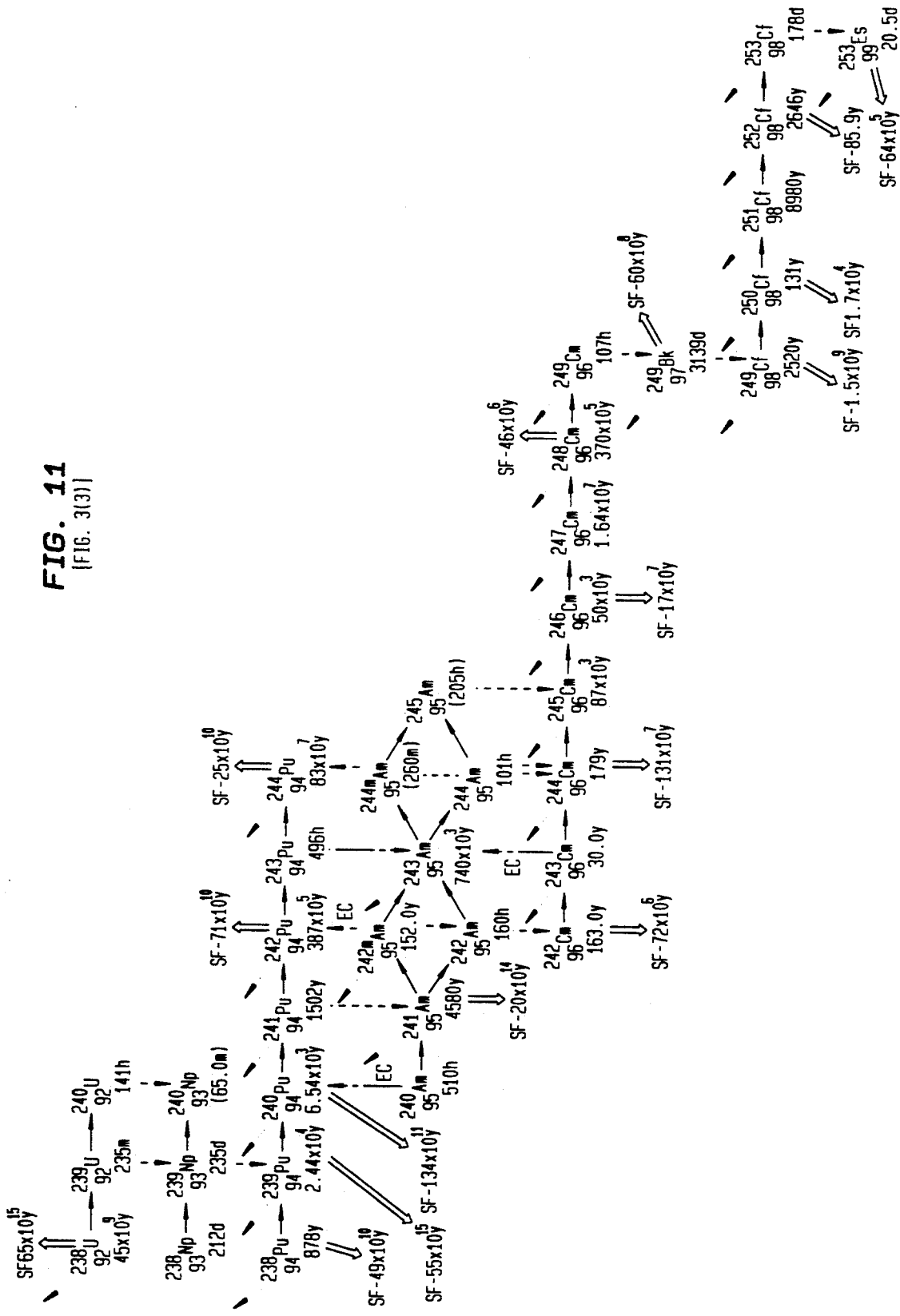

FIG. 11 is a reproduction of FIG. 3(3) of the said Tobias publication.

Figure 4:
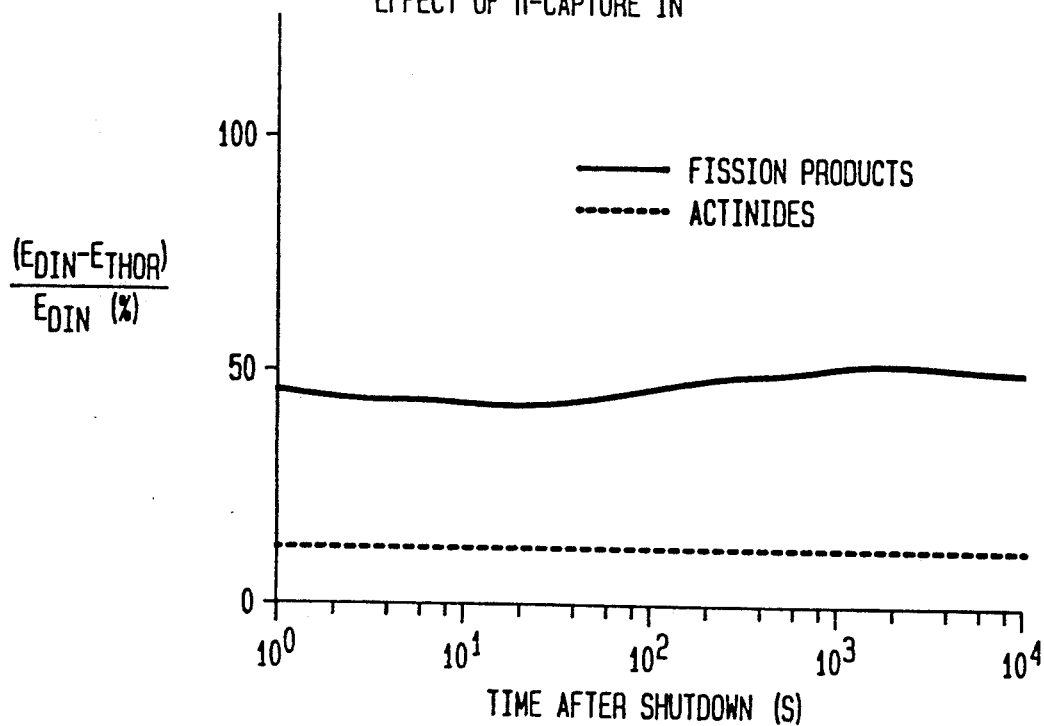
FIG. 4 are diagrams corresponding to those of FIG. 3, but referring to the DIN standard.

FIG. 12 is a reproduction of FIG. 4(1) of the said Tobias publication.

Figure 13:
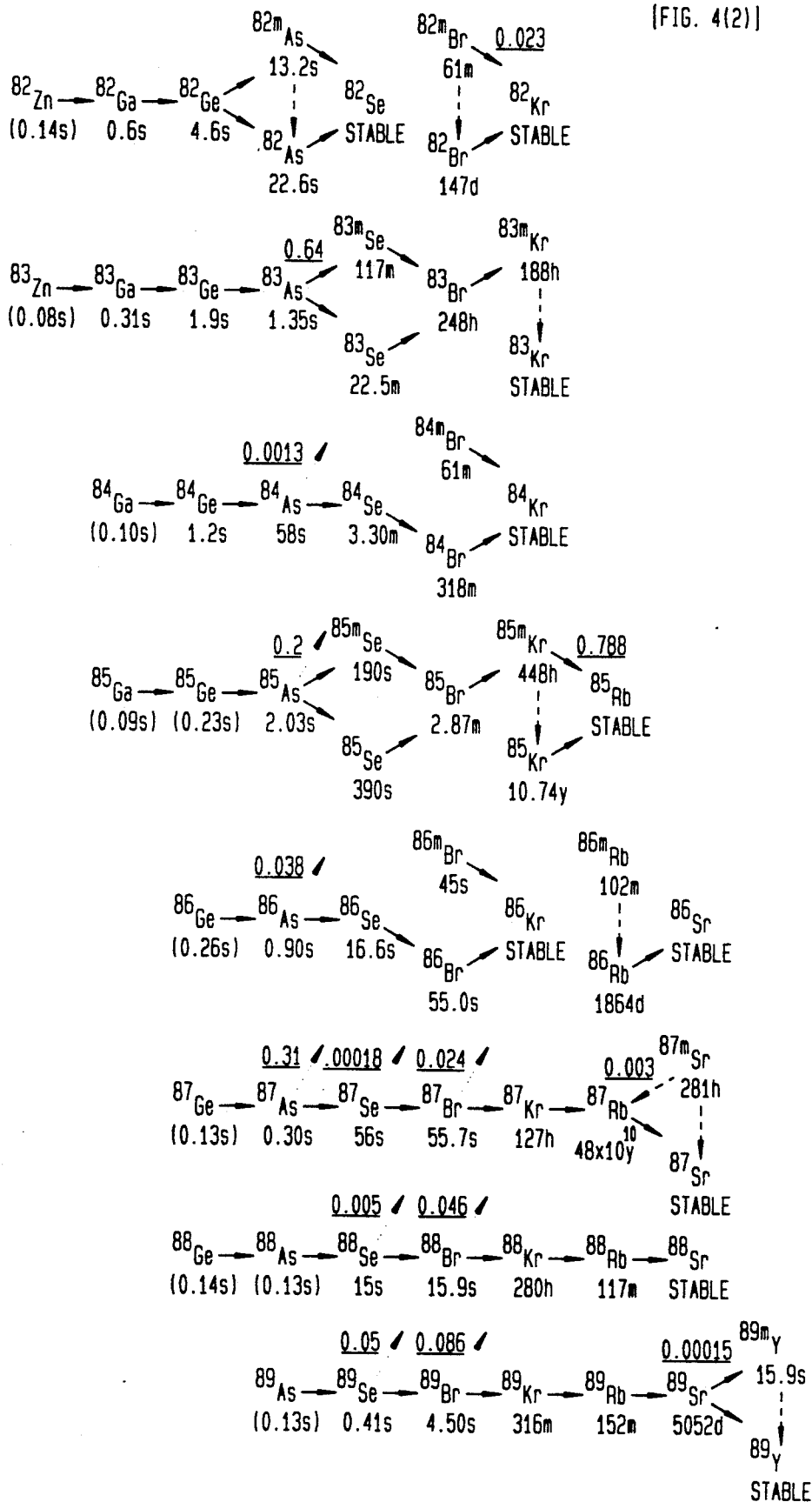

FIG. 13 is a reproduction of FIG. 4(2) of the said Tobias publication.

Figure 14:
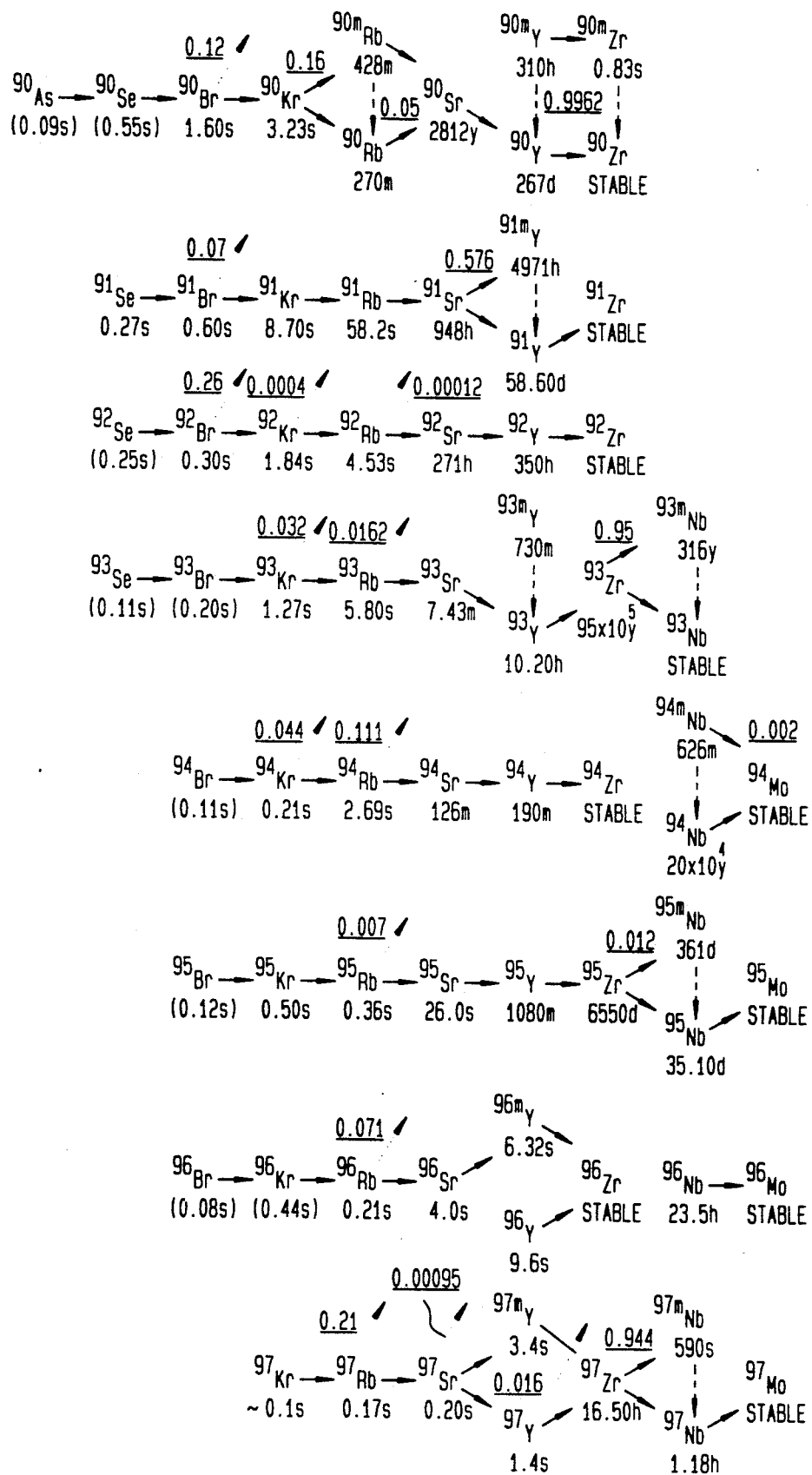

FIG. 14 is a reproduction of FIG. 4(3) of the said Tobias publication.

Figure 15:
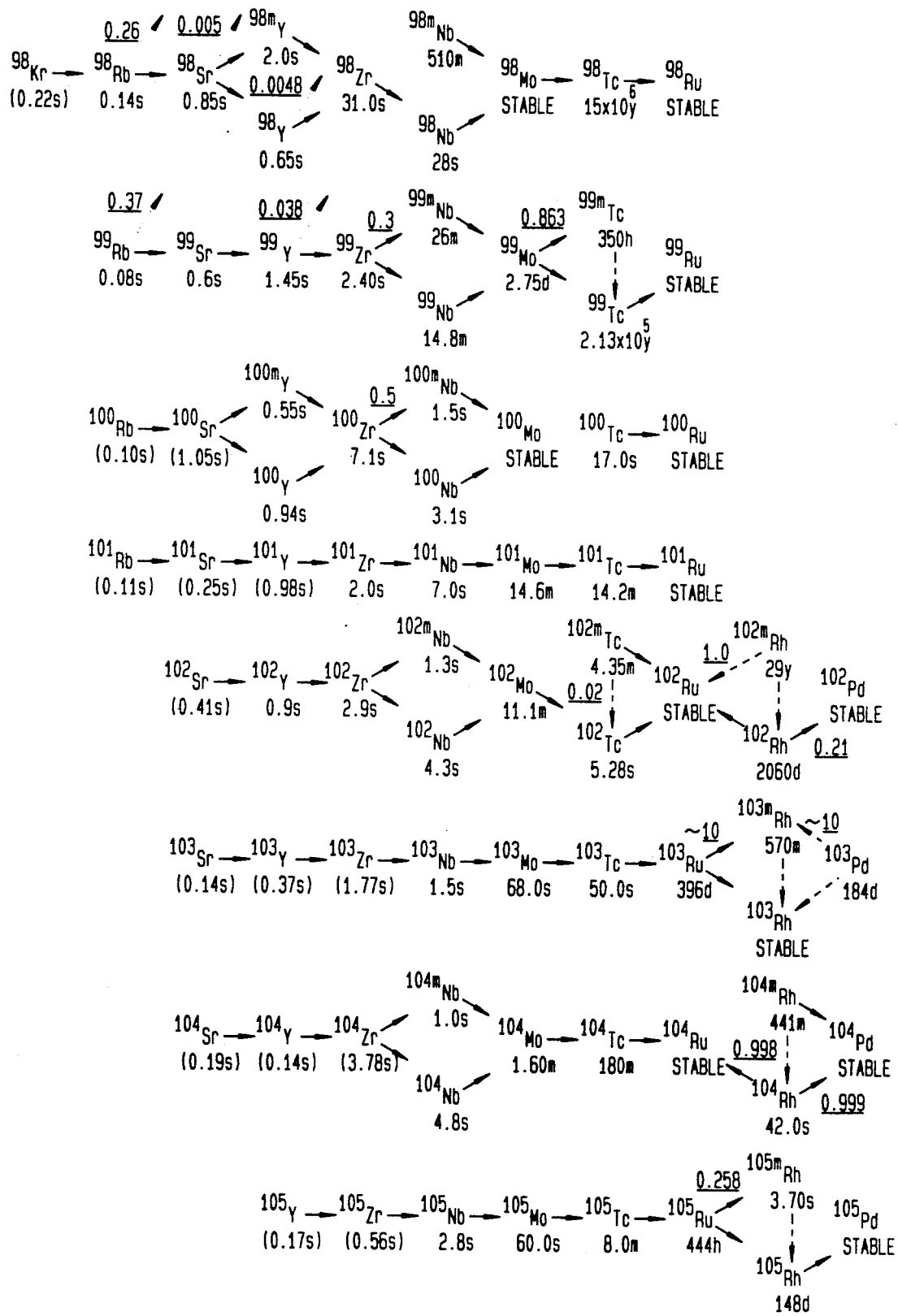

FIG. 15 is a reproduction of FIG. 4(4) of the said Tobias publication.

Figure 16:
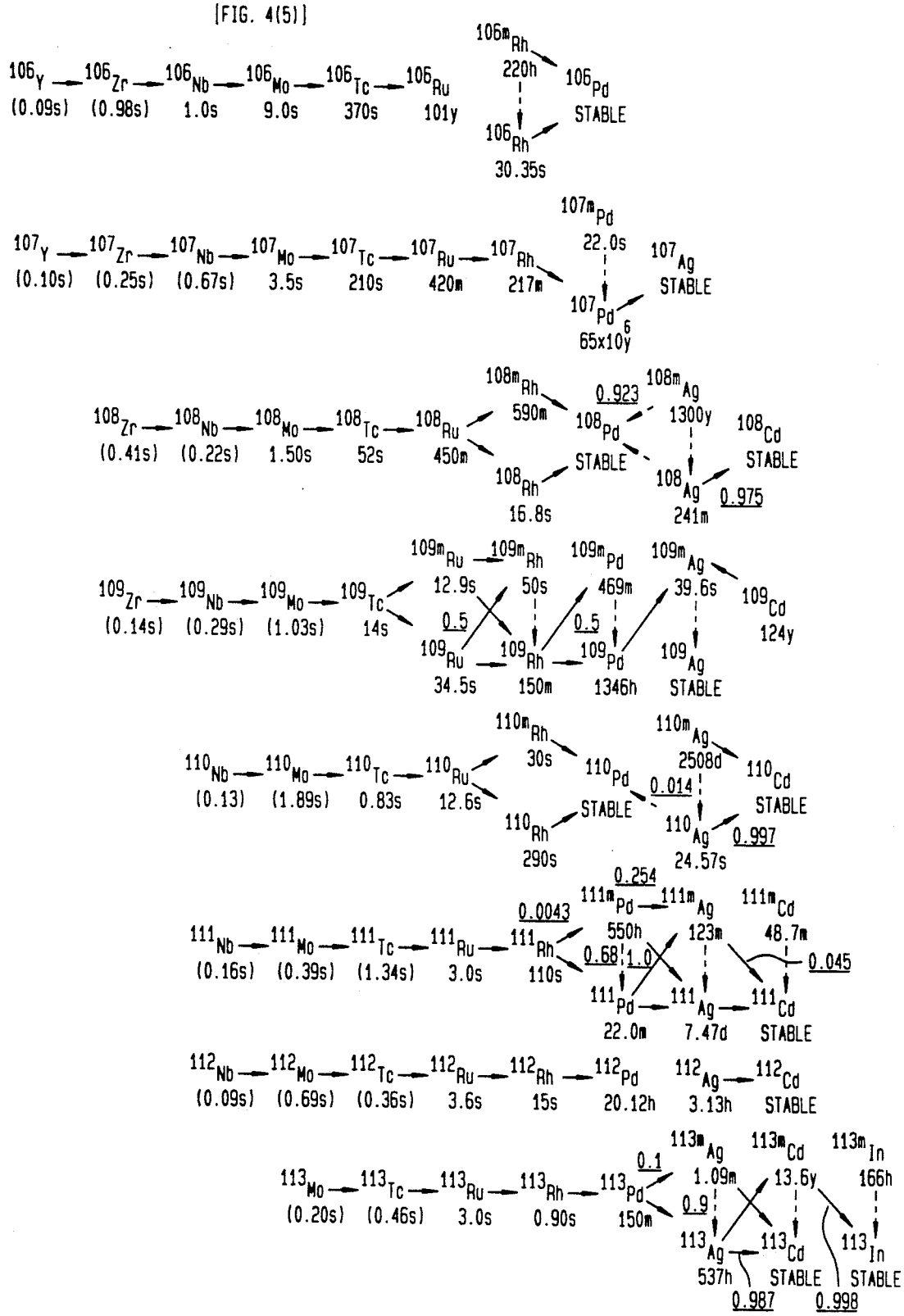

FIG. 16 is a reproduction of FIG. 4(5) of the said Tobias publication.

Figure 17:
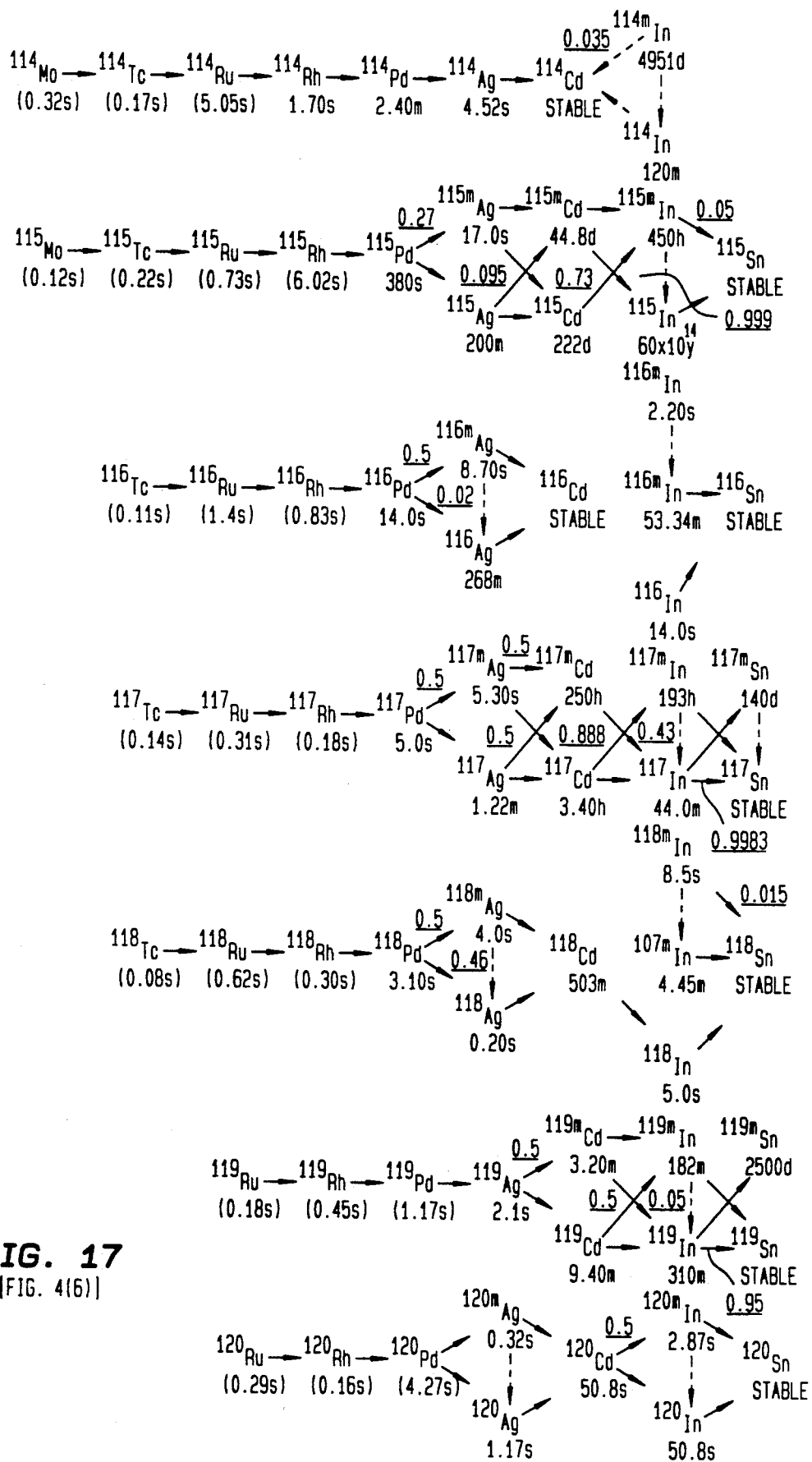

FIG. 17 is a reproduction of FIG. 4(6) of the said Tobias publication.

Figure 18:
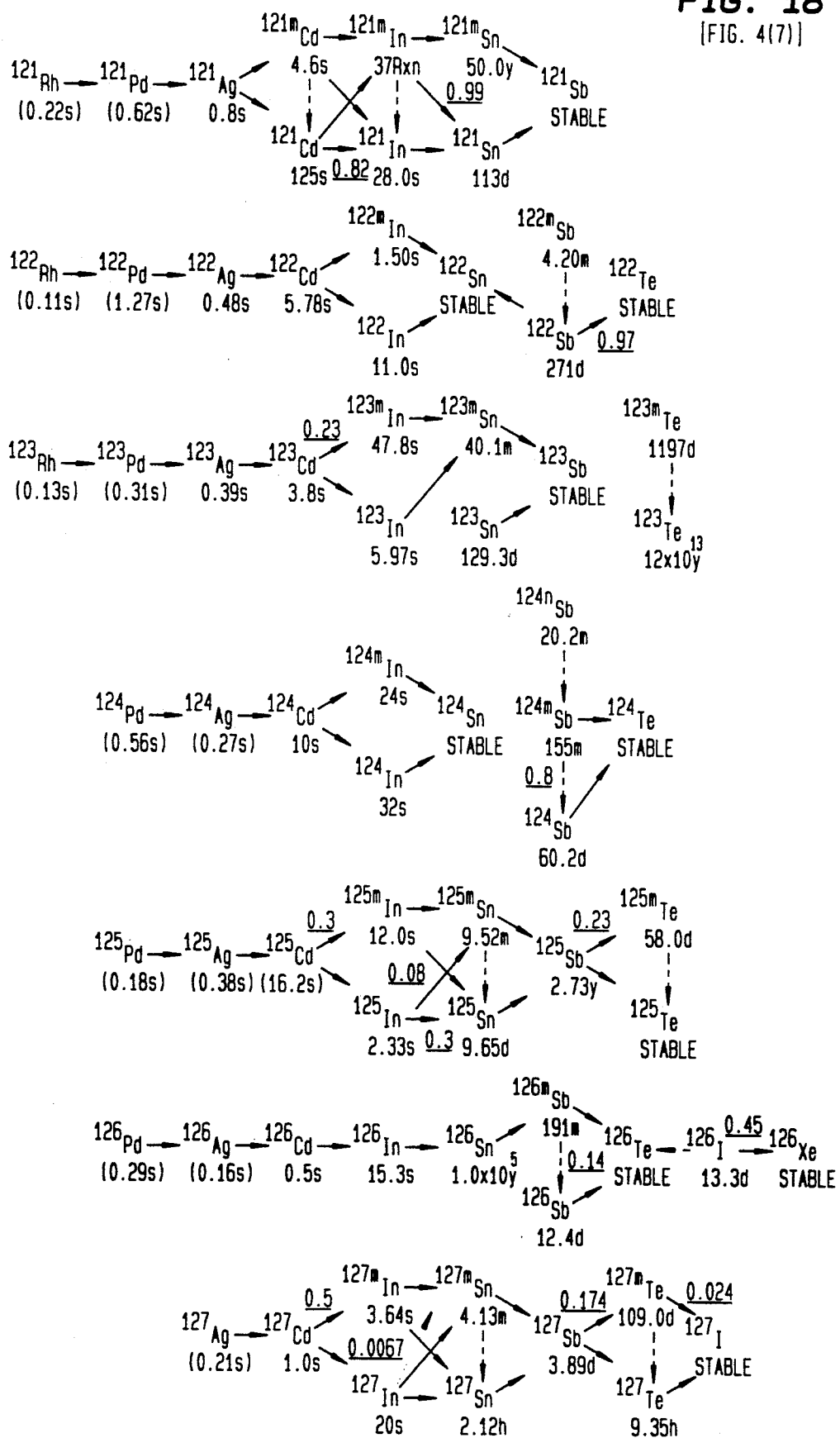

FIG. 18 is a reproduction of FIG. 4(7) of the said Tobias publication.

Figure 19:
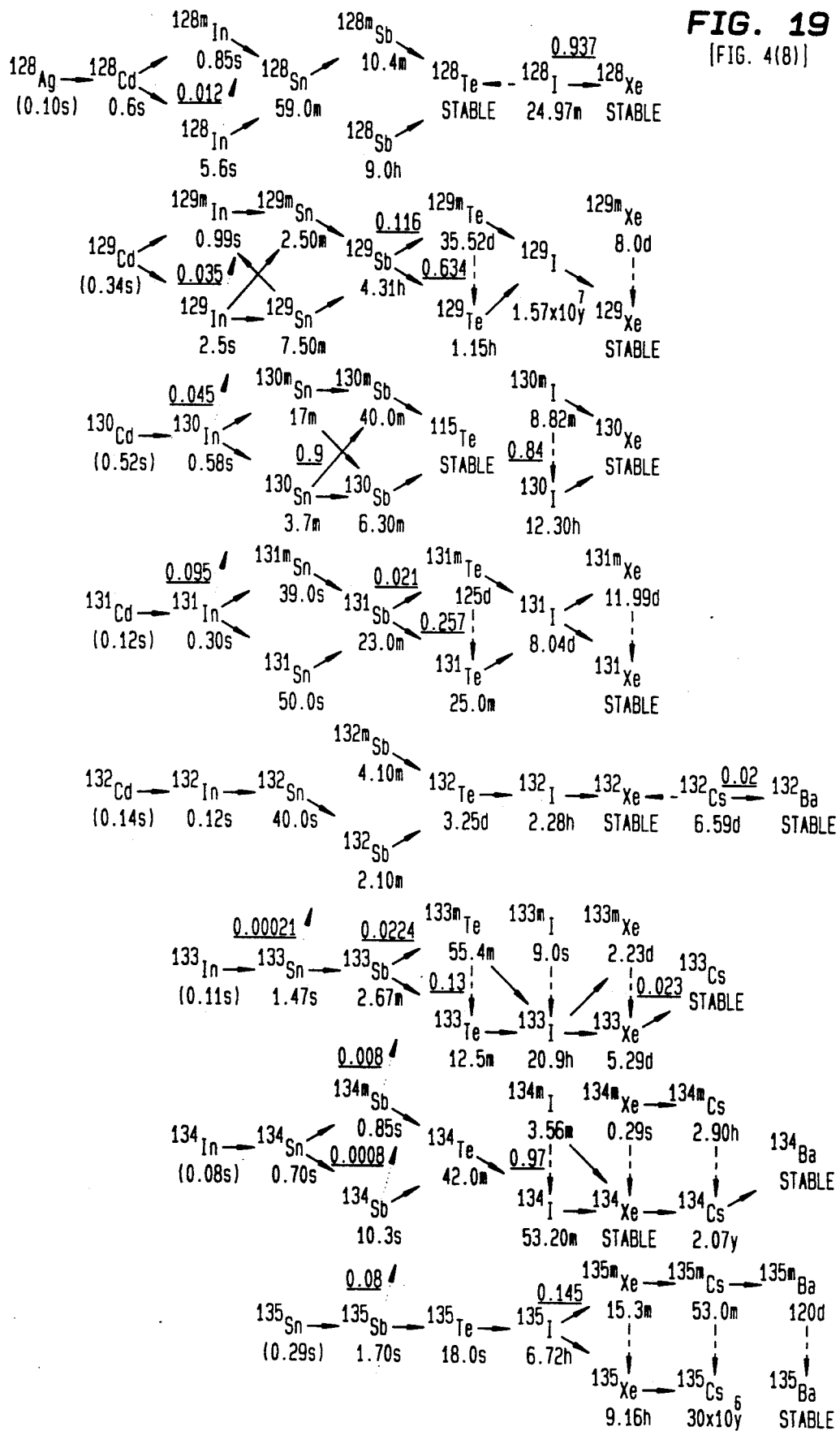

FIG. 19 is a reproduction of FIG. 4(8) of the said Tobias publication.

Figure 20:
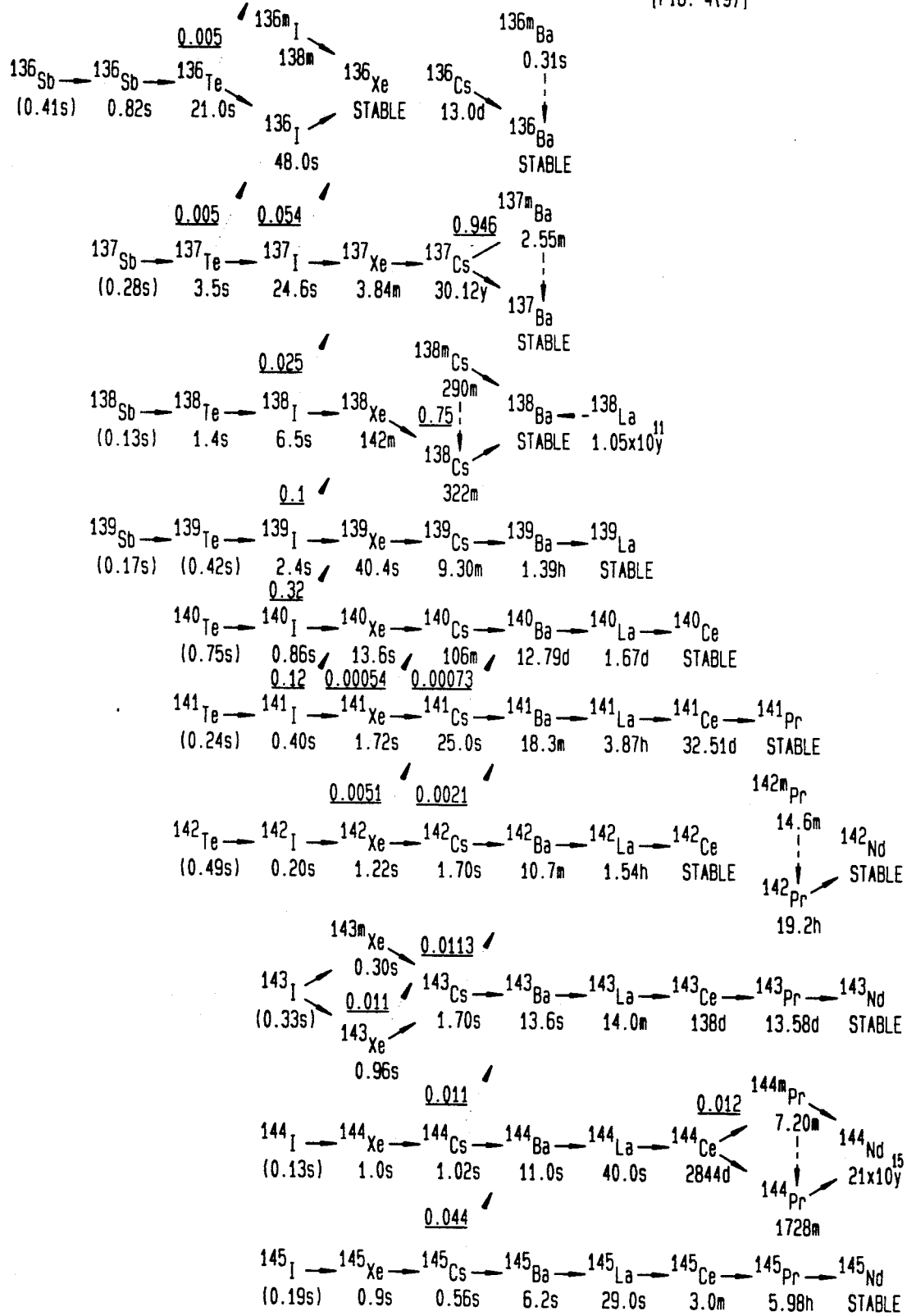

FIG. 20 is a reproduction of FIG. 4(9) of the said Tobias publication.

Figure 21:
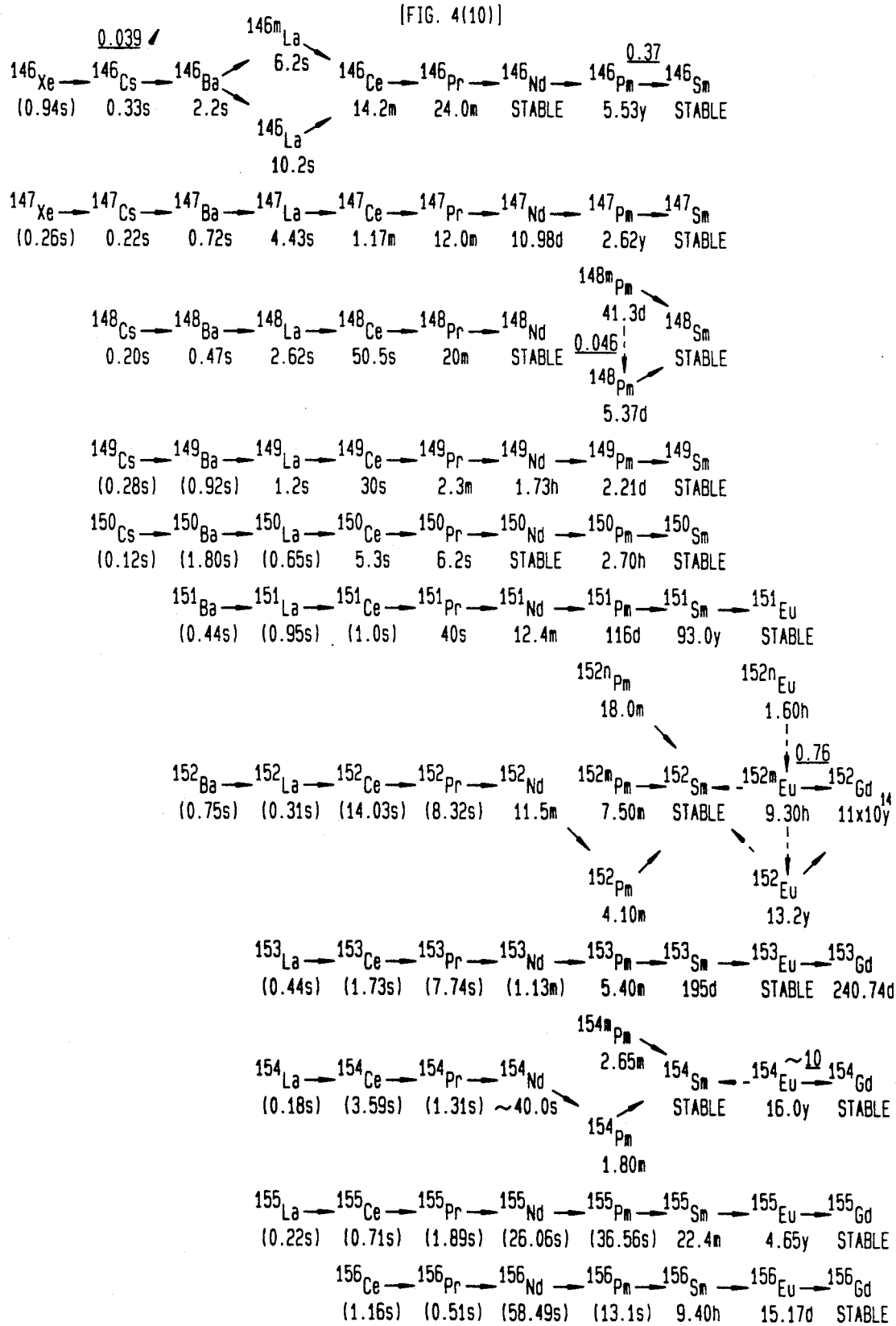

FIG. 21 is a reproduction of FIG. 4(10) of the said Tobias publication.

Figure 22:
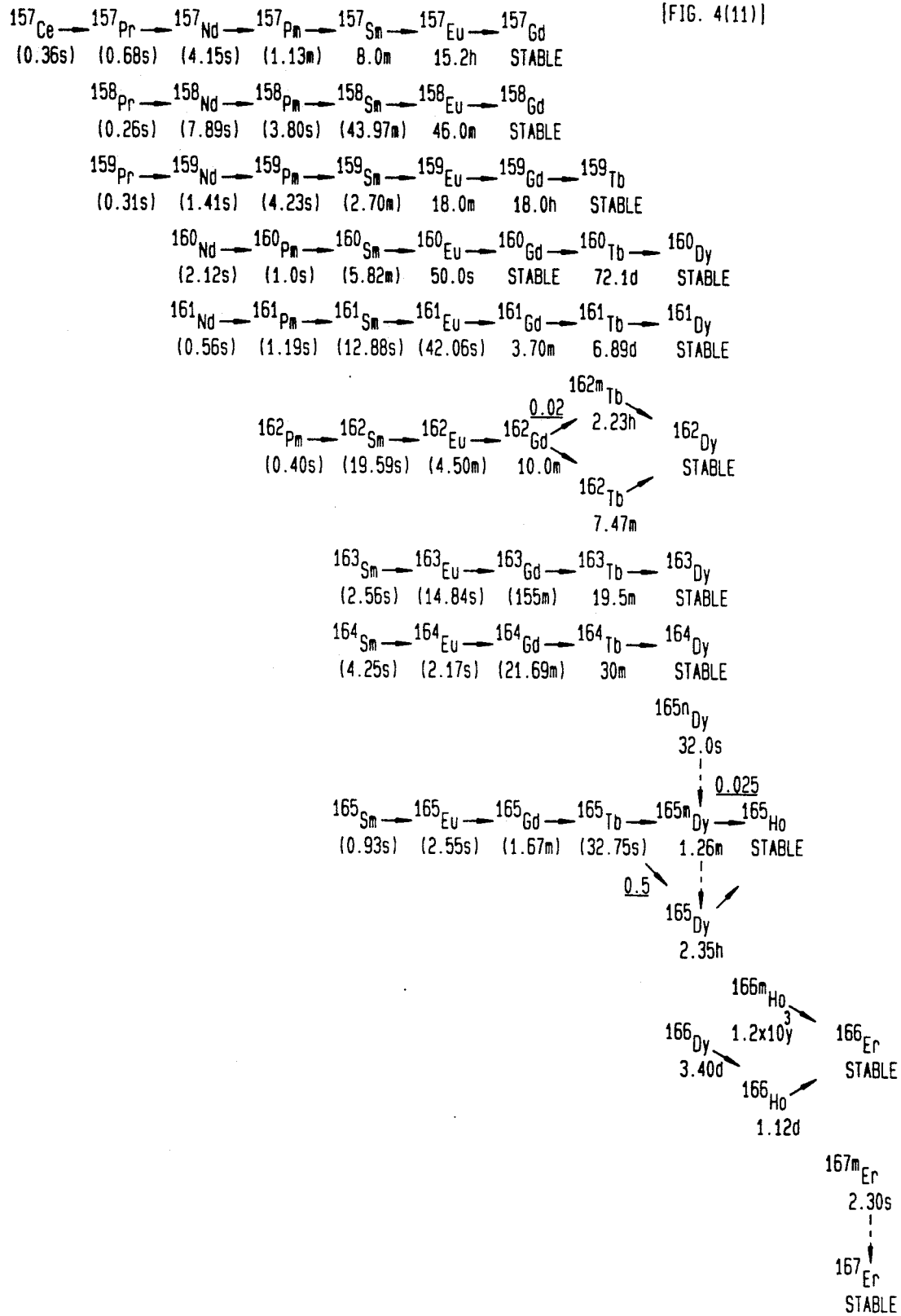

FIG. 22 is a reproduction of FIG. 4(11) of the said Tobias publication.

DESCRIPTION OF THE PREFERRED EMBODIMENTS

It is known to those skilled in the art, how to calculate the isotopic content of an arbitrary nuclear reactor at any time during reactor operation and after shutdown as function of the reactor operation parameters and reactor running time (and also as a special case the isotopic distribution as function of time after a short-time irradiation of a fissile sample by neutrons). This approach is used to calculate the isotopic inventory of the reactor under consideration. The decay heat produced at time t after shutdown (or irradiation) is calculated by integration over the inventory at time t and over the energy contributions from the individual isotopes. Further integration over the time t from shutdown yields the total decay heat produced until time t after shutdown.

The invention is based on new and more reliable data of the decay heat contributed by isotopes, for which no sufficiently precise experimental data were available. These heat energy contributions are listed in the TABLE of FIG. 8 and were obtained by using a microscopic nuclear model, known in principle per se for other purposes, in modified and extended form for the calculation of the decay heat. Thus the decay heat data for the above calculations are taken from the TABLE in FIG. 8, which comprises new and more reliable data.

Figure 1:
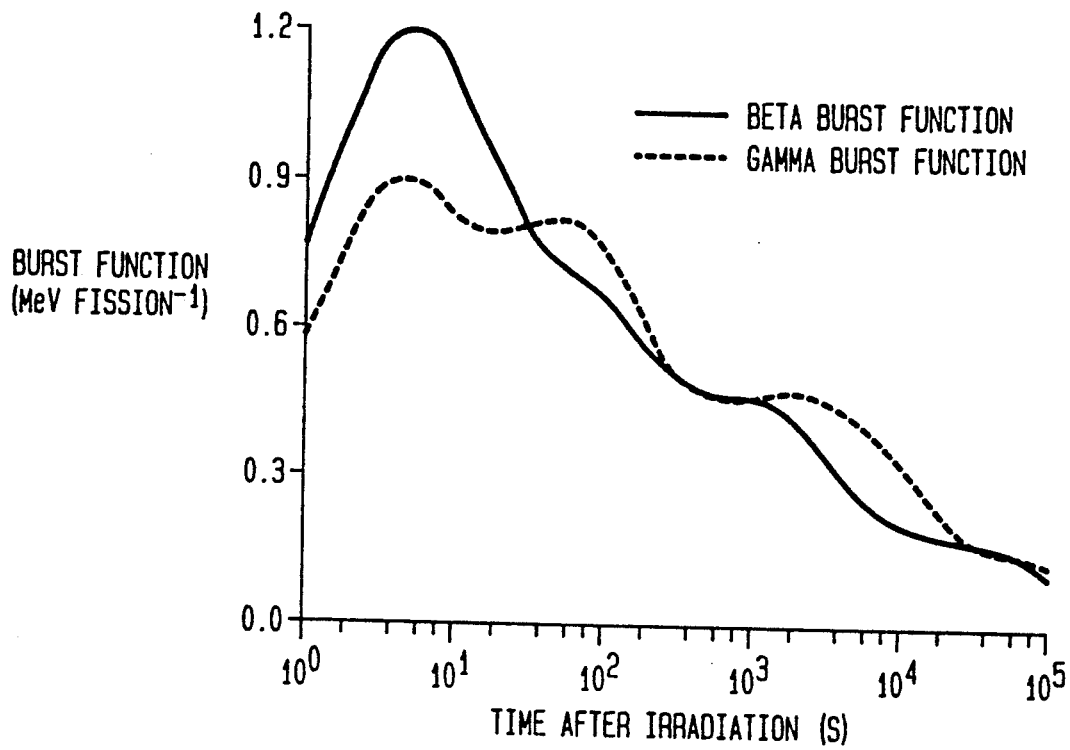
FIG. 1 shows the calculated so-called burst-function for fast fission of $^{238}U$.

In FIG. 1 as a specific example of the new information obtainable with the new data comprised in the TABLE, the so-called burst-function is shown for the fission of $^{238}$U by fast neutrons ("fast fission"), i.e. the decay heat per fission event multiplied by the time t after a short-time irradiation of $^{238}$U with fast neutrons, as function of time t. The solid curve shows the portion of the decay heat produced by beta radiation, the dashed line the portion produced by gamma radiation. It should be pointed out, that known experimentally obtained burst functions of the above type are not suitable for calculating the decay heat of a reactor, because they do not comprise information on the effects of neutron capture by the fission products and actinides.

Figure 2A:
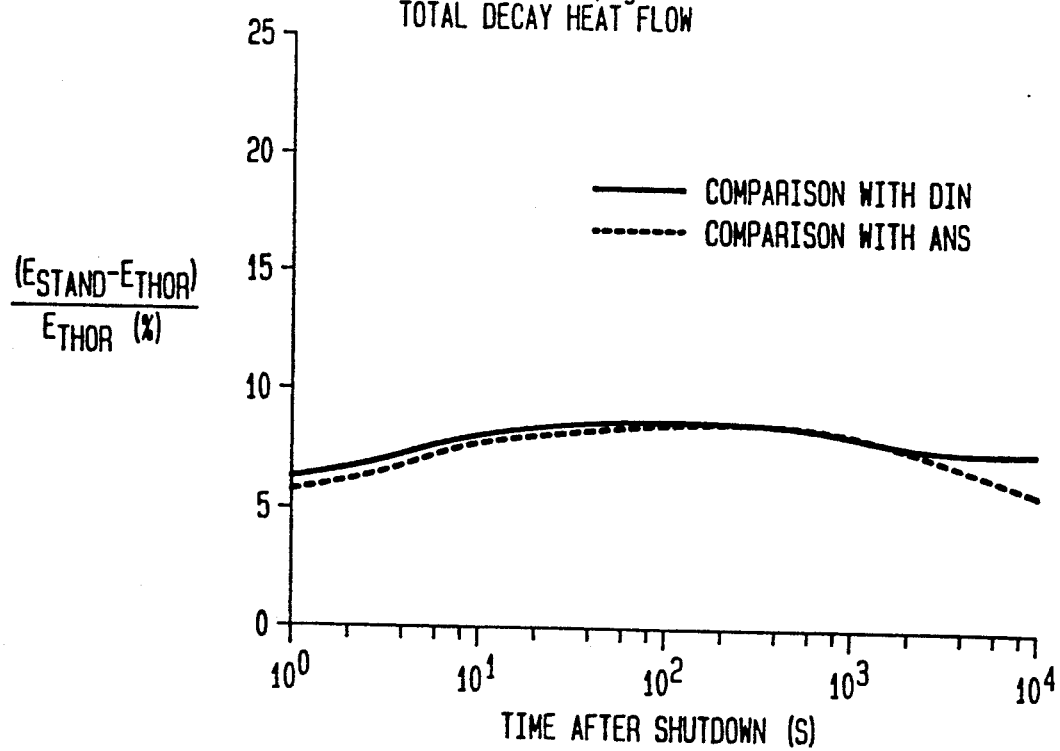
FIG. 2a shows in diagrammatic form the overestimate by the ANS (dashed line) and the DIN (solid line) standards of the total decay heat produced from the time of shutdown (t=0) of a typical pressurized water reactor (PWR) till time t after shutdown, in percent of the newly determined total decay heat $E_{THOR}$ on which the invention is based. The diagrams of FIG. 2a correspond to a PWR with a burn-up of 38 megawatt-days (MWd) per kg of nuclear fuel, the latter being assumed as consisting of uranium enriched to 3.4% in $^{235}U$ at the time of starting the reactor.
Figure 5:
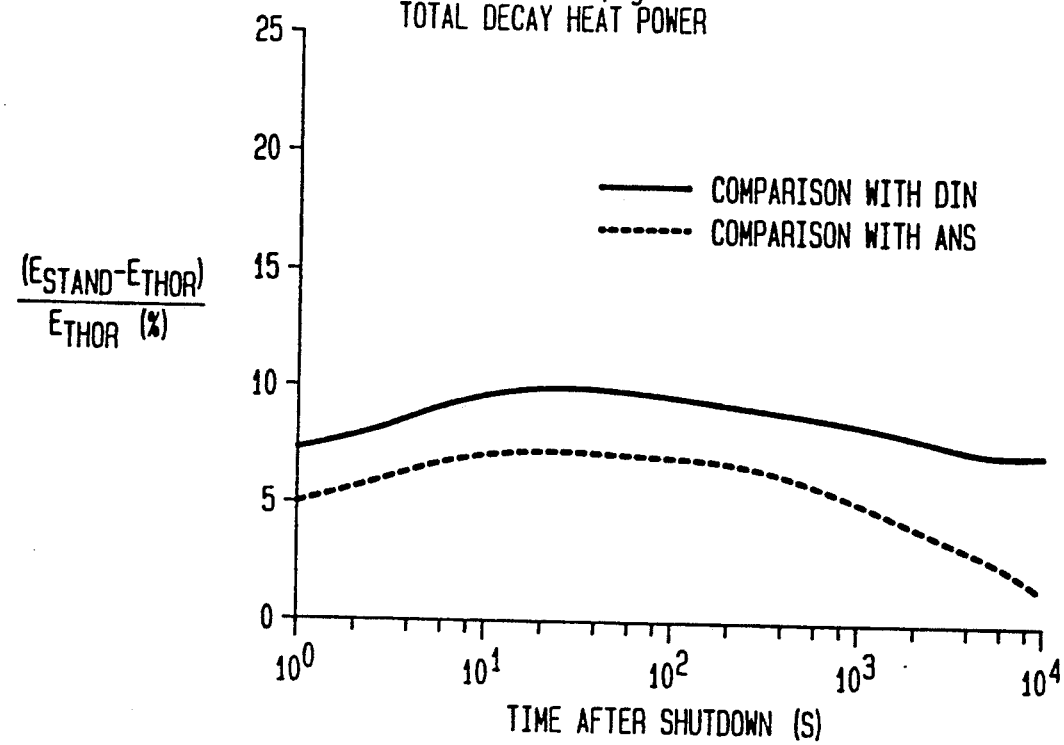
Figure 6:
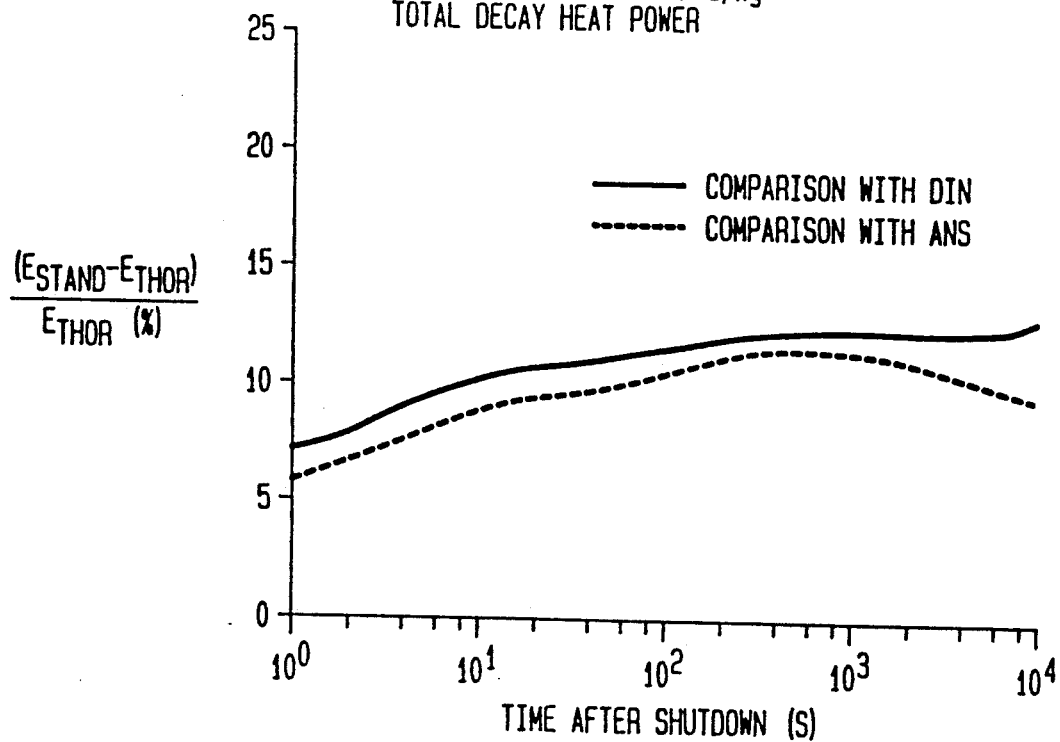
FIG. 6 are diagrams corresponding to FIG. 2a, but for a high-converting LWR and a burn-up of 38,4 MWd/kg of nuclear fuel consisting of 0.2% $^{235}$U,
88.65% $^{238}$U,
6.44% $^{239}$Pu,
2.96% $^{240}$Pu,
1.06% $^{241}$Pu
0.69% $^{242}$Pu.
Figure 7:
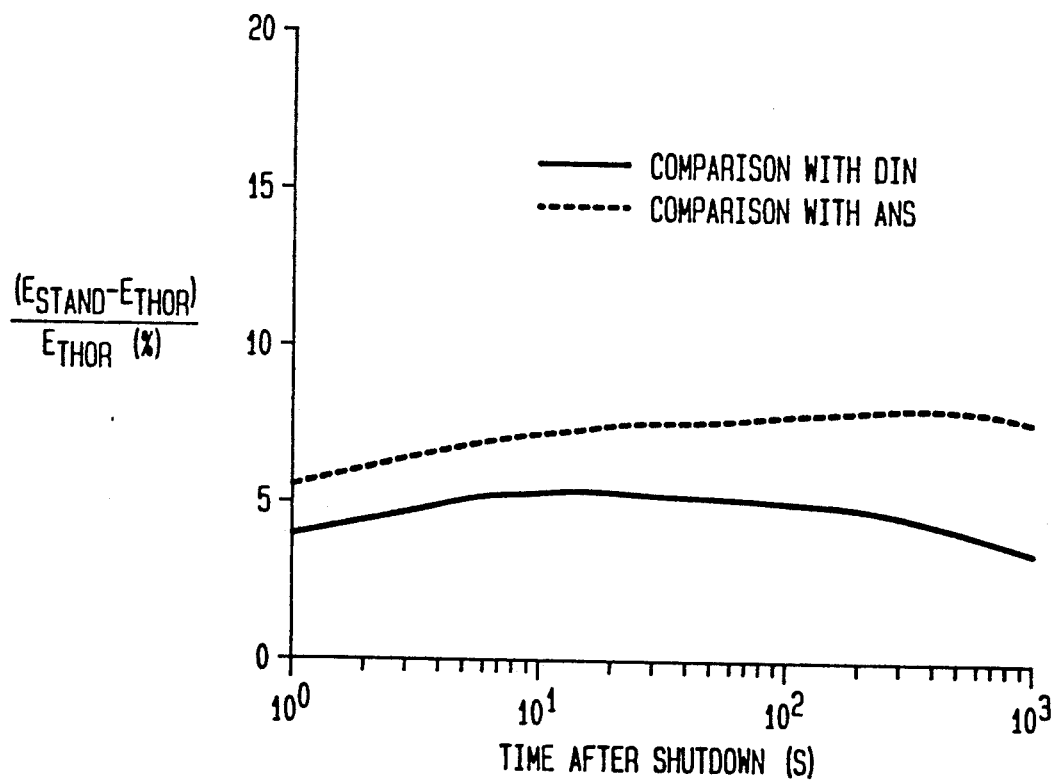
FIG. 7 are diagrams corresponding to FIG. 2a, but for a heavy water reactor of the "CANDU" type and a burn-up of 15.1 MWd/kg of nuclear fuel consisting of natural uranium.

FIG. 2a shows that the amount of the total decay heat of a reactor, determined in this new precise way, is—for example for a PWR with an at present usual burn-up of 38 MWd/kg—in the order of 6 to 8% less than the amount assumed up to now, which is the basis of the present safety standards. The same applies for smaller and, more important, for larger burn-up values, as shown in FIGS. 2b and 2c, respectively, and other types of nuclear reactors, as shown in the examples of FIGS. 5 to 7.

Thus, the new values of the amount of the decay heat allow to increase the effective and maximum power output of a reactor comprising an emergency cooling system of a given cooling capacity beyond the "installed or nominal capacity" or originally set nominal output power or, when devising a new reactor, to dimension the emergency cooling system smaller than assumed to be necessary before, without impairing the safety.

Already an increase of the effective and maximum power output of only 1% yields very considerable economical benefits, correspondingly larger benefits follow from an increase by 2%, 3%, 4%, 5%, etc.

FIGS. 3 and 4 show by way of example that the ANS and DIN standards make considerably erroneous estimates of the various contributions to the decay heat and that the standards do not always overestimate these partial contributions but sometimes underestimate them—so in the case of the ANS standard the contribution to the decay heat from neutron capture by the fission products. The situation is more or less similar for the other contributions to the decay heat. Only the precise determination of all these portions of or contributions to the decay heat mentioned above, on which this invention is based, allows to reduce the decay heat-removal capacity of the emergency cooling system for given installed capacity of a reactor to the optimum value, or to operate, at given emergency cooling capacity, the reactor with correspondingly larger maximum and effective power output.

FIGS. 2 to 4 show, that for a PWR with typical burn-up, the reduction of the decay heat is about 6 to 8%. Since, after shutdown of the reactor, the emergency cooling system has to remove also the specific heat stored in the reactor core, which in the critical time (first minutes) is of the same order as the decay heat, the maximum and effective power output of the nuclear power plant can be increased by about 3 to 4%, depending on the operation parameters in appropriate instances by 5% or more.

For other operating parameters than that of FIGS. 2 to 4, and for other reactor types in general somewhat different values are obtained, as shown by the examples in FIG. 5 to 7, so that the percentage of the maximum permissible reactor power output, which has to be held available as decay heat-removal capacity of the emergency cooling system, can be up to 10% less, and in appropriate instances even more less, than required by the present standards and safety regulations. In other specific cases a reduction of 8% or 6% or about 5% may be appropriate.

APPENDIX OF THE INVENTION

The Calculation of Decay Heat Utilizing the Data Tabulated in FIG. 8

The calculational procedure to determine the isotopic inventory of a nuclear reactor at any time during operation and after shutdown and to calculate the decay heat at is function of running time of the reactor and of time after reactor shutdown is similar to that described by A. Tobias in Prog. Nucl. Energy 5, 1–93, 1980, hereby incorporated by reference.

The calculations should preferably be performed using an extended range of magnitude from $10^{-308}$ to $10^{308}$.

More specifically, for the calculation of the isotopic inventory at an arbitrary point in the core of a reactor linear decay chains of the following form have to be set up and solved:

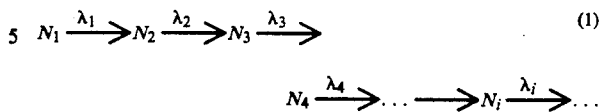

$$N_1 \xrightarrow{\lambda_1} N_2 \xrightarrow{\lambda_2} N_3 \xrightarrow{\lambda_3} \quad (1)$$

$$N_4 \xrightarrow{\lambda_4} \ldots \longrightarrow N_i \xrightarrow{\lambda_i} \ldots$$

wherein $N_i$ denotes the number of the nuclei of isotope i specified by nuclear charge Z, atomic mass A, and K as defined with reference to FIG. 8. For any isotope i in any decay chain the rate of change of $N_i$ at time t:

$$\frac{d}{dt}(N_i) = -\lambda_i^{tot} N_i + \alpha_i F + \gamma_{i-1} N_{i-1} \quad (2)$$

wherein $\lambda_i^{tot}$ is the total decay rate per second, which is listed for each isotope $i(Z,A,K)$ in the TABLE of FIG. 8, and $$\lambda_i^{tot} = \lambda_i^{\beta-(G)} + \lambda_i^{\beta-(I)} + \lambda_i^{\beta+(G)} + \lambda_i^{\beta+(I)} +$$

$$\lambda_i^{SF} + \lambda_i^{\alpha} + \lambda_i^{\gamma} + \lambda_i^{1n} + \lambda_i^{2n} + \sigma_i^n \phi + \sigma_i^f \phi;$$

$\gamma_{i-1}$ is one of the partial decay rates $$\lambda_i^{\beta-(G)}, \lambda_i^{\beta-(I)}, \lambda_i^{\beta+(G)}, \lambda_i^{\beta+(I)}, \lambda_i^{\gamma}, \lambda_i^{\alpha}, \lambda_i^{SF}, \lambda_i^{1n}, \lambda_i^{2n}, \sigma_i^n \phi;$$

with which the (i−1)th isotope contributes to the decay chain.

$$\lambda_i^x = \lambda_i^{tot} P_i^x;$$

wherein
x is any of $\beta-(G), \beta-(I), \beta+(G), \beta+(I), \alpha, \gamma$, SF, 1n, 2n;
$P_i^x$ are the values listed in the TABLE for the isotope $i(Z,A,K)$,
F is the fission rate per second,
$\alpha_i$ is the fission yield of isotope i,
$\phi$ is the neutron flux per cm² and second and
$\sigma_i^n$ and $\sigma_i^f$ are the cross sections (in cm²) for neutron capture without and with successive fission, respectively.

The fission yield values are taken from a standard nuclear data file, such as ENDF/B-IV, V or VI, Brookhaven, National Lab. When setting up the decay chains, "self-production" of an isotope is to be avoided.

For typical reactor operation conditions for each unit cell in the reactor a system of equations of the form of eq. (2) are to be solved for about 1400 isotopes. For each member of a decay chain an analytical solution is used which has the following form:

$$N_i(t) = \sum_{r=1}^{i} \frac{1}{\gamma_i} \prod_{k=r}^{i} \gamma_k \left\{ F\alpha_r \left[ \sum_{j=r}^{i} \frac{(1 - e^{-\lambda_j^{tot} t})}{\lambda_j^{tot} \prod_{\substack{m=r \\ m \neq j}}^{i} (\lambda_m^{tot} - \lambda_j^{tot})} \right] + \right.$$

$$\left. N_r^0 \left[ \sum_{j=r}^{i} \frac{e^{-\lambda_j^{tot} t}}{\prod_{\substack{m=r \\ m \neq j}}^{i} (\lambda_m^{tot} - \lambda_j^{tot})} \right] \right\} \quad (3)$$

-continued wherein $(\lambda_m^{tot} - \lambda_j^{tot}) = 1$ for $j = m$.

The starting abundances $N^0$ and the neutron capture cross sections are reactor specific and have to be provided by the operator of the specific reactor under consideration.

During the time of operation of the reactor the relative composition of the fissile material in the core changes according to eq. (3). Thus the corresponding change of the parameters F and $a_i$ has to be taken into account. For this purpose, the time of operation is divided into intervals with constant fission rates and fission yields. This means approximating the real function shape of the reactor power output by a step function ("power histogram"). For typical reactor conditions, the number of time steps should be sufficiently large, so that the quantities to be calculated do not depend any more (within the required accuracy) on the number of time intervals. The time intervals must be small compared to the total decay rates of the isotopes involved.

The calculation of the decay heat H at time t is performed using the results of eq. (3) in eq. (4):

$$H(t) = \sum_i \lambda_i^{tot} N_i(t) E_{Total,i} \qquad (4)$$

The calculation of the integral decay heat $E_{THOR}$ from shutdown up to time t is performed by numerical integration of eq. (4) with the Gaussian integration method. The total decay energies $E_{Total, i}$ of the individual isotopes are taken from the TABLE of FIG. 8.

It will be understood that the above description of the present invention is susceptible to various modifications, changes and adaptions and the same are intended to be comprehended within the meaning and range of equivalents of the appended claims.

---

REFERENCED MATERIAL

EXCERPT FROM "DECAY HEAT" by A. Tobias, Progr. in Nucl. Energy, Vol. 5, N. 1.

(with figure numbers to accord with this specification)

---

2.3. Present summation methods

In order to calculate the decay heat from irradiated fuel it is necessary, in the first instance, to determine the isotopic content of the fuel at the end of irradiation and at any time following shutdown. This starting point is used in decay heat studies as well as other fields such as environmental health physics. Consequently the computer codes developed initially for one application are often adapted for use in another. Examples of this are FISP (Clarke, 1972) for fission products, HYACINTH (Harte, 1976a) for actinides, and RICE (Nair, 1977) for both actinides and fission products.

Inventory codes are usually based on a point source model, whereas the more complex reactor physics codes take into account details of the lattice geometry, including effects such as self-shielding. However, results from the reactor physics codes may be reproduced by the point source model through the use of 'effective' spectrum-averaged reaction cross-sections.

Although the descriptions of the time variation of both the fission products and actinides during reactor operation, are normally represented by a system of linear equations, the system is, strictly speaking, a non-linear one. The build-up of actinides produces changes in the neutron spectrum, so that the spectrum-averaged cross-sections become time dependent quantities. A number of the actinides produced during reactor operation are themselves fissile, so that, for a constant neutron flux level, the power output becomes time dependent, and vice versa. Since the various fissile nuclides generally have different fission product yield distributions, as illustrated in Fig. 1 for $^{235}U$ and $^{239}Pu$, the fission product creation rates will also be time dependent.

Fortunately this complex nonlinear behaviour may be approximated by a linear system in which a period of reactor operation is represented by a series of suitably chosen time steps, with values of cross-sections and neutron flux levels being held constant during each step; these values are revised for each time step.

Having obtained the inventory of the radioactive fission products and actinides, it is then a relatively simple matter to calculate the alpha- and beta-decay heat, as well as the spectrum of gamma radiation emitted by the fuel constituents.

2.3.1. The build-up of actinides and heavy elements. Before looking at the general method of calculating the inventory of actinides and heavy elements, it is worth considering the simple method used for many years to calculate this component of decay heat.

For uranium-fuelled reactors, and for times of up to ~10 days following shutdown, the principal nuclides responsible for the actinide component of decay heat are $^{239}U$ and $^{239}Np$, which have radioactive half-lives of 23.5 min and 2.35 days respectively.

Let R be the (constant) neutron absorption rate in $^{238}U$—i.e. the maximum production rate of both $^{239}U$ and $^{239}Np$. The number of atoms, $N_1$ and $N_2$, of $^{239}U$ and $^{239}Np$ respectively, may be described by $$\frac{d}{dt}(N_1) = R - \lambda_1 N_1 \qquad (9)$$

$$\frac{d}{dt}(N_2) = \lambda_1 N_1 - \lambda_2 N_2 \qquad (10)$$

where $\lambda_1$ and $\lambda_2$ are the radioactive decay constants of $^{239}$U and $^{239}$Np respectively.

Assuming that the $^{238}$U is steadily replenished, or that its depletion may be neglected during an irradiation period $I$, these equations have solutions $$N_1^0 = \frac{R}{\lambda_1}(1 - e^{-\lambda_1 I}) \qquad (11)$$

$$N_2^0 = \frac{R}{\lambda_2}\left[1 + \frac{(\lambda_2 e^{-\lambda_1 I} - \lambda_1 e^{-\lambda_2 I})}{(\lambda_1 - \lambda_2)}\right] \qquad (12)$$

where $N_1^0$ and $N_2^0$ are the numbers of atoms of $^{239}$U and $^{239}$Np respectively, at the end of the irradiation.

Following shutdown, both species undergo radioactive decay with the release of beta and gamma radiation. At a time $t$ following shutdown, the numbers of atoms of $^{239}$U and $^{239}$Np are given respectively by $$N_1 = \frac{R}{\lambda_1}(1 - e^{-\lambda_1 I})e^{-\lambda_1 t} \qquad (13)$$

and $$N_2 = \frac{R}{\lambda_2}\left[1 + \frac{(\lambda_2 e^{-\lambda_1 I} - \lambda_1 e^{-\lambda_2 I})}{(\lambda_1 - \lambda_2)}\right]e^{-\lambda_2 t}$$

$$+ \frac{R}{(\lambda_1 - \lambda_2)}(e^{-\lambda_2 t} - e^{-\lambda_1 t})(1 - e^{-\lambda_1 I}). \qquad (14)$$

The first term of equation (14) describes the $^{239}$Np created during the irradiation, while the second term describes that produced from the decay of $^{239}$U remaining at the end of the irradiation.

The decay heat components $H_1$ and $H_2$, due to $^{239}$U and $^{239}$Np respectively, are thus $$H_1 = E_1 R(1 - e^{-\lambda_1 I})e^{-\lambda_1 t} \qquad (15)$$

and $$H_2 = E_2 R\left\{\left[1 + \frac{(\lambda_2 e^{-\lambda_1 I} - \lambda_1 e^{-\lambda_2 I})}{(\lambda_1 - \lambda_2)}\right]e^{-\lambda_2 t}\right.$$

$$\left. + \frac{\lambda_2}{(\lambda_1 - \lambda_2)}(e^{-\lambda_2 t} - e^{-\lambda_1 t})(1 - e^{-\lambda_1 I})\right\} \qquad (16)$$

where $E_1$ and $E_2$ represent the total absorbable energy release (mean beta plus total gamma) per disintegration of $^{239}$U and $^{239}$Np respectively.

These decay heat components are usually normalized relative to the fission product component by expressing $R$ as the ratio of the neutron capture rate in $^{238}$U to the total fission rate in the fuel. Consequently, the value of $R$ varies with reactor type, and is also lattice dependent.

It is often possible to simplify equations (15) and (16) for moderate irradiation and cooling times. Since the $^{239}$U half-life is short (23.5 min), it will have reached its saturation level $R/\lambda_1$ after only a few hours irradiation; i.e. $e^{-\lambda_1 I}$ becomes negligible. Under these circumstances, it may be easily shown that the second term of equation (16) also becomes negligible and, since $\lambda_1 \gg \lambda_2$, equations (15) and (16) may be approximated by $$H_1 = E_1 R \, e^{-\lambda_1 t} \qquad (15')$$

and $$H_2 = E_2 R(1 - e^{-\lambda_2 I})e^{-\lambda_2 t}. \qquad (16')$$

In thorium-fuelled reactor systems, the short-term actinide decay heat arises principally from $^{233}$Th and $^{233}$Pa, which have radioactive half-lives of 2.23 min and 27.1 days respectively. Hence, equations similar to those developed above may be applied to the evaluation of short-term decay heat from these nuclides.

The development, in recent years, of both hardware and software for digital computers has enabled the calculation of actinide decay heat by a more rigorous treatment. The reactions normally considered in calculating the inventory, during irradiation, of each nuclide are its own radioactive decay and total neutron absorption, its production from alpha and beta decay of parent nuclides, and production from (n, γ) and (n, 2n) reactions in other species present.

The number of atoms $N_{Z,A}$, of the nuclide of atomic number $Z$ and mass number $A$, may be described by $$\frac{d}{dt}(N_{Z,A}) = -\lambda_{Z,A}^T N_{Z,A} - N_{Z,A}$$

$$\times \int_0^\infty \sigma_{Z,A}^A(E)\phi(E)\,dE + N_{Z,A-1}$$

$$\times \int_0^\infty \sigma_{Z,A-1}^{n,\gamma}(E)\phi(E)\,dE + N_{Z,A+1}$$

$$\times \int_0^\infty \sigma_{Z,A+1}^{n,2n}(E)\phi(E)\,dE + k_\alpha \lambda_{Z-2,A+4}^\alpha$$

$$\times N_{Z+2,A+4} + k_{\beta^-} \lambda_{Z-1,A}^{\beta^-} N_{Z+1,A}$$

$$+ k_{\beta^+} \lambda_{Z+1,A}^{\beta^+} N_{Z+1,A} \qquad (17)$$

where $\sigma_{i,j}^A(E)$, $\sigma_{i,j}^{n,\gamma}(E)$ and $\sigma_{i,j}^{n,2n}(E)$ are the total absorption, (n, γ) and (n, 2n) cross-sections, respectively, at neutron energy $E$, for the nuclide of atomic number $i$ and mass number $j$; $\lambda_{i,j}^\alpha$, $\lambda_{i,j}^{\beta^-}$, $\lambda_{i,j}^{\beta^+}$ and $\lambda_{i,j}^T$ are the alpha, negatron, positron and total decay constants, respectively, for the nuclide of atomic number $i$ and mass number $j$; $k_\alpha$, $k_{\beta^-}$ and $k_{\beta^+}$ are the branching fractions for α, $\beta^-$ and $\beta^+$ decay to nuclide $Z,A$; and $\phi(E)$ is the neutron flux at neutron energy $E$.

For convenience, the neutron flux is normally represented in a finite number of energy groups with corresponding spectrum-averaged cross-section data.

The linear system of coupled first order differential equations given by equation (17) may be represented in matrix notation by $$\frac{d}{dt} N = [A] \times N \qquad (18)$$

where $N$ is the column vector of inventories, and matrix $[A]$ contains details of decay constants and reaction rates. In principle, equation (18) may be solved analytically by first resolving the system so that, in the resultant partial reaction chains, each nuclide is fed by a single parent. However, due to the complexity of the couplings in the case of the actinides, the equations are invariably solved by means of numerical integration—e.g. ORIGEN (Bell, 1973a), HYACINTH (Harte, 1976a) and FISPIN (Burstall and Thornton, 1977). Different numerical methods of solution for these equations are discussed in some detail by Harte (1976b).

*2.3.2. The generation of fission products.* During reactor operation a fission product may be produced through its direct fission yield or the radioactive decay of, or neutron capture in, a number of parent nuclides. It may itself undergo transformation by several modes of radioactive decay, by neutron absorption, or by a combination of these processes. Fortunately, in this case the system is less complex than that for the actinides, and it may be resolved into linear chains, where the concentration of any nuclide depends only on a single parent and its own radioactive decay, neutron absorption and fission yield. However, the effective yields of the fission products are time-dependent quantities, as noted above. Let $\sigma^F_{p,k}$ represent the effective group-averaged fission cross-section of actinide $p$ in the $k$th neutron group (of $N$ groups), with corresponding independent yields for fission product $i$ of $Y^i_{p,k}$. If $\phi_j$ represents the neutron flux in group $j$, then the effective yield $\alpha_i$ of fission product $i$ is given by $$\alpha_i = \sum_p \sum_{k=1}^{N} \sigma^F_{p,k} \phi_k N_p(t) Y^i_{p,k} \qquad (19)$$

where $N_p(t)$ is the number of atoms of fissile actinide $p$ at time $t$ during irradiation. Details of the variation of the fission rates in the major actinides present in the fuel may be obtained from the reactor physics codes for both thermal (0.025 eV), and fission spectrum neutron-induced fission. Values for a wider range of actinides are given by codes such as HYACINTH (Harte, 1976a), or FISPIN (Burstall and Thornton, 1977). Since the fission product inventories vary more rapidly than those of the fissioning actinides, the fission rate may be treated as a constant over reasonably wide time intervals. Hence, as in the case of the actinides, a period of reactor operation may be represented by a series of time steps in which the time dependent quantities are held constant during each step, and varied discontinuously between steps.

Consider the linear chain $$N_1 \rightarrow N_2 \rightarrow N_3 \rightarrow \ldots N_i \rightarrow \ldots$$

with effective fission yields $\alpha_i$, decay constants $\lambda_i$/sec, and effective neutron capture cross-sections $\sigma_i$ cm$^2$. With a fission rate $F$/sec, in an effective neutron flux of $\phi$ n/cm$^2$-s, $$\frac{d}{dt}(N_1) = -(\lambda_1 + \sigma_1 \phi) N_1 + \alpha_1 F \qquad (20)$$

$$\frac{d}{dt}(N_2) = -(\lambda_2 + \sigma_2 \phi) N_2 + \alpha_2 F + \gamma_1 N_1 \qquad (21)$$

while for chain member $i$ $$\frac{d}{dt}(N_i) = -(\lambda_i + \sigma_i \phi) N_i + \alpha_i F + \gamma_{i-1} N_{i-1} \qquad (22)$$

where $\gamma_{i-1} = k_{i-1} \lambda_{i-1}$ or $k_{i-1} \sigma_{i-1} \phi$ depending on the coupling between members $(i-1)$ and $i$, and $k_{i-1}$ is the appropriate branching fraction.

The set of equations represented by equation (22) may be solved either by an analytical method or by numerical integration. The inventory codes which use the analytical method represent the general solution of equation (22) by different but equivalent expressions. E.g., the EPRI-CINDER code (England, Wilson and Stamatelatos, 1976) bases its solution on $$N_i(t) = \sum_{r=1}^{i} \frac{1}{\gamma_i} \prod_{k=r}^{i} \gamma_k$$
$$\times \left\{ F\alpha_r \left[ \frac{1}{\prod_{l=r}^{i} \lambda^*_l} - \sum_{j=r}^{i} \frac{e^{-\lambda^*_j t}}{\lambda^*_j \prod_{m=r}^{i}(\lambda^*_m - \lambda^*_j)} \right] \right.$$
$$\left. + N^0_r \left( \sum_{j=r}^{i} \frac{e^{-\lambda^*_j t}}{\prod_{m=r}^{i}(\lambda^*_m - \lambda^*_j)} \right) \right\} \qquad (23)$$

where $\lambda^*_i = \lambda_i + \sigma_i \phi$, and $(\lambda^*_m - \lambda^*_j) = 1$ if $m = j$.

In this expression the term within square brackets represents the contribution to chain member $i$ from the fission yield source, while that in parentheses gives the contribution from the precursors existing at the start of the time step.

However, due to computer limitations to finite word lengths, the analytical method of solution is generally plagued with problems of rounding errors —evaluation of the difference of two large, but almost identical numbers. These errors arise in particular for calculations using short time steps and long decay chains. Problems also arise if, in the denominator of the term within square brackets above, two decay constants are nearly equal. A simple remedy to this particular difficulty is to alter one of the decay constants by a small amount ($\sim$0.01%). This has a negligible effect on the calculated inventory of the nuclide concerned, but permits the difference $(\lambda^*_m - \lambda^*_j)$ to be evaluated without any difficulty. Because of these problems, a number of inventory codes now utilize sophisticated mathematical routines to perform numerical integration in solving the set of equations represented by equation 22; e.g. RICE (Nair, 1977) and ORIGEN (Bell, 1973a).

Only some of the codes which still use the analytical method of solution—e.g. EPRI-CINDER (England et al., 1976)—take steps to identify the sources of such numerical problems and implement remedial action wherever possible.

Recently, Tobias (1978) has eliminated a number of the sources of rounding error using the identity $$\frac{1}{\prod_{j=n}^{i} x_j} = \sum_{j=n}^{i} \left[ x_j \prod_{m=n}^{i} (x_m - x_j) \right]^{-1}. \quad (24)$$

where $(x_m - x_j) = 1$ if $m = j$.

Equation (23) may be rewritten $$N_i(t) = \sum_{r=1}^{i} \frac{1}{\gamma_i} \prod_{k=r}^{i} \gamma_k \left\{ F\alpha_r \left[ \sum_{j=r}^{i} \frac{(1 - e^{-\lambda_j^* t})}{\lambda_j^* \prod_{m=r}^{i} (\lambda_m^* - \lambda_j^*)} \right] + N_r^0 \left( \sum_{j=r}^{i} \frac{e^{-\lambda_j^* t}}{\prod_{m=r}^{i} (\lambda_m^* - \lambda_j^*)} \right) \right\} \quad (25)$$

where $(\lambda_m^* - \lambda_j^*) = 1$ if $j = m$.

It was found that, with double precision arithmetic on a computer with a 16-bit word length, equation (25) could be used for decay chains of at least 15 members without cause for concern on rounding errors.

Alternative analytical approaches have been developed by Siewers (1976, 1978), and Grossman and Stein (1978), in which use is made of recurrence relations to avoid the numerical difficulties noted above. Some of the more popular methods of solution are described briefly by Schrock (1979).

2.3.3. *Inventories following shutdown.* Following reactor shutdown the large number of actinides and fission products formed during reactor operation will undergo radioactive decay and, at a time $t$ following shutdown, $$\frac{d}{dt} N_i = -\lambda_i N_i + \lambda_{i-1} N_{i-1}. \quad (26)$$

The coupling of equations represented by equation (26) for both actinides and fission products are much less complex in the case of cooling periods than for reactor operation. Consequently, the system of equations may be more easily resolved so that each nuclide in a 'decay chain' is fed by a single parent. This is borne out by the fact that, with very few exceptions, inventory codes utilize an analytical solution in cooling periods for both actinides and fission products, irrespective of the methods employed to solve the irradiation case.

The general solution may be represented by $$N_i(t) = \sum_{r=1}^{i} \frac{1}{\gamma_i} \prod_{k=r}^{i} \gamma_k N_r^0 \left( \sum_{j=r}^{i} \frac{e^{-\lambda_j t}}{\prod_{m=r}^{i} (\lambda_m - \lambda_j)} \right) \quad (27)$$

where $(\lambda_m - \lambda_j) = 1$ if $j = m$.

Note that this solution is equivalent to equation (23) with both the fission rate $F$ and flux $\phi$ set to zero.

2.3.4. *The summation step.* Once the inventories of actinides and/or fission products have been obtained for the required conditions of reactor operation and cooling period, the decay heat produced may be simply derived by summing the products of the nuclide activities with the values of the mean alpha, beta and gamma energy release per disintegration of that nuclide; i.e.

$$H_\alpha(t) = \sum_{i=1}^{M} \lambda_i^T N_i(t) E_\alpha^i \quad (28)$$

$$H_\beta(t) = \sum_{i=1}^{M} \lambda_i^T N_i(t) E_\beta^i \quad (29)$$

$$H_\gamma(t) = \sum_{i=1}^{M} \lambda_i^T N_i(t) E_\gamma^i \quad (30)$$

where $E_\alpha^i$, $E_\beta^i$ and $E_\gamma^i$ are the mean alpha, beta and gamma energy release respectively per disintegration of nuclide $i$; $\lambda_i^T$ is the total decay constant of nuclide $i$, and $H_\alpha(t)$, $H_\beta(t)$ and $H_\gamma(t)$ are the total alpha, beta and gamma decay heat respectively at a time $t$ following reactor shut-down.

Due to the nature of this final stage in calculating decay heat, the term 'summation calculations' is used to describe this method of evaluation.

2.3.5. *Data and codes.* The data required for decay heat calculations fall generally into two broad categories:

(1) irradiation dependent, and
(2) irradiation independent quantities.

The first category includes all of the variable parameters which have to be specified for each different calculation—e.g. fission rate and neutron flux level—while the second category comprises the permanent data libraries which are used, either in part or in whole, in all calculations.

The specific data requirements for actinides and fission products will now be considered in a little more detail.

2.3.5.1. Actinides. Much of the data required for calculating the actinide component of decay heat fall into the first category, and have to be specified for each calculation. These variable parameters include the initial isotopic composition of the fuel, reaction cross-sections, and neutron flux levels. Reactions, induced in the fuel constituents, which are normally considered in summation calculations are (n,f), (n,γ) and (n,2n). Some computer codes utilize a multi-group representation of both the neutron flux and corresponding cross-section data, while others use averaged single-group parameters, which are themselves derived from some original multi-group structure. These items of data are both reactor- and time-dependent quantities, as noted earlier, and their values in a calculation generally require modification for successive time steps. Details of the variation of these data, for a number of the more important actinides, are given by the more detailed lattice calculations. Hence, another requirement for the detailed calculation of actinide decay heat is access to an appropriate reactor physics lattice calculation, and/or a cross-section processing code for deriving appropriate spectrum-averaged cross-section data, e.g. TOAFEW (Wilson and England, 1978). Inventory codes, such as ORIGEN (Bell, 1973a), HYACINTH (Harte, 1976a), RICE (Nair, 1977), FISPIN (Burstall and Thornton, 1977) and EPRI-CINDER (England et al., 1976b), consider many more nuclides than do the lattice codes, and consequently some time-dependent reaction cross-section data are unavailable. In these cases, single-point values are often used and are stored in the permanent library.

The permanent data library for the actinides contains, almost exclusively, details of the radioactive decay of the various nuclides considered. The specific items required are the radioactive half-lives, decay mode branching fractions, and energies and abundances of radiations emitted. The actinides, as a whole, exhibit a wide range of decay modes, including $\alpha$ decay, $\beta^-$ decay, electron capture decay, isomeric transition, and spontaneous fission. Figures 9, 10 and 11 illustrate the range of actinide build-up and decay chains used by the codes HYACINTH (Harte, 1976a) and RICE (Nair, 1977); these nuclides cover both the uranium and thorium fuel cycles. The short-lived nuclides, with half-life values within parentheses, are not included explicitly within the HYACINTH and RICE libraries, but their decay energies are added to those of the long-lived parent heavy element. The useful quantities which are derived from the radiation spectra are the mean energies released per disintegration, in the form of alpha, beta and gamma radiation. (In addition, the data on spontaneous fission are required for the calculation of the neutron production rate within the fuel.) Some inventory codes—e.g. HYACINTH (Harte, 1976a) and RICE (Nair, 1977)—take matters further, and include a gamma energy spectrum (15 groups) for each nuclide. The actinide modules and data libraries of the codes HYACINTH and RICE are essentially identical, but generally the energy group structure differs between codes.

Permanent data libraries for the calculation of actinide decay heat have, in the past, been independently compiled by the authors, or the users, of the inventory codes, using available published data. Only in some cases are full details given of both the data sources used and evaluation methods adopted. Table 6 gives brief details of the known actinide decay heat codes, and the range of nuclides included in their present data libraries.

Table 6. Actinide summation codes currently in use

| Code | Reference | Nuclides in library | Country of use |
| --- | --- | --- | --- |
| COMBO | Gunst et al. (1974a) | 30 nuclides: $^{231}$Th–$^{242}$Cm | U.S.A. |
| EPRI-CINDER | England et al. (1976) Wilson et al. (1979) | 50 nuclides: $^{208}$Tl–$^{246}$Cm | U.S.A. |
| FISPIN | Burstall and Thornton (1977) | <90 nuclides: $^{206}$Pb–$^{253}$Es | U.K. |
| HYACINTH | Harte (1976a) | 74 nuclides: $^{206}$Pb–$^{253}$Es | U.K. |
| HYLAS2 | Beynon (1973) | 54 nuclides: $^{228}$Th–$^{246}$Cm | U.K. |
| ORIGEN | Bell (1973a) | 101 nuclides: $^{207}$Tl–$^{253}$Es | U.S.A. |
| RADEC | Angelo et al. (1973) | 20 nuclides: $^{232}$U–$^{244}$Cm | U.S.A. |
| RIBD-II | Ma (1975) | 2 nuclides: $^{239}$U, $^{239}$Np | U.S.A. |
| RICE | Nair (1977) | As HYACINTH, above | U.K. |

Table 7. The scope of actinide and heavy element decay data evaluations in progress

| Evaluation | Total no. of nuclides | Range of nuclides | Reference |
| --- | --- | --- | --- |
| ENDF/B-V | 60 | $^{208}$Tl–$^{253}$Es | Schenter (1978) |
| French | 280 | $^{206}$Tl–$^{260}$Lr | Blachot and Fiche (1978) |
| U.K. | 119 | $^{206}$Hg–$^{253}$Es | Nichols and James (1979) |

In the last few years there has been intense effort to evaluate decay data for the actinides and heavy elements. These efforts appear to have been concentrated in France (Blachot and Fiche, 1978), the U.S.A. (Schenter, 1978), and the U.K. (Davies et al., 1978; Nichols, 1979; Nichols and James, 1979); the scope of these evaluations are summarized in Table 7. It is anticipated that as these data files become readily available they will form the principal data sources for the actinide decay heat codes.

2.3.5.2. Fission products. The decay modes of the fission products, with few exceptions, are limited to $\beta^-$ decay, $\beta^+$ decay/electron capture, and isomeric transition. Details are required of the radioactive half-lives, decay mode branching fractions, and mean beta and gamma energies emitted per disintegration. Many codes such as FISP5 (Tobias, 1978) and RICE (Nair, 1977) also include a gamma energy spectrum in their permanent libraries, while others, e.g. CINDER-10 (England et al., 1976b), utilize auxiliary codes to calculate detailed beta and gamma radiation spectra (Stamatelatos and England, 1977).

The number of known fission products is far in excess of the number of actinides generated within the fuel. Figures illustrates a typical set of fission products considered in present day decay heat calculations, and for which data are required. The decay chains shown are based on the U.K. Fission Product Decay File UKFPDD1 (Tobias, 1977c), and supplemented by some recent half-life measurements summarized by Blachot (1977). The independent yield models predict a number of short-lived fission products, which have yet to be experimentally observed; theoretical half-lives for these nuclides (England and Schenter, 1975) are given within parentheses. The study of $^{239}$Pu fission product beta activity by Iyer and Ganguly (1970) provided evidence to suggest that the lower limit for the half-life of fission product beta decay was ~0.2 sec. Since present day fission product data libraries already include many nuclides with half-lives of this magnitude, it is unlikely that there will be any significant increase in the number of nuclides represented in future versions of these data libraries. Indeed, as noted earlier, fission product data libraries currently include most of the nuclides having independent yields >0.0001%, in a wide range of fission reactions.

There are also many known, and unknown, short-lived fission products for which no detailed beta or gamma data are available. In these cases, theoretical estimates of mean beta and gamma energies are made with the aid of both known (Wapstra and Gove, 1971) and theoretical $Q$ values for decay (Myers, 1970, 1973; Garvey et al., 1969).

American National Standard ANSI/ANS-5.1-1979 for Decay Heat Power in Light Water Reactors 1. Scope and Purpose 1.1 Scope. This standard sets forth values for the decay heat power from fission products and $^{239}$U and $^{239}$Np following shutdown of light water reactors containing $^{235}$U, $^{238}$U, and plutonium. The decay heat power from fission products is presented in tables and equivalent analytical representations. Methods are described which account for the reactor operating history, for the effect of neutron capture in fission products, and for assessing the uncertainty in the resultant decay heat power. Equations for the decay heat power from the decay of $^{239}$U AND $^{239}$Np are presented separately.

Decay heat power from other actinides and activation products in structural materials and fission power from delayed neutron-induced fission are not included in this standard and shall be evaluated by the user and appropriately included in any analysis of shutdown power.

1.2 Purpose and Application. This standard provides bases for determining the shutdown decay heat power and its uncertainty following shutdown of light water reactors. The information in this standard shall be used in design, performance evaluation, and assessment of the safety of light water reactors. This standard shall be used as the basis for comparison of the results of alternate methods of determining fission product decay heat power.[1]

2. Limitations 2.1 General. The standard methods of evaluating decay heat power described herein are applicable to light water reactors containing $^{235}$U as the initial major fissile material and $^{238}$U as the fertile material. The contributions from $^{235}$U, $^{238}$U, and $^{239}$Pu are treated explicitly; account is made for other fissionable nuclides by treating them as $^{235}$U.

[1] Examples of the use of the standard methods are presented in the Appendix.

2.2 Limitations on Use of Standard Fission-Product Decay Heat Power Representation. Standard fission-product decay heat power representations are provided for thermal reactor neutron spectrum fission of $^{235}$U and $^{239}$Pu and fast fission of $^{238}$U at various times after shutdown following two limiting reactor operating periods, one for a fission pulse and one for a reactor operated at a constant fissioning rate for an infinite period of time and then instantaneously shut down. These standard representations do not account for neutron capture by fission products. Uncertainties are provided for each shutdown time for each of the tabulations. Methods are prescribed for obtaining the total fission-product decay heat power and the associated uncertainty for finite operating times from either the pulse or infinite operation representations. A method is prescribed to account for the effect of neutron capture in fission products for shutdown times, t, less than $10^4$ sec using a multiplying factor that depends upon reactor operating time, total fissions per initial fissile atom, and the time after shutdown t. The upper bound for this factor is also prescribed for shutdown times up to $10^9$ sec. The user has the option of computing and justifying the capture correction.

2.3 Spatial Distribution Not Included. The variation of the spatial distribution of the decay heat power deposition is left to the users of this standard. This standard relates local production of decay heat radiations in the shutdown condition to local fission power in the operating condition. Time dependence of radiation spectra in the shutdown reactor may cause variation in the spatial distribution of the gamma-ray energy deposition. This influence is beyond the scope of the present standard.

2.4 Users' Option. Users may employ their own computer programs and nuclear data to compute decay heat power. Justification for these programs and nuclear data shall be documented in a form amenable to review procedures.

3. Fission-Product Decay Heat Power 3.1 Definition of Terms. The following notation defines the terms to be used in this section of the standard. Independent variables are enclosed in parentheses ( ).

| | |
|---|---|
| T' | Time measured from initial reactor startup, seconds |
| T | Total operating period, including intermediate periods at zero power, seconds |
| t | Time after shutdown; cooling time, seconds |
| ∞ | Infinite time T ≡ $10^{13}$ seconds (for computational purposes) |
| $f_i(t)$ | Decay heat power t seconds after a fission pulse from fissionable nuclide i, in MeV/sec/fission |
| $\Delta f_i(t)$ | One standard deviation in $f_i(t)$ MeV/sec/fission |
| $F_i(t,T)$ | Decay heat power t seconds after an operating period of T sec at constant fission rate of nuclide i in the absence of neutron capture in fission products in (MeV/sec)/(fission/sec) |
| $\Delta F_i(t,T)$ | One standard deviation in $F_i(t,T)$ in the same units as $F_i(t,T)$ |
| $Q_i$ | Total recoverable energy associated with one fission of nuclide i, MeV/fission[2] |
| $\Delta Q_i$ | One standard deviation in $Q_i$, MeV/fission |
| $P_{i\alpha}$ | Average power from fissioning of nuclide i during operation period $T_\alpha$, MeV/sec |
| $\Delta P_{i\alpha}$ | One standard deviation in $P_{i\alpha}$, MeV/sec |
| $\alpha$ | An index specifying an operating period at constant power |
| $P_d(t,T)$ | Total fission product decay heat power at t sec after shutdown from an operating history of T sec duration, MeV/sec |
| $P'_d(t,T)$ | Total fission product decay heat power corresponding to $P_d(t,T)$ but uncorrected for nuetron capture in fission products, MeV/sec |
| $P'_{di}(t,T)$ | Fission product decay heat power contribution to $P'_d(t,T)$ by ith fissionable nuclide, uncorrected for neutron capture in fission products, MeV/sec |
| $G(t)$ | The factor which accounts for neutron capture in fission products |
| $\psi$ | Fissions per initial fissile atom, dimensionless |
| $P_i(T')$ | The power generated by ith fissionable nuclide at T', MeV/sec |
| $P(T')$ | The total power at T' equals $\sum_i P_i(T')$, MeV/sec |
| $\Delta P(T')$ | One standard deviation in $P(T')$, MeV/sec |

---
[2] Includes fission fragment and neutron kinetic energy, prompt γ energy, γ and β radiation from complete decay of fission products and γ and β radiation from capture reactions in all fuel, coolant, and structural materials.

3.2 General. The data on fission product decay heat power are presented in two ways. The first is $f_i(t)$ which represents decay heat power per fission following an instantaneous pulse of a significant number of fission events. $f_i(t)$ and its assigned uncertainty ($1\sigma$) are presented for thermal fission of $^{235}$U and $^{239}$Pu in Tables 1 and 2 respectively and for fast fission of $^{238}$U in Table 3. The second method of presentation is $F_i(t,\infty)$, the decay heat power from fission products produced at a constant rate over an infinitely long operating period without neutron absorption in the fission products. $F_i(t,\infty)$ and its assigned uncertainty ($1\sigma$) is presented for thermal fission of $^{235}$U and $^{239}$Pu in Tables 4 and 5 and for fast fission of $^{238}$U in Table 6. Tables 7, 8, and 9 give the parameters for exponential fits to $f_i(t)$ and $F_i(t,T)$ for the three fissionable nuclides.

Internal consistency of the standard values of $f(t)$ and $F(t)$ was achieved by using the exponential representations to generate the tabular values. Use of the tables must be approached with some caution since their use is subject to interpolation and round-off errors.

Methods are prescribed below for obtaining the decay heat power $P'_d(t,T)$ for an arbitrary reactor power history without neutron capture in fission products. Neutron capture in fission products has a small effect upon decay heat power for $0 \leq t \leq 10^4$ sec and is treated as a correction factor $G(t)$. The total decay heat power is given by:

$$P_d(t,T) = P'_d(t,T) \cdot G(t) \quad (Eq\ 1)$$

where $$P'_d(t,T) = \sum_{i=1}^{3} P'_{di}(t,T) \quad (Eq\ 2)$$

and $i = 1,2,3$ represent $^{235}$U thermal (throughout the standard, this shall include the other fissionable nuclides referred to in 2.1), $^{239}$Pu thermal, and $^{238}$U fast. $G(t)$ is presented in 3.5. For $10^4 < t < 10^9$ sec, a conservative upperbound $G_{max}(t)$ is given in Table 10 for use in Equation (1). User options are provided in 3.5.

3.3 Determining Decay Heat Power and Uncertainty from $f_i(t)$. The uncorrected decay heat power contributed by fissioning of nuclide i shall be calculated from $$P'_{di}(t,T) = \int_0^T \frac{P_i(T')}{Q_i} f_i(t + T - T') dT' \quad (Eq\ 3)$$

Equations (1) and (2) shall then be used to obtain the fission product decay heat power, $P_d(t,T)$.

The uncertainty in $P'_{di}$ shall be calculated from $$\left(\frac{\Delta P'_{di}}{P'_{di}}\right)^2 = \left(\frac{\Delta Q_i}{Q_i}\right)^2 + \left(\frac{\int_0^T P_i(T') \Delta f_i(t+T-T') dT'}{Q_i P'_{di}}\right)^2 \quad (Eq\ 4)$$

Values of $Q_i$ and $\Delta Q_i$ for specific reactors shall be provided and justified by the user.

The uncertainty in $P_d$ is given by $$\left(\frac{\Delta P_d}{P_d}\right)^2 = \left(\frac{\Delta P'_d}{P'_d}\right)^2 + \left(\frac{\Delta P}{P}\right)^2 \quad (Eq\ 5a)$$

where $$|\Delta P'_d| = \sum_{i=1}^{3} |\Delta P'_{di}| \quad (Eq\ 5b)$$

and where $\Delta P$ shall be provided and justified by the user.

3.4 Determining Decay Heat Power and Its Uncertainty from $F_i(t,\infty)$. When the reactor operating history can be represented by a histogram of N time intervals with constant power, $P_{i\alpha}$, from fissionable nuclide i assigned to time interval $\alpha$, then the decay heat power and its uncertainty may be computed from $F_i$ and $\Delta F_i$. An example is shown in Figure 1.

Then the uncorrected decay heat power, $P'_{di}$, shall be calculated from $$P'_{di}(t,T) = \sum_{\alpha=1}^{N} \frac{P_{i\alpha} F_i(t_\alpha, T_\alpha)}{Q_i} \quad (Eq\ 6)$$

where $$t_1 = t,\ t_2 = t + T_1,\ t_N = t + \sum_{\alpha=1}^{N-1} T_\alpha,$$

$$T = \sum_{\alpha=1}^{N} T_\alpha \quad (Eq\ 7)$$

and $$F_i(t_\alpha, T_\alpha) = F_i(t_\alpha, \infty) - F_i(t_\alpha + T_\alpha, \infty) \quad (Eq\ 8)$$

The uncertainty in $P'_{di}(t,T)$ shall be determined as $$\left(\frac{\Delta P'_{di}}{P'_{di}}\right)^2 = \left(\frac{\Delta Q_i}{Q_i}\right)^2 + \left[\frac{\sum_{\alpha=1}^{N} P_{i\alpha} \Delta F_i(t_\alpha, T_\alpha)}{Q_i P'_{di}}\right]^2 \quad (Eq\ 9)$$

where $$\Delta F_i(t,T) = \Delta F_i(t,\infty) - \Delta F_i(t+T,\infty) \quad (Eq\ 10)$$

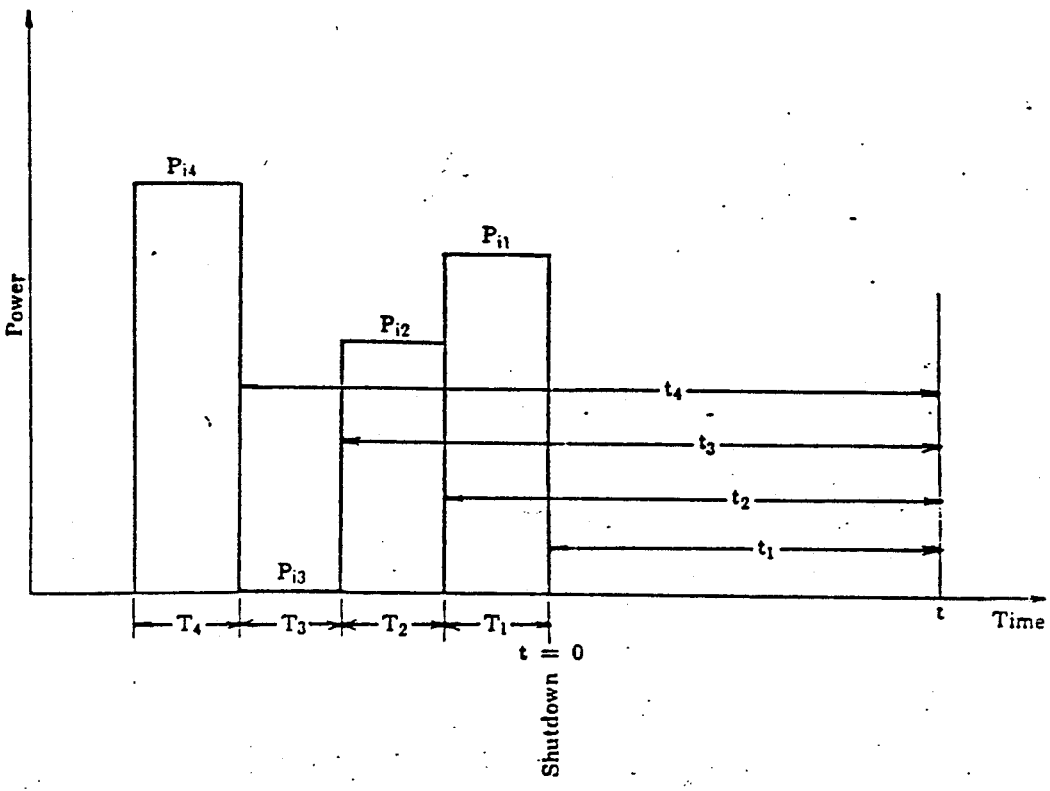

*Figure 1*

The number of histograms shall be deemed adequate if halving each time interval changes the value of $P'_{di}$ obtained from Equation (6) by less than one-half of the value of $\Delta P'_{di}$ obtained from Equation (9).

The decay heat power and uncertainty are then calculated using Equations (1), (2), (5a), and (5b).

3.5 Effect of Neutron Capture in Fission Products.

For shutdown times $t < 10^4$ sec, operating times $T < 1.2614 \times 10^8$ sec (4 years) and $\psi < 3.0$ the factor $G(t)$ which accounts for neutron capture in fission products shall be computed for $t$, $T$, and $\psi$ defined in Section 3.1 as follows:

$$G(t) = 1.0 + (3.24 \times 10^{-6} + 5.23 \times 10^{-10} t) T^{0.4} \psi \quad (Eq\ 11)$$

For shutdown times $10^4 < t < 10^9$ sec, Table 10 lists multiplicative factors, $G_{max}(t)$, i.e., the maximum of $G(t)$, that shall be applied; as a user option Table 10 may be used in place of the $G(t)$ factor given by Equation (11), for times $t < 10^4$ sec. The user also has the option of calculating and justifying the capture correction for either or both of these shutdown time regimes.

Table 10 values were calculated using the following conditions which exceed current light water reactor (LWR) operating conditions:

a) Cross section data in ENDF/B-IV averaged in a typical LWR spectrum.

b) Constant power for 4 years prior to shutdown.

c) Thermal neutron flux $\phi_{th} = 1.75 \times 10^{14}$ n/cm$^2$-sec (equivalent to a flux of $10^{14}$ applied to effective cross sections at 0.0253 eV). Epithermal neutron flux $\phi_{epi} = 3 \times 10^{14}$ n/cm$^2$-sec (where $\phi_{epi}$ is the total resonance region flux in the range of 0.625 eV to $5.53 \times 10^3$ eV).

d) $^{235}$U thermal fission.

For operating times and fluxes lower than these conditions, $G_{max}(t)$ of Table 10 overestimates the capture correction. If these conditions are exceeded, the user shall calculate and justify the capture correction.

In the application of this standard, the multiplier, $G(t)$, does not contribute to the statistical error associated with Equation (1) because it is assumed to make a negligible contribution for $t < 10^4$ sec; for $t > 10^4$ only an approximate upper bound on $G(t)$ is specified in this standard.

3.6 Simplified Method for Determining Decay Heat Power and Uncertainty.

The decay heat power may be obtained by using the simplified method outlined in this section. It is assumed that the decay heat power from fissioning isotopes other than $^{235}U$ is identical to that of $^{235}U$ and that the fission rate is constant over the operating history of the maximum level corresponding to a power $P_{max}$. Use is made only of the infinite operating period data for $^{235}U$, Table 4. This simplified method overestimates decay heat power, especially with respect to LWR cores containing an appreciable amount of plutonium.

For finite reactor operating time, T, the decay heat power without neutron absorption in fission products is $$P'_d(t,T) = 1.02 \frac{P_{max}}{Q} \left[ F(t,\infty) - F(t+T,\infty) \right]. \quad (Eq\ 12)$$

where F and Q are for $^{235}U$.

The corrected decay heat power is obtained by substituting this result into Equation (1). The uncertainty in $P_d$ is given as $$\left(\frac{\Delta P_d}{P_d}\right)^2 = \left(\frac{\Delta P_{max}}{P_{max}}\right)^2 + 0.0016. \quad (Eq\ 13)$$

4. $^{239}U$ and $^{239}Np$ Decay Heat Power

The $^{239}U$ and $^{239}Np$ contributions to the total decay heat power per fission per second shall be obtained from the following expressions:

$$F_{239U}(t,T) = E_{239U} R \left[ 1 - \exp(-\lambda_1 T) \right] \exp(-\lambda_1 t) \quad (Eq\ 14)$$

$$F_{239Np}(t,T) = E_{239Np} R \left\{ \frac{\lambda_1}{\lambda_1 - \lambda_2} \left[ 1 - \exp(-\lambda_2 T) \right] \exp(-\lambda_2 t) - \frac{\lambda_2}{\lambda_1 - \lambda_2} \left[ 1 - \exp(-\lambda_1 T) \right] \exp(-\lambda_1 T) \right\} \quad (Eq\ 15)$$

where:

$E_{239U}$ = Average energy from the decay of one $^{239}U$ atom = 0.474 MeV $E_{239Np}$ = Average energy from the decay of one $^{239}Np$ atom = 0.419 MeV R = atoms of $^{239}U$ produced per second per fission per second evaluated for the reactor composition at the time of shutdown $\lambda_1$ = decay constant for $^{239}U$ ($= 4.91 \times 10^{-4}$ sec$^{-1}$)

$\lambda_2$ = decay constant for $^{239}Np$ ($= 3.41 \times 10^{-6}$ sec$^{-1}$)

F is units of (MeV/sec) per (fission/sec)

The value of R shall be supplied and justified by the user.

The decay heat power contributed by these heavy elements $P_{dHE}(t,T)$ shall then be calculated from $$P_{dHE}(t,T) = \frac{P}{Q} \left[ F_{239U}(t,T) + F_{239Np}(t,T) \right] \quad (Eq\ 16)$$

where P shall be taken as the maximum reactor power during the operating history and Q is the effective energy release per fission evaluated for the reactor composition at the time of shutdown. $P_{dHE}(t,T)$ shall be added to the fission product decay heat power.

5. Concerning Shutdown Times > 10⁹ Sec

This standard does not apply for $t > 10^9$ sec and should not be extrapolated beyond $10^9$ sec.

6. Tabular Data

Table 1
Tabular Data for Standard Decay Heat Power For Pulse Thermal Fission of $^{235}U$

| Time After Shutdown (s) | Decay Heat Power f(t) (MeV/s/fission) | One Sigma Uncertainty Δf(t) (MeV/s/fission) | One Sigma Uncertainty Percent |
|---|---|---|---|
| 1.0000E+00 | 7.123E-01 (a) | 2.818E-01 | 39.6 |
| 1.5000E+00 | 6.167E-01 | 1.097E-01 | 17.8 |
| 2.0000E+00 | 5.390E-01 | 0.445E-01 | 8.3 |
| 4.0000E+00 | 3.431E-01 | 0.146E-01 | -4.3 |
| 6.0000E+00 | 2.443E-01 | 0.087E-01 | 3.5 |
| 8.0000E+00 | 1.876E-01 | 0.059E-01 | 3.1 |

Table 1 (cont'd.)

| Time After Shutdown (s) | Decay Heat Power f(t) (MeV/s/fission) | One Sigma Uncertainty $\Delta f(t)$ (MeV/s/fission) | One Sigma Uncertainty Percent |
|---|---|---|---|
| 1.0000E+01 | 1.512E-01 | 0.048E-01 | 3.2 |
| 1.5000E+01 | 9.981E-02 | 0.255E-02 | 2.6 |
| 2.0000E+01 | 7.336E-02 | 0.179E-02 | 2.4 |
| 4.0000E+01 | 3.546E-02 | 0.072E-02 | 2.0 |
| 6.0000E+01 | 2.321E-02 | 0.045E-02 | 1.9 |
| 8.0000E+01 | 1.684E-02 | 0.033E-02 | 1.9 |
| 1.0000E+02 | 1.295E-02 | 0.023E-02 | 1.8 |
| 1.5000E+02 | 7.867E-03 | 0.149E-03 | 1.9 |
| 2.0000E+02 | 5.479E-03 | 0.105E-03 | 1.9 |
| 4.0000E+02 | 2.383E-03 | 0.044E-03 | 1.9 |
| 6.0000E+02 | 1.581E-03 | 0.029E-03 | 1.8 |
| 8.0000E+02 | 1.195E-03 | 0.023E-03 | 1.9 |
| 1.0000E+03 | 9.588E-04 | 0.175E-04 | 1.8 |
| 1.5000E+03 | 6.345E-04 | 0.116E-04 | 1.8 |
| 2.0000E+03 | 4.648E-04 | 0.082E-04 | 1.8 |
| 4.0000E+03 | 1.977E-04 | 0.037E-04 | 1.9 |
| 6.0000E+03 | 1.152E-04 | 0.021E-04 | 1.8 |
| 8.0000E+03 | 7.891E-05 | 0.139E-05 | 1.8 |
| 1.0000E+04 | 5.897E-05 | 0.104E-05 | 1.8 |
| 1.5000E+04 | 3.419E-05 | 0.054E-05 | 1.6 |
| 2.0000E+04 | 2.302E-05 | 0.033E-05 | 1.4 |
| 4.0000E+04 | 9.328E-06 | 0.134E-06 | 1.4 |
| 6.0000E+04 | 5.372E-06 | 0.074E-06 | 1.4 |
| 8.0000E+04 | 3.558E-06 | 0.048E-06 | 1.4 |
| 1.0000E+05 | 2.579E-06 | 0.035E-06 | 1.7 |
| 1.5000E+05 | 1.434E-06 | 0.029E-06 | 2.0 |
| 2.0000E+05 | 9.465E-07 | 0.189E-07 | 2.0 |
| 4.0000E+05 | 3.981E-07 | 0.080E-07 | 2.0 |
| 6.0000E+05 | 2.663E-07 | 0.053E-07 | 2.0 |
| 8.0000E+05 | 2.015E-07 | 0.040E-07 | 2.0 |
| 1.0000E+06 | 1.606E-07 | 0.032E-07 | 2.0 |
| 1.5000E+06 | 1.039E-07 | 0.021E-07 | 2.0 |
| 2.0000E+06 | 7.526E-08 | 0.151E-08 | 2.0 |
| 4.0000E+06 | 3.143E-08 | 0.063E-08 | 2.0 |
| 6.0000E+06 | 1.818E-08 | 0.036E-08 | 2.0 |
| 8.0000E+06 | 1.277E-08 | 0.026E-08 | 2.0 |
| 1.0000E+07 | 9.829E-09 | 0.197E-09 | 2.0 |
| 1.5000E+07 | 5.803E-09 | 0.116E-09 | 2.0 |
| 2.0000E+07 | 3.672E-09 | 0.073E-09 | 2.0 |
| 4.0000E+07 | 1.041E-09 | 0.021E-09 | 2.0 |
| 6.0000E+07 | 5.445E-10 | 0.109E-10 | 2.0 |
| 8.0000E+07 | 3.438E-10 | 0.069E-10 | 2.0 |
| 1.0000E+08 | 2.342E-10 | 0.047E-10 | 2.0 |
| 1.5000E+08 | 1.204E-10 | 0.024E-10 | 2.0 |
| 2.0000E+08 | 8.857E-11 | 0.177E-11 | 2.0 |
| 4.0000E+08 | 6.632E-11 | 0.133E-11 | 2.0 |
| 6.0000E+08 | 5.634E-11 | 0.113E-11 | 2.0 |
| 8.0000E+08 | 4.815E-11 | 0.096E-11 | 2.0 |

(b)

| | | | |
|---|---|---|---|
| 1.0000E+09 | 4.127E-11 | 0.083E-11 | 2.0 |
| 1.5000E+09 | 2.820E-11 | 0.056E-11 | 2.0 |
| 2.0000E+09 | 1.930E-11 | 0.039E-11 | 2.0 |
| 4.0000E+09 | 4.247E-12 | 0.085E-12 | 2.0 |
| 6.0000E+09 | 9.369E-13 | 0.187E-13 | 2.0 |
| 8.0000E+09 | 2.084E-13 | 0.042E-13 | 2.0 |
| 1.0000E+10 | 4.746E-14 | 0.095E-14 | 2.0 |

Table 1 (cont'd.)

| Time After Shutdown (s) | Decay Heat Power f(t) (MeV/s/fission) | One Sigma Uncertainty Δf(t) (MeV/s/fission) | One Sigma Uncertainty Percent |
|---|---|---|---|
| 1.5000E+10 | 2.067E-15 | 0.041E-15 | 2.0 |
| 2.0000E+10 | 6.398E-16 | 0.128E-16 | 2.0 |
| 4.0000E+10 | 4.399E-16 | 0.088E-16 | 2.0 |
| 6.0000E+10 | 4.372E-16 | 0.087E-16 | 2.0 |
| 8.0000E+10 | 4.357E-16 | 0.087E-16 | 2.0 |
| 1.0000E+11 | 4.342E-16 | 0.087E-16 | 2.0 |
| 1.5000E+11 | 4.306E-16 | 0.086E-16 | 2.0 |
| 2.0000E+11 | 4.270E-16 | 0.085E-16 | 2.0 |
| 4.0000E+11 | 4.131E-16 | 0.083E-16 | 2.0 |
| 6.0000E+11 | 3.998E-16 | 0.080E-16 | 2.0 |
| 8.0000E+11 | 3.870E-16 | 0.077E-16 | 2.0 |
| 1.0000E+12 | 3.748E-16 | 0.075E-16 | 2.0 |
| 1.5000E+12 | 3.464E-16 | 0.069E-16 | 2.0 |
| 2.0000E+12 | 3.210E-16 | 0.064E-16 | 2.0 |
| 4.0000E+12 | 2.425E-16 | 0.049E-16 | 2.0 |
| 6.0000E+12 | 1.909E-16 | 0.038E-16 | 2.0 |
| 8.0000E+12 | 1.566E-16 | 0.031E-16 | 2.0 |
| 1.0000E+13 | 1.334E-16 | 0.027E-16 | 2.0 |

(a) Read as $7.123 \times 10^{-1}$
(b) Data for t greater than $10^9$s are provided solely for use in Equations (3) and (4). They are not to be interpreted as standard decay heat values at these times.

Table 2
Tabular Data for Standard Decay Heat Power for Pulse Thermal Fission of $^{239}$Pu

| Time After Shutdown (s) | Decay Heat Power f(t) (MeV/s/fission) | One Sigma Uncertainty Δf(t) (MeV/s/fission) | One Sigma Uncertainty Percent |
|---|---|---|---|
| 1.0E+00 | 5.286E-01 (a) | 2.858E-01 | 54. |
| 1.5E+00 | 4.495E-01 | 1.228E-01 | 27. |
| 2.0E+00 | 3.879E-01 | 0.484E-01 | 12. |
| 4.0E+00 | 2.431E-01 | 0.133E-01 | 5.5 |
| 6.0E+00 | 1.748E-01 | 0.090E-01 | 5.1 |
| 8.0E+00 | 1.357E-01 | 0.067E-01 | 4.9 |
| 1.0E+01 | 1.103E-01 | 0.054E-01 | 4.9 |
| 1.5E+01 | 7.386E-02 | 0.339E-02 | 4.6 |
| 2.0E+01 | 5.520E-02 | 0.240E-02 | 4.4 |
| 4.0E+01 | 2.800E-02 | 0.113E-02 | 4.0 |
| 6.0E+01 | 1.876E-02 | 0.074E-02 | 3.9 |
| 8.0E+01 | 1.386E-02 | 0.054E-02 | 3.9 |
| 1.0E+02 | 1.080E-02 | 0.042E-02 | 3.9 |
| 1.5E+02 | 6.686E-03 | 0.261E-03 | 3.9 |
| 2.0E+02 | 4.718E-03 | 0.188E-03 | 4.0 |
| 4.0E+02 | 2.217E-03 | 0.086E-03 | 3.9 |
| 6.0E+02 | 1.523E-03 | 0.059E-03 | 3.8 |
| 8.0E+02 | 1.170E-03 | 0.045E-03 | 3.9 |
| 1.0E+03 | 9.505E-04 | 0.363E-04 | 3.8 |
| 1.5E+03 | 6.362E-04 | 0.246E-04 | 3.9 |
| 2.0E+03 | 4.614E-04 | 0.180E-04 | 3.9 |
| 4.0E+03 | 1.847E-04 | 0.075E-04 | 4.0 |
| 6.0E+03 | 1.016E-04 | 0.043E-04 | 4.3 |
| 8.0E+03 | 6.619E-05 | 0.304E-05 | 4.6 |
| 1.0E+04 | 4.790E-05 | 0.219E-05 | 4.6 |

Table 2 (Con't)

| Time After Shutdown (s) | Decay Heat Power f(t) (MeV/s/fission) | One Sigma Uncertainty Δf(t) (MeV/s/fission) | One Sigma Uncertainty Percent |
|---|---|---|---|
| 1.5E+04 | 2.710E-05 | 0.140E-05 | 5.2 |
| 2.0E+04 | 1.828E-05 | 0.087E-05 | 4.8 |
| 4.0E+04 | 7.878E-06 | 0.348E-06 | 4.4 |
| 6.0E+04 | 4.874E-06 | 0.224E-06 | 4.6 |
| 8.0E+04 | 3.366E-06 | 0.162E-06 | 4.8 |
| 1.0E+05 | 2.496E-06 | 0.125E-06 | 5.0 |
| 1.5E+05 | 1.436E-06 | 0.072E-06 | 5.0 |
| 2.0E+05 | 9.775E-07 | 0.489E-07 | 5.0 |
| 4.0E+05 | 4.307E-07 | 0.215E-07 | 5.0 |
| 6.0E+05 | 2.812E-07 | 0.141E-07 | 5.0 |
| 8.0E+05 | 2.072E-07 | 0.104E-07 | 5.0 |
| 1.0E+06 | 1.616E-07 | 0.081E-07 | 5.0 |
| 1.5E+06 | 9.989E-08 | 0.500E-08 | 5.0 |
| 2.0E+06 | 7.022E-08 | 0.351E-08 | 5.0 |
| 4.0E+06 | 2.819E-08 | 0.141E-08 | 5.0 |
| 6.0E+06 | 1.599E-08 | 0.080E-08 | 5.0 |
| 8.0E+06 | 1.112E-08 | 0.056E-08 | 5.0 |
| 1.0E+07 | 8.593E-09 | 0.430E-09 | 5.0 |
| 1.5E+07 | 5.287E-09 | 0.264E-09 | 5.0 |
| 2.0E+07 | 3.568E-09 | 0.178E-09 | 5.0 |
| 4.0E+07 | 1.335E-09 | 0.067E-09 | 5.0 |
| 6.0E+07 | 7.761E-10 | 0.388E-10 | 5.0 |
| 8.0E+07 | 4.956E-10 | 0.248E-10 | 5.0 |
| 1.0E+08 | 3.277E-10 | 0.164E-10 | 5.0 |
| 1.5E+08 | 1.379E-10 | 0.069E-10 | 5.0 |
| 2.0E+08 | 7.884E-11 | 0.394E-11 | 5.0 |
| 4.0E+08 | 4.393E-11 | 0.220E-11 | 5.0 |
| 6.0E+08 | 3.687E-11 | 0.184E-11 | 5.0 |
| 8.0E+08 | 3.164E-11 | 0.158E-11 | 5.0 |
| (b) 1.0E+09 | 2.724E-11 | 0.136E-11 | 5.0 |
| 1.5E+09 | 1.877E-11 | 0.094E-11 | 5.0 |
| 2.0E+09 | 1.294E-11 | 0.065E-11 | 5.0 |
| 4.0E+09 | 2.927E-12 | 0.146E-12 | 5.0 |
| 6.0E+09 | 6.668E-13 | 0.333E-13 | 5.0 |
| 8.0E+09 | 1.550E-13 | 0.078E-13 | 5.0 |
| 1.0E+10 | 3.816E-14 | 0.191E-14 | 5.0 |
| 1.5E+10 | 3.075E-15 | 0.154E-15 | 5.0 |
| 2.0E+10 | 1.526E-15 | 0.076E-15 | 5.0 |
| 4.0E+10 | 1.181E-15 | 0.059E-15 | 5.0 |
| 6.0E+10 | 1.174E-15 | 0.059E-15 | 5.0 |
| 8.0E+10 | 1.169E-15 | 0.059E-15 | 5.0 |
| 1.0E+11 | 1.164E-15 | 0.058E-15 | 5.0 |
| 1.5E+11 | 1.152E-15 | 0.058E-15 | 5.0 |
| 2.0E+11 | 1.141E-15 | 0.057E-15 | 5.0 |
| 4.0E+11 | 1.095E-15 | 0.055E-15 | 5.0 |
| 6.0E+11 | 1.052E-15 | 0.053E-15 | 5.0 |
| 8.0E+11 | 1.010E-15 | 0.051E-15 | 5.0 |
| 1.0E+12 | 9.707E-16 | 0.485E-16 | 5.0 |
| 1.5E+12 | 8.786E-16 | 0.439E-16 | 5.0 |
| 2.0E+12 | 7.961E-16 | 0.398E-16 | 5.0 |
| 4.0E+12 | 5.431E-16 | 0.272E-16 | 5.0 |
| 6.0E+12 | 3.794E-16 | 0.190E-16 | 5.0 |
| 8.0E+12 | 2.732E-16 | 0.137E-16 | 5.0 |
| 1.0E+13 | 2.040E-16 | 0.102E-16 | 5.0 |

(a) Read as $5.286 \times 10^{-1}$
(b) Data for t greater than $10^9$s are provided solely for use in Equations (3) and (4). They are not to be interpreted as standard decay heat values at these times.

Table 3
Tabular Data for Standard Decay Heat Power for Pulse Fast Fission of $^{238}U$

| Time After Shutdown (s) | Decay Heat Power f(t) (MeV/s/fission) | One Sigma Uncertainty Δf(t) (MeV/s/fission) | One Sigma Uncertainty Percent |
|---|---|---|---|
| 1.0E+00 | 1.315E+00 (a) | 0.297E+00 | 23. |
| 1.5E+00 | 1.014E+00 | 0.221E+00 | 22. |
| 2.0E+00 | 8.196E-01 | 1.714E-01 | 21. |
| 4.0E+00 | 4.469E-01 | 0.884E-01 | 20. |
| 6.0E+00 | 3.027E-01 | 0.575E-01 | 19. |
| 8.0E+00 | 2.286E-01 | 0.421E-01 | 18. |
| 1.0E+01 | 1.838E-01 | 0.329E-01 | 18. |
| 1.5E+01 | 1.237E-01 | 0.213E-01 | 17. |
| 2.0E+01 | 9.255E-02 | 1.533E-02 | 17. |
| 4.0E+01 | 4.415E-02 | 0.647E-02 | 15. |
| 6.0E+01 | 2.836E-02 | 0.364E-02 | 13. |
| 8.0E+01 | 2.035E-02 | 0.230E-02 | 11. |
| 1.0E+02 | 1.551E-02 | 0.156E-02 | 10. |
| 1.5E+02 | 9.237E-03 | 0.801E-03 | 8.7 |
| 2.0E+02 | 6.298E-03 | 0.457E-03 | 7.3 |
| 4.0E+02 | 2.513E-03 | 0.157E-03 | 6.2 |
| 6.0E+02 | 1.566E-03 | 0.093E-03 | 5.9 |
| 8.0E+02 | 1.157E-03 | 0.066E-03 | 5.7 |
| 1.0E+03 | 9.273E-04 | 0.519E-04 | 5.6 |
| 1.5E+03 | 6.221E-04 | 0.337E-04 | 5.4 |
| 2.0E+03 | 4.563E-04 | 0.245E-04 | 5.4 |
| 4.0E+03 | 1.913E-04 | 0.104E-04 | 5.4 |
| 6.0E+03 | 1.091E-04 | 0.060E-04 | 5.5 |
| 8.0E+03 | 7.270E-05 | 0.404E-05 | 5.6 |
| 1.0E+04 | 5.319E-05 | 0.298E-05 | 5.6 |
| 1.5E+04 | 3.011E-05 | 0.161E-05 | 5.3 |
| 2.0E+04 | 2.010E-05 | 0.102E-05 | 5.1 |
| 4.0E+04 | 8.289E-06 | 0.393E-06 | 4.7 |
| 6.0E+04 | 4.942E-06 | 0.226E-06 | 4.6 |
| 8.0E+04 | 3.343E-06 | 0.151E-06 | 4.5 |
| 1.0E+05 | 2.458E-06 | 0.110E-06 | 4.5 |
| 1.5E+05 | 1.406E-06 | 0.059E-06 | 4.2 |
| 2.0E+05 | 9.496E-07 | 0.365E-07 | 3.8 |
| 4.0E+05 | 4.161E-07 | 0.153E-07 | 3.7 |
| 6.0E+05 | 2.746E-07 | 0.098E-07 | 3.6 |
| 8.0E+05 | 2.032E-07 | 0.072E-07 | 3.5 |
| 1.0E+06 | 1.592E-07 | 0.056E-07 | 3.5 |
| 1.5E+06 | 9.970E-08 | 0.352E-08 | 3.5 |
| 2.0E+06 | 7.076E-08 | 0.250E-08 | 3.5 |
| 4.0E+06 | 2.916E-08 | 0.104E-08 | 3.6 |
| 6.0E+06 | 1.686E-08 | 0.061E-08 | 3.6 |
| 8.0E+06 | 1.182E-08 | 0.043E-08 | 3.6 |
| 1.0E+07 | 9.125E-09 | 0.336E-09 | 3.7 |
| 1.5E+07 | 5.524E-09 | 0.208E-09 | 3.8 |
| 2.0E+07 | 3.641E-09 | 0.140E-09 | 3.8 |
| 4.0E+07 | 1.248E-09 | 0.051E-09 | 4.1 |
| 6.0E+07 | 7.020E-10 | 0.310E-10 | 4.4 |
| 8.0E+07 | 4.441E-10 | 0.209E-10 | 4.7 |
| 1.0E+08 | 2.939E-10 | 0.147E-10 | 5.0 |
| 1.5E+08 | 1.288E-10 | 0.064E-10 | 5.0 |
| 2.0E+08 | 7.922E-11 | 0.396E-11 | 5.0 |
| 4.0E+08 | 4.918E-11 | 0.246E-11 | 5.0 |
| 6.0E+08 | 4.141E-11 | 0.207E-11 | 5.0 |
| 8.0E+08 | 3.548E-11 | 0.177E-11 | 5.0 |

Table 3 (Cont'd.)

| Time After Shutdown (s) | Decay Heat Power f(t) (MeV/s/fission) | One Sigma Uncertainty Δf(t) (MeV/s/fission) | One Sigma Uncertainty Percent |
|---|---|---|---|
| (b) | | | |
| 1.0E+09 | 3.051E-11 | 0.153E-11 | 5.0 |
| 1.5E+09 | 2.096E-11 | 0.105E-11 | 5.0 |
| 2.0E+09 | 1.440E-11 | 0.072E-11 | 5.0 |
| 4.0E+09 | 3.216E-12 | 0.161E-12 | 5.0 |
| 6.0E+09 | 7.228E-13 | 0.361E-13 | 5.0 |
| 8.0E+09 | 1.654E-13 | 0.083E-13 | 5.0 |
| 1.0E+10 | 3.975E-14 | 0.199E-14 | 5.0 |
| 1.5E+10 | 2.511E-15 | 0.126E-15 | 5.0 |
| 2.0E+10 | 8.683E-16 | 0.434E-16 | 5.0 |
| 4.0E+10 | 4.937E-16 | 0.247E-16 | 5.0 |
| 6.0E+10 | 4.892E-16 | 0.245E-16 | 5.0 |
| 8.0E+10 | 4.874E-16 | 0.244E-16 | 5.0 |
| 1.0E+11 | 4.856E-16 | 0.243E-16 | 5.0 |
| 1.5E+11 | 4.813E-16 | 0.241E-16 | 5.0 |
| 2.0E+11 | 4.770E-16 | 0.239E-16 | 5.0 |
| 4.0E+11 | 4.604E-16 | 0.230E-16 | 5.0 |
| 6.0E+11 | 4.445E-16 | 0.222E-16 | 5.0 |
| 8.0E+11 | 4.292E-16 | 0.215E-16 | 5.0 |
| 1.0E+12 | 4.146E-16 | 0.207E-16 | 5.0 |
| 1.5E+12 | 3.808E-16 | 0.190E-16 | 5.0 |
| 2.0E+12 | 3.504E-16 | 0.175E-16 | 5.0 |
| 4.0E+12 | 2.568E-16 | 0.128E-16 | 5.0 |
| 6.0E+12 | 1.956E-16 | 0.098E-16 | 5.0 |
| 8.0E+12 | 1.552E-16 | 0.078E-16 | 5.0 |
| 1.0E+13 | 1.282E-16 | 0.064E-16 | 5.0 |

(a) Read as $1.315 \times 10^{+0}$
(b) Data for t greater than $10^9$s are provided solely for use in Equations (3) and (4). They are not to be interpreted as standard decay heat values at these times.

Table 4
Tabular Data for Standard Decay Heat for
Thermal Fission of $^{235}$U and for Irradiation of $10^{13}$ Seconds

| Time After Shutdown (s) | Decay Heat Power F(t,∞) (MeV/fission) (a) | One Sigma Uncertainty ΔF(t,∞) (MeV/fission) | One Sigma Uncertainty Percent |
|---|---|---|---|
| 1.0000E+00 | 1.231E+01 (b) | 0.040E+01 | 3.3 |
| 1.5000E+00 | 1.198E+01 | 0.032E+01 | 2.7 |
| 2.0000E+00 | 1.169E+01 | 0.028E+01 | 2.4 |
| 4.0000E+00 | 1.083E+01 | 0.023E+01 | 2.2 |
| 6.0000E+00 | 1.026E+01 | 0.021E+01 | 2.1 |
| 8.0000E+00 | 9.830E+00 | 0.198E+00 | 2.0 |
| 1.0000E+01 | 9.494E+00 | 0.187E+00 | 2.0 |
| 1.5000E+01 | 8.882E+00 | 0.170E+00 | 1.9 |
| 2.0000E+01 | 8.455E+00 | 0.159E+00 | 1.9 |
| 4.0000E+01 | 7.459E+00 | 0.137E+00 | 1.8 |
| 6.0000E+01 | 6.888E+00 | 0.125E+00 | 1.8 |
| 8.0000E+01 | 6.493E+00 | 0.118E+00 | 1.8 |
| 1.0000E+02 | 6.198E+00 | 0.112E+00 | 1.8 |
| 1.5000E+02 | 5.696E+00 | 0.103E+00 | 1.8 |
| 2.0000E+02 | 5.369E+00 | 0.097E+00 | 1.8 |

Table 4 (Cont'd.)

| Time After Shutdown t(s) | Decay Heat Power F(t,∞) (MeV/s/fission) | One Sigma Uncertainty ΔF(t,∞) (MeV/s/fission) | One Sigma Uncertainty Percent |
|---|---|---|---|
| 4.0000E+02 | 4.667E+00 | 0.083E+00 | 1.8 |
| 6.0000E+02 | 4.282E+00 | 0.076E+00 | 1.8 |
| 8.0000E+02 | 4.009E+00 | 0.071E+00 | 1.8 |
| 1.0000E+03 | 3.796E+00 | 0.067E+00 | 1.8 |
| 1.5000E+03 | 3.408E+00 | 0.060E+00 | 1.8 |
| 2.0000E+03 | 3.137E+00 | 0.055E+00 | 1.8 |
| 4.0000E+03 | 2.534E+00 | 0.045E+00 | 1.8 |
| 6.0000E+03 | 2.234E+00 | 0.039E+00 | 1.7 |
| 8.0000E+03 | 2.044E+00 | 0.036E+00 | 1.7 |
| 1.0000E+04 | 1.908E+00 | 0.033E+00 | 1.7 |
| 1.5000E+04 | 1.685E+00 | 0.030E+00 | 1.8 |
| 2.0000E+04 | 1.545E+00 | 0.027E+00 | 1.8 |
| 4.0000E+04 | 1.258E+00 | 0.023E+00 | 1.9 |
| 6.0000E+04 | 1.117E+00 | 0.021E+00 | 1.9 |
| 8.0000E+04 | 1.030E+00 | 0.020E+00 | 2.0 |
| 1.0000E+05 | 9.691E-01 | 0.194E-01 | 2.0 |
| 1.5000E+05 | 8.734E-01 | 0.175E-01 | 2.0 |
| 2.0000E+05 | 8.154E-01 | 0.163E-01 | 2.0 |
| 4.0000E+05 | 6.975E-01 | 0.140E-01 | 2.0 |
| 6.0000E+05 | 6.331E-01 | 0.127E-01 | 2.0 |
| 8.0000E+05 | 5.868E-01 | 0.117E-01 | 2.0 |
| 1.0000E+06 | 5.509E-01 | 0.110E-01 | 2.0 |
| 1.5000E+06 | 4.866E-01 | 0.097E-01 | 2.0 |
| 2.0000E+06 | 4.425E-01 | 0.089E-01 | 2.0 |
| 4.0000E+06 | 3.457E-01 | 0.069E-01 | 2.0 |
| 6.0000E+06 | 2.983E-01 | 0.060E-01 | 2.0 |
| 8.0000E+06 | 2.680E-01 | 0.054E-01 | 2.0 |
| 1.0000E+07 | 2.457E-01 | 0.049E-01 | 2.0 |
| 1.5000E+07 | 2.078E-01 | 0.042E-01 | 2.0 |
| 2.0000E+07 | 1.846E-01 | 0.037E-01 | 2.0 |
| 4.0000E+07 | 1.457E-01 | 0.029E-01 | 2.0 |
| 6.0000E+07 | 1.308E-01 | 0.026E-01 | 2.0 |
| 8.0000E+07 | 1.222E-01 | 0.024E-01 | 2.0 |
| 1.0000E+08 | 1.165E-01 | 0.023E-01 | 2.0 |
| 1.5000E+08 | 1.082E-01 | 0.022E-01 | 2.0 |
| 2.0000E+08 | 1.032E-01 | 0.021E-01 | 2.0 |
| 4.0000E+08 | 8.836E-02 | 0.177E-02 | 2.0 |
| 6.0000E+08 | 7.613E-02 | 0.152E-02 | 2.0 |
| 8.0000E+08 | 6.570E-02 | 0.131E-02 | 2.0 |
| 1.0000E+09 | 5.678E-02 | 0.114E-02 | 2.0 |

(a) MeV/fission is a contraction of $\frac{(MeV/s)}{(fission/s)}$ (b) Read as $1.231 \times 10^{+0}$

Table 5
Tabular Data for Standard Decay Heat Power for Thermal Fission of $^{239}$Pu and for Irradiation of $10^{13}$ Seconds

| Time After Shutdown t(s) | Decay Heat Power F(t,∞) (MeV/fission) (a) | One Sigma Uncertainty ΔF(t,∞) (MeV/fission) | One Sigma Uncertainty Percent |
|---|---|---|---|
| 1.0E+00 | 1.027E+01 (b) | 0.058E+01 | 5.6 |
| 1.5E+00 | 1.003E+01 | 0.048E+01 | 4.8 |

Table 5 (Cont'd.)

| Time After Shutdown t(s) | Decay Heat Power $F(t,\infty)$ (MeV/fission) (a) | One Sigma Uncertainty $\Delta F(t,\infty)$ (MeV/fission) | One Sigma Uncertainty Percent |
|---|---|---|---|
| 2.0E+00 | 9.816E+00 | 0.441E+00 | 4.5 |
| 4.0E+00 | 9.206E+00 | 0.396E+00 | 4.3 |
| 6.0E+00 | 8.795E+00 | 0.374E+00 | 4.3 |
| 8.0E+00 | 8.488E+00 | 0.359E+00 | 4.2 |
| 1.0E+01 | 8.243E+00 | 0.347E+00 | 4.2 |
| 1.5E+01 | 7.794E+00 | 0.326E+00 | 4.2 |
| 2.0E+01 | 7.476E+00 | 0.311E+00 | 4.2 |
| 4.0E+01 | 6.707E+00 | 0.279E+00 | 4.2 |
| 6.0E+01 | 6.251E+00 | 0.261E+00 | 4.2 |
| 8.0E+01 | 5.929E+00 | 0.248E+00 | 4.2 |
| 1.0E+02 | 5.685E+00 | 0.239E+00 | 4.2 |
| 1.5E+02 | 5.262E+00 | 0.223E+00 | 4.2 |
| 2.0E+02 | 4.982E+00 | 0.211E+00 | 4.2 |
| 4.0E+02 | 4.357E+00 | 0.187E+00 | 4.3 |
| 6.0E+02 | 3.993E+00 | 0.173E+00 | 4.3 |
| 8.0E+02 | 3.726E+00 | 0.163E+00 | 4.4 |
| 1.0E+03 | 3.516E+00 | 0.155E+00 | 4.4 |
| 1.5E+03 | 3.128E+00 | 0.140E+00 | 4.5 |
| 2.0E+03 | 2.857E+00 | 0.129E+00 | 4.5 |
| 4.0E+03 | 2.276E+00 | 0.106E+00 | 4.7 |
| 6.0E+03 | 2.002E+00 | 0.095E+00 | 4.7 |
| 8.0E+03 | 1.839E+00 | 0.088E+00 | 4.8 |
| 1.0E+04 | 1.727E+00 | 0.083E+00 | 4.8 |
| 1.5E+04 | 1.548E+00 | 0.074E+00 | 4.8 |
| 2.0E+04 | 1.437E+00 | 0.068E+00 | 4.8 |
| 4.0E+04 | 1.204E+00 | 0.058E+00 | 4.8 |
| 6.0E+04 | 1.081E+00 | 0.053E+00 | 4.9 |
| 8.0E+04 | 1.000E+00 | 0.049E+00 | 4.9 |
| 1.0E+05 | 9.421E-01 | 0.471E-01 | 5.0 |
| 1.5E+05 | 8.480E-01 | 0.424E-01 | 5.0 |
| 2.0E+05 | 7.890E-01 | 0.395E-01 | 5.0 |
| 4.0E+05 | 6.634E-01 | 0.332E-01 | 5.0 |
| 6.0E+05 | 5.944E-01 | 0.297E-01 | 5.0 |
| 8.0E+05 | 5.462E-01 | 0.273E-01 | 5.0 |
| 1.0E+06 | 5.097E-01 | 0.255E-01 | 5.0 |
| 1.5E+06 | 4.464E-01 | 0.223E-01 | 5.0 |
| 2.0E+06 | 4.046E-01 | 0.202E-01 | 5.0 |
| 4.0E+06 | 3.163E-01 | 0.158E-01 | 5.0 |
| 6.0E+06 | 2.741E-01 | 0.137E-01 | 5.0 |
| 8.0E+06 | 2.477E-01 | 0.124E-01 | 5.0 |
| 1.0E+07 | 2.282E-01 | 0.114E-01 | 5.0 |
| 1.5E+07 | 1.945E-01 | 0.097E-01 | 5.0 |
| 2.0E+07 | 1.728E-01 | 0.086E-01 | 5.0 |
| 4.0E+07 | 1.302E-01 | 0.065E-01 | 5.0 |
| 6.0E+07 | 1.099E-01 | 0.055E-01 | 5.0 |
| 8.0E+07 | 9.741E-02 | 0.487E-02 | 5.0 |
| 1.0E+08 | 8.931E-02 | 0.447E-02 | 5.0 |
| 1.5E+08 | 7.859E-02 | 0.393E-02 | 5.0 |
| 2.0E+08 | 7.344E-02 | 0.367E-02 | 5.0 |
| 4.0E+08 | 6.269E-02 | 0.314E-02 | 5.0 |
| 6.0E+08 | 5.466E-02 | 0.273E-02 | 5.0 |
| 8.0E+08 | 4.783E-02 | 0.239E-02 | 5.0 |
| 1.0E+09 | 4.195E-02 | 0.210E-02 | 5.0 |

(a) MeV/fission is a contraction of $\frac{(MeV/s)}{(fission/s)}$ (b) Read as $1.027 \times 10^{+1}$

Table 6
Tabular Data for Standard Decay Heat Power for Fast Fission of $^{238}$U and for Irradiation of $10^{13}$ Seconds

| Time After Shutdown t(s) | Decay Heat Power $F(t,\infty)$ (MeV/fission) (a) | One Sigma Uncertainty $\Delta F(t,\infty)$ (MeV/fission) | One Sigma Uncertainty Percent |
|---|---|---|---|
| 1.0E+00 | 1.419E+01 (b) | 0.176E+01 | 12. |
| 1.5E+00 | 1.361E+00 | 0.164E+01 | 12. |
| 2.0E+00 | 1.316E+01 | 0.154E+01 | 12. |
| 4.0E+00 | 1.196E+01 | 0.130E+01 | 11. |
| 6.0E+00 | 1.123E+01 | 0.115E+01 | 10. |
| 8.0E+00 | 1.070E+01 | 0.105E+01 | 9.9 |
| 1.0E+01 | 1.029E+01 | 0.098E+01 | 9.5 |
| 1.5E+01 | 9.546E+00 | 0.855E+00 | 9.0 |
| 2.0E+00 | 9.012E+00 | 0.758E+00 | 8.4 |
| 4.0E+01 | 7.755E+00 | 0.560E+00 | 7.2 |
| 6.0E+01 | 7.052E+00 | 0.463E+00 | 6.6 |
| 8.0E+01 | 6.572E+00 | 0.405E+00 | 6.2 |
| 1.0E+02 | 6.217E+00 | 0.367E+00 | 5.9 |
| 1.5E+02 | 5.621E+00 | 0.317E+00 | 5.6 |
| 2.0E+02 | 5.241E+00 | 0.281E+00 | 5.4 |
| 4.0E+02 | 4.464E+00 | 0.229E+00 | 5.1 |
| 6.0E+02 | 4.072E+00 | 0.205E+00 | 5.0 |
| 8.0E+02 | 3.804E+00 | 0.189E+00 | 5.0 |
| 1.0E+03 | 3.598E+00 | 0.177E+00 | 4.9 |
| 1.5E+03 | 3.220E+00 | 0.157E+00 | 4.9 |
| 2.0E+03 | 2.954E+00 | 0.142E+00 | 4.8 |
| 4.0E+03 | 2.366E+00 | 0.111E+00 | 4.7 |
| 6.0E+03 | 2.078E+00 | 0.095E+00 | 4.6 |
| 8.0E+03 | 1.901E+00 | 0.085E+00 | 4.5 |
| 1.0E+04 | 1.777E+00 | 0.078E+00 | 4.4 |
| 1.5E+04 | 1.578E+00 | 0.068E+00 | 4.3 |
| 2.0E+04 | 1.455E+00 | 0.061E+00 | 4.2 |
| 4.0E+04 | 1.204E+00 | 0.049E+00 | 4.1 |
| 6.0E+04 | 1.077E+00 | 0.043E+00 | 4.0 |
| 8.0E+04 | 9.955E-01 | 0.392E-01 | 3.9 |
| 1.0E+05 | 9.383E-01 | 0.366E-01 | 3.9 |
| 1.5E+05 | 8.459E-01 | 0.327E-01 | 3.9 |
| 2.0E+05 | 7.884E-01 | 0.303E-01 | 3.8 |
| 4.0E+05 | 6.673E-01 | 0.258E-01 | 3.9 |
| 6.0E+05 | 6.002E-01 | 0.233E-01 | 3.9 |
| 8.0E+05 | 5.530E-01 | 0.216E-01 | 3.9 |
| 1.0E+06 | 5.171E-01 | 0.204E-01 | 3.9 |
| 1.5E+06 | 4.544E-01 | 0.180E-01 | 4.0 |
| 2.0E+06 | 4.125E-01 | 0.165E-01 | 4.0 |
| 4.0E+06 | 3.224E-01 | 0.132E-01 | 4.1 |
| 6.0E+06 | 2.784E-01 | 0.117E-01 | 4.2 |
| 8.0E+06 | 2.503E-01 | 0.107E-01 | 4.3 |
| 1.0E+07 | 2.296E-01 | 0.101E-01 | 4.4 |
| 1.5E+07 | 1.941E-01 | 0.086E-01 | 4.4 |
| 2.0E+07 | 1.717E-01 | 0.076E-01 | 4.5 |
| 4.0E+07 | 1.299E-01 | 0.060E-01 | 4.6 |
| 6.0E+07 | 1.113E-01 | 0.053E-01 | 4.7 |
| 8.0E+07 | 1.001E-01 | 0.049E-01 | 4.9 |
| 1.0E+08 | 9.280E-02 | 0.464E-02 | 5.0 |
| 1.5E+08 | 8.307E-02 | 0.415E-02 | 5.0 |

Table 6 (Cont'd.)

| Time After Shutdown t(s) | Decay Heat Power $F(t,\infty)$ (MeV/fission) [a] | One Sigma Uncertainty $\Delta F(t,\infty)$ (MeV/fission) | One Sigma Uncertainty Percent |
|---|---|---|---|
| 2.0E+08 | 7.810E-02 | 0.391E-02 | 5.0 |
| 4.0E+08 | 6.647E-02 | 0.332E-02 | 5.0 |
| 6.0E+08 | 5.746E-02 | 0.287E-02 | 5.0 |
| 8.0E+08 | 4.979E-02 | 0.249E-02 | 5.0 |
| 1.0E+09 | 4.321E-02 | 0.216E-02 | 5.0 |

(a) MeV/fission is a contraction of $\frac{(MeV/s)}{(fission/s)}$ (b) Read as $1.419 \times 10^{+1}$ Table 7
Parameters
for
$^{235}$U Thermal Fission Functions f(t) and $F(t,\infty)$ [a]

| $\alpha$ | $\lambda$ | $\alpha$ | $\lambda$ |
|---|---|---|---|
| 6.5057E-01 (b) | 2.2133E+01 | 2.5232E-06 | 1.0010E-05 |
| 5.1264E-01 | 5.1587E-01 | 4.9948E-07 | 2.5438E-06 |
| 2.4384E-01 | 1.9594E-01 | 1.8531E-07 | 6.6361E-07 |
| 1.3850E-01 | 1.0314E-01 | 2.6608E-08 | 1.2290E-07 |
| 5.5440E-02 | 3.3656E-02 | 2.2398E-09 | 2.7213E-08 |
| 2.2225E-02 | 1.1681E-02 | 8.1641E-12 | 4.3714E-09 |
| 3.3088E-03 | 3.5870E-03 | 8.7797E-11 | 7.5780E-10 |
| 9.3015E-04 | 1.3930E-03 | 2.5131E-14 | 2.4786E-10 |
| 8.0943E-04 | 6.2630E-04 | 3.2176E-16 | 2.2384E-13 |
| 1.9567E-04 | 1.8906E-04 | 4.5038E-17 | 2.4600E-14 |
| 3.2535E-05 | 5.4988E-05 | 7.4791E-17 | 1.5699E-14 |
| 7.5595E-06 | 2.0958E-05 | | |

(a)
$$f(t) = \sum_{i=1}^{23} \alpha_i e^{-\lambda_i t} \quad \text{MeV/Fission-s}$$

$$F(t,T) = \sum_{i=1}^{23} \frac{\alpha_i}{\lambda_i} e^{-\lambda_i t} (1 - e^{-\lambda_i T}) \quad \text{MeV/Fission}$$

$F(t,\infty) = F(t,10^{13})$
t and T in seconds (b) Read as $6.5057 \times 10^{-1}$ Table 8

Parameters for $^{239}$Pu Thermal Fission Functions f(t) and F(t,∞) (a)

| α | λ | α | λ |
|---|---|---|---|
| 2.083E-01 (b) | 1.002E+01 | 1.747E-06 | 8.319E-06 |
| 3.853E-01 | 6.433E-01 | 5.481E-07 | 2.358E-06 |
| 2.213E-01 | 2.186E-01 | 1.671E-07 | 6.450E-07 |
| 9.460E-02 | 1.004E-01 | 2.112E-08 | 1.278E-07 |
| 3.531E-02 | 3.728E-02 | 2.996E-09 | 2.466E-08 |
| 2.292E-02 | 1.435E-02 | 5.107E-11 | 9.378E-09 |
| 3.946E-03 | 4.549E-03 | 5.703E-11 | 7.450E-10 |
| 1.317E-03 | 1.328E-03 | 4.136E-14 | 2.426E-10 |
| 7.052E-04 | 5.356E-04 | 1.088E-15 | 2.210E-13 |
| 1.432E-04 | 1.730E-04 | 2.454E-17 | 2.640E-14 |
| 1.765E-05 | 4.881E-05 | 7.557E-17 | 1.380E-14 |
| 7.347E-06 | 2.006E-05 | | |

(a)
$$f(t) = \sum_{i=1}^{23} \alpha_i e^{-\lambda_i t} \quad \text{MeV/Fission-s}$$

$$F(t,T) = \sum_{i=1}^{23} \frac{\alpha_i}{\lambda_i} e^{-\lambda_i t} (1-e^{-\lambda_i T}) \quad \text{MeV/Fission}$$

$F(t,\infty) = F(t,10^{13})$
t and T in seconds (b) Read as $2.083 \times 10^{-1}$ Table 9

Parameters for $^{238}$U Fast Fission Functions f(t) and F(t,∞) (a)

| α | λ | α | λ |
|---|---|---|---|
| 1.2311E+0 (b) | 3.2881E+0 | 1.0075E-6 | 7.0465E-6 |
| 1.1486E+0 | 9.3805E-1 | 4.9894E-7 | 2.3190E-6 |
| 7.0701E-1 | 3.7073E-1 | 1.6352E-7 | 6.4480E-7 |
| 2.5209E-1 | 1.1118E-1 | 2.3355E-8 | 1.2649E-7 |
| 7.1870E-2 | 3.6143E-2 | 2.8094E-9 | 2.5548E-8 |
| 2.8291E-2 | 1.3272E-2 | 3.6236E-11 | 8.4782E-9 |
| 6.8382E-3 | 5.0133E-3 | 6.4577E-11 | 7.5130E-10 |
| 1.2322E-3 | 1.3655E-3 | 4.4963E-14 | 2.4188E-10 |
| 6.8409E-4 | 5.5158E-4 | 3.6654E-16 | 2.2739E-13 |
| 1.6975E-4 | 1.7873E-4 | 5.6293E-17 | 9.0536E-14 |
| 2.4182E-5 | 4.9032E-5 | 7.1602E-17 | 5.6098E-15 |
| 6.6356E-6 | 1.7058E-5 | | |

(a)
$$f(t) = \sum_{i=1}^{23} \alpha_i e^{-\lambda_i t} \quad \text{MeV/Fission-s}$$

$$F(t,T) = \sum_{i=1}^{23} \frac{\alpha_i}{\lambda_i} e^{-\lambda_i t} (1-e^{-\lambda_i T}) \quad \text{MeV/Fission}$$

$F(t,\infty) = F(t,10^{13})$
t and T in seconds (b) Read as $1.2311 \times 10^0$

Table 10
Ratio Decay Heat with Absorption to Values Without Absorption [a]

| Time After Shutdown (sec) | $G_{max}(t)$ | Time After Shutdown (sec) | $G_{max}(t)$ |
|---|---|---|---|
| 1.0 | 1.020 | 1.5E+5 | 1.130 |
| 1.5 | 1.020 | 2.0E+5 | 1.131 |
| 2.0 | 1.020 | 4.0E+5 | 1.126 |
| 4.0 | 1.021 | 6.0E+5 | 1.124 |
| 6.0 | 1.022 | 8.0E+5 | 1.123 |
| 8.0 | 1.022 | 1.0E+6 | 1.124 |
| 1.0E+1 | 1.022 | 1.5E+6 | 1.125 |
| 1.5E+1 | 1.022 | 2.0E+6 | 1.127 |
| 2.0E+1 | 1.022 | 4.0E+6 | 1.134 |
| 4.0E+1 | 1.022 | 6.0E+6 | 1.146 |
| 6.0E+1 | 1.022 | 8.0E+6 | 1.162 |
| 8.0E+1 | 1.022 | 1.0E+7 | 1.181 |
| 1.0E+2 | 1.023 | 1.5E+7 | 1.233 |
| 1.5E+2 | 1.024 | 2.0E+7 | 1.284 |
| 2.0E+2 | 1.025 | 4.0E+7 | 1.444 |
| 4.0E+2 | 1.028 | 6.0E+7 | 1.535 |
| 6.0E+2 | 1.030 | 8.0E+7 | 1.586 |
| 8.0E+2 | 1.032 | 1.0E+8 | 1.598 |
| 1.0E+3 | 1.033 | 1.5E+8 | 1.498 |
| 1.5E+3 | 1.037 | 2.0E+8 | 1.343 |
| 2.0E+3 | 1.039 | 4.0E+8 | 1.065 |
| 4.0E+3 | 1.048 | 6.0E+8 | 1.021 |
| 6.0E+3 | 1.054 | 8.0E+8 | 1.012 |
| 8.0E+3 | 1.060 | 1.0E+9 | 1.007 |
| 1.0E+4 | 1.064 | | |
| 1.5E+4 | 1.074 | | |
| 2.0E+4 | 1.081 | | |
| 4.0E+4 | 1.098 | | |
| 6.0E+4 | 1.111 | | |
| 8.0E+4 | 1.119 | | |
| 1.0E+5 | 1.124 | | |

(a) Ratio Based on: $^{235}$U thermal fission for 4 years, no depletion, typical LWR spectrum (see 3.5).

Appendix (This Appendix is not a part of American National Standard for Decay Heat Power in Light Water Reactors, ANSI/ANS-5.1-1979)

Examples of the Use of the Standard

The values and formulas in this standard have been applied to simple examples to illustrate its use and also to check for internal consistency, since redundant prescriptions are given.

Example 1

Evaluate decay heat for $0 < t < 10^4$ for the power history described in the following histogram.

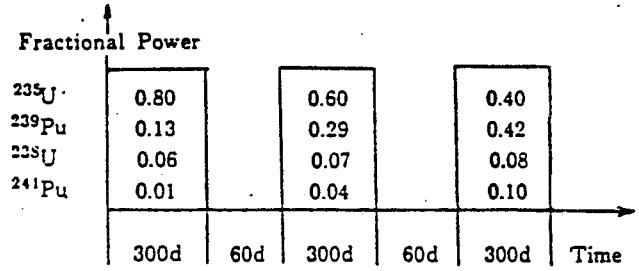

User Input: $Q_i$ = 200 MeV/fission, $\psi$ = 1.00
$\Delta Q_i = \Delta P = 0$

As specified in Sections 2.1 and 3.2 of the text, the fission products from fissionable nuclides other than $^{235}$U, $^{238}$U, and $^{239}$Pu shall be treated as $^{235}$U. Thus, the power fractions for $^{235}$U and $^{241}$Pu are combined and designated $^{235}$U as follows: 0.81 in the first power period, 0.64 in the second, and 0.50 in the third.

The uncorrected decay heat power, $P'_{di}$, is then calculated for each fissionable nuclide using expotential representations for F given in Tables 7, 8, and 9 to obtain the $F_i(t_{\alpha},T_{\alpha})$ from Equation (6) for use in Equation (6).

The results are then combined in Equation (2) of Text. Next the correction for neutron capture is evaluated from Equation (11) using the user input value $\psi$ = 1.00 and $T = (3 \times 300 + 2 \times 60)d = 8.8128 \times 10^7$ s. Thus, $G(t) = 1 + 4.88 \times 10^{-3} + 7.88 \times 10^{-7}t$.

The total decay heat power, $P_d$ is then calculated from Equation (1) of Text. The result has the same units as P. (The values given in the histograms are fractions of the power, P, which may be, for example, the total reactor power or a local power density, depending upon the application.) The result is reported as the ratio $P_d/P$. Numerical results are given in Table A-1. The uncertainties are obtained using Equations (5a), (5b), (9), and (10) of Text. For the purpose of this example $\Delta P = \Delta Q_i = 0$ were chosen for simplicity. If both errors were assigned the value of 2%, uniformly, the uncertainty at t = $10^3$ seconds would increase from 3.1 to 4.2%. It may also be noted that the values of G(t) found in this example are lower than the upperbound values of Table 10.

Equivalent numerical results for this example were obtained by the alternative methods of Sections 3.3 and 3.4 of Text:
 a) Numerical integration of Equation (3) of Text using tabular pulse function data, Tables 1, 2, and 3. Linear interpolation of ln f(t) vs ln t was used for tabular data.
 b) Equations (6), (7), and (8) employing linear interpolation of ln F(t) vs ln t from tabular data entries.

Table A-1
Example 1 — Decay Heat Power Relative to Operating Power

| Time After Shutdown t, sec | $^{235}$U $P'_{di}/P$ | Uncertainty $1\sigma$, % | $^{239}$Pu $P'_{di}/P$ | Uncertainty $1\sigma$, % | $^{238}$U $P'_{di}/P$ | Uncertainty $1\sigma$, % | Total $P'_d/P$ | Uncertainty $1\sigma$, % | G(t) | $P_d/P$ |
|---|---|---|---|---|---|---|---|---|---|---|
| 1 | 3.048×10⁻² | 3.3 | 2.129×10⁻² | 5.7 | 5.628×10⁻³ | 12.5 | 5.740×10⁻² | 5.1 | 1.00488 | 5.769×10⁻² |
| 10 | 2.344×10⁻² | 2.0 | 1.704×10⁻² | 4.2 | 4.071×10⁻³ | 9.6 | 4.455×10⁻² | 3.5 | 1.00489 | 4.477×10⁻² |
| 10² | 1.519×10⁻² | 1.8 | 1.167×10⁻² | 4.2 | 2.440×10⁻³ | 5.9 | 2.930×10⁻² | 3.1 | 1.00496 | 2.945×10⁻² |
| 10³ | 9.191×10⁻³ | 1.8 | 7.113×10⁻³ | 4.4 | 1.392×10⁻³ | 4.9 | 1.770×10⁻² | 3.1 | 1.00567 | 1.780×10⁻² |
| 10⁴ | 4.472×10⁻³ | 1.7 | 3.356×10⁻³ | 4.8 | 6.634×10⁻⁴ | 4.4 | 8.491×10⁻³ | 3.2 | 1.01276 | 8.600×10⁻³ |

Example 2

Evaluate the decay heat for $1 < t < 10^4$s from a single fissionable nuclide, $^{235}$U, with the power histogram of Example 1. User input data: Q = 200 MeV/fission, $\psi$ = 1.00, $\Delta P = \Delta Q = 0$.

The procedures are the same as in the first example. Numerical results are given in Table A-2.

Table A-2
Example 2 — Decay Heat Power Relative To Operating Power

| Time After Shutdown t, sec | $P'_d/P$ | Uncertainty $1\sigma$, % | G(t) | $P_d/P$ |
|---|---|---|---|---|
| 1 | 6.090×10⁻² | 3.3 | 1.00488 | 6.120×10⁻² |
| 10 | 4.681×10⁻² | 2.0 | 1.00489 | 4.704×10⁻² |
| 10² | 3.033×10⁻² | 1.8 | 1.00496 | 3.048×10⁻² |
| 10³ | 1.832×10⁻² | 1.8 | 1.00567 | 1.842×10⁻² |
| 10⁴ | 8.879×10⁻³ | 1.7 | 1.01276 | 8.992×10⁻³ |

Example 3.

For the power history of Example 1, use the simplified method prescribed in Section 3.6 of Text to obtain the decay heat power for $1 < t < 10^9$ seconds. For $t < 10^4$s, use Equation (11) rather than Table 10 of Text.

User Input: $Q = 200$ MeV/fission, $\psi = 1$
$\Delta P = 0$

Calculate the nominal value $+ 2\sigma$ uncertainty and compare the result with the 1973 revised standard upper bound.

For this example we use the data from Table 4 in Equation (12) of Text to obtain $\frac{P'_d}{P}$, where P represents the unit power level during periods of reactor operation, and T is the total duration of reactor operation, $8.8128 \times 10^7$ sec (1020 days). For $1 < t < 10^4$s, the factor G(t) is the same as in Example 1. For $t > 10^4$s, G(t) is taken from Table 10 of Text. The uncertainty is obtained from Equation (13) of Text. The calculations are summarized in Table A-3.

In Table A-4, we give the ratio of the 1979 standard result from Example 3 to the result for the same problem obtained from the 1973 standard. Both nominal values and upper bounds are presented. For comparison, the nominal value plus $2\sigma$ obtained from Example 1 is also given. Evidently the simplified method of the 1979 standard increases the calculated decay heat power by about 6%, as compared with the detailed method (Example 1), for the power history of this problem.

It may also be noted that the capture correction given by Table 10 of Text produces upper bound results for $t > 10^4$s using the 1979 standard that are larger than the upper bound obtained using the 1973 standard. It should be emphasized that Table 10 values are larger than those expected for the conditions of this example.

Table A-3
Example 3
Decay Heat Power Relative To Operating Power

| Time After Shutdown t sec | $F(t,\infty)$ MeV/ Fission | $F(t+T,\infty)$ MeV/ Fission | $\frac{P'_d}{P}$ | G(t) | $\frac{P_d}{P}$ | Uncertainty $1\sigma$, % | $\frac{P_d}{P}(1+2\sigma)$ |
|---|---|---|---|---|---|---|---|
| 1 | 12.31 | 0.1197 | $6.217 \times 10^{-2}$ | 1.00488 | $6.247 \times 10^{-2}$ | 4.0 | $6.747 \times 10^{-2}$ |
| 10 | 9.494 | 0.1197 | $4.781 \times 10^{-2}$ | 1.00489 | $4.804 \times 10^{-2}$ | 4.0 | $5.189 \times 10^{-2}$ |
| $10^2$ | 6.198 | 0.1197 | $3.100 \times 10^{-2}$ | 1.00496 | $3.115 \times 10^{-2}$ | 4.0 | $3.365 \times 10^{-2}$ |
| $10^3$ | 3.796 | 0.1197 | $1.875 \times 10^{-2}$ | 1.00567 | $1.886 \times 10^{-2}$ | 4.0 | $2.036 \times 10^{-2}$ |
| $10^4$ | 1.908 | 0.1197 | $9.120 \times 10^{-3}$ | 1.01276 | $9.237 \times 10^{-3}$ | 4.0 | $9.976 \times 10^{-3}$ |
| $10^5$ | $9.691 \times 10^{-1}$ | 0.1197 | $4.33 \times 10^{-3}$ | 1.124 | $4.87 \times 10^{-3}$ | 4.0 | $5.26 \times 10^{-3}$ |
| $10^6$ | $5.509 \times 10^{-1}$ | 0.1194 | $2.20 \times 10^{-3}$ | 1.124 | $2.47 \times 10^{-3}$ | 4.0 | $2.67 \times 10^{-3}$ |
| $10^7$ | $2.457 \times 10^{-1}$ | 0.1170 | $6.56 \times 10^{-4}$ | 1.181 | $7.75 \times 10^{-4}$ | 4.0 | $8.37 \times 10^{-4}$ |
| $10^8$ | $1.165 \times 10^{-1}$ | 0.1043 | $6.22 \times 10^{-5}$ | 1.598 | $9.94 \times 10^{-5}$ | 4.0 | $1.074 \times 10^{-4}$ |
| $10^9$ | $5.678 \times 10^{-2}$ | $5.34 \times 10^{-2}$ | $1.724 \times 10^{-5}$ | 1.007 | $1.736 \times 10^{-5}$ | 4.0 | $1.875 \times 10^{-5}$ |

Table A-4
Comparison of Example Results

| Seconds | Ratios 1979/1973 | | |
|---|---|---|---|
| | Example 3 | | Example 1 |
| | Nominal | Upper Bound | Upper Bound |
| 1 | 1.009 | 0.908 | 0.860 |
| 10 | 0.972 | 0.875 | 0.808 |
| $10^2$ | 0.957 | 0.863 | 0.802 |
| $10^3$ | 1.051 | 0.947 / 1.034 | 0.879 / 0.960 |
| $10^4$ | 1.016 | 0.998 | 0.915 |
| $10^5$ | 1.163 | 1.143 | — |
| $10^6$ | 1.172 | 1.151 | — |
| $10^7$ | 1.25 | 1.227 / 1.080 | — |
| $10^8$ | 1.529 | 1.322 | — |
| $10^9$ | 1.24 | 1.071 | — |

1973 Nominal is for 1020 days at constant power
1973 "Upper Bound" = Nominal x $(1 + \epsilon)$
where $t < 10^3 s$, $\epsilon = 0.2$
$10^3 \leq t \leq 10^7 s$, $\epsilon = 0.1$
$10^7 \leq t \leq 10^9 s$, $\epsilon = 0.25$.
1978 "Upper Bounds" are Nominal x $(1 + 2\sigma)$

We claim:

1. A method of operating a nuclear reactor which includes an emergency cooling system having a predetermined maximum rated emergency cooling capacity for dissipating reactor heat including decay heat, in which method said nuclear reactor is operated with a maximum rated power output which has a value equal to or less than a value thereof, hereinafter referred to as the highest permissible value thereof, at which a shut-down of the reactor will produce a predicted integral decay heat ($E_{THOR}$), at some time soon after shut-down, which is protected by said predetermined maximum rated emergency cooling capacity, said predicted integral decay heat being calculable from the data of FIG. 8 hereof by the calculational procedure set forth in the APPENDIX hereof, in which method said maximum rated power output has a value which is equal to or less than said highest permissible value of said maximum rated power output and when it is less than said highest permissible value thereof, said maximum rated power output is greater than 95% of said highest permissible value thereof.

2. The method of claim 1 in which said nuclear reactor is operated with a maximum rated power output which has a value which is greater than 96% of said highest permissible value of said maximum rated power output.

3. The method of claim 2 in which said nuclear reactor is operated with a maximum rated power output which has a value which is greater than 97% of said highest permissible value of said maximum rated power output.

4. The method of claim 3 in which said nuclear reactor is operated with a maximum rated power output which has a value which is greater than 98% of said highest permissible value of said maximum rated power output.

5. The method of claim 4 in which said nuclear reactor is operated with a maximum rated power output which has a value which is greater than 99° of said highest permissible value of said maximum rated power output.

* * * * *